March 21, 1950 W. T. GOLLWITZER 2,501,444
CALCULATING MACHINE
Filed June 12, 1946 42 Sheets-Sheet 1

Inventor:
Walter T. Gollwitzer,
By: Wallace and Cannon
Attorneys

March 21, 1950     W. T. GOLLWITZER     2,501,444
CALCULATING MACHINE

Filed June 12, 1946     42 Sheets-Sheet 3

Inventor:
Walter T. Gollwitzer,
By: Wallace and Cannon
attorneys

March 21, 1950 W. T. GOLLWITZER 2,501,444
CALCULATING MACHINE
Filed June 12, 1946 42 Sheets-Sheet 4
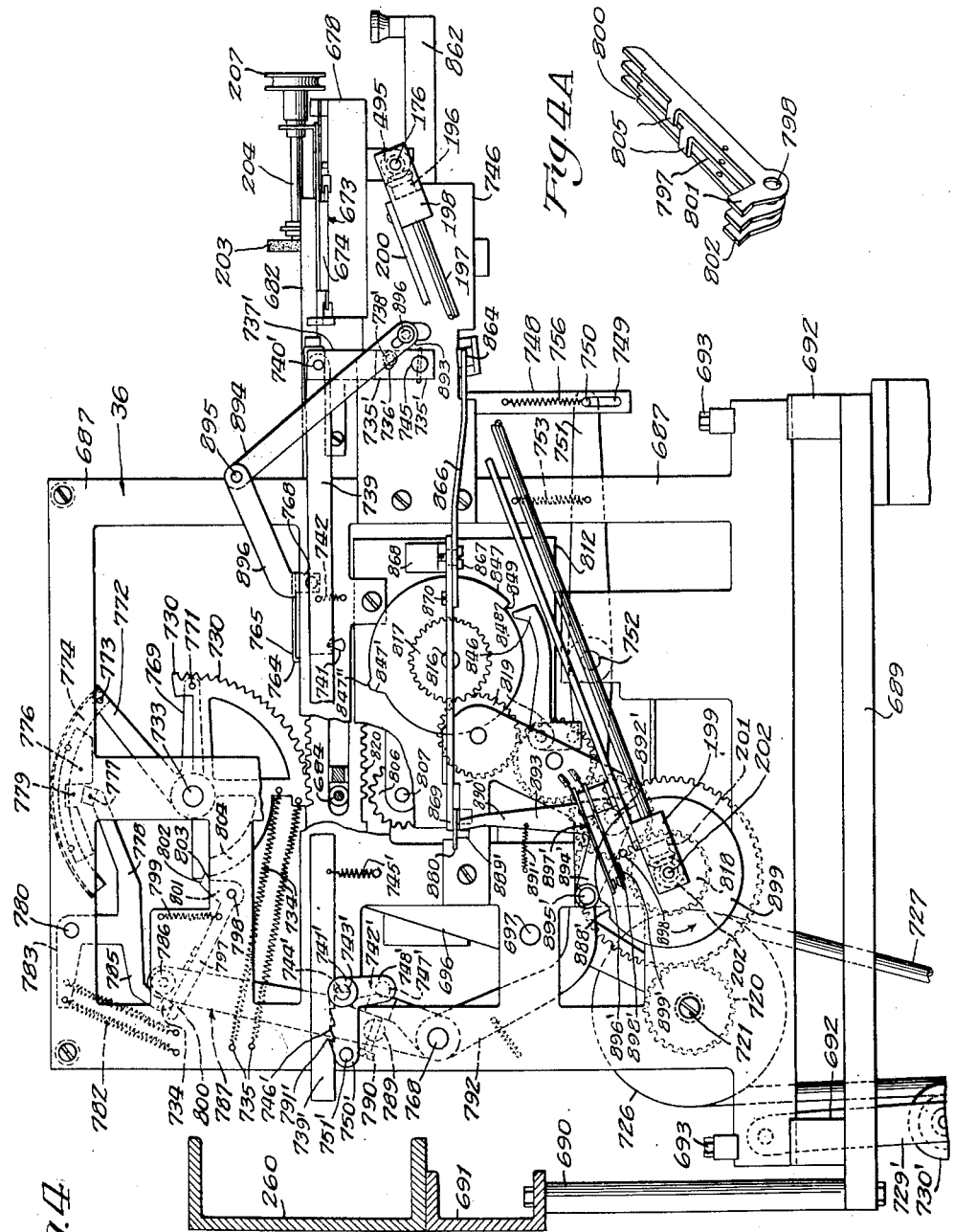
Inventor:
Walter T. Gollwitzer,
By: Wallace and Cannon
Attorneys

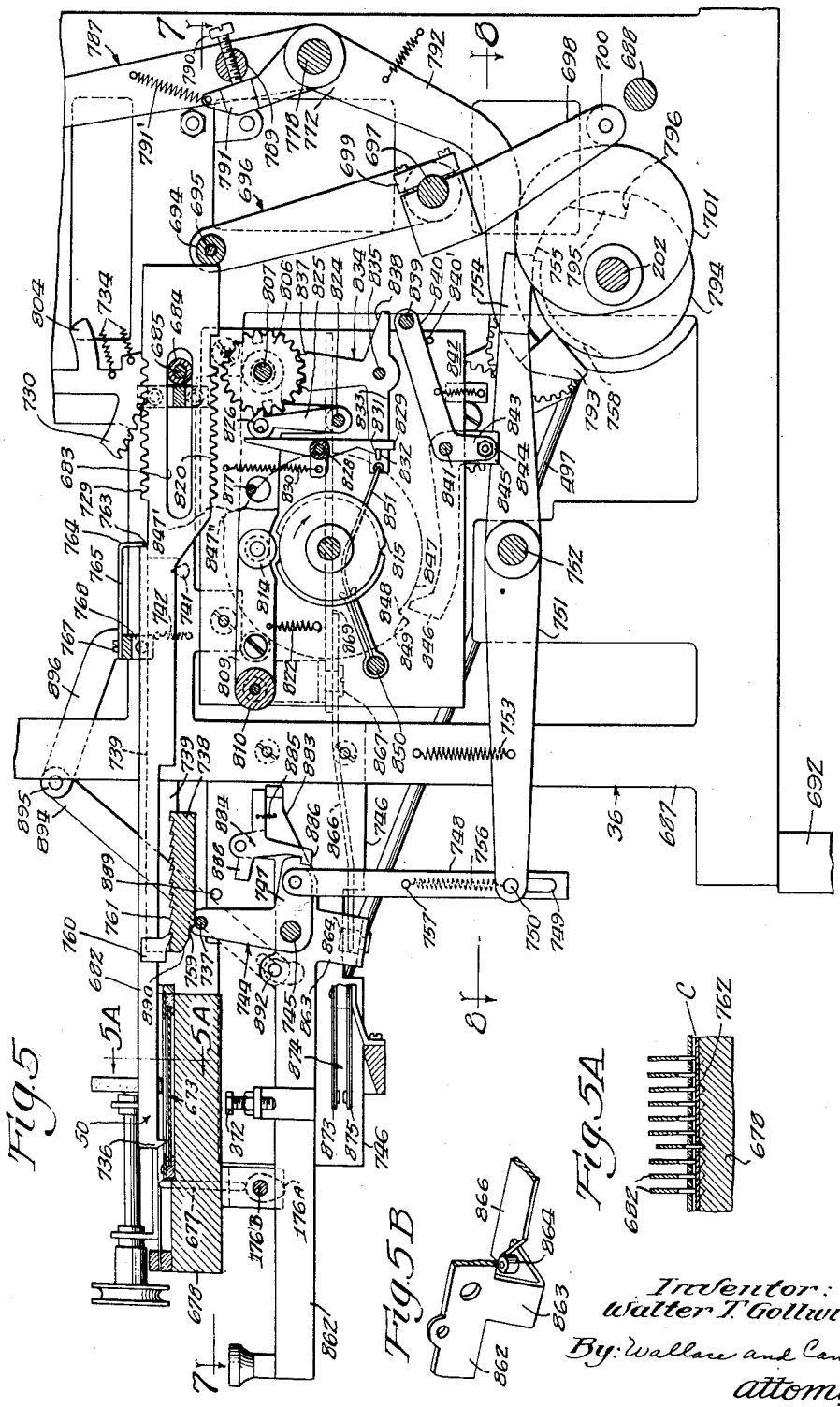

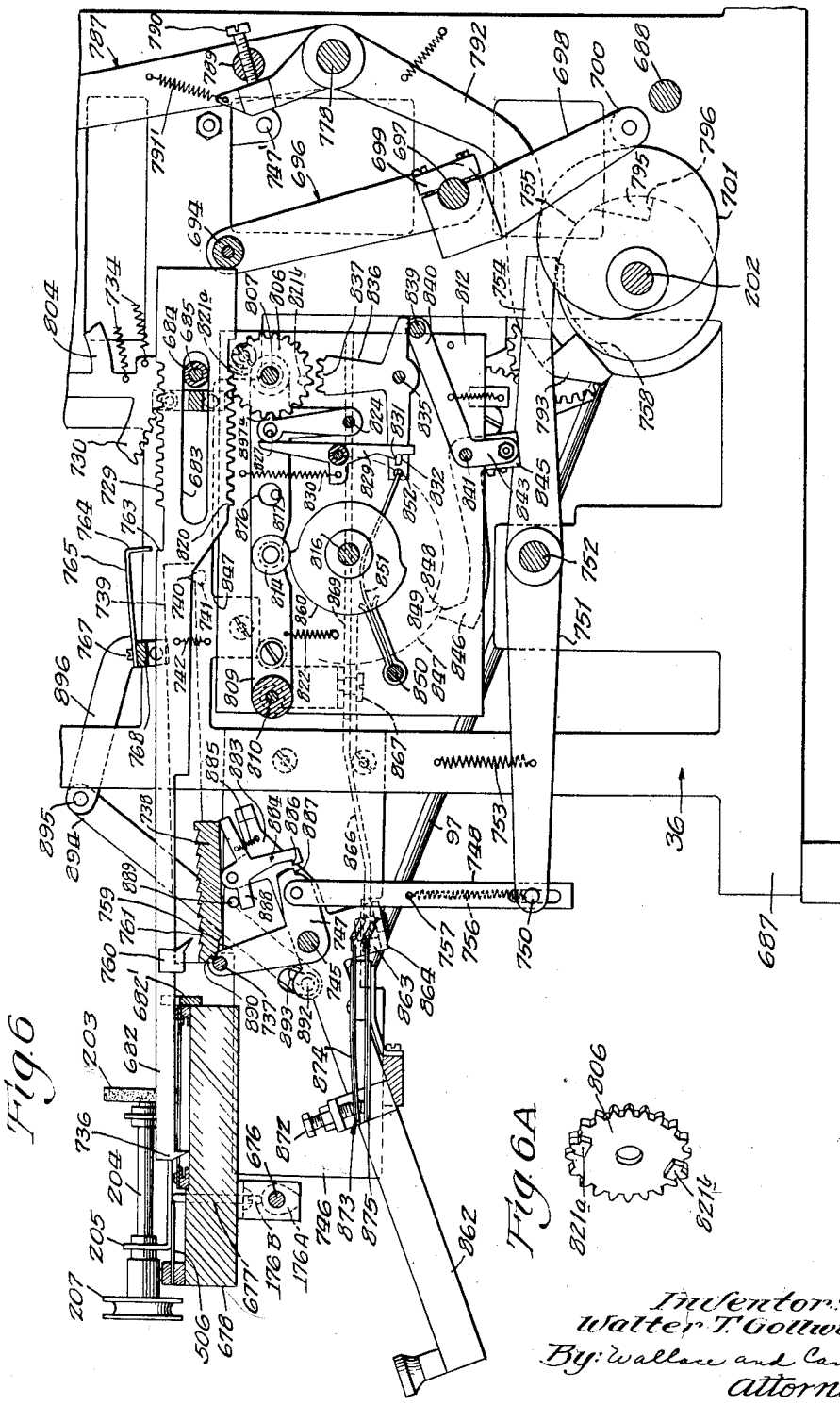

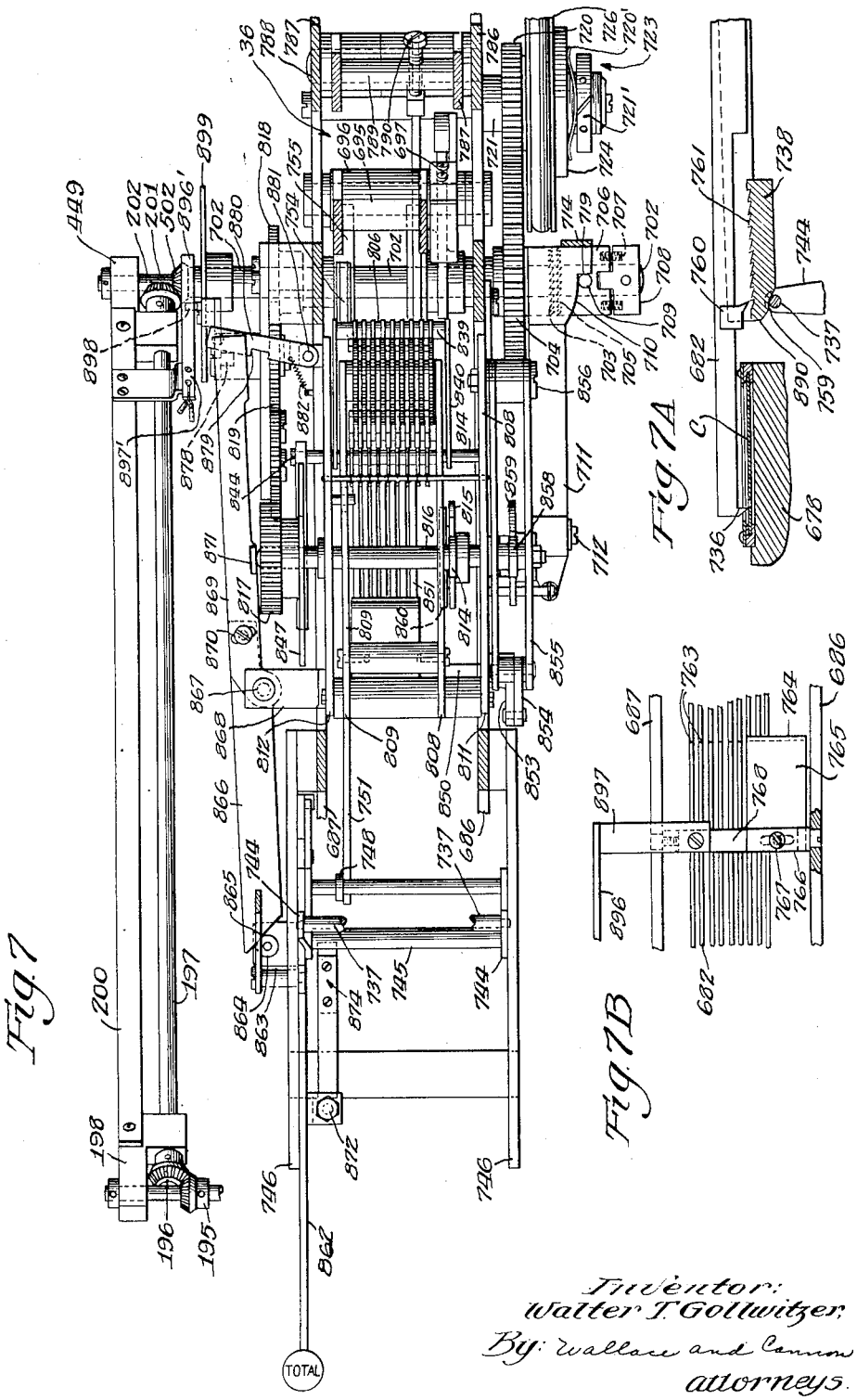

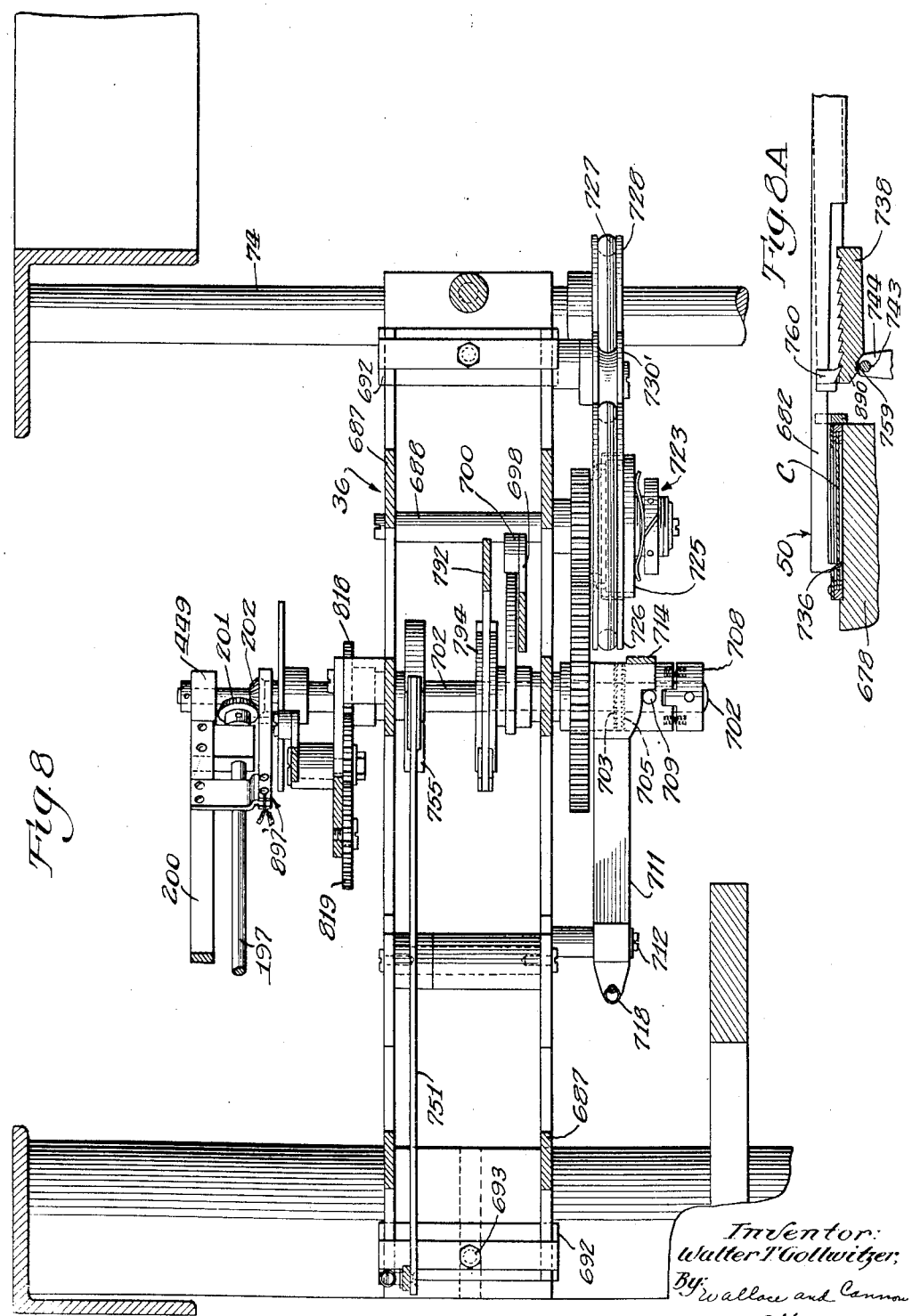

March 21, 1950  W. T. GOLLWITZER  2,501,444
CALCULATING MACHINE
Filed June 12, 1946  42 Sheets-Sheet 9

Inventor:
Walter T. Gollwitzer,
By Wallace and Cannon
attorneys

March 21, 1950　　　W. T. GOLLWITZER　　　2,501,444
CALCULATING MACHINE
Filed June 12, 1946　　　　　　　　　　　　42 Sheets-Sheet 10
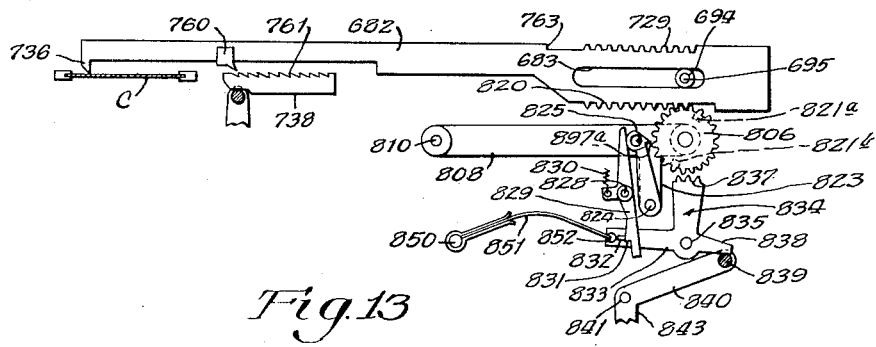
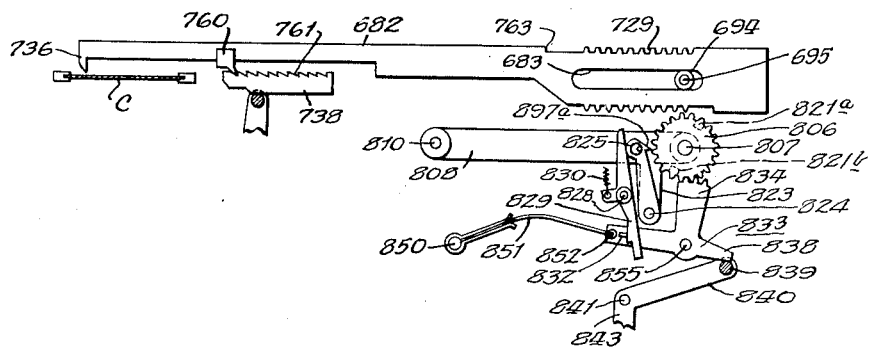
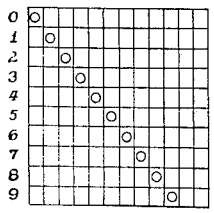
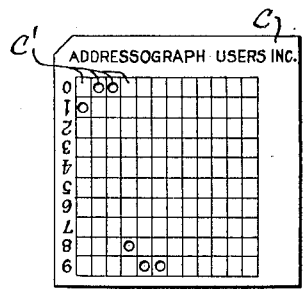
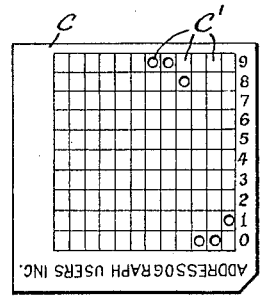
Fig.14　　Fig.15　　Fig.16
Inventor:
Walter T. Gollwitzer,
By Wallace and Cannon
Attorneys

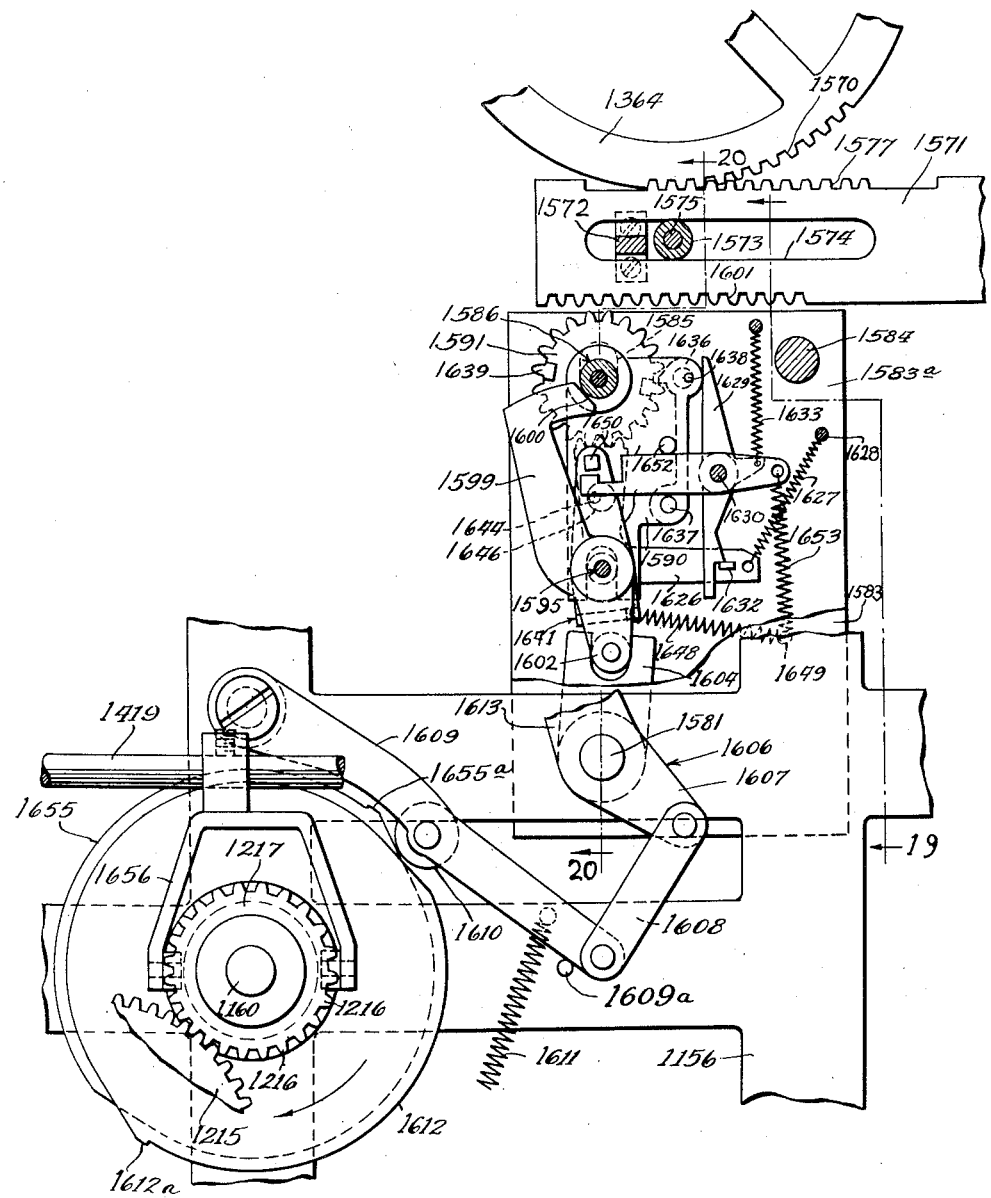

March 21, 1950  W. T. GOLLWITZER  2,501,444
CALCULATING MACHINE
Filed June 12, 1946  42 Sheets-Sheet 12
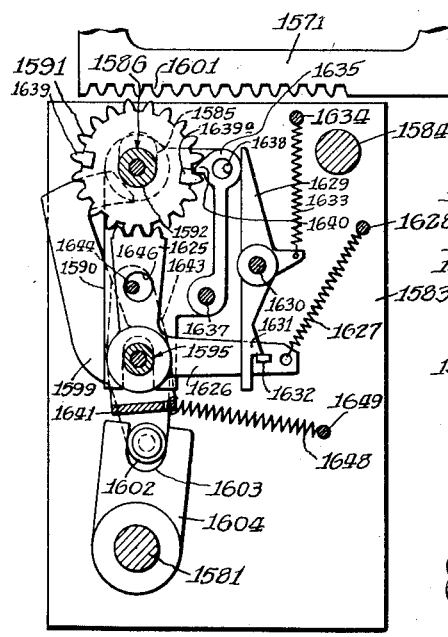
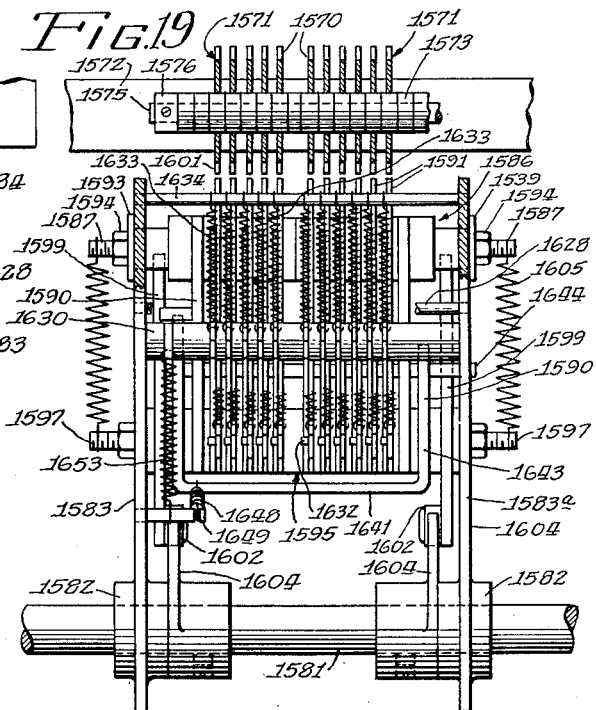
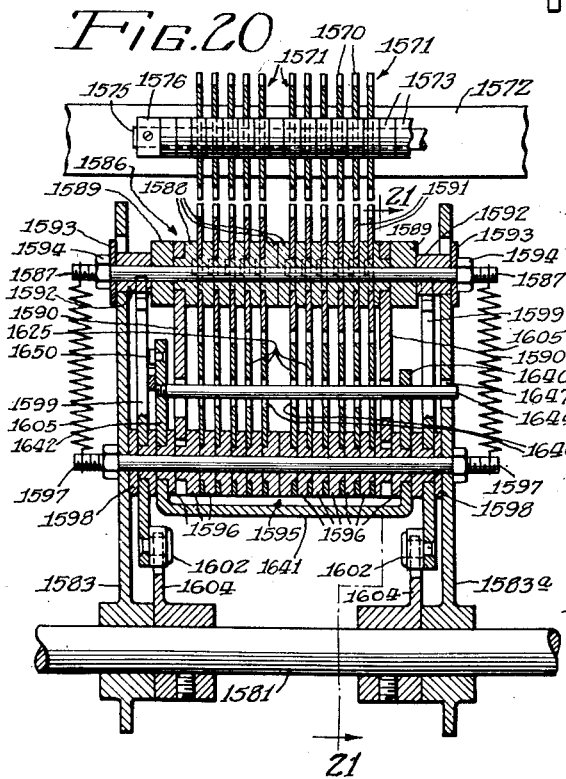
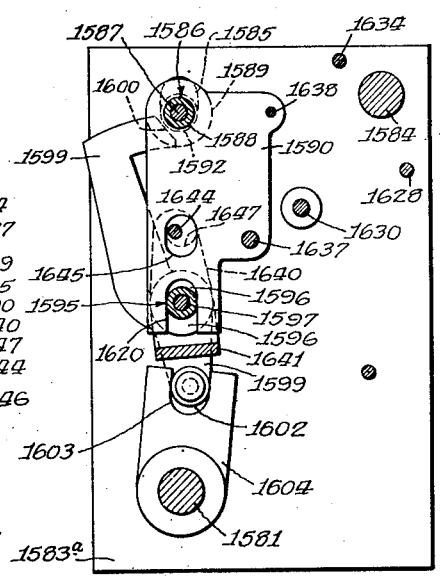
Inventor:
Walter T. Gollwitzer
By Wallace and Cannon
Attorneys March 21, 1950 — W. T. GOLLWITZER — 2,501,444
CALCULATING MACHINE
Filed June 12, 1946 — 42 Sheets-Sheet 13
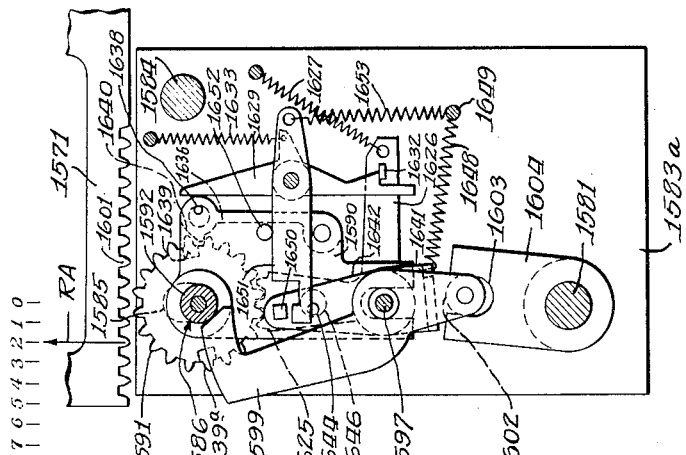
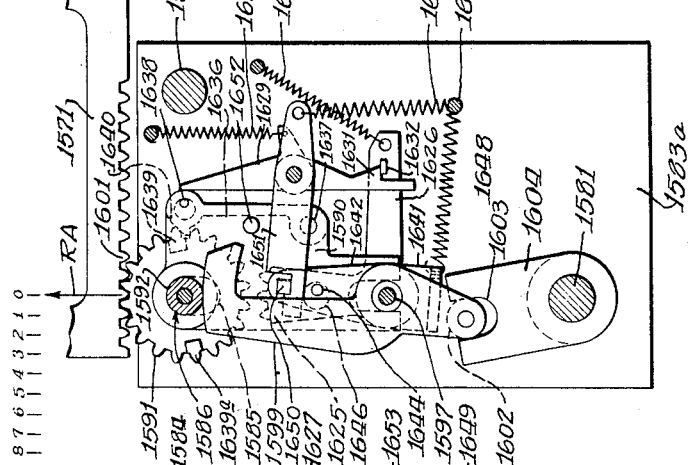
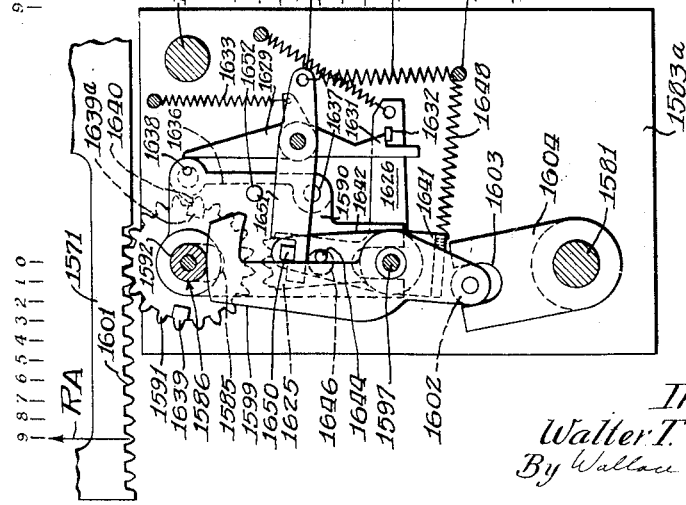
Inventor:
Walter T. Gollwitzer
By Wallace and Cannon
Attorneys

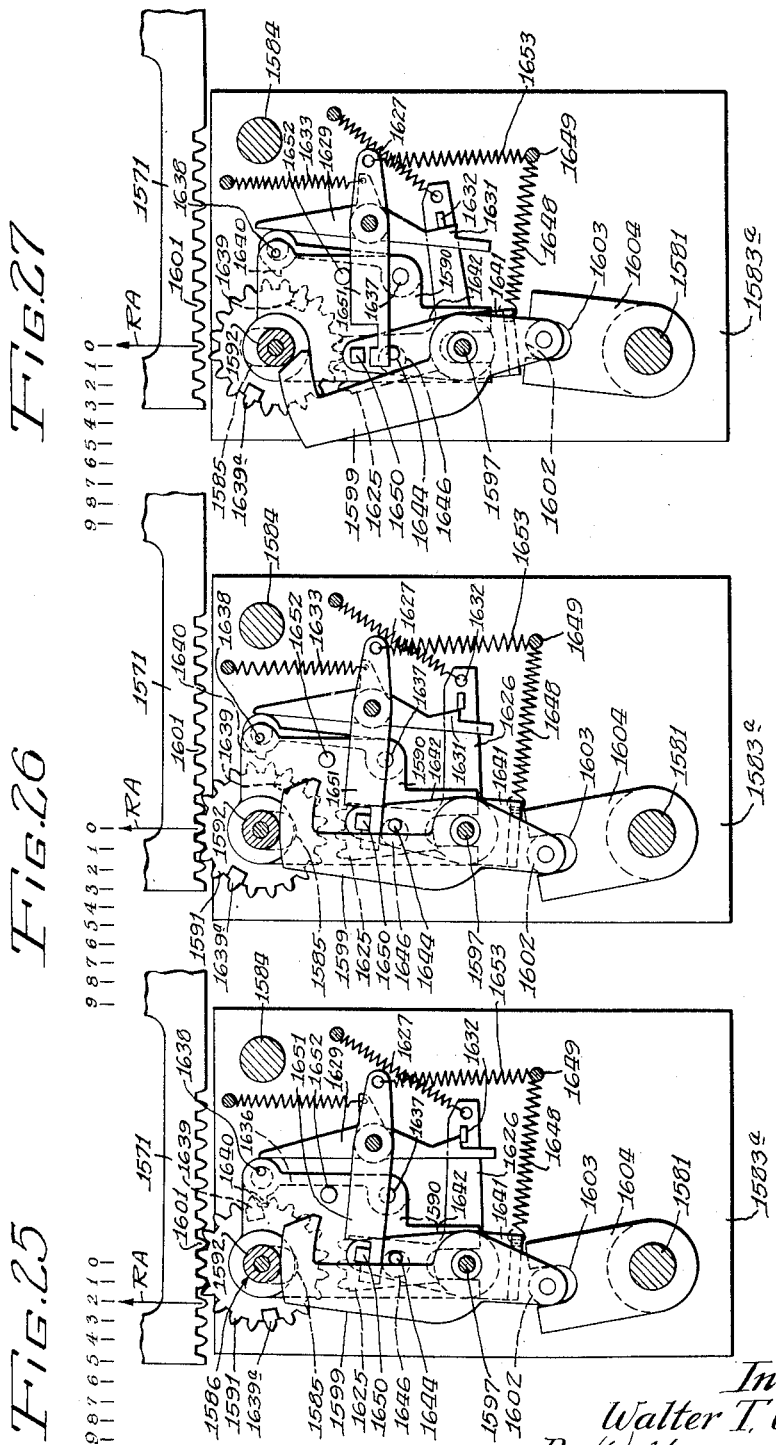

March 21, 1950 W. T. GOLLWITZER 2,501,444
CALCULATING MACHINE
Filed June 12, 1946 42 Sheets-Sheet 15

Inventor:
Walter T. Gollwitzer
By Wallace and Cannon
Attorneys

March 21, 1950　　　W. T. GOLLWITZER　　　2,501,444
CALCULATING MACHINE
Filed June 12, 1946　　　42 Sheets-Sheet 18

Inventor
Walter T. Gollwitzer
By Wallace and Cannon
Attorneys

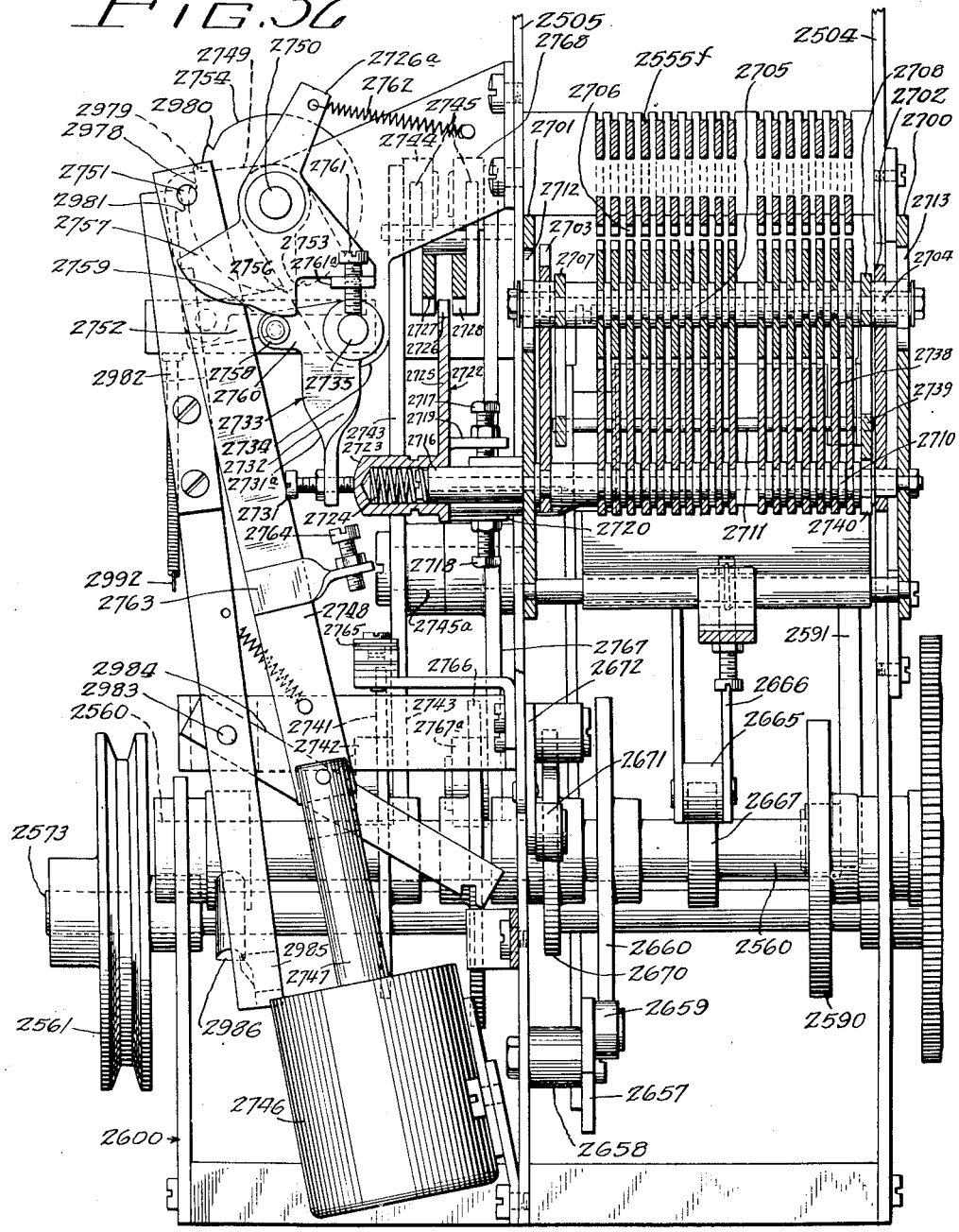

March 21, 1950 W. T. GOLLWITZER 2,501,444
CALCULATING MACHINE
Filed June 12, 1946 42 Sheets-Sheet 20
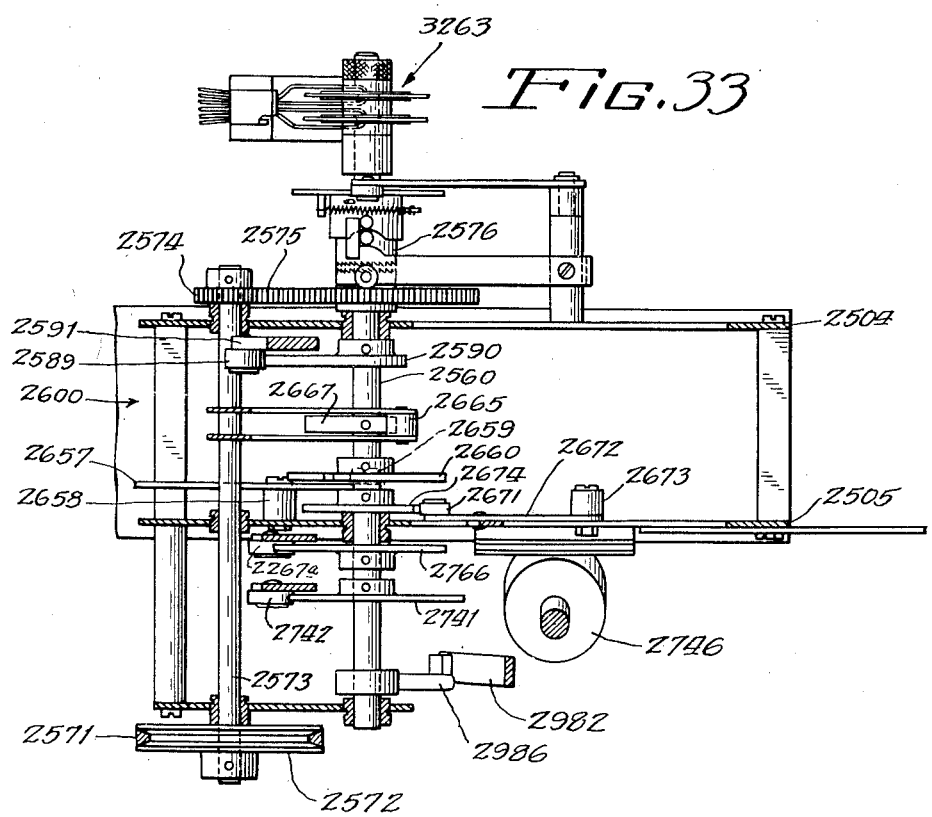
Inventor
Walter T. Gollwitzer
By Wallace and Cannon
Attorneys March 21, 1950  W. T. GOLLWITZER  2,501,444
CALCULATING MACHINE
Filed June 12, 1946  42 Sheets-Sheet 21
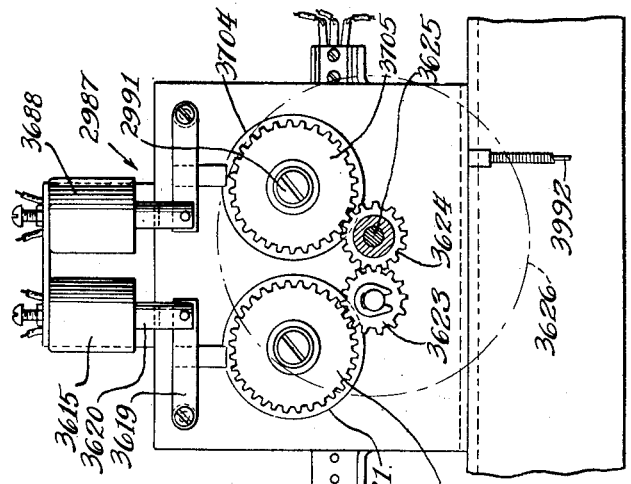
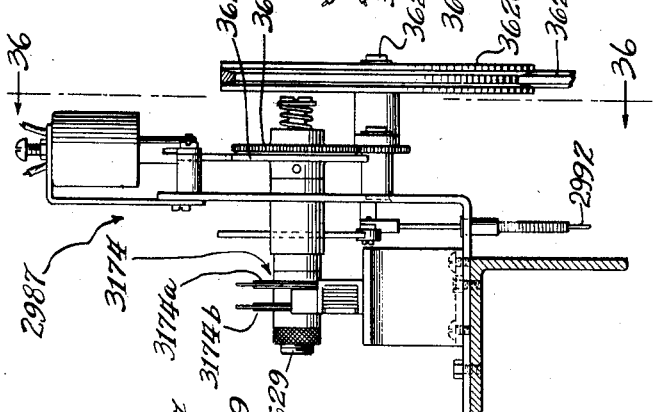
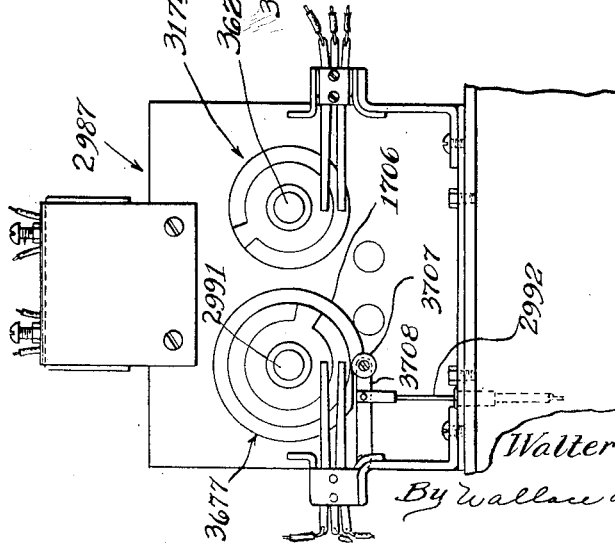
Inventor
Walter T. Gollwitzer
By Wallace and Cannon
Attys March 21, 1950 W. T. GOLLWITZER 2,501,444
CALCULATING MACHINE
Filed June 12, 1946 42 Sheets-Sheet 22
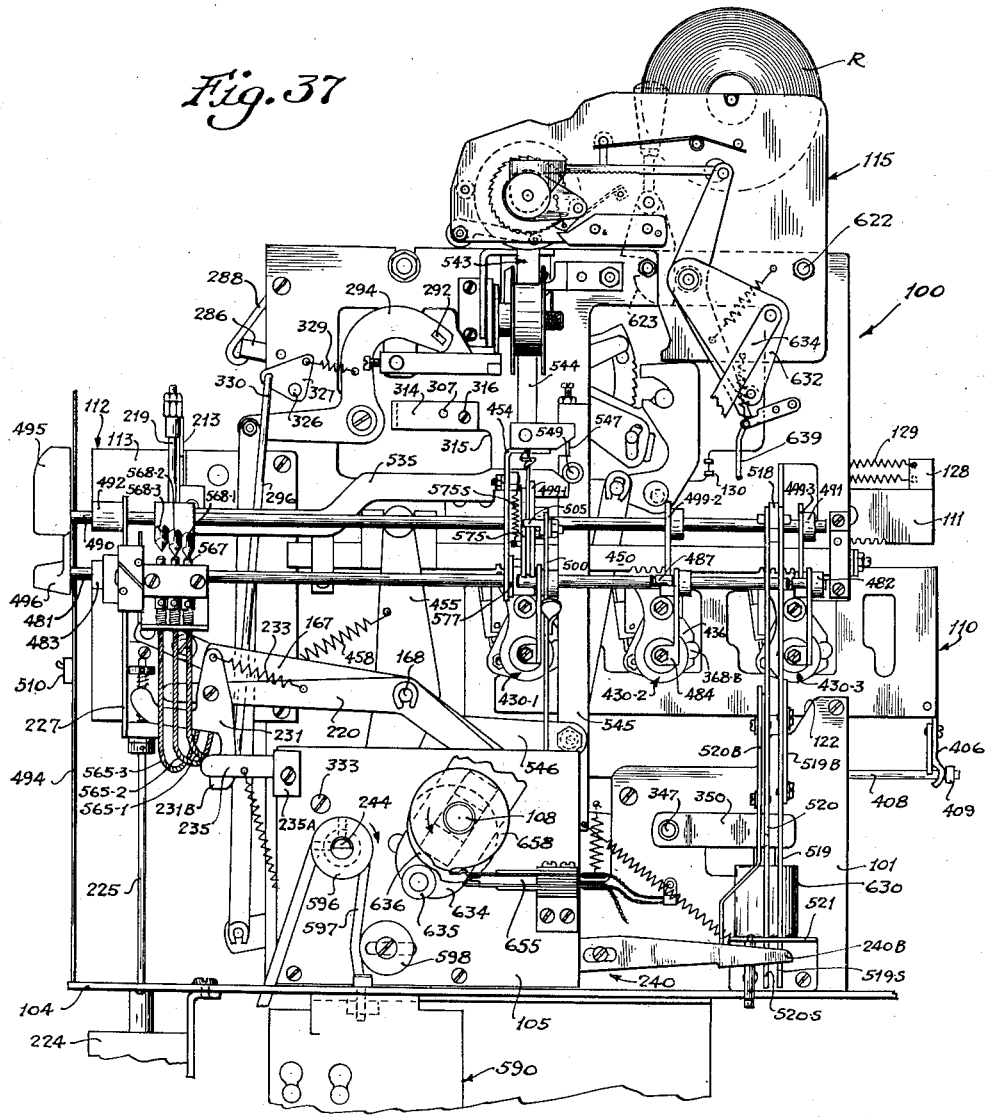
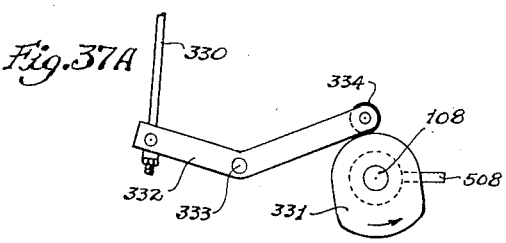
INVENTOR.
Walter T. Gollwitzer
BY Wallace and Cannon
ATTORNEYS March 21, 1950     W. T. GOLLWITZER     2,501,444
CALCULATING MACHINE
Filed June 12, 1946                        42 Sheets-Sheet 23
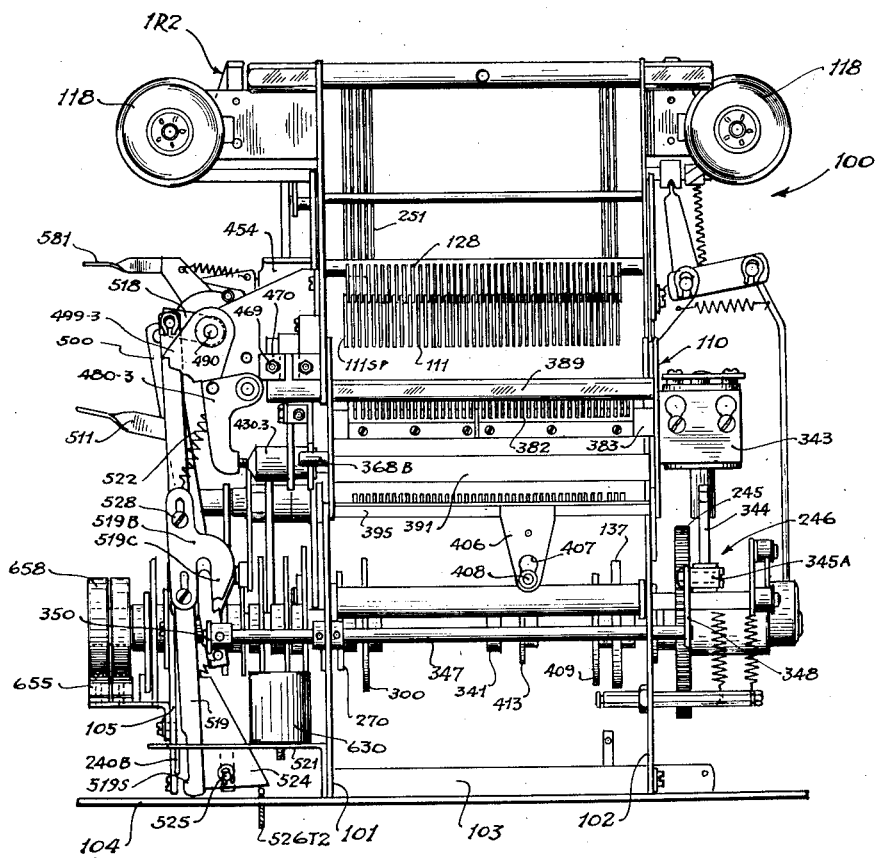
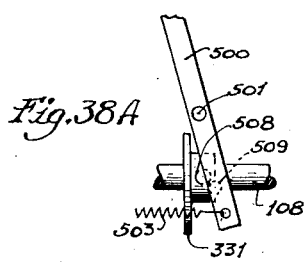
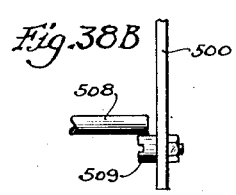
INVENTOR.
Walter T. Gollwitzer
BY Wallace and Cannon
ATTORNEYS March 21, 1950 W. T. GOLLWITZER 2,501,444
CALCULATING MACHINE
Filed June 12, 1946 42 Sheets-Sheet 24

INVENTOR.
Walter T. Gollwitzer
BY Wallace and Cannon
ATTORNEYS

March 21, 1950     W. T. GOLLWITZER     2,501,444
CALCULATING MACHINE
Filed June 12, 1946                                42 Sheets—Sheet 25
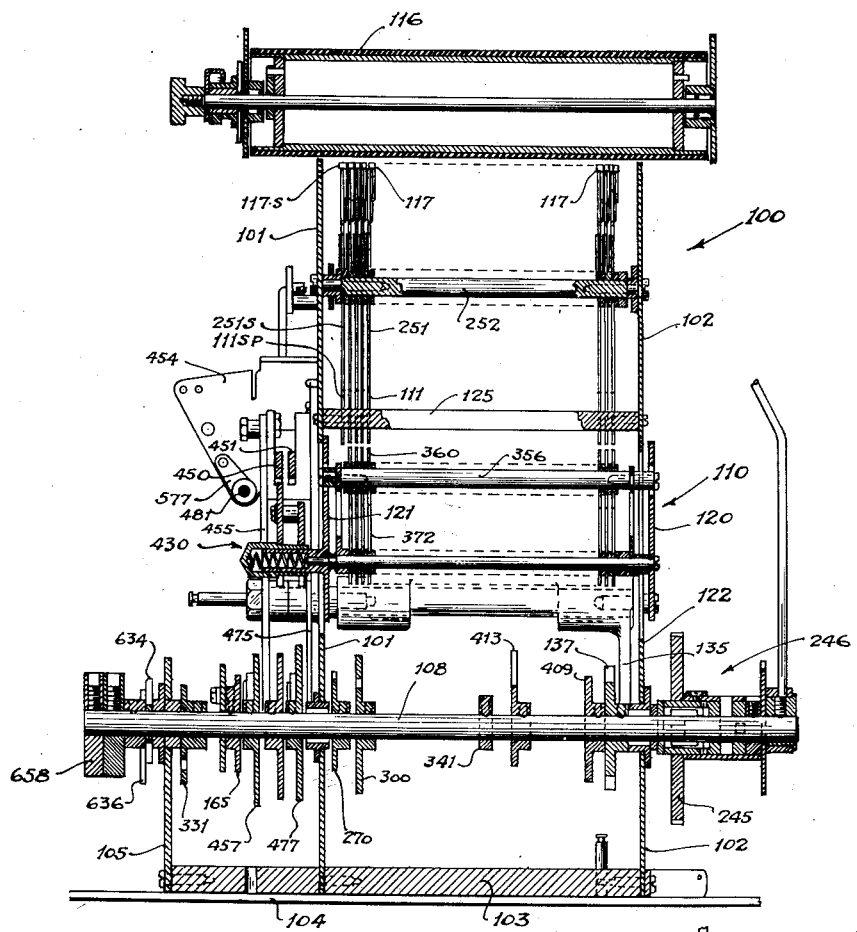
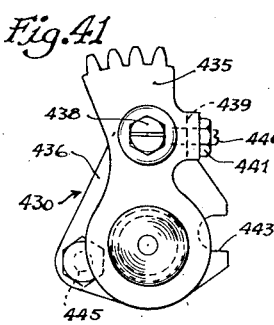
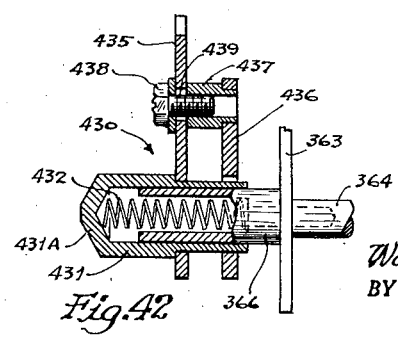
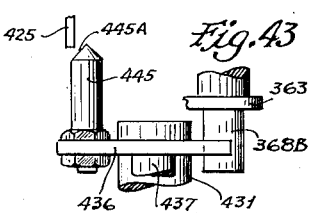
INVENTOR.
Walter T. Gollwitzer
BY Wallace and Cannon
ATTORNEYS March 21, 1950 W. T. GOLLWITZER 2,501,444
CALCULATING MACHINE
Filed June 12, 1946 42 Sheets-Sheet 26
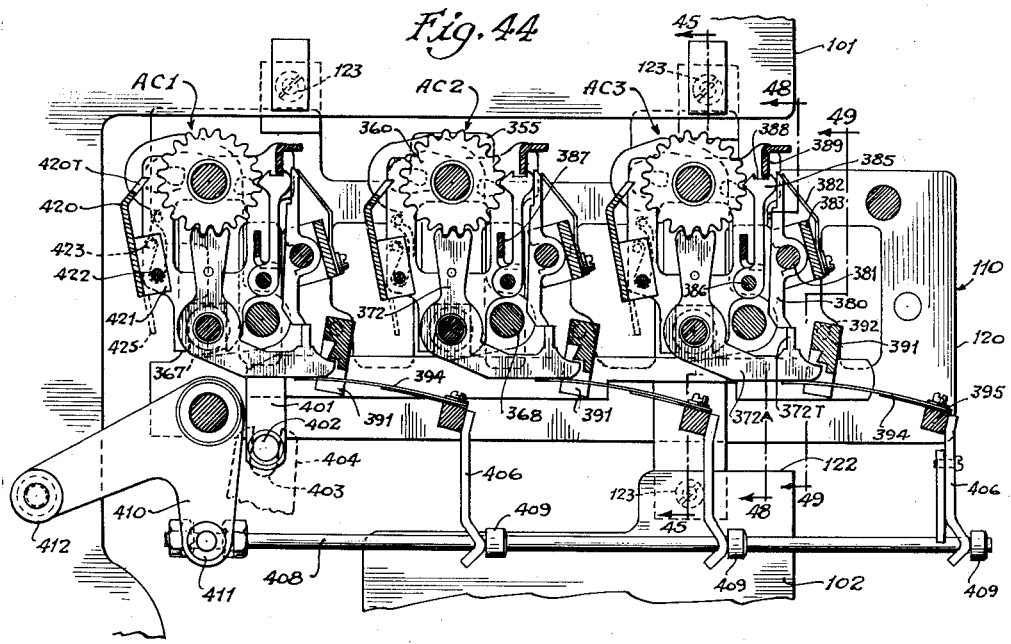
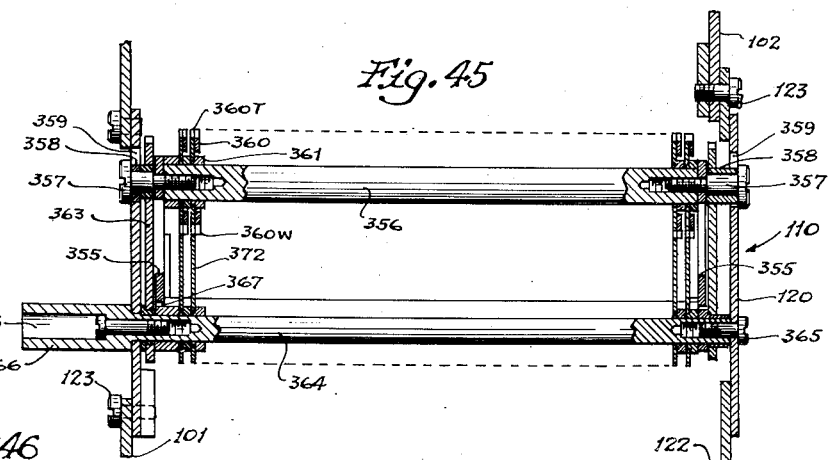
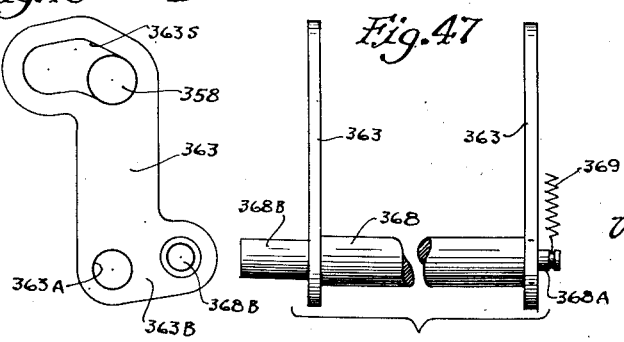
INVENTOR.
Walter T. Gollwitzer
BY Wallace and Cannon
ATTORNEYS March 21, 1950 W. T. GOLLWITZER 2,501,444
CALCULATING MACHINE
Filed June 12, 1946 42 Sheets-Sheet 27

INVENTOR.
Walter T. Gollwitzer
BY
Wallace and Cannon
ATTORNEYS

March 21, 1950 W. T. GOLLWITZER 2,501,444
CALCULATING MACHINE
Filed June 12, 1946 42 Sheets-Sheet 29
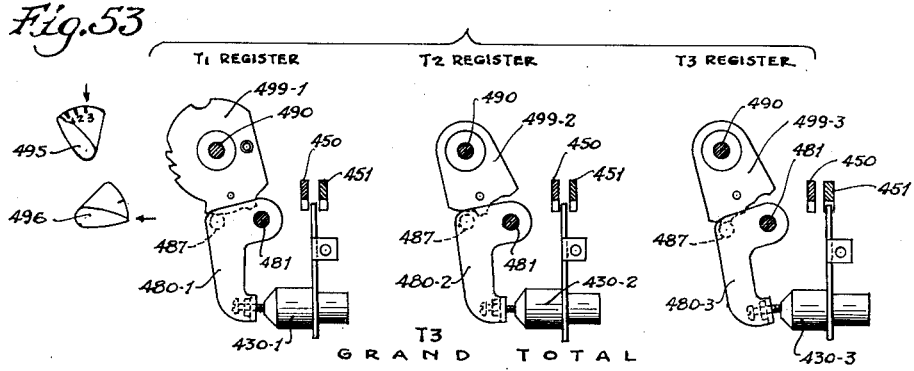
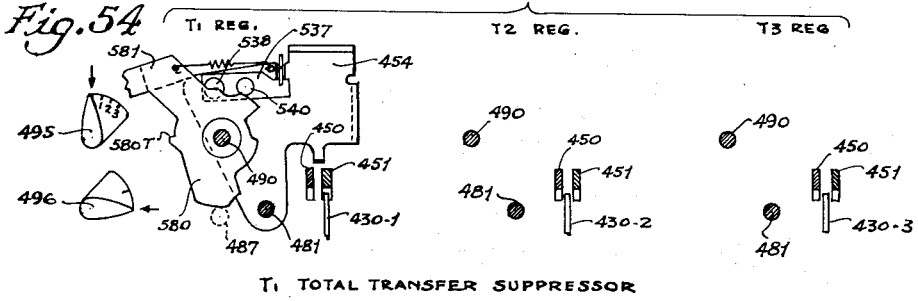
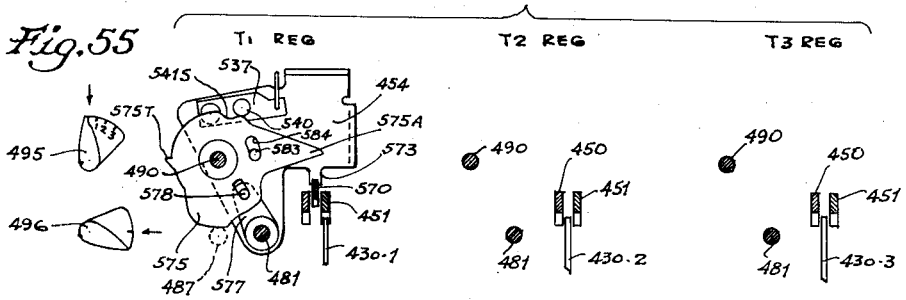
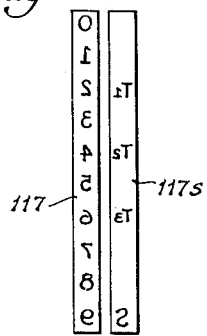
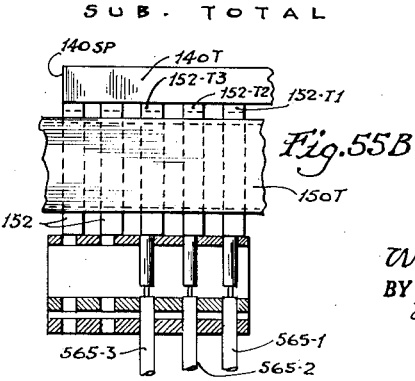
INVENTOR.
Walter T. Gollwitzer
BY
Wallace and Cannon
ATTORNEYS March 21, 1950     W. T. GOLLWITZER     2,501,444
CALCULATING MACHINE Filed June 12, 1946                               42 Sheets-Sheet 30

INVENTOR.
Walter T. Gollwitzer
BY Wallace and Cannon
ATTORNEYS

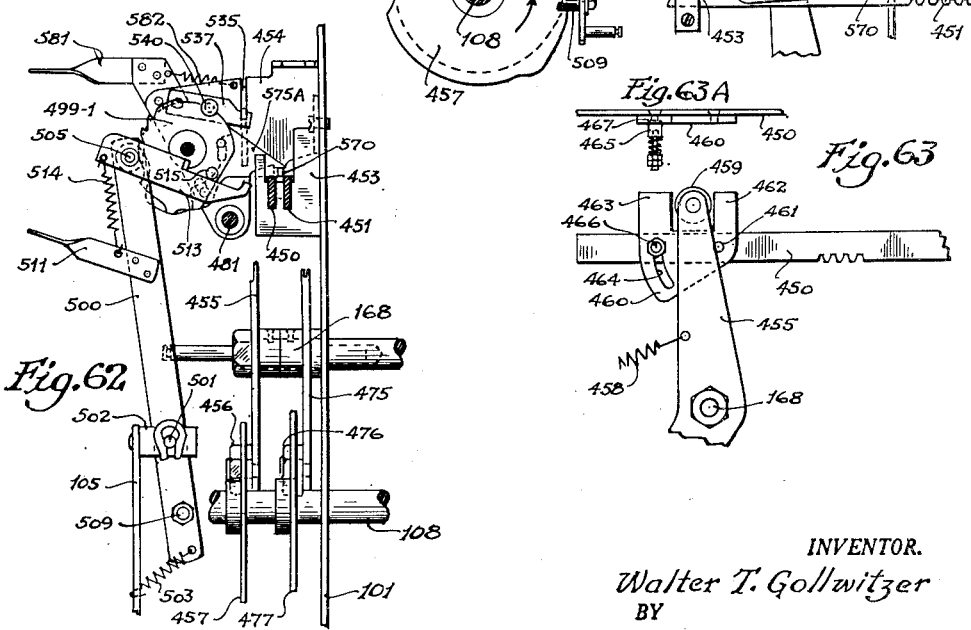

March 21, 1950 W. T. GOLLWITZER 2,501,444
CALCULATING MACHINE
Filed June 12, 1946 42 Sheets-Sheet 32
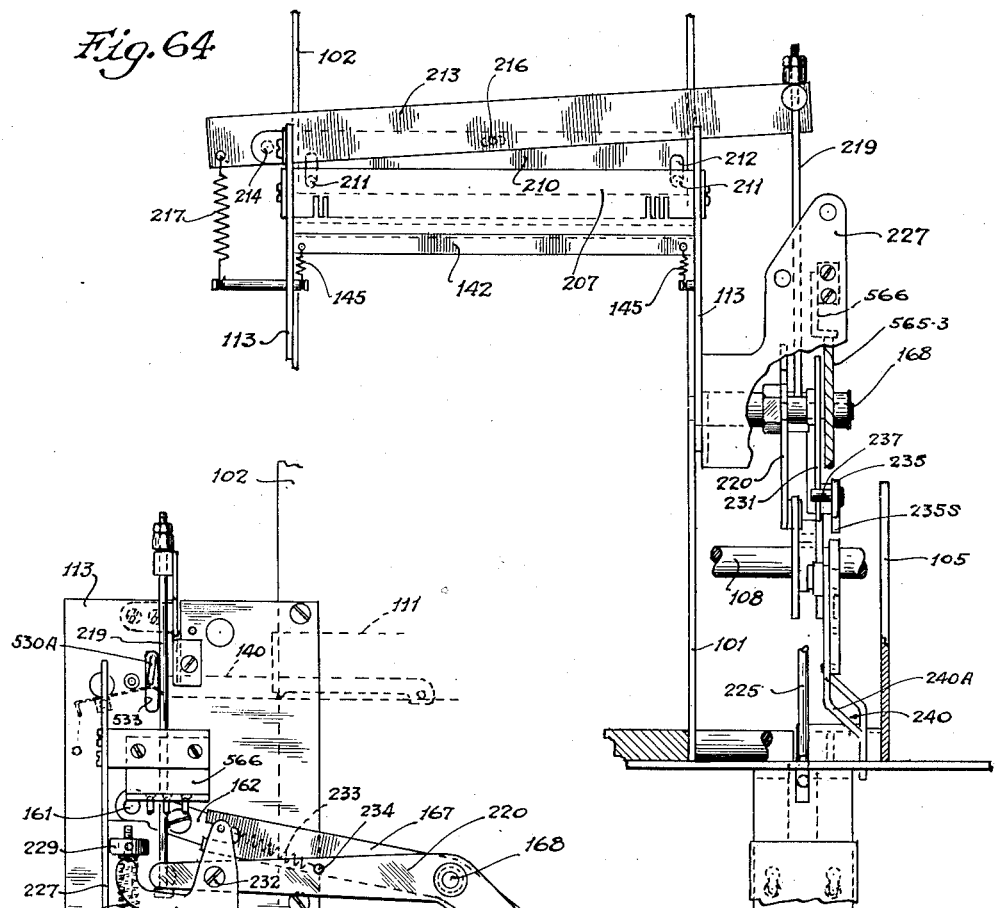
INVENTOR.
Walter T. Gollwitzer
BY
Wallace and Cannon
ATTORNEYS March 21, 1950 — W. T. GOLLWITZER — 2,501,444
CALCULATING MACHINE
Filed June 12, 1946 — 42 Sheets-Sheet 33
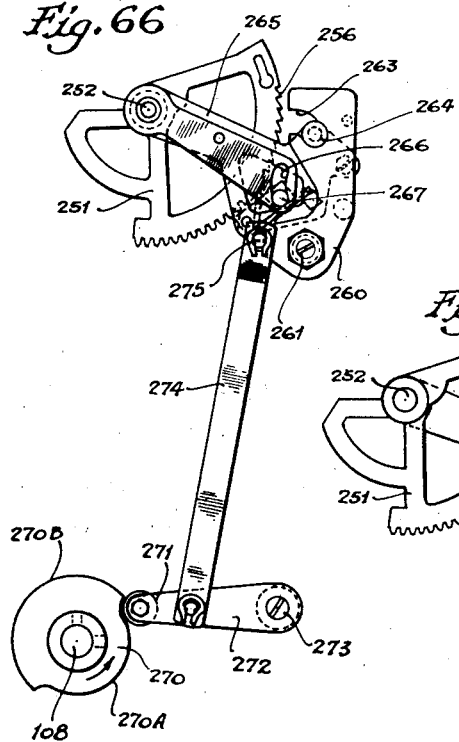
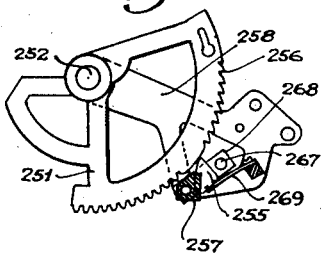
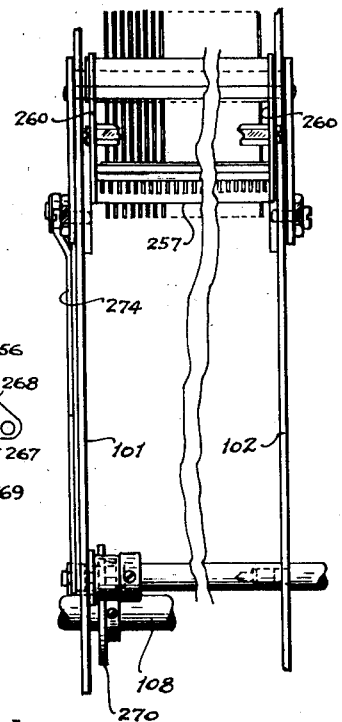
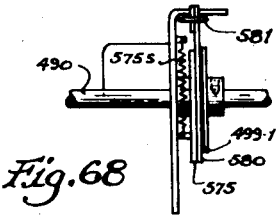
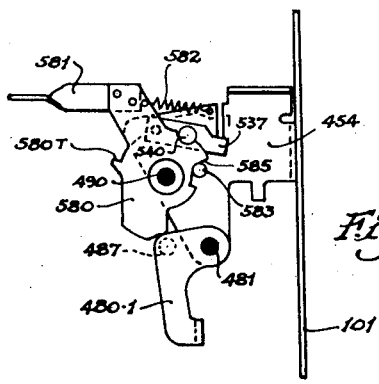
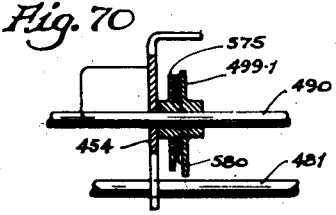
INVENTOR.
Walter T. Gollwitzer
BY Wallace and Cannon
ATTORNEYS March 21, 1950 W. T. GOLLWITZER 2,501,444
CALCULATING MACHINE
Filed June 12, 1946 42 Sheets-Sheet 34
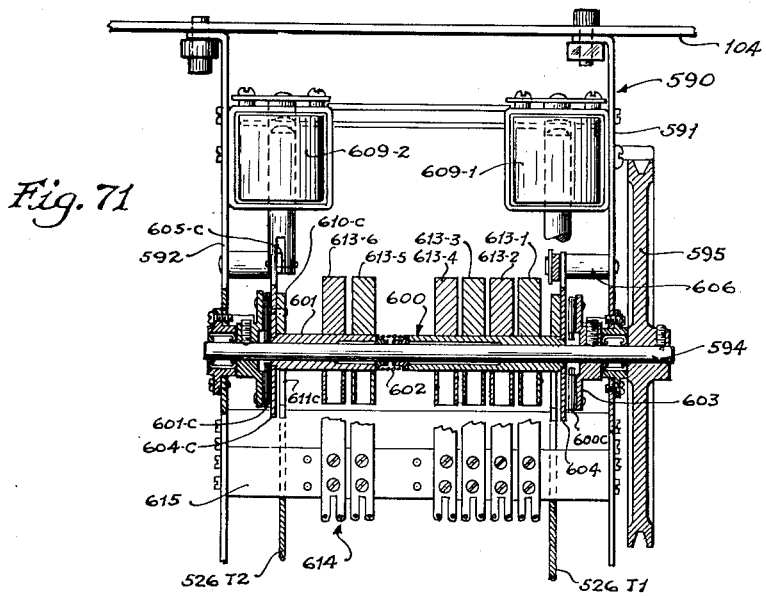
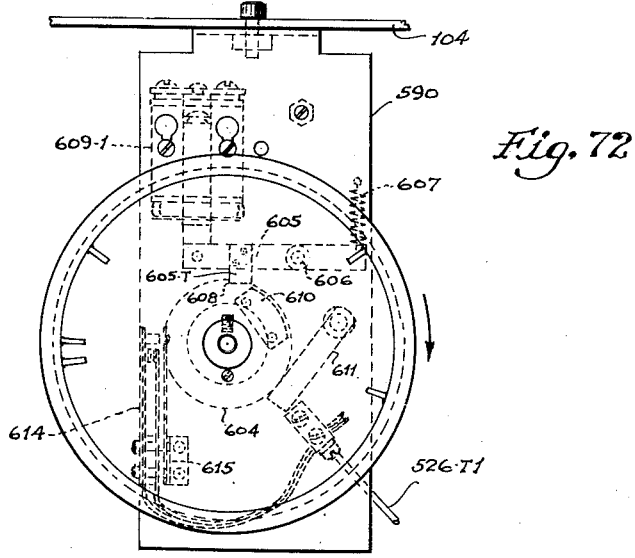
INVENTOR.
Walter T. Gollwitzer
BY Wallace and Cannon
ATTORNEYS March 21, 1950 W. T. GOLLWITZER 2,501,444
CALCULATING MACHINE
Filed June 12, 1946 42 Sheets-Sheet 35
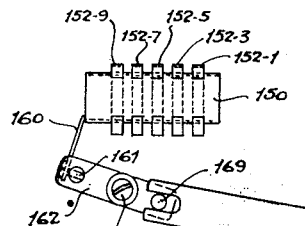
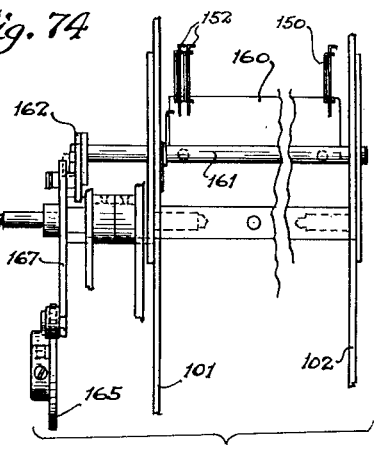
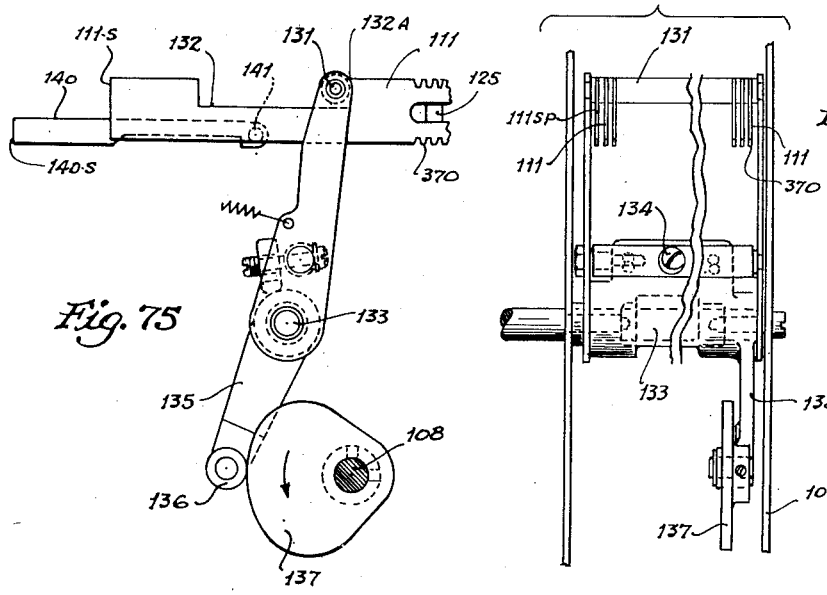
INVENTOR.
Walter T. Gollwitzer
BY
Wallace and Cannon
ATTORNEYS March 21, 1950 W. T. GOLLWITZER 2,501,444
CALCULATING MACHINE Filed June 12, 1946 42 Sheets-Sheet 36

INVENTOR.
Walter T. Gollwitzer
BY
Wallace and Cannon
ATTORNEYS

March 21, 1950  W. T. GOLLWITZER  2,501,444
CALCULATING MACHINE
Filed June 12, 1946  42 Sheets-Sheet 37
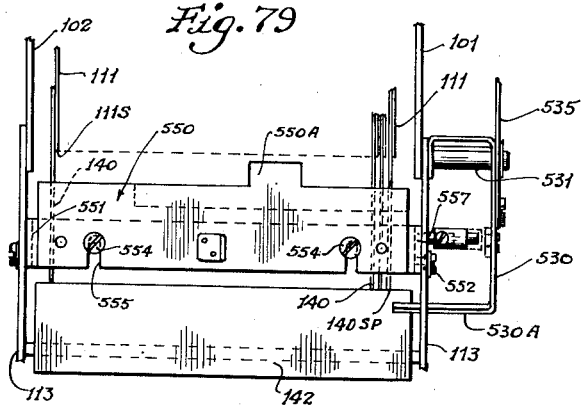
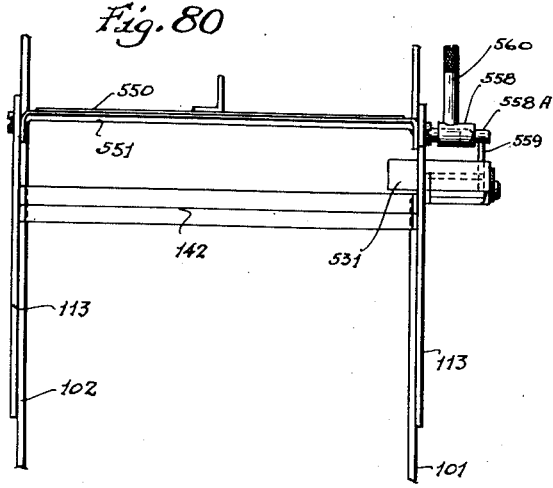 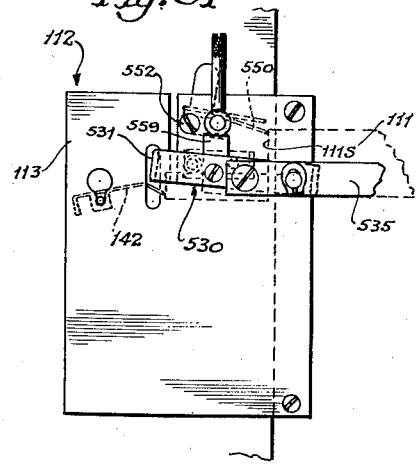
INVENTOR.
Walter T. Gollwitzer
BY
Wallace and Cannon
ATTORNEYS March 21, 1950     W. T. GOLLWITZER     2,501,444
CALCULATING MACHINE Filed June 12, 1946                                         42 Sheets-Sheet 38

INVENTOR.
Walter T. Gollwitzer
BY
Wallace and Cannon
ATTORNEYS

March 21, 1950     W. T. GOLLWITZER     2,501,444
CALCULATING MACHINE
Filed June 12, 1946                                            42 Sheets-Sheet 39
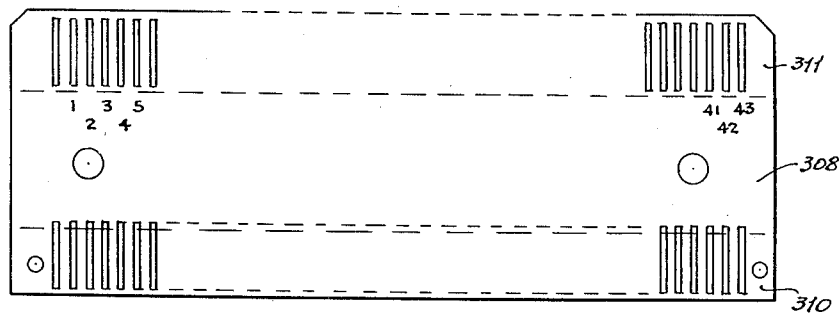
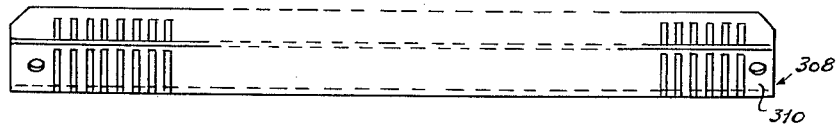
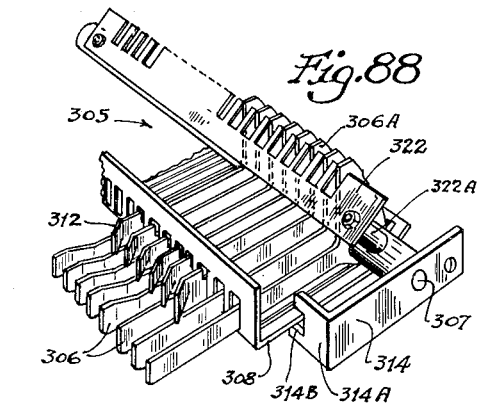
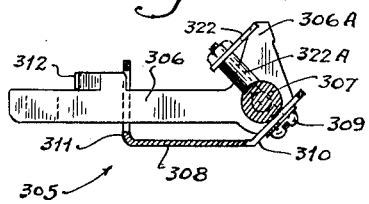
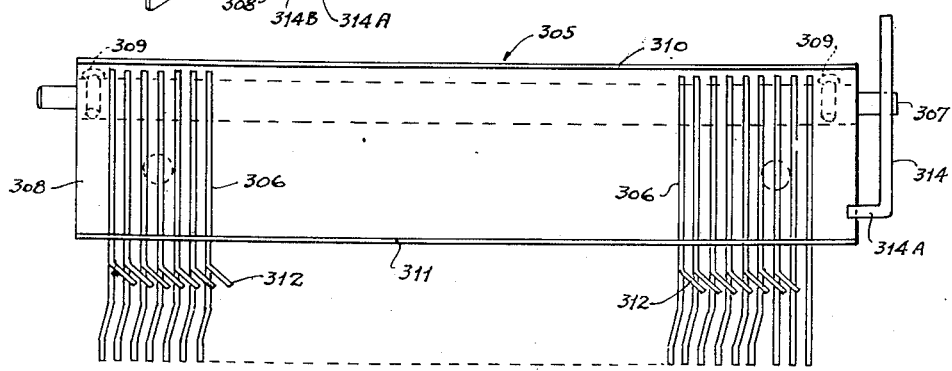
INVENTOR.
Walter T. Gollwitzer
BY
Wallace and Cannon
ATTORNEYS

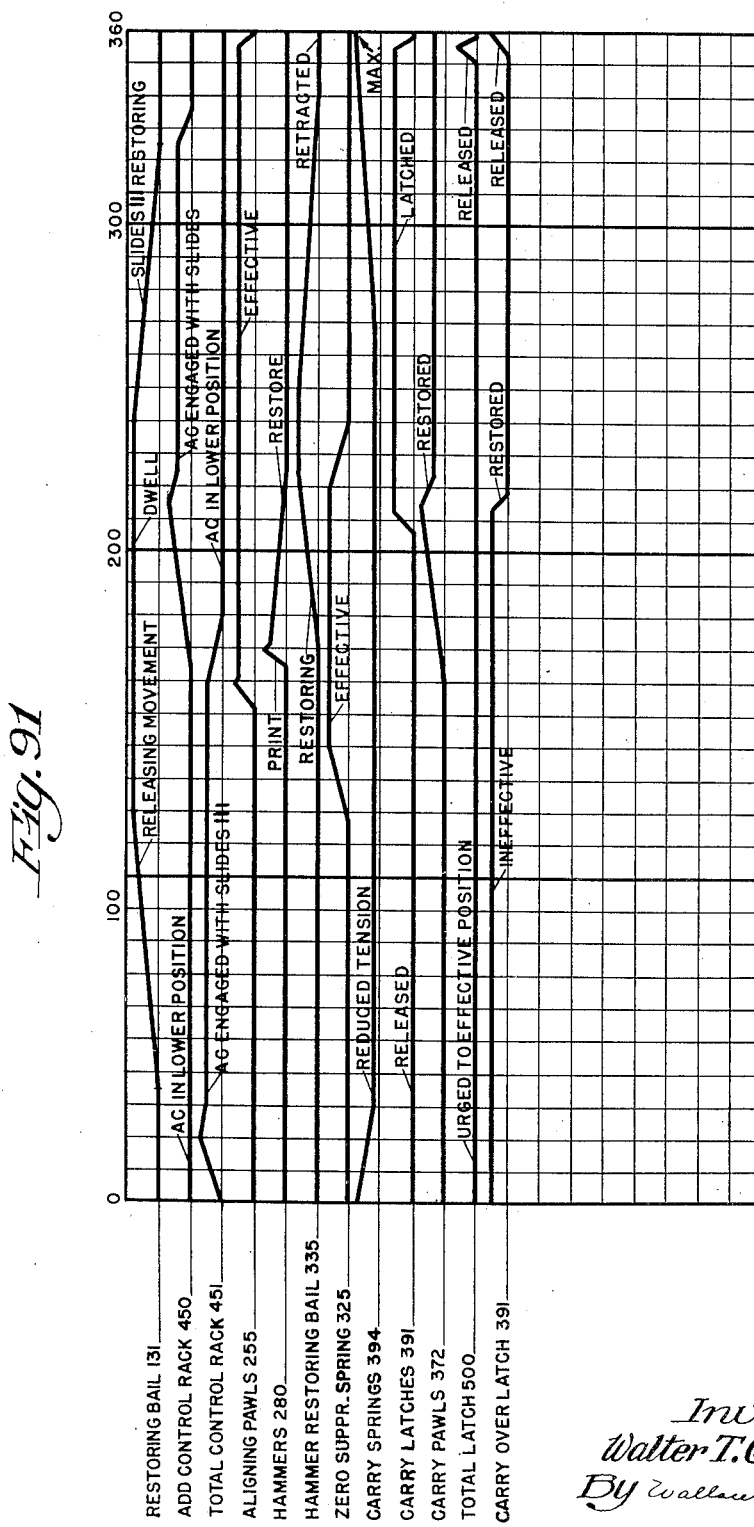

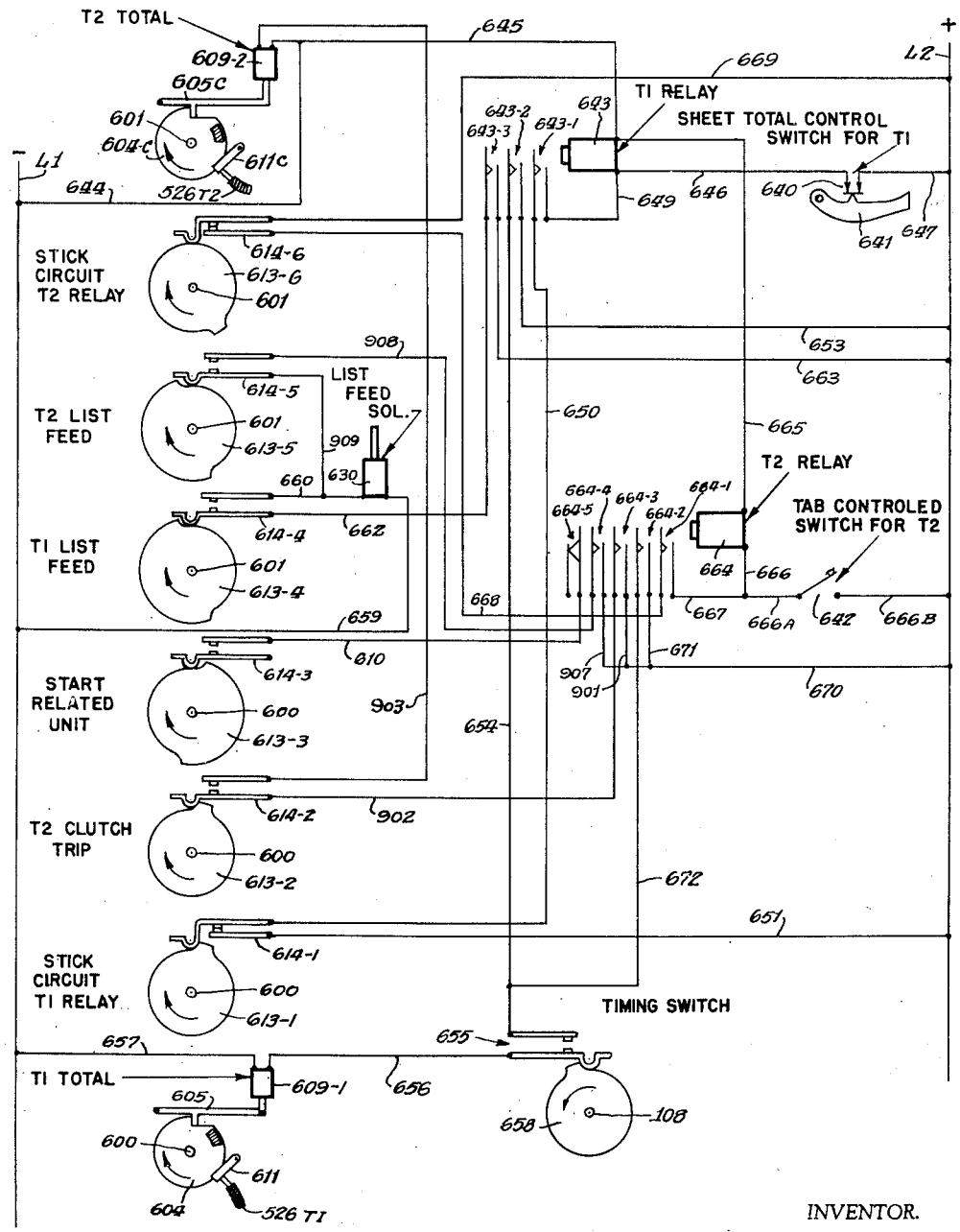

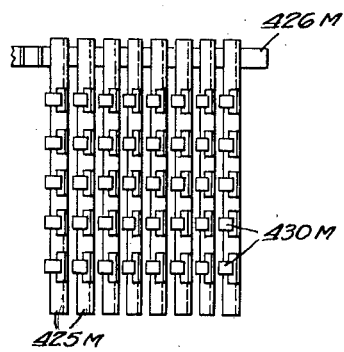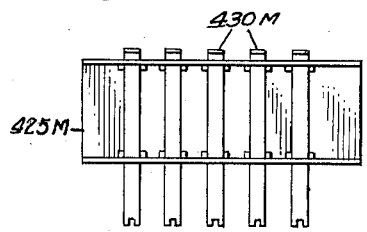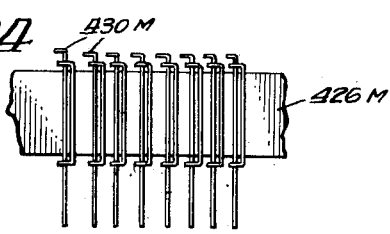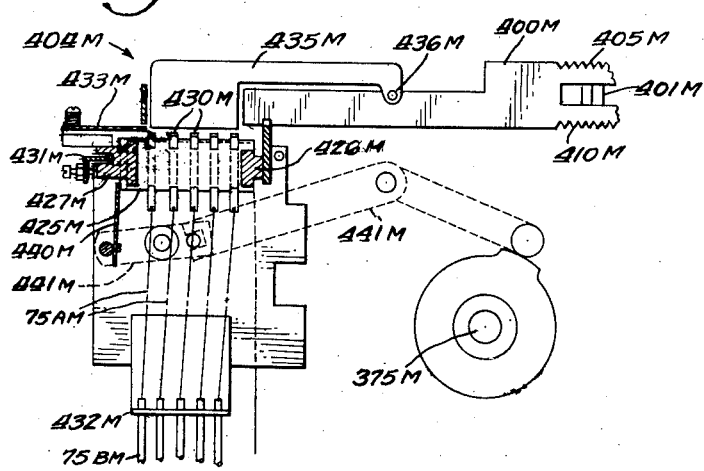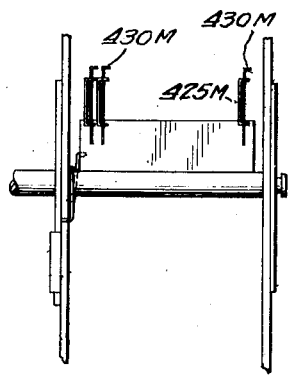

Patented Mar. 21, 1950

2,501,444

UNITED STATES PATENT OFFICE 2,501,444

CALCULATING MACHINE

Walter T. Gollwitzer, Euclid, Ohio, assignor to Addressograph-Multigraph Corporation, Wilmington, Del., a corporation of Delaware Application June 12, 1946, Serial No. 676,329

25 Claims. (Cl. 235—61.6)

This application is a continuation in part of my copending applications, Serial No. 348,283, filed July 29, 1940, now Patent No. 2,414,643, Serial No. 416,745, filed October 27, 1941, now Patent No. 2,427,049, Serial No. 587,579, filed April 10, 1945, and Serial No. 423,119 filed December 15, 1941, since abandoned, the last mentioned of said copending applications having in turn been a division of my application, Serial No. 221,-841, filed July 28, 1938, and now issued as Patent No. 2,296,277, patented September 22, 1942.

This invention relates to calculating machines and particularly to an improved construction and control in accumulators.

In this instance where variable data representations are sensed and thereafter operative devices are set up in pursuance of a sensing operation so effected means are rendered effective in response to such sensing operations to print the variable data on business instruments and the like and particularly in those instances where the data representations pertained to numerical accounts, the values of such amounts are entered into accumulators from which totals or the like of various amounts sensed may be ascertained as by being directly read therefrom or as by being printed from or under control of the accumulators, and among the important objects of the present invention is to provide a novel accumulator that may be utilized in such instances.

Further objects of this invention are to provide an accumulator that may be operated from members movable in one direction to effect entries into the accumulator and to so control the operation of the accumulator and such members that movement of the members in one direction may be effective on the accumulator but movement of the members in the opposite direction will be ineffective on the accumulator; to enable entries to be made into accumulators as an incident to movement of control members associated with the accumulators in one direction and to enable totals or the like to be read out of the accumulators as an incident to movement of such members in a direction opposite to that in which such members move in effecting entries into the accumulator; to enable a variable printer to be set up as an incident to zeroizing of an accumulator; to enable carry-over mechanism in an accumulator to be readily and easily conditioned for operation during the entry of numerical amounts into the accumulator; and to correlate the operations in an accumulator in such a novel manner as to enable rapid and accurate entry of numerical amounts as well as carryovers resulting therefrom.

In an instance where proof sheets as, for example, the sheets of a check register are prepared in accordance with the present invention, it is advantageous to include a total at the bottom of each such proof page, and it is also advantageous to produce a total of all of the items printed on all of the pages in a particular group thereof or, in other words, to print what is commonly referred to as a grand total. Furthermore, and particularly where a check register is being prepared, the items are printed thereon in relation to a ledger or other book of account, and it is frequently advantageous to produce a total at the end of a series of items constituting a group as determined by such ledger or other book of account, such a total being commonly known as a ledger total, and among the objects of the present invention are to enable a page total, a ledger total and a grand total to be printed on proof sheets or the like produced in the machine; to enable a page total to be produced automatically as the last item printed on each proof sheet; to enable other operative functions of the machine to be suspended, automatically if desired, so as to enable a ledger total to be taken when the need so to do arises; to enable normal operation of the machine to be suspended when a grand total is to be taken; and to utilize a novel accumulating means for the purpose of accumulating totals as aforesaid and to enable such totals to be printed under control of such accumulators.

Other objects of the present invention are to enable accumulator mechanism to be readily correlated with related mechanism or machines such for example as a printing machine; to enable control of such an accumulator to be attained by means that are readily adaptable to different types of equipment and control; to simplify the attainment of different types of total operations; to enable split field operation to be readily attained; to simplify the use of different fields of the accumulator for account numbering purposes and enable control of the printing mechanism to be readily attained in such instances.

Other and further objects of the present invention will be apparent from the following description and claims and will be understood by reference to the accompanying drawings which, by way of illustration, show preferred embodiment and the principles thereof and what I now consider to be the best mode in which I have contemplated applying these principles. Other embodiments of the invention embodying the same or equivalent principles may be used and structural changes may be made as desired by those skilled in the art without departing from the present invention and the purview of the appended claims.

Figure 2:
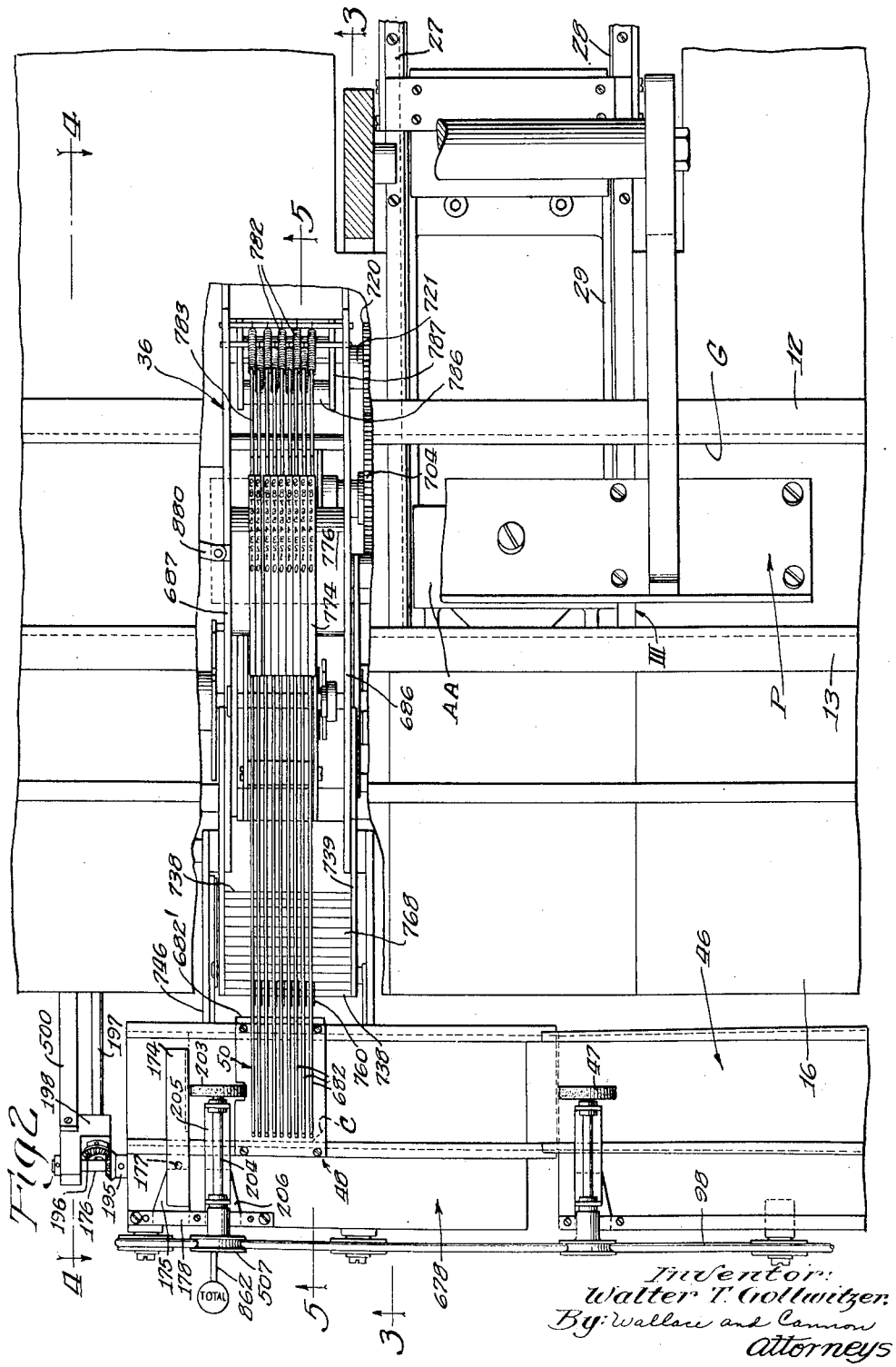
Fig. 2 is a plan view of the printing mechanism and an accumulator included therein and which are employed as auxiliary printing means in the machine, these mechanisms being mounted adjacent to the printing and control device guideway of such machine.
Figures 3, 3A, 3B:
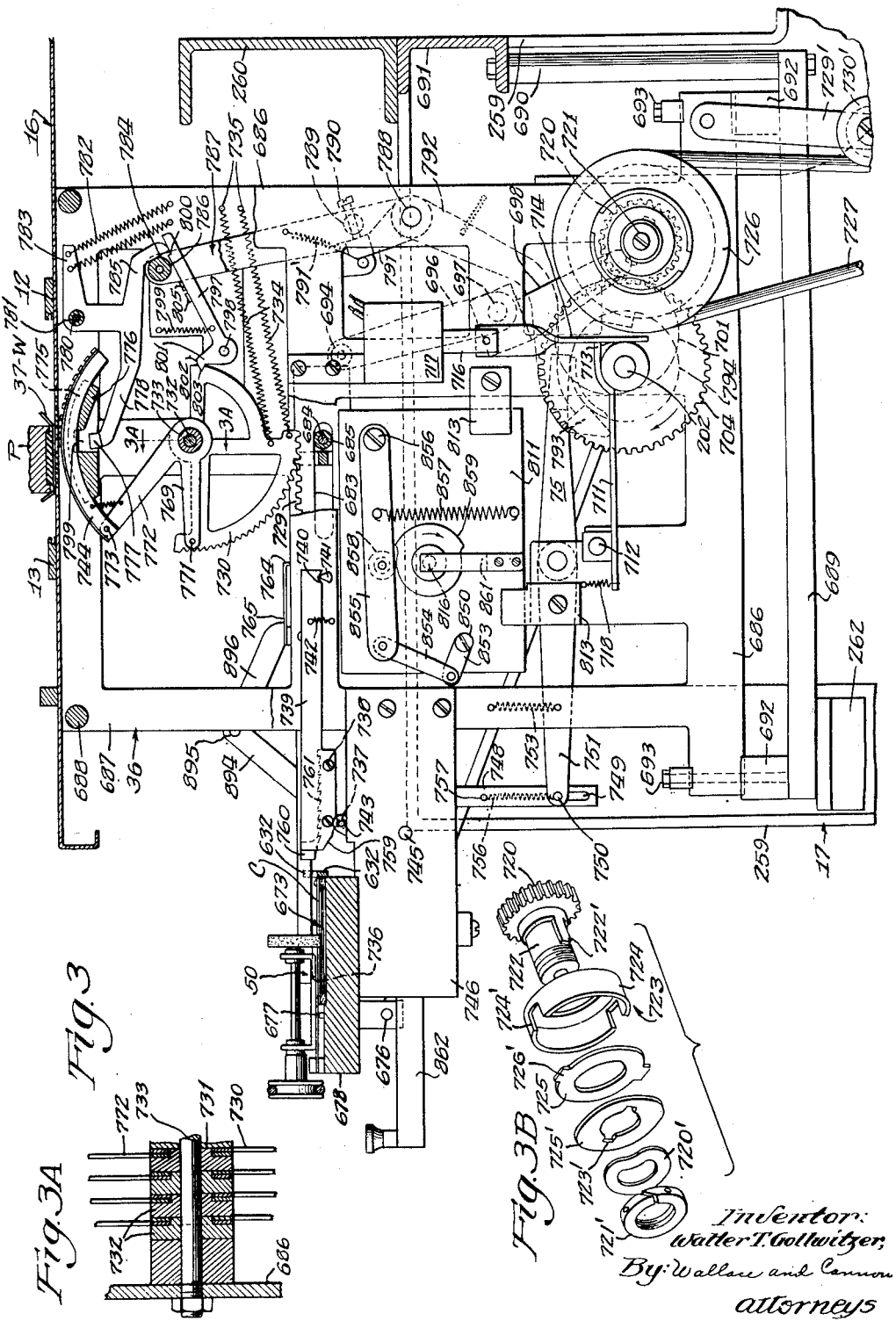
Figure 28:
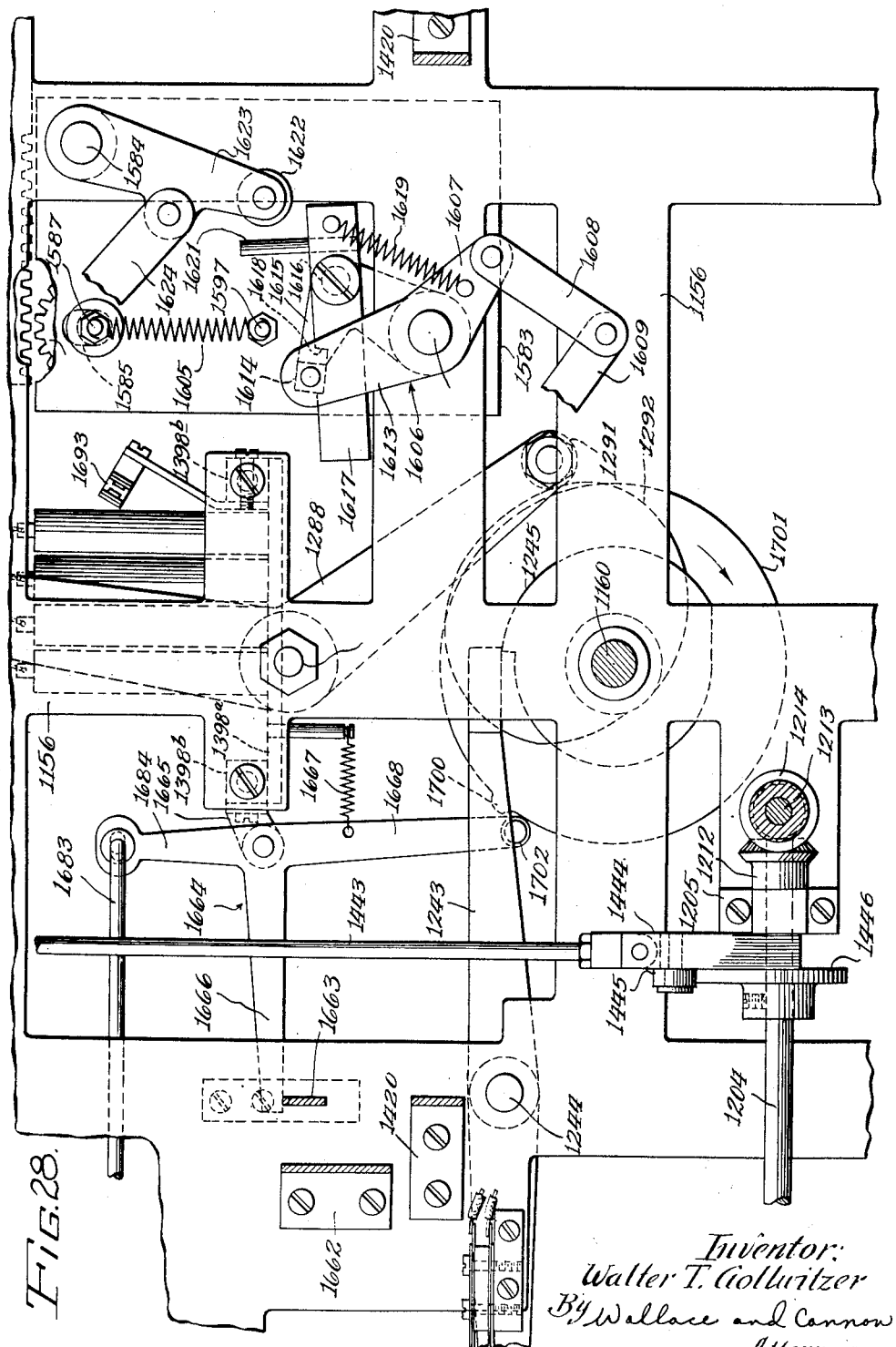

Figs. 3, 4 and 5 are vertical sectional detail views taken substantially on the lines 3—3, 4—4, and 5—5 on Fig. 2;

Fig. 3A is a sectional detail view taken substantially on the line 3A—3A on Fig. 3;

Fig. 3B is an exploded view of a slip clutch through which the mechanism shown, for example, in Fig. 2 is driven;

Fig. 4A is a perspective detail view of a portion of the control of the type segments employed in the auxiliary printing mechanism shown, for example, in Figs. 2 and 4;

Fig. 5A is a sectional view taken along the line 5A—5A in Fig. 5;

Fig. 5B is a fragmentary perspective detail view showing a portion of the control mechanism shown, for example, in Fig. 5;

Fig. 6 is a view similar to Fig. 5, but showing the parts in another operative position;

Fig. 6A is a perspective detail view of a part of the accumulator employed in the mechanism shown for example in Fig. 6;

Figs. 7 and 8 are horizontal sectional detail views taken substantially on the lines 7—7 and 8—8 on Fig. 5;

Fig. 7A is a vertical sectional detail view of a portion of the sensing means employed in the auxiliary printing mechanism shown for example in Fig. 2 at the position occupied thereby at the start of a sensing operation;

Fig. 7B is a fragmentary plan detail view of a control means and mounting therefor employed in the mechanism shown in Fig. 2;

Fig. 8 is a horizontal sectional view taken substantially on line 8—8 of Fig. 5;

Fig. 8A is a view similar to Fig. 7A showing the parts in the next operative position attained thereby in the course of a sensing operation;

Figs. 9 to 13, inclusive, are views illustrating successive operative positions attained by the sensing means, these views being related to Figs. 7A and 8A;

Fig. 14 is a chart of the manner in which perforations are made in record cards of which Fig. 15 is an elevation;

Fig. 16 is a view similar to Fig. 15 but showing the card in the position in which it is held to facilitate reading the data represented by perforations therein;

Fig. 17 is a side elevational view of a portion of the machine shown in my aforesaid copending application, Serial No. 348,283, some of the parts being broken away to show the accumulator mechanism;

Fig. 18 is a vertical sectional detail view of the accumulator;

Figs. 19 and 20 are transverse sectional views taken respectively along the lines 19—19 and 20—20 of Fig. 17;

Fig. 21 is a transverse sectional view taken on the line 21—21 of Fig. 20;

Figs. 22 to 27, inclusive, are elevational detail views showing typical entry-effecting operations of the accumulator;

Fig. 28 is a fragmental vertical sectional view showing additional structure.

Figure 29:
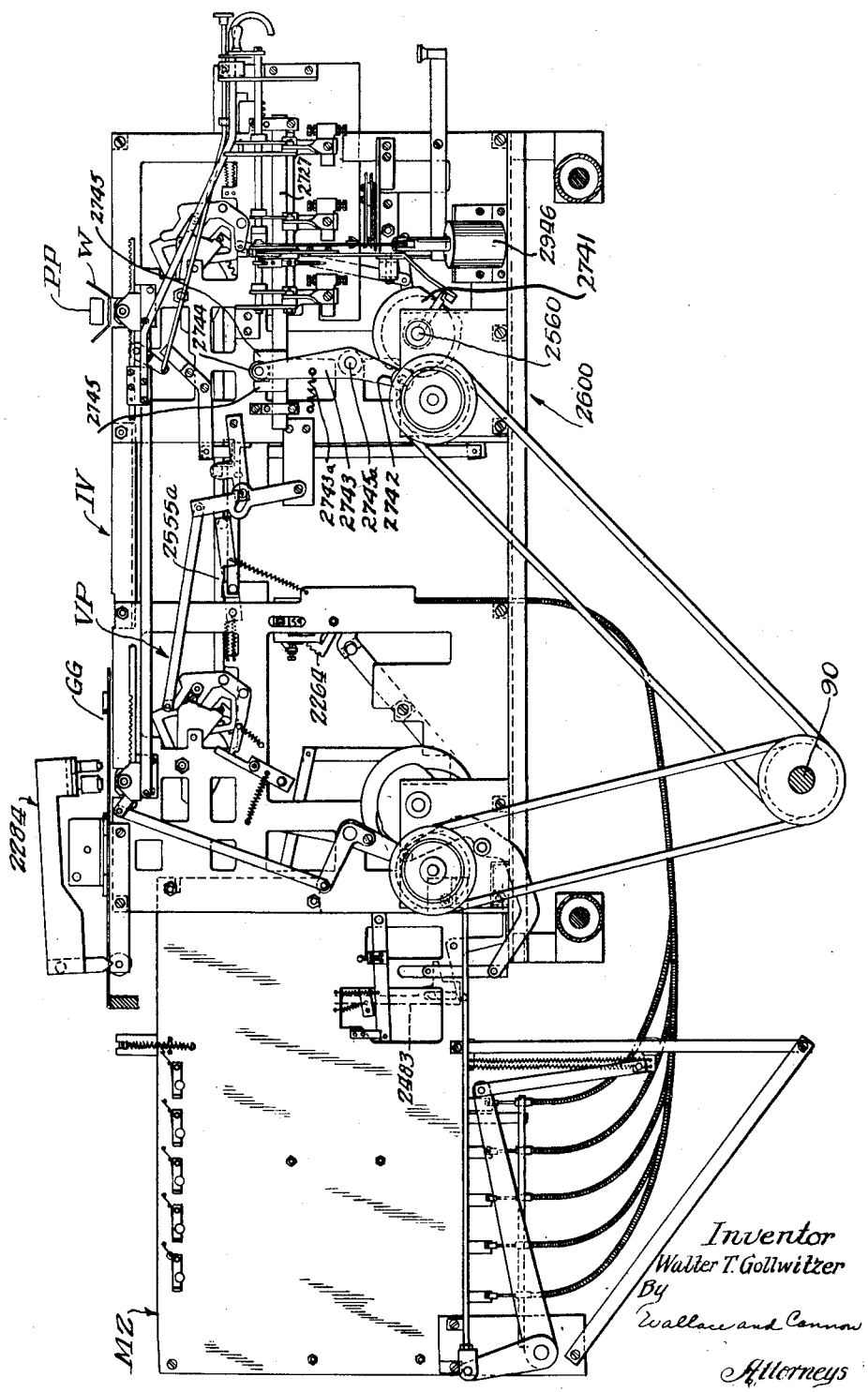
Figure 30:
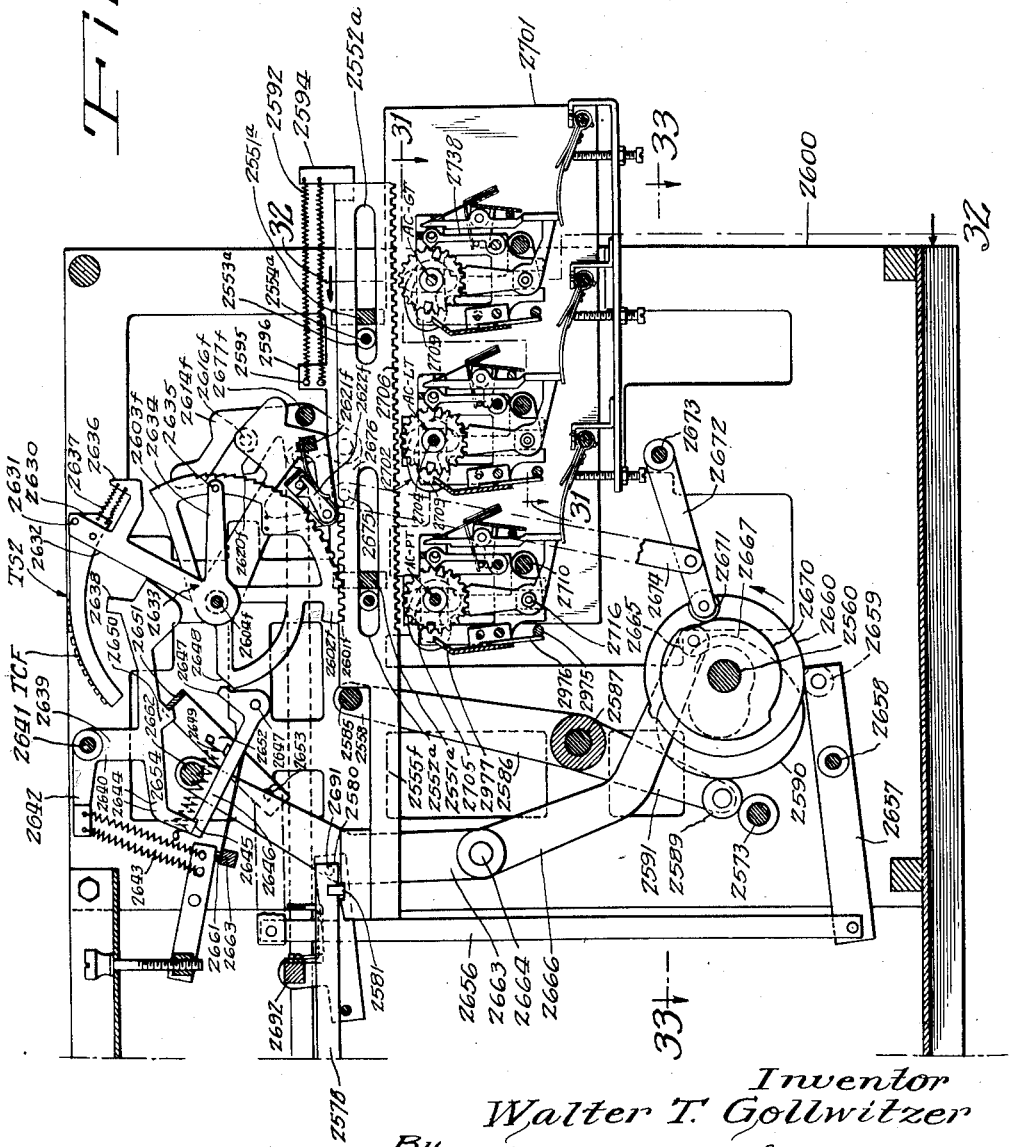
Figure 31:
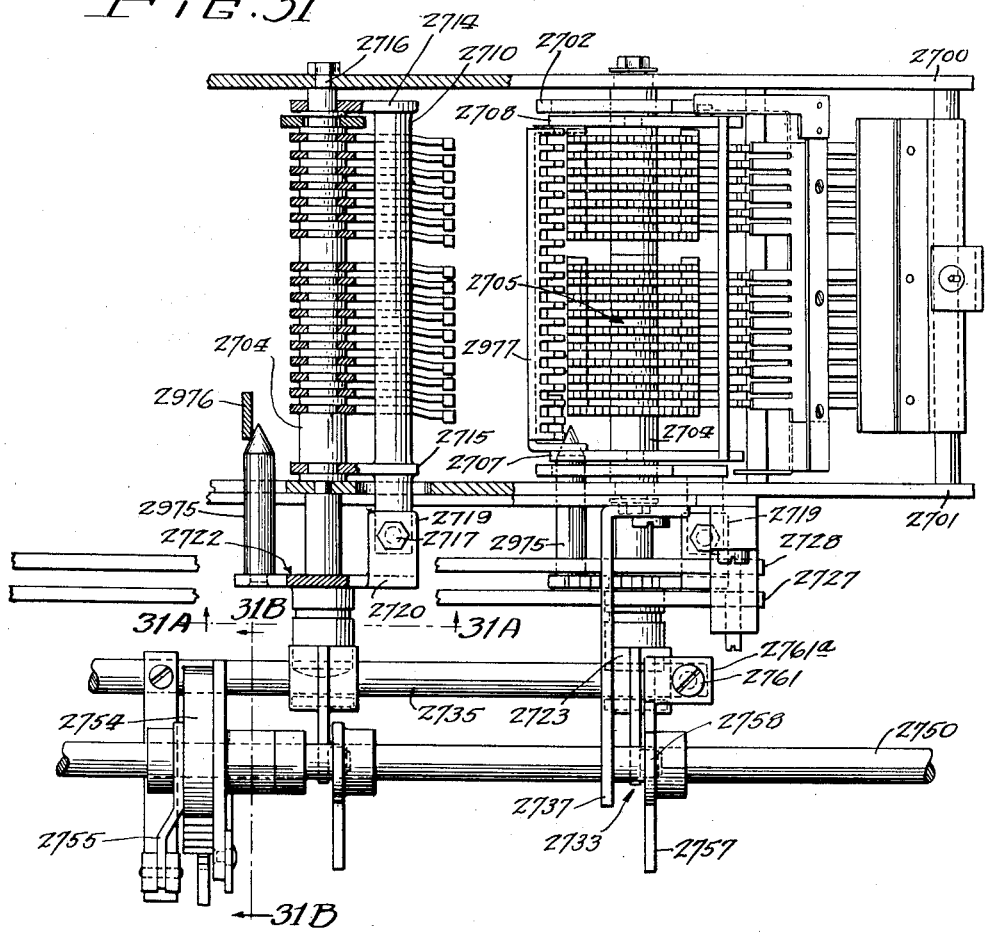
Figure 31A:
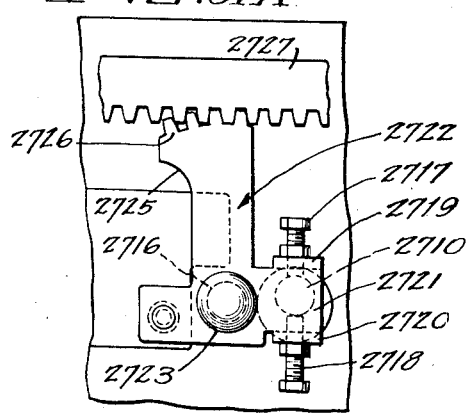
Figure 31B:
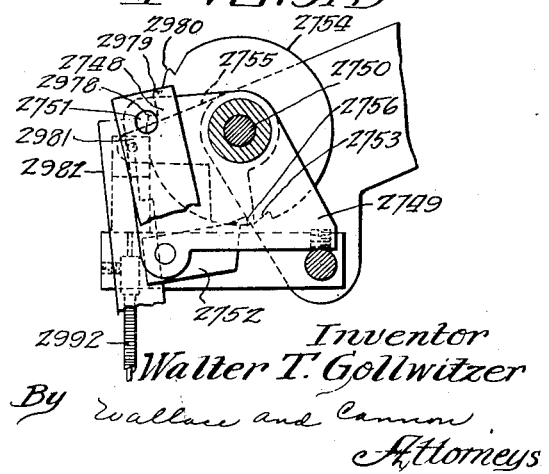
Figure 39:
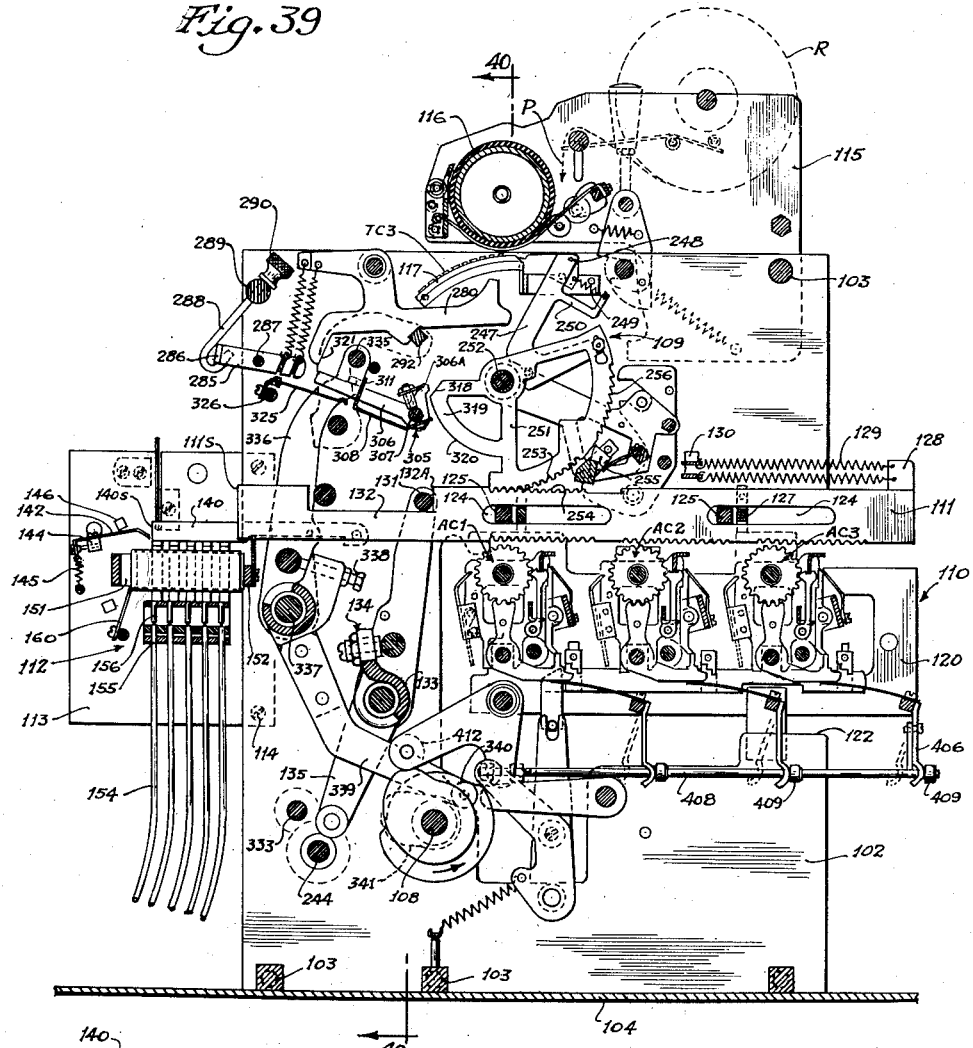
Figure 39B:
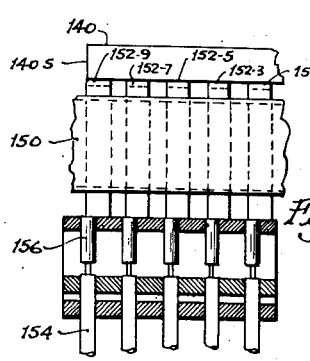
Figure 39A:
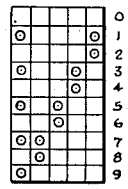
Figure 48:
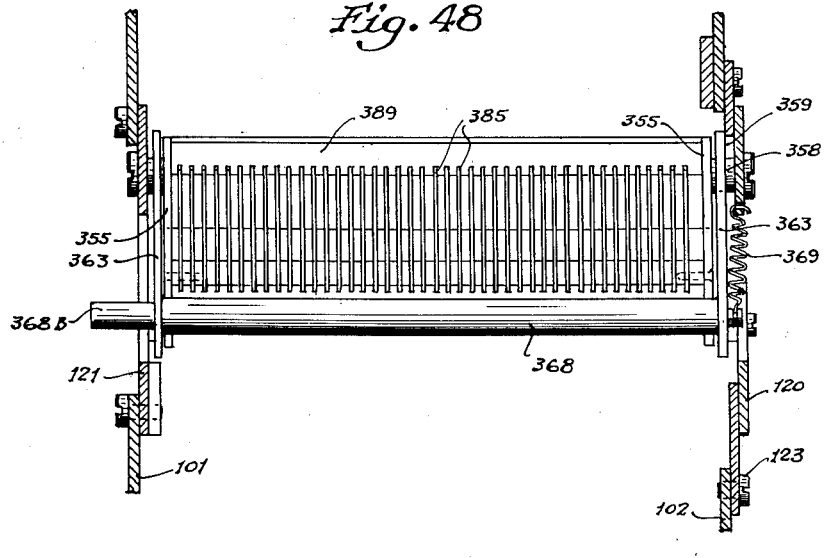
Figure 49:
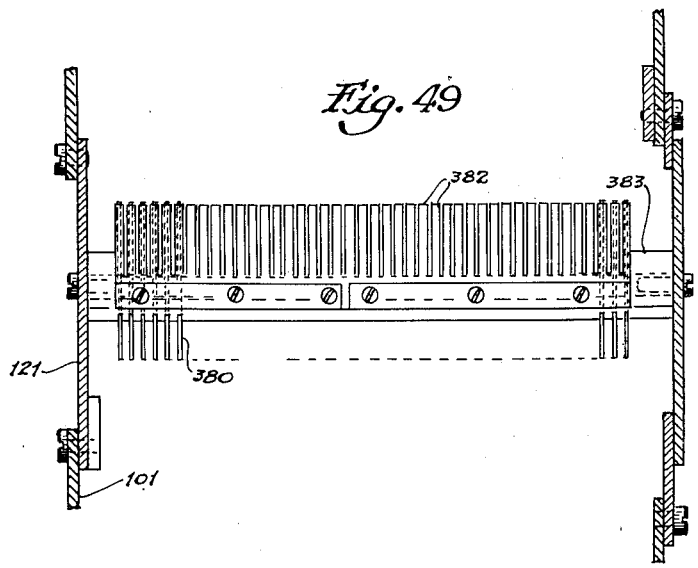
Figure 49A:
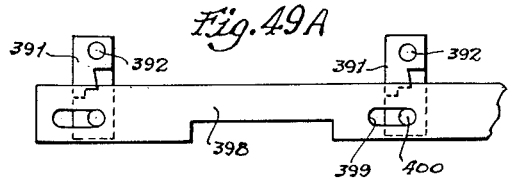
Figure 77:
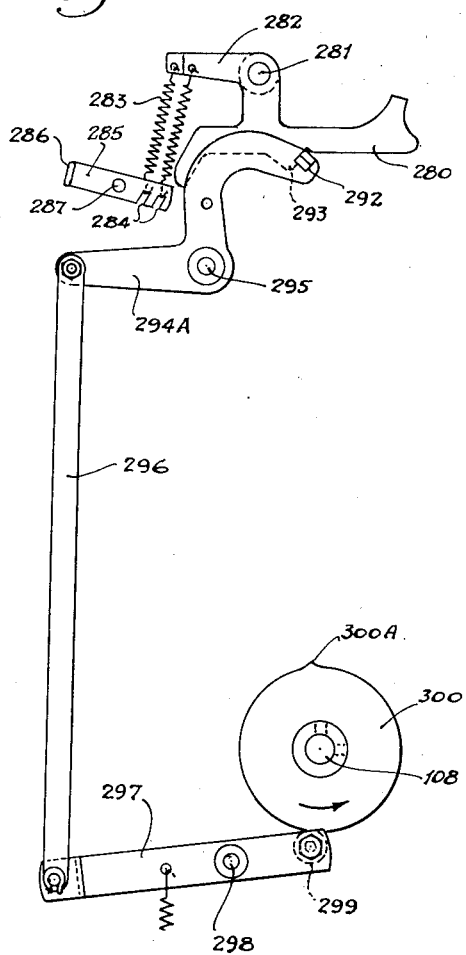
Figure 78:
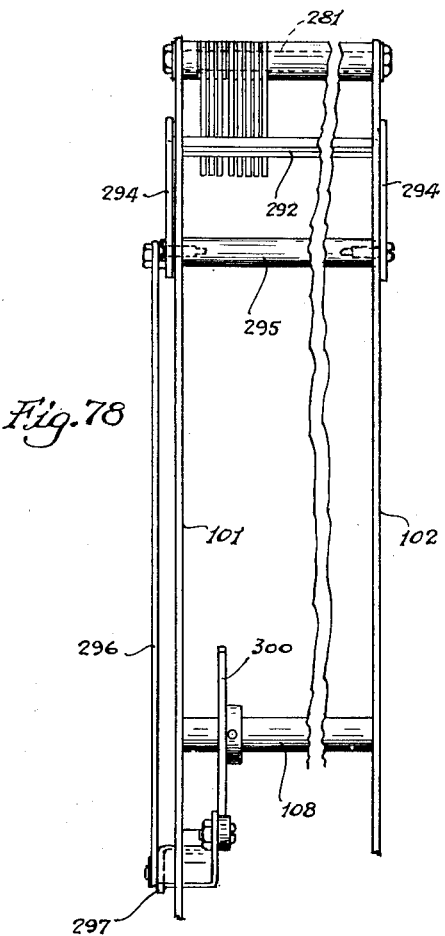
Figure 78A:
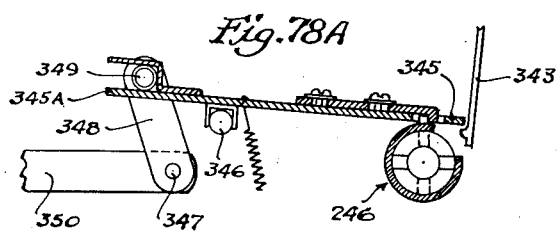
Figure 82:
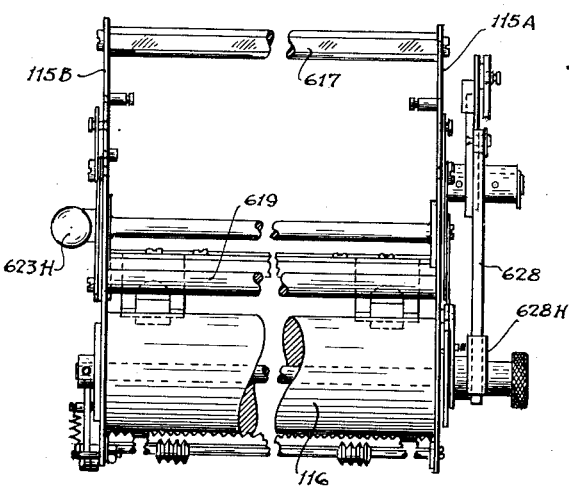
Figure 83:
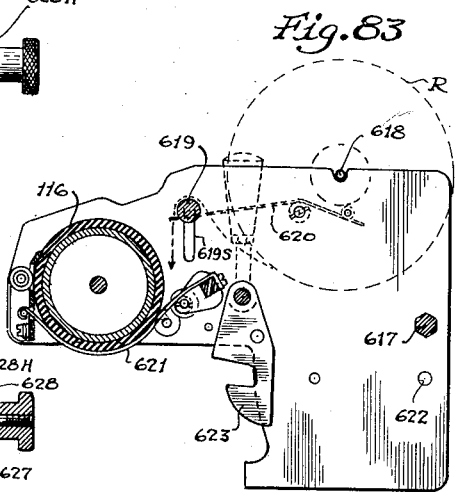
Figure 84:
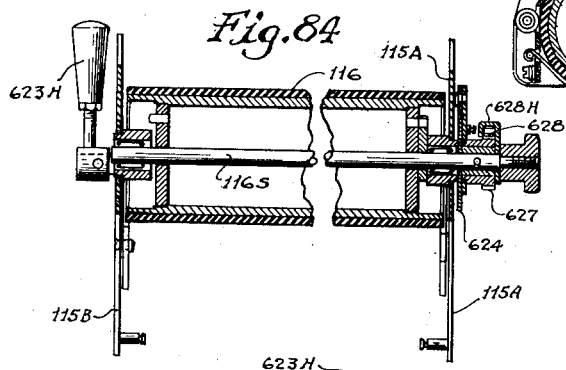
Figure 85:
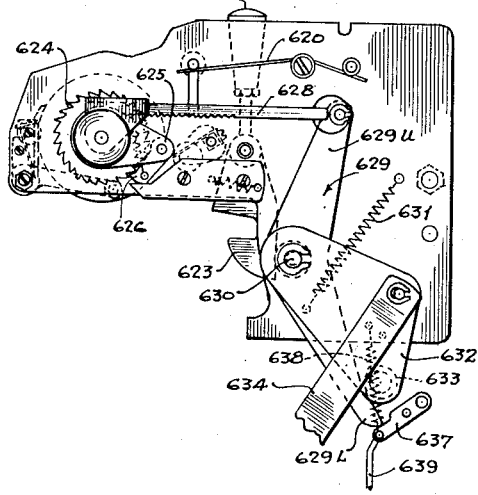

Fig. 29 is a view taken from front to rear of the machine shown in my aforesaid copending application Serial No. 416,745 and illustrating the accumulator disclosed in such application;

Fig. 30 is a vertical sectional view of the accumulator of Fig. 29;

Fig. 31 is a sectional view taken along the line 31—31 of Fig. 30;

Fig. 31A is a sectional view taken along the line 31A—31A of Fig. 31;

Fig. 31B is a sectional view taken along the line 31B—31B of Fig. 31;

Fig. 32 is a sectional view taken along the line 32—32 of Fig. 30;

Fig. 33 is a sectional view taken along the line 33—33 of Fig. 30;

Fig. 34 is an end view of the total control unit;

Fig. 35 is a side view of the total control unit;

Fig. 36 is a sectional view taken along the line 36—36 of Fig. 35;

Fig. 37 is a side elevational view of another embodiment of an adding machine constructed in accordance with the invention;

Fig. 37A is a fragmental view illustrating a part of the operating mechanism;

Fig. 38 is a rear view of the machine;

Figs. 38A and 38B are fragmental views showing the releasing means for the total control shaft latch;

Fig. 39 is a vertical section taken from front to rear of the machine;

Fig. 39A is a view illustrating the five-element code utilized with the set up mechanism of the machine;

Fig. 39B is an enlarged view of the set up mechanism;

Fig. 40 is a transverse vertical sectional view taken along the line 40—40 of Fig. 39;

Fig. 41 is an enlarged end elevational view of one of the rocking assemblies used to control the accumulator;

Fig. 42 is a vertical sectional view showing the rocking assembly in association with the operating cams;

Fig. 43 is a fragmental plan view of the rocking assembly and the related parts;

Fig. 44 is an enlarged fragmental vertical section of the accumulator unit;

Fig. 45 is a vertical sectional view taken along the line 45—45 of Fig. 44;

Fig. 46 is an enlarged view of one of the accumulator actuating or lifting cams;

Fig. 47 is a fragmental view showing the manner in which the two cams of each accumulator are associated;

Figs. 48 and 49 are vertical sectional views taken respectively along the lines 48—48 and 49—49 of Fig. 44;

Fig. 49A is a fragmental elevational view of the means used to release the main carry over latches;

Figs. 50 to 55 are diagrammatic views illustrating the control of the accumulator movements for normal operation as well as the different types of total operations;

Fig. 55A is a view of the type segments;

Fig. 55B is a view showing the control for the symbol printing type segment;

Figs. 56 to 59 are diagrammatic views illustrating the operation of the carry over mechanism;

Fig. 60 is a plan view of the adding and total control racks and associated mechanism;

Fig. 61 is a fragmental vertical section taken along the line 61—61 of Fig. 60 and showing the total control rack;

Fig. 61A is a fragmental view similar to Fig. 61 and showing the sub-total latch in greater detail;

Fig. 62 is a vertical sectional view taken transversely on Fig. 60;

Fig. 63 is a fragmental sectional view taken along the line 63—63 of Fig. 60 and illustrating the adding control rack;

Fig. 63A is a fragmental plan view of the structure shown in Fig. 63;

Fig. 64 is a fragmental front view showing the means for restoring the set up mechanism;

Fig. 65 is a side view, taken partially in section, from the right in Fig. 64;

Fig. 66 is a detailed side elevational view of the type aligning mechanism;

Fig. 67 is an end view of the type aligning means;

Fig. 68 is a fragmental side view of the total, total transfer suppressor and sub-total control means;

Fig. 69 is a transverse sectional view showing the total transfer suppressor cam;

Fig. 70 is a sectional view showing the mounting of the cams shown in Fig. 68;

Fig. 71 is a vertical sectional view of the total control unit;

Fig. 72 is an end view of the total control unit;

Fig. 73 is a detail view showing the restoring means for the set up mechanism in side elevation;

Fig. 74 is a view taken from the right in Fig. 73;

Fig. 75 is a fragmentary side view of the slide operating and restoring means;

Fig. 76 is a view taken from the right in Fig. 75;

Fig. 77 is a side view of the hammer latch and its operating means;

Fig. 78 is a view taken from the right in Fig. 77;

Fig. 78A is a view showing the control means for the main clutch of the machine;

Fig. 79 is a top plan view of the means for suppressing printing in selected orders or fields;

Figs. 80 and 81 are front and side views respectively of the mechanism shown in Fig. 79;

Fig. 82 is a plan view of the paper feed mechanism;

Fig. 83 is a sectional view taken from front to rear in Fig. 82;

Fig. 84 is a transverse sectional view taken through the platen roller;

Fig. 85 is a side view of the mechanism shown in Fig. 82;

Fig. 86 is a plan view of a partially formed comb plate used in the zero suppressing pawl assembly;

Fig. 87 is a view of the plate after completion of the plate;

Fig. 88 is a perspective view of the zero suppressing assembly;

Fig. 89 is a transverse sectional view of the assembly of Fig. 88;

Fig. 90 is a plan view of the assembly of Fig. 88;

Fig. 91 is a timing chart of the machine shown in Figs. 37 to 90;

Fig. 91A is an electrical diagram of the total control unit;

Fig. 92 is a plan view of an alternative form of set up mechanism as illustrated in my aforesaid copending application Serial No. 587,579.

Fig. 93 is a side view of one of the slide plates of Fig. 92;

Fig. 94 is an end view of the slide plates;

Fig. 95 is a front to rear sectional view of the set up mechanism of Fig. 92 showing the operating means therefor; and Fig. 96 is an end view of the structure shown in Fig. 95.

For purposes of disclosure, the accumulator of the present invention is herein shown in several different embodiments, the first of which is illustrated in Figs. 1 to 16 as it is included in a machine whereby complete business instruments such as checks, bills and the like are produced from and under control of printing and control devices passed sequentially through the machine. The machine in which the accumulator is thus illustrated is shown and described in detail in my aforesaid Patent No. 2,296,277, and reference may be had to such patent for further details of structure and operation. When the accumulator of the present invention is so used it must, of course, cooperate with the other mechanisms of the machine in attaining the ultimate objective of the machine as a whole, but it will be understood that the accumulator of the present invention may be employed in other environments with equal facility.

Figure 1:
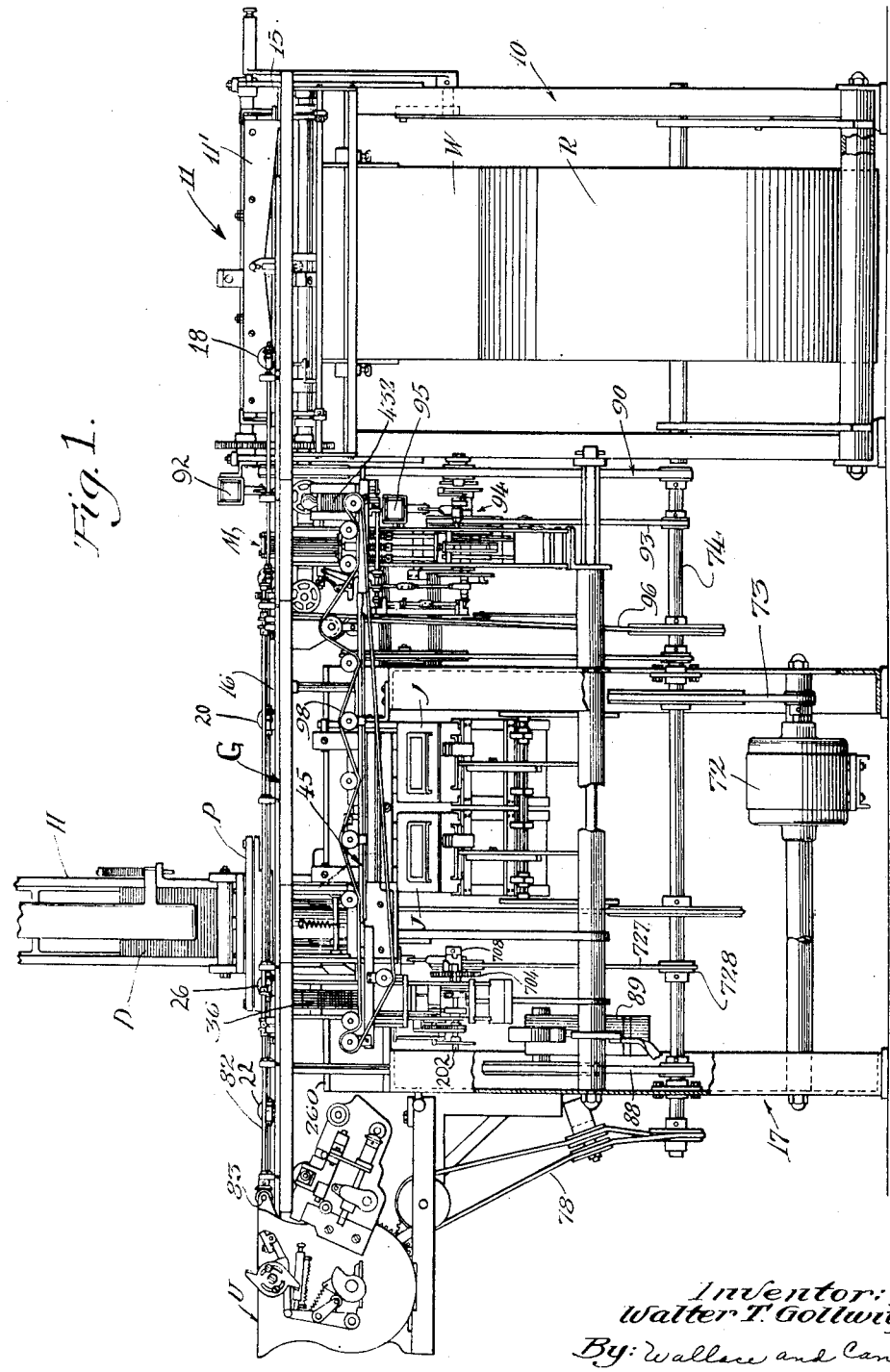
Fig. 1 is a front elevational view of the machine shown in my aforesaid copending application Serial No. 423,119, in which an accumulator embodying the features of my invention is utilized, the machine being shown with the cover plates removed.

The novel machine depicted in Fig. 1 is constructed and arranged to produce dividend checks, and such a dividend check includes constantly reoccurring data which, in the present instance, is the name and location of the company issuing the check, the words "Check No.", the name of the bank on which the check is drawn, and kindred data imparting characteristics to the check, including the border appearing thereon, changing data, constituting an identification and characterizing the check and, in the present instance, this is an address comprising a name, street and number, and city and State; variable data which are the amount for which the check is to be payable; and other other analogous data such as a date, a check number and a signature. The date and signature are the first data, in the machine as constructed, to be printed; next the variable data are printed and thereafter the address and number, and finally the form is printed on the check.

In the machine herein shown, the dividend check or sheet is severed from a web W, Fig. 1, that is withdrawn from a roll R which is rotatably supported in the stand 10, which, in the machine as shown in Fig. 1, is provided at the right-hand end of the machine as a part of a paper supply unit 11 that forms a part of the machine. The web W is led from the roll R to suitable web withdrawing devices contained as a part of the unit 11, and during passage of the web through these devices the date and signature are printed thereon. Subsequently a portion of the web bearing these impressions is extended beyond a severing device or knife 11'; and thereupon the check or sheet is severed from the web to be deposited in a sheet guideway G, Figs. 1, 2 and 3, formed by spaced guide bars 12 and 13.

The sheet guideway G extends along the top or table portion of the web withdrawing mechanism, and the sheet guideway G then extends to the left onto and along a table top 16 which is provided on the top of a main skeleton-like frame 17 of the machine. As the sheets are fed along the sheet guideway G, the various operations are performed thereon. The advancing movement imparted to the sheets along the guideway G is obtained through the medium of a plurality of friction discs or rollers 18, 19, 20, 21 and 22, which operate so that each sheet is first actuated into contact with a stop finger 25 to be thereby positioned beneath a platen PM of a multiplying mechanism M. The sheet is thus brought to rest so that the platen PM may print variable data upon the sheet under the controlling action of the multiplier M. The stop finger 25 is then elevated and the sheet is advanced along the guideway G into contact with a stop finger 26 which brings the sheet to a rest position at a second printing station. At this second printing station the sheet is positioned beneath a platen P which then operates through a printing cycle to print the changeable data upon the sheet. The stop finger 26 is then raised and the sheet is advanced by the friction rollers 21 and 22 to a form printing unit U which is disposed at the left-hand end of the guideway G. The sheet then passes through the form printing unit U and the form is printed thereon, after which the completed check is discharged from the form printing unit U into a suitable collector.

The changeable data are printed upon the sheet from the type of a printing device on an anvil A, Fig. 2, located at printing position beneath the platen P. The printing devices D are introduced into a magazine H located on the machine near the rear edge of the table top 16, and the printing devices are withdrawn in succession from the bottom of the magazine and are advanced through the action of the printing device guiding and advancing unit to a plurality of stations, including the aforesaid printing station, after which the printing devices are discharged and are refiled in one or the other of two drawers, J, the arrangement being such that the drawers J are utilized alternately to receive the printing devices which have been removed therefrom for introduction into the magazine H.

The printing device guiding and advancing means includes a pair of spaced supporting rails 27 and 28 between which a reciprocable carrier bar structure 29 may operate to advance the printing devices D in a step-by-step manner. The advancing movement imparted to the printing devices D by the carrier bar structure 29 is such that the printing devices are withdrawn from the bottom of the magazine H and are first advanced to a sensing station, as fully disclosed in my aforesaid Patent No. 2,296,277, after which each printing device is advanced to the aforesaid printing station so as to rest on the anvil AA beneath the platen P for the performance of a printing operation. The printing device is then advanced forwardly from the printing station and drops in a substantially vertical position downwardly into a drawer selecting mechanism. The drawer selecting mechanism includes a suitable lateral guideway along which the printing devices are moved, and through a suitable gate mechanism the printing devices are dropped into one or the other of the two drawers J.

The variable data is in the present instance derived from and under the control of control means on the printing and control devices D, this control means in the present instance being provided by control perforations formed in the printing devices as described in said Patent No. 2,296,277. Such control means are sensed by a sensing means while the printing and control device is located at the aforesaid sensing station, and the sensed control means are effective through Bowden cable connections to set up the multiplying mechanism M. The multiplying mechanism M includes variable printing means, as disclosed in the aforesaid Patent No. 2,296,277, the type segments of which are set up under the control of and in accordance with the setting of the multiplier M, and when the platen PM operates it serves to print upon the check the variable data which has thus been derived from the control means of the printing and control device D.

In the machine herein shown a proof sheet is produced, and for this purpose a pager and proofer mechanism of the kind shown in my Patent No. 2,265,134, patented December 9, 1941, and this pager and proofer cooperates with a variable printer 36 to produce proof impressions on a web 37W, Fig. 3. The variable printer 36, which in some instances hereinafter be termed the auxiliary printing mechanism 36, is disposed on the machine frame 17 beneath the table top 16 so as to be located beneath the platen P, and thus impressions may be made from the printing and control device as well as from the variable printer 36 onto the proof web 37W.

The production of a proof sheet on the web 37W through the use of such a pager and proofer involves the performance of two printing operations from each of the printing devices D, and the machine is therefore constructed and arranged for what is termed duplicate operation, in that the printing devices are retained at printing position while two printing impressions are made. One of the printing impressions made from each printing device D is made on the sheet or check while the other printing impression from the printing device is made on the web 37W which is to be subsequently severed to form the proof sheet. As hereinbefore pointed out, the variable data are printed upon the check prior to the time when the sheet reaches printing position beneath the platen P, while the changeable data and the check number are printed upon the sheet or check at printing station through the action of the platen P. With respect to the proof sheet, however, all of the printing operations are performed by means of the platen P, and the variable printer 36 functions at this time to print corresponding variable data on the proof sheet. The variable printer 36 is arranged to be set up from and under control of the multiplier M so that the variable printer 36 prints variable data on the proof sheet to correspond with the variable data V which has been printed previously by the variable printing means of the multiplier upon the check or sheet.

In attaining the desired control of the variable printer 36 so as to print variable data on the proof sheet which corresponds to the variable data printed on the sheet or check, the present machine employs a variantly settable punching apparatus 45 which is set up by the multiplying mechanism M at the same time that the variable printer 35 is set up, and the card punching mechanism 45 operates to punch coded representations of the variable data which is to be printed by the variable printer 35 onto cards C, Figs. 15 and 16, that are fed to the card punching apparatus. After the card C has been prepared by the punching mechanism 45, the card C is advanced along a card guideway 46 by means of friction discs or wheels. The card C is thus advanced to a sensing station 48, Figs. 1 and 2, at which sensing means 50 operate to sense the variable data represented on the card C and to correspondingly set up the variable printer 36 so that this variable printer may, through the intermediary of its hammer mechanism, print the correct variable data upon the proof sheet.

Thus, the machine produces checks or sheets properly numbered and bearing changeable data and variable data both derived or taken from the same printing and control device D, and a corresponding proof sheet is produced which lists the various classes of data which have been printed upon a series of checks.

The individual units or operative mechanisms which form the machine thus illustrated are arranged to be driven and controlled in such a manner that the driving and control mechanism is not adversely affected by adjustments or repositioning of the units relative to each other. In accomplishing this desirable end, each of the individually formed units of the machine is provided with a constantly driven power source to which the unit may be connected at predetermined times in the operation of the machine as a whole, and the individual connection of each of the units to its constantly operating power source serves to drive the operating mechanism of the particular unit through a single cycle of operation. Each unit contains within itself the requisite means to time the operations of the various elements of the unit, and the units of the machine as a whole are operated in timed relation to each other through a central control means, as described in my Patent No. 2,367,395, patented January 16, 1945, which causes the drive of the individual units to be connected at predetermined times in the cycle of operation of the machine, and as a result the several individually driven units of the machine operate in timed relation and cooperate to produce the sheets S and the proof sheet.

While individual drive means such as motors might be provided for each of several units of a machine, I prefer to utilize a single motor 72 mounted in a lower portion of the frame 17 and operating through a belted connection 73 to constantly rotate a main drive shaft 74. The main drive shaft 74 extends longitudinally of the machine and is mounted in the frame 17 so that belted connections may be taken from the drive shaft 74 to constantly rotate driving elements in each of the several units of the machine. The constantly driven elements which form a part of each of the units of the machine, where pertinent to the present invention, will be described hereinafter in connection with the description of each of the units, but in general it may be observed that these constantly driven elements are in each instance arranged for driving connection with the normally stationary elements of the associated unit through the medium of a suitable one-revolution clutch. The one-revolution clutch of each of the operative units of the present machine is arranged to be electrically controlled from the aforesaid main control means of the machine. Thus, the several units of the machine may be adjusted with relation to each other and despite such adjustment the main control means will act to produce timed operation of the several units of the machine to thereby cause all of the separately formed units to cooperate in producing the desired business instruments.

In attaining the coordinated action of the several units of the machine as aforesaid, the form printing unit U is constantly driven by a belt connection 78, and the main control is driven in timed relation to the form printing unit U. The stop fingers 25 and 26 and other elements of the sheet feeding means along the sheet guideway G are also controlled in timed relation to the operation of the form printing unit U, this end being attained by a cam shaft 82 which is driven through a cross shaft 83 from the aforesaid main control.

The platen P is operated by power derived from the main shaft 74, there being a belt connection 88 to a metering pump 89 which serves, as described in detail in my copending application, Ser. No. 416,548, filed October 25, 1941, now issued as Patent No. 2,410,935, patented November 12, 1946, to operate the platen P through an impression forming cycle. The drive to the pump 89 is controlled by a one-revolution clutch (not shown) of the character disclosed in my Patent No. 2,265,133, patented December 9, 1941, and when this clutch is to be engaged to drive the pump and the associated platen through an operative cycle, a suitable control solenoid is energized either directly by the main control or indirectly from the control, as will hereinafter be described.

The means for advancing the web W and for operating the date and signature printing means and the knife 11' are driven by a belt connection 90 and a one-revolution clutch such as that shown in my aforesaid Patent No. 2,265,133, the clutch 91 being controlled by a solenoid 92. A similar belted drive 93 is provided for the multiplier M, the variable printer 35 and the card punching mechanism, and a similar one-revolution clutch 94, governed by a solenoid 95 controls the operation of this mechanism.

The sheet feeding rollers or discs 18, 19, 20, 21 and 22 and the card feeding discs 47 are constantly driven, and this is attained by a belted connection 96 from the drive shaft 74, this connection serving to drive a shaft 97 connected to the feed discs along the sheet guideway G, and also operating to drive a belt 98 which connects the several card feeding discs 47.

The variable printer 36 is also driven from the main drive shaft 74 through a belted connection and a solenoid controlled one-revolution clutch as will hereinafter be explained, and the desired timed inter-relation of the various mechanisms, including the variable printer 36, is attained through timed energization of the several control solenoids by the aforesaid main control means.

Since the variable printing means of the multiplier M and the card punching unit 45 are set up under direct control of the multiplier M, these mechanisms are in the present instance included in a unitary structure, but the details of structure and operation of the multiplying mechanism M need not be described in detail herein, since reference may be had to my Patent No. 2,296,276, patented September 22, 1942, for such information. The card C, Fig. 15, that is perforated under control of the multiplier M is fed from the multiplying mechanism M to the sensing means 50 of the auxiliary printing mechanism 36 through the card guideway 46. This affords a very flexible arrangement for it enables an auxiliary printing mechanism as 36 to be located in any desired position along the course of travel of the checks through the machine and avoids the necessity of affording a direct mechanical connection between the auxiliary printing mechanism 36 and the multiplying mechanism M and in fact avoids any type of interconnection between a record producing means such as the multiplying mechanism M and a record reproducing means such as the auxiliary printing mechanism 36.

Where the cards C are to be utilized in controlling the operation of another mechanism, as the auxiliary printing mechanism 36 in the present instance, the guideway 46 for the cards leads from the punching mechanism in which the cards are perforated to the sensing station 48 of the auxiliary printing mechanism 36.

Thus in the present instance the card guideway 46 has a stop finger 174 therein so that the cards may move into engagement with the stop finger 174 where they are held in position to have the perforations thereof sensed by the sensing means 50 of the variable printer 36. The stop finger 174 is carried by a leaf spring 175, Fig. 2, that is secured to the block 678. In order to insure that the stop finger 174 will be elevated at a proper time in the cycle of operation of the auxiliary printing mechanism 36, a cam shaft 176 mounted beneath the guideway 46 is driven in timed relation with the operative parts in the auxiliary printing mechanism 36.

To this end a bevel gear 195, Fig. 2, is fast on the cam shaft 176 and meshes with a bevel gear 196 fast on a shaft 197 journaled in a swivel bearing 198 carried by the cam shaft 176. The shaft 197 is also journaled in a swivel bearing 199 carried by a shaft 202 of the variable printer 36, the swivel bearings 198 and 199 being interconnected by a bar 200 to insure that these swivel bearings remain in proper relation one with the other to afford suitable journals for the shaft 197. At its lower end the shaft 197 carries a bevel gear 201 that meshes with a bevel gear fast on the shaft 202 and the ratio of the gears in the train of mechanism interconnecting the shafts 202 and 176 is such that these shafts rotate one to one. Thus when the cam shaft 176 is in operation a rise on the cam 176A, Fig. 5, moves into engagement with the pin 176B and elevates the stop finger 174 whereupon, in a manner to be described presently, a card C which has been engaged with the stop finger is ejected into a suitable card collector 679. In order to insure ejection of a card C from the machine upon elevation of the stop finger 174, a roller 203, Fig. 2, carried by a shaft 204, journaled in bearings in a bracket 205, mounted on a leaf spring 206, is provided.

Mention has been made heretofore that the platen P not only makes impressions from printing and control devices which come to rest on the anvil AA but that it also makes other impressions and in the present instance one of these other impressions is the printing of the number on the checks or sheets, as described in my aforesaid patent, and still other impressions are the printing of this number and other data on the proof sheet or web 37W which will be described more fully hereinafter. These other impressions are made from what will be called auxiliary printing mechanisms and it is to be understood that while in the present instance impressions are made from these auxiliary printing mechanisms by the platen P, which is the same platen as that which makes printing impressions from the printing and control devices D on the anvil AA, other platens could be provided, and the auxiliary printing mechanisms would in such instance be located at positions in the machine other than that at which such printing and control devices will cooperate with the platen P. If the auxiliary printing mechanisms were located in positions other than that at which impressions are made therefrom by the same platen as that making impressions from the printing and control devices it will, of course, be understood that such positioning would produce other printing positions and this might in some instances entail providing additional stop fingers on the sheet guideway. However, it is convenient to employ the same platen to make impressions from both the auxiliary printing mechanisms and the printing and control devices and for this reason this arrangement is resorted to and is shown herein. This arrangement enables the stop finger 26 to be employed to position the sheets to dispose them in position to receive impressions from printing and control devices on the anvil AA and also to receive impressions from the auxiliary printing mechanisms.

*The variable printer 36*

In addition to printing a number on the proof sheet, an impression is also made thereon in association with each number corresponding to the variable data printed on the check. As has been explained, the variable data are printed on the checks by the platen PM in the multiplying mechanism M. It is essential that the impression on the proof sheet in association with a number printed thereon correspond to the variable data and which is printed on a check in association with the check number thereof that corresponds to the aforesaid number on the proof sheet. This may be effected in a wide variety of ways and in the present instance this is assured by perforating a card C, Fig. 15, to bear representations of the variable data, when these data are printed in the multiplying mechanism M. Such cards C are fed through a card guideway, in the present instance, from the multiplying mechanism M to the auxiliary printing mechanism generally indicated by 36, which prints the data on the proof sheet.

While in the present instance the cards C, under control of which the auxiliary printing mechanism 36 is operated, are perforated in the multiplying mechanism M, it is to be understood that this auxiliary printing mechanism could be operated under control of cards derived from a wide variety of other sources and if the cards were derived from some other source than the present machine they would be introduced into a card receiving magazine which is arranged close to the inlet end of the card guideway 46 of the auxiliary printing mechanism 36 so that means, such as are associated with the magazine could operate to pass the cards into the guideway 46 one at a time.

From whatever source derived, the cards C passed into the card guideway 46 move into engagement with the stop finger 174 which arrests movement of the cards and disposes them in position to cooperate with the sensing means 50 of the auxiliary printing mechanism 36, such sensing means being described presently. The stop finger 174 is moved to and from card stopping position by a cam 176A, Fig. 5. This cam shaft, as hereinbefore described, is driven by the shaft 197 from the shaft 202 of the variable printer 36 and thus is operated in timed relation with other operative mechanisms in the machine. Hence at a predetermined time in the course of rotation thereof a rise on the cam 176A engages a pin 176B which rides on the periphery of the cam, and forces this pin up into a position such that this pin causes the stop finger 174 to be retracted from stopping position. This occurs after the card C has been sensed and a printing operation has been performed in the auxiliary printing mechanism 36. When the stop finger 174 is retracted from stopping position, the cards C in a manner described more fully hereinafter are fed from the card guideway 46 and pass into the card collector.

When a card C comes to rest in engagement with the stop finger 174 it is, as has been stated, in position to be sensed by the sensing means 50 of the auxiliary printing mechanism 36, such sensing means 50 in the present instance including a plurality of sensing bars 682, Figs. 2 to 6. There is a sensing bar 682 for cooperation with each column C', Figs. 15 and 16 on the cards C, in which columns digit representing perforations are provided. Each sensing bar 682 is devoted to a particular column C' and to insure accurated alignment of each bar with the proper column on a card C engaged with the stop finger 174, a comb 682', Fig. 2, is provided which is so secured in position that the slots between the teeth thereof are aligned with the respective columns C' on a card C engaged with the stop finger 174. The front ends of the sensing bars 682 are reciprocable in the slots in the comb 682' and are therefore properly aligned with the columns C' as aforesaid.

The sensing bars 682, as shown in Figs. 5 and 6, have enlarged portions at their inwardly disposed ends, and slots 683 are formed in these enlarged portions. A roller as 684 is mounted in each slot 683, these rollers 684 being rotatable on the shaft 685 which is fast in the side plates 686 and 687 of the auxiliary printing mechanism 36.

The side plates 686 and 687 are firmly retained in spaced apart relation by spacing bars as 688, Fig. 8, which, with cooperating devices, tie the side plates together to afford a unitary structure for the auxiliary printing mechanism 36 so that it may be handled as a unit. The side plates 686 and 687 are supported on a plate 689, Fig. 3, the front end of which rests on and is secured to the girder 262. Posts 690 are secured to the plate 689 near the rear end thereof and these posts are connected to a girder of the frame 17, Fig. 15, which is mounted below and which reenforces a girder also forming part of the frame 17. In order that the printing mechanism of the auxiliary printing mechanism 36 may be cleared from cooperating parts in the machine when this unit, that is, the parts thereof carried by the side plates 686 and 687, is to be removed from the machine, blocks as 692 are mounted on the plate 689. Clamp bolts 693 are passed through cross bars interconnecting the side plates 686 and 687 and the blocks as 692 and are threaded into the plate 689 to thereby firmly connect the unit of which the side plates 686 and 687 are a part to the plate 689. By removing the clamp bolts 693 and thereafter removing the blocks as 692 the unit, of which the side plates 686 and 687 are a part, may be dropped down onto the plate 689 and then slid from the machine.

The sensing bars 682 are reciprocated in each operation of the auxiliary printing mechanism 36 and, for the purpose of imparting such reciprocatory movement to these bars, a roller 694 is extended past the inner ends of the sensing bars, and in a manner explained presently, springs act on the sensing bars to maintain the ends thereof engaged with the roller 694. This roller is mounted on a shaft 695 carried by a double-armed rocker 696 fast to the shaft 697 journaled in suitable bearings in the side plates 686 and 687. A depending arm 698 is clamped to the shaft 697 by a clamp block 699, Fig. 5, so as to afford an adjustable connection between this arm and the shaft 697. The arm 698 has a roller 700 mounted at the free end thereof and this roller bears against the periphery of a cam 701 fast on the shaft 202 suitably journaled in bearings in the side plates 686 and 687, the roller 700 being urged into engagement with the periphery of the cam 701 by the aforesaid springs acting on the sensing bars 682.

Rotary movement is imparted to the shaft 702 through a clutch, such as is disclosed in my aforesaid Patent No. 2,265,133. This clutch, Figs. 4, 7 and 8, comprises the clutch teeth 703 on the hub of a gear 704 that is rotatable on the shaft 202. Clutch teeth 705 on a sleeve 706, that is slidably but non-rotatably mounted on the shaft 202, are urged toward the clutch teeth 703 by springs 707 that extend between the sleeve 706 and a collar 708 fast to the shaft 702. A pin 709 fast in the sleeve 706 is engageable with the cam surface 710 on an arm 711 pivotally mounted as indicated at 712 on the side plate 687. As best shown in Fig. 4, a lug 713 on an arm 714 is normally disposed beneath the free end of the arm 711. The arm 714 is pivotally connected at 715 to the core 716 of a solenoid 717 which when it is energized attracts its core and thereupon the arm 714 moves upwardly and in the course of this movement the lug 713 engages the free end of the plate 711 and pivots this plate upwardly whereupon the cam surface 710 is disengaged from the pin 709 and thereupon the spring 707 engages the clutch teeth 705 with the clutch teeth 703. Thereupon the shaft 202 is connected to the gear 704 to rotate therewith, said gear being constantly rotated in the course of operation of the machine as will be explained presently. As soon as the sleeve 706 starts rotating with the gear 704, the pin 709 engages the arm 714 and so pivots it that the lug 713 is disengaged from the end of the arm 711 whereupon the spring 718 pivots the arm 711 back into engagement with the periphery of the collar 706 so that, as the end of a revolution is approached, the pin 709 will ride over the cam surface 710 to thereby withdraw the clutch teeth 705 from cooperation with the clutch teeth 703, and at the end of a complete revolution the pin 709 moves into engagement with a stop edge 719, Fig. 8, on the arm 711 to interrupt further rotation of the shaft 202. It will be understood that all of the various clutch structures to which reference has been made hereinabove include parts as just described and operate in an identical manner.

The gear 704 meshes with and is driven by a gear 720 rotatable on a stub shaft 721, Fig. 8, and one element 722, Fig. 3B, in the form of a sleeve, of a slip clutch generally indicated by 723 is fast to the gear 720. The other element 724 of the clutch 723 is rotatable on the sleeve 722 and has a pulley 726 fast thereto, Fig. 8. The clutch 723 also includes a plurality of discs as 725 and 725', the two of such discs shown in Fig. 3B being typical of the two different types of discs employed. The discs 725 include ears 726' that are adapted to seat in notches 724' in the collar portion of the element 724. The discs 725' have recesses as 723' formed therein which are mounted on the spline 722' on the periphery of the sleeve 722. A spring washer 720' is engaged with the outwardly disposed face of the outwardly disposed of the discs 725 and 725', and a split clamp nut 721' is run onto the threaded portion at the free end of the sleeve 722. This nut 721' is so positioned on this threaded portion that the spring washer 720' exerts the proper degree of pressure on the discs 725 and 725' to insure that the required power will be transmitted through the clutch 723. The pressure exerted by the spring washer 720' however is such that the discs 725 and 725' will slip relative to each other in event of jamming of any of the operative elements receiving power through the clutch 723 and in this way damage to these elements is prevented.

A belt 727 passes about the pulley 726 and also about a pulley 728, Fig. 1, fast on the main drive shaft 74. A belt tightener, including the arm 729' and the roller 730', acts on a pass of the belt 727 between the pulleys 726 and 728 to insure proper tautness in this belt and power derived from the main drive shaft 74 is transmitted through the pulley 728, belt 727, pulley 726, clutch 723 and gear 720 to the gear 704.

In the course of each rotation of the shaft 202, induced by energization of the solenoid 717, which connects the shaft 202 to the gear 704, to bring about a complete rotation of the shaft 202, the cam 701 acts on the roller 700 and through the arm 698 to rock the shaft 697 and therefore the rocker 696 which in such an event moves in a clockwise direction, as viewed in Fig. 5, at the start of an operation. Each sensing bar 682 has a rack 729 formed in the upper edge thereof and such racks mesh with gear segments 730 rotatably mounted on the shouldered portions 731, Fig. 3A, of spacing collars 732, the shouldered portions 731 being wide enough to support the type segments for rocking movement thereon but, when placed side by side, preventing undesirable movement axially of these type segments along the periphery of these shouldered portions. The collars as 732 are mounted on a shaft 733 fast in the side plates 686 and 687, the collars being clamped together on this shaft. Springs as 734 extend between each gear segment as 730 and pins as 735 extended between the side plates 686 and 687. It is the action of the springs as 734 on the gear segments as 730 through the racks as 729 which is effective to engage the sensing bars 682 with the roller 694 and this spring pressure is effective through the rocker 696, shaft 697 and arm 698 to hold the roller 700 in engagement with the periphery of the cam 701.

At the time the rocker 696 starts to move clockwise, as viewed in Fig. 5, the gear segments 730 are positioned relative to the rack 729 in the manner shown in Fig. 5 and in the course of the advancing movement of the sensing bars 682 induced by the clockwise movement of the rocker 696, the gear segments 730 move relative to the race 729 into positions such as for example in which the gear segment 730 is shown in Fig. 3. The position which the gear segment 730 will assume in the course of such forward movement of the sensing bars 682 is determined by the position attained by these bars in the course of advancing movement thereof, and such position of the sensing bars is determined by the cooperation thereof with perforations in the cards C engaged with the stop finger 674.

The cards C, whether they are punched by punching means included in the multiplying mechanism M or in any other suitable punching means, are perforated to represent the digits in accordance with the chart shown in Fig. 4, the card C shown in Fig. 5 having been perforated in accordance with this chart to represent 998001 or, in accordance with the printing performed in the present machine, to represent $9980.01. If reference is made to Fig. 15 it will be seen that the representations of the digits as they appear thereon when read in accordance with the usual custom, appear in the order 100899, which is the reverse order to the manner in which this number is printed in the machine. The reason for this reverse arrangement is that the check faces downwardly as it passes through the machine and in order that the impressions may be made properly on the sheet when it is so faced the order of the printing mechanisms in the machine is adjusted to enable this to be done. Therefore, it is necessary that the means under control of which these printing mechanisms are set up, which is the card C in the present instance, be correspondingly arranged, and it is for this reason that the representations of the digits shown in the card illustrated in Fig. 15 are in the reverse order. The cards pass through the machine in the position in which the card C is illustrated in Fig. 15.

As shown in Figs. 15 and 16 the card is ruled to indicate the positions at which impressions may be made and indicia is associated with this ruling enabling the perforations to be read, and by referring to the card shown in Fig. 16 it will be seen that the data represented by perforations may be readily ascertained, this card C being perforated to represent 998001.

When cards are perforated in accordance with the chart shown in Fig. 14, a perforation representative of zero is located in a particular column in the row of potential perforation receiving positions nearest the edge of the card first engaged in the course of a sensing operation by the sensing bars 682 (the top edge as the card is viewed in Fig. 15) and a perforation representative of 9 is positioned in the row most remote from this edge, perforations representative of the intermediate digits being located in rows in an ascending order according to the value of the digit as, for example, a perforation representative of 4 is positioned in the fifth row from the aforesaid engaging edge which, as stated heretofore, is the uppermost edge as the cards are viewed in Fig. 15.

Each sensing bar 682 includes a sensing nose 736 and at the initiation of a sensing operation such noses rest on a card C, engaged with the stop finger 674, substantially in alignment with the first row of perforation receiving positions which, as stated heretofore, is the position whereat perforations representative of zero are made and, therefore, if a card C has a perforation in a particular column in this zero position the sensing noses 736 will pass into such perforation very soon after the bars 682 move toward the right, as viewed in Fig. 5, which is induced by clockwise movement of the rocker 696, as viewed in said Fig. 5.

When the sensing bars 682 are in their at rest position in which they are shown in Fig. 19A the roller 737, Figs. 3, 5 and 6, is engaged with the bottom of a block 738 that extends beneath all of the sensing bars 682 and which is carried between arms as 739 that have substantially V-shaped notches 740 therein near the rear edges thereof. These notches rest on knife edges provided on the blocks 741 respectively secured to the inner faces of the side plates 686 and 687. Springs as 742 act on the arms as 739 to tend to pivot these arms about the knife edges on the blocks as 741 in such a direction that the block 738 is urged into engagement with the roller 737. The roller 737 is formed as part of a shaft 743 journaled in arms as 744 fast to a shaft 745 journaled in plates as 746 carried by the side plates 686 and 687, one of the arms 744 including an arm 747. The upper end of a link 748 is pivotally connected to the arm 747. The link 748 has a slot 749 therein into which a pin 750 at one end of a medially mounted lever 751 is extended, said lever 751 being pivoted on a shaft 752 fast in the side plates 686 and 687. A spring 753 acts on the lever 751 to normally urge the cam follower 754 on the end thereof opposite that at which the pin 750 is secured into engagement with the periphery of a cam 755 fast on the above described shaft 720. A spring 756 extends between a spring anchor 757 on the link 748 and the pin 750 and serves to tie the link 748 to the lever 751. The cam 755 has a relief portion 758, Figs. 5 and 6, in the periphery thereof and when the parts are in the at rest position as, for example, in Fig. 5, the cam follower 754 rests on the periphery of the cam 755 adjacent the leading edge of the relief portion 758.

Immediately after the shaft 202 is set in operation by the engagement of the clutch teeth 705 with the clutch teeth 703, the relief portion 758 of the cam 755 moves into alignment with the cam follower 754 whereupon the spring 753 pivots the lever 751 in such a direction that the pin 750 engages the upper edge of the slot 749 whereupon the link 748 is moved upwardly and this movement is imparted through the arm 747 to the shaft 745 whereupon the arms as 744 pivot counterclockwise as viewed in Fig. 5 and thereupon the roller 737 moves from engagement with the bottom of the block 738 into alignment with the inset edge 759 thereon and in so doing permits the springs as 742 to move the block 738 downwardly.

The block 738 is maintained in the position in which it is disposed when the roller 737 is engaged with the inset edge 759 until after the sensing bars 682 have completed their movement to the right, as viewed in Fig. 5, which is the advancing movement thereof in the sensing operation, this movement being induced by the action of the spring as 734 when the rocker 696 moves in a clockwise direction, as viewed in Fig. 5. In order to maintain the block 738 in the aforesaid position without requiring a high degree of accuracy in the cam 755 and the devices controlled thereby that dispose the roller 737 in engagement with the inset edge 759, a latching arrangement is provided which retains the block 738 in this position, this latching arrangement being as follows:

An arm 735', Fig. 4 is fast on the shaft 745 outwardly of one of the side plates 746. This arm has a slot 736' therein. Another arm 737' is pivotally mounted on the shaft 745 and a screw 738' is freely passed through the slot 736' and is tapped into the arm 737', this affording an adjustable connection between the arms 737' and 735'.

One end of a pawl 739', Fig. 4, is pivotally connected as indicated at 740', to the upper end of the arm 737' and near its other end this pawl is passed through a slot in the hub 741' of a bell crank lever, generally indicated by 742', and which is pivotally mounted on a stub shaft 743' which, in alignment with the slot therein through which the pawl 739' passes, is cut away to provide a vertical stop edge 744', a spring 745' acting on the pawl 739' to urge the lower edge thereof toward the stub shaft 743'. A notch 746' is provided in the lower edge of the pawl 739' and the roller 737 engages the inset edge 759 on the block 738 the shaft 745 is rotated into such a position that through the arms 735' and 737' the pawl 739' is moved into such a position that the notch 746' moves into engagement with the stop edge 744' and the engagement of this notch with this stop edge retains the block 738 in the position in which it is disposed when the roller 737 engages the inset edge 759 thereon.

As the rocker 696 attains the end of its clockwise movement, as viewed in Fig. 5, one arm of this rocker engages a pin 747' in the arm 748' of the bell crank 742' and pivots this bell crank in such a direction the arm 750' thereon as well as the pin 751' on this arm are moved upwardly. In such upward movement of the pin it engages the lower edge of the pawl 739' and elevates this pawl in such a manner that the notch 746' is disengaged from the stop edge 744' whereupon the block 738 is freed of the latch holding it in the aforesaid position.

Prior to the time the rocker 696 attains the end of its movement in a clockwise direction, as viewed in Fig. 5, and acts to disengage the notch 746' from the stop edge 744', the dwell on the cam 755 will have moved into engagement with the cam follower 754 which will rock the lever 751 in such a direction that the pin 750 will move downwardly. It will be remembered that the pin 750 is connected to the arm 751 by a spring 756 and when the pin 750 is so pivoted downwardly the tension of the spring 756 is increased for in this downward movement the pin 750 freely moves through the slot 749 and does not pivot the arm 744. Thus the spring 756 is under appreciable tension when the notch 746' is disengaged from the stop edge 744' in the manner above described and thereupon the spring 756 promptly pivots the arm 744 in such a direction that the roller 737 is moved back into engagement with the bottom of the block 738, the top edge of the slot 749 engaging the pin 750 to limit pivotal movement in this direction.

Each sensing bar 682 includes a tooth 760 which is adapted to seat in elongated undercut teeth 761 provided in and extended transversely across the upper face of the block 738. There are as many undercut teeth 761 in the upper face of the block 738 as there are potential perforation receiving positions in a column on the card C so that therefore there is an undercut tooth 761 for each of the digits. The block 738 is in such a position with respect to the card receiving position determined by the stop finger 674 and each tooth 760 is so located on a sensing bar 682 that the undercut of tooth 761 nearest the card is so spaced from the potential zero positions on the card that each tooth as 760 on the various sensing bars 682 will be slightly spaced from the undercut edge of this first of the teeth 761 when the sensing bars are in their initial or at rest position. Since each tooth 760 is disposed in this position and since, when the parts are in their at rest position the roller 737 is engaged with the bottom of the block 738, to dispose this block in an upper position, the result is that the sensing noses as 736 are spaced above cards fed into engagement with the stop finger 674 and therefore the sensing noses do not interfere with the passage of the cards into this position.

It is after a card C has been fed into engagement with the stop finger 174 that in the course of operation of the machine the solenoid 717 is energized to engage the clutch teeth 705 with the clutch teeth 703 to set the shaft 202 in rotation. Such rotation of the shaft 202 first causes the relief portion 758 on the cam 755 to move into alignment with the cam follower 754 whereupon the roller 737 moves into alignment with the inset edge 759 on the block 738 and thereupon the springs 742 pivot this block downwardly and, incident to such downward movement of the block, the sensing noses 736 move into cooperating relation with the card C engaged with the stop finger 674. Immediately after the sensing noses 736 move into such cooperating relation with the card, the cam 701 starts to move the rocker 696 clockwise, as viewed in Fig. 5, and thereupon the sensing bars 682 start to move, under the influence of the springs 734, from positions in alignment with the positions at which perforations representative of zero would be produced in a card C now engaged with the stop finger 674 toward the positions at which perforations representative of 9 would be provided in such card.

Each card C is of such a size that perforations may be provided therein to represent any digit in any one of twelve columns thereacross wherefore each card C has a capacity to receive perforations representative of a 12-order number. In the present instance, however, accommodations are provided in the auxiliary printing mechanism 36 to care for a 9 order number but the machine as illustrated is sized to have a potential capacity for handling a 12 order number. Since the multiplying mechanism M, from which perforated cards C are derived in the present instance, has a capacity for but a 6 order number, the provision in the auxiliary printing mechanism 36 of accommodations for a 9 order number will care for all contingencies that may arise in the course of operation of the auxiliary printing mechanism. Accommodations are provided in the auxiliary printing mechanism for a 9 order number instead of a 6 order number to care for exigencies that may arise in the operation of an accumulator associated with and included in this mechanism, as described hereinafter, this accumulator in the present instance being for the purpose of accumulating totals of amounts printed by the auxiliary printing mechanism 36.

Since the auxiliary printing mechanism 36 includes accommodations to care for a 9 order number, nine sensing bars 682 are provided as is best shown in Fig. 2. Furthermore, in the block 678 below the position where a card C comes to rest when it is engaged with the stop finger 674, twelve grooves 762, Fig. 5A, are provided, these twelve grooves being respectively aligned with the twelve columns on the cards C in which perforations may be provided. Thus, if in the course of the travel of the sensing noses 736 across a card C engaged with the stop finger 174, one of these sensing noses moves into alignment with a perforation and into the underlying groove 762, and since the nose 736 is provided near the free end of each sensing bar 682, it is manifest that the passage of such a nose into a groove as 762 imparts appreciable lowering movement to the sensing bar 682, such lowering movement being sufficient to insure effective seating of the tooth 760 in the tooth 761 pertaining to the same digit as the perforation through which the nose 736 has passed pertains. Thus the teeth 761 provide a plurality of possible orientations for the sensing bars 682, and each such orientation is related to a particular location or position on the cards C whereat a perforation may be formed.

It has been stated that a sensing operation is initiated by first moving the roller 737 into alignment with the inset edge 759 on the block 738 and that when this is done the sensing bars 682 move downwardly so as to engage the noses 736 thereon with the face of a card C engaged with the stop finger 674. It has also been explained that immediately after the above operation the rocker 696 is actuated in such a way that the springs 734 may act say, to the right, as viewed, for example, in Fig. 5. Now at the time the noses 736 are lowered into engagement with the face of a card C engaged with the stop finger 674, the noses 736 engage the card C just beyond the positions in the various rows on the card at which perforations would be provided representative of zero, this being due to the fact that each tooth 760 on each sensing bar 682, when in its at rest position, does not completely seat in the one of the teeth 761 that pertains to zero, each tooth 760 being slightly spaced from the undercut edge of this one of the teeth 761 as has been previously explained when the parts are at rest. Thus, if in any one of the columns across the card C there is a perforation representative of zero, immediately after the sensing bars 682 start to move to the right as viewed in Fig. 5 the nose 736 cooperating with this particular column on the card C will pass through such perforation representative of zero into the underlying groove 762 and thereupon the tooth 760 on the sensing bar on which this particular nose 736 is provided will immediately seat in the one of the teeth 731 pertaining to zero.

It has been explained heretofore that the teeth 761 are undercut and this undercut is projected rearwardly, which is to say, in the direction of the line of movement of the sensing bars 682 in the course of a sensing operation induced by clockwise movement of the rocker 696. Each tooth 760 is complementary in form to the undercut teeth 761. Thus, when, as above described, a tooth 760 seats in one of the teeth 761, its complementary form firmly engages the undercut portion of the particular one of the teeth 761 and in this way the particular sensing bar is effectively retained against the action of the spring 734 acting thereon and the undercut portion of each of the teeth 761 and the complementary configuration of each tooth 760 insures that as the particular spring 734 acts on a sensing bar 682 the particular tooth 760 will slide down and firmly seat at the bottom of the one of the teeth 761 in which it is to seat. Furthermore, once such engagement is established it insures against displacement such as might be induced by vibration incidental to operation of the machine or for other reason.

Of course, if there is no perforation at the zero position in a particular column on the card C with which a particular nose 736 on a particular sensing bar 682 is cooperating, this bar will continue movement unless and until its nose 736 passes through a perforation in a position representative of one of the significant digits. It is in order to prevent the sensing bars 682 from making a false reciprocation that a perforation is provided representative of zero in those instances where a perforation representative of significant digit is not to be made in a particular column.

Particularly because of the inclusion in the auxiliary printing mechanism 36 of an accumulator, as will be described presently, it is also essential, where more sensing bars 682 are provided than there will be perforations in columns to be sensed, as in the present instance where perforations will appear only in six columns and nine sensing bars 682 are provided, that means be provided for preventing those sensing bars 682, which will in no instance cooperate with perforations, from making a sensing movement for otherwise, if these bars were permitted to make a sensing movement, false figures would be entered into and accumulated in the accumulator and to prevent this the following arrangement is provided.

A notch as 763 is provided in the top edge of each sensing bar 682 and is engageable by the depending portion 764 on a plate 765 that has a slot 766 therein, Fig. 7B through which a screw 767 is extended, the head of this screw overlying the marginal portions about the slot and serving to clamp the part 765 against the top surface of a bar 768 that extends between and is pivotally mounted on the side plates 686 and 687. The aforesaid slidable mounting of the plate 765 enables it to be moved transversely across the sensing bars 682, and the depending portion 764 is moved into the notches 763 in those sensing bars which will not in any circumstance cooperate with perforations in a card C which in the present instance will be the three lowermost sensing bars 682 shown in Fig. 7B, it being remembered that nine such bars are provided but only six thereof are to be effective in the present instance since perforations will be provided in only six columns on the card C. The pivotal mounting of the bar 768 enables this bar to be pivoted to retract the depending portion 764 from the notches 763 in a total taking operation of the accumulator as will be explained hereinafter.

The sensing bars 682 as has been explained cooperate with gear segments as 730, and in the course of the sensing movement of the sensing bars 682 the gear segments 730 are to be rotated about their pivotal mountings on the shaft 733 in an amount corresponding to the distance travelled by the respective sensing bars with which the gear segments 730 respectively cooperate and hence the respective gear segments are moved in an amount corresponding to the respective amount of movement of the sensing bars as 682. Such movement of the gear segments 730 is utilized in the present instance to control the set-up of the type segments from which impressions are made onto the web 37W that is to be divided into pages which constitute the proof sheet and in order to effect such positioning of such type segments the following arrangement is provided.

Arms as 769 pivotal on the spacing collars 732, Fig. 3A, mounted on the shaft 733, are connected to the adjacent gear segment 730 by bolts 771, Figs. 3 and 4, which pass through relatively enlarged openings in the arms 769 and are threaded into the adjacent gear segment 730, this arrangement affording an adjustable connection between each arm 769 and its adjacent gear segment 730.

Arms as 772 are unitary with the arms 769 and these arms are pivotally connected as indicated at 773, Figs. 4 and 5, to the type segments as 774, springs as 775 extending between the arms as 772 and the type segments as 774 and serving to tightly seat the type segments in the arcuate slots 775' formed in the top of the block 776 mounted between and connected to the slide plates 686 and 687. The disposition of the type segments 774 in the slots 775' affords a slidable mounting for these type segments, which, it will be understood have type characters provided on the top surface thereof. In the present instance the type characters provided on the top edges of the type segments 774 are for printing the digits and they are arranged in the order of from 0 to 9, the zeros being aligned with the printing position below the platen P when the type segments are in their normal at rest position shown in Fig. 3. The advancing movement of the sensing bars 682 acts through the gear segments 730 and arms 769 and 772 to move the type segments with the sensing bars 682 and thereby in correspondence with the positions at which noses 736 on the sensing bars 682 come to rest, type characters are disposed in printing position below the platen P as, for example, where a sensing nose 736 passes through a perforation representative of the digit 4 the type character on the connected type segment 774 for printing the digit 4 comes to rest in printing position.

The platen P, in so far as making impressions from the type characters on the type segments 774 is concerned, serves as a backing member when impressions are made from the type characters on the type segments, such impressions being made by the action of the nose as 777 on a hammer as 778, there being a nose 777 in alignment with each type segment 774. The noses 777 are aligned with an opening 779 in the block 776 and when the noses 777 are rapidly moved upwardly to effect an impression operation they pass through this opening 779 and engage the aligned type segment 774.

The hammers 778 are pivotally mounted as indicated at 780 to be carried by a shaft 781 that extends between and is carried by the side plates 686 and 687. Springs as 782 extend between arms as 783 on the hammers 778 and spring anchors extended between the side plates 686 and 687, and it is these springs that forcibly urge the noses 777 upwardly when an impression operation is to be made from type characters on the type segments 774, the noses 777 being maintained in their retracted at rest position against the action of the springs 782 by the engagement of edges as 784 on the hammers 778, the edge 784 lying on a radial line through the pivotal mounting 780 of the hammers 778.

The edges 784 engage the periphery of a roller 786 mounted between the arms 787 of a two-armed rocker that is pivotally mounted as indicated at 788 on a shaft extended between the side plates 686 and 687. A post 789 extends between the arms 787 of the aforesaid two-armed rocker and has an adjusting screw 790 mounted therein, the free end of which engages the arm 791 of a rocker that is pivotally mounted on the shaft 788 and which includes an arm 792 that depends below the shaft 788 and which carries a cam follower in the form of a block 793 at the free end thereof. The arms 787 and 791 are tied together by a spring 791', Figs. 3, 4 and 5.

The effect of the springs as 782 is impressed through the arms as 783 and 785 of the hammers 778 on the roller 786, and through the arm 787, adjusting screw 790, arm 791 and arm 792 to urge the block 793 into engagement with the periphery of a cam 794 fast on the shaft 702 to be rotatable therewith when this shaft is set in rotation in the manner hereinabove described. The periphery of the cam 794 is cut away to define a notch 795 which includes a radially extending edge 796. Hence, when in the course of rotation of the cam 794 with the shaft 702, the radial edge 796 moves into alignment with a complementary edge on the block 793, this block may rapidly pass into the notch 795 whereupon the hammers as 778 are freed to the action of the springs as 782 and thereupon those hammers which will be disengaged from the zero suppressing mechanism, to be described presently, are forced upwardly to make an impression from the type characters on the type segments 774 that are disposed in printing position below the platen P and the ink ribbon IRb that is disposed between, in the present instance, the web 37W and the type characters on the type segments so that the upward movements of the noses 777 of the hammers 778 causes an impression to be made on the web 37W from those type characters that are in printing position.

*Zero suppressing means—Figs. 3, 4 and 4A*

While there are as many type segments 774 as there are sensing bars 682 there will be instances where all of the type segments are not to be effective in a printing operation. If, for example, as in the present instance, six sensing bars 682 are free of the depending portion 764, Figs. 5 and 7B, six type segments 774 will be capable of being set up in each sensing operation which enables a six order number to be printed. There may be instances however when the number to be printed will extend through but say four orders. Furthermore, in the present instance there will be three type segments which at all times will be retained in their normal at rest position, this being due to the disposition of the depending portion 764 in notches as 763 in three of the sensing bars 682. Thus, if the noses 777 on the hammers 778 which are aligned with those type segments disposed beyond the four required in an impression operation, where the number extends through but four orders, are freed to the action of the springs 782, superfluous zeros will be printed. It is objectionable so to do and for this reason the zero suppressing mechanism now to be described is employed, this mechanism functioning to prevent the printing of such superfluous zeros.

In connection with the zero suppressing mechanism, it should be remembered that the printing mechanism of which the type segments 774 are a part, are in the present instance, employed to make the impressions on the proof sheet, and since these impressions are merely to be made on a proof sheet it is not necessary to provide for the printing of one or more dollar signs above the highest order in which a significant digit is printed. By reason of this I am enabled in this instance to employ a zero suppressing mechanism of relatively simple construction.

The zero suppressing mechanism is illustrated best in Figs. 3, 4 and 4A and includes arms as 797 that are pivotally mounted as indicated at 798 on a shaft extending between the side plates 686 and 687, springs as 799 being effective on the arms 797 to urge the shoulders 800 on these arms adjacent the free ends thereof into engagement with the radial edges as 784 on the arms 785 of the hammers 778, the engagement of these shoulders with these edges serving to lock the hammers 778 against movement when freed to the action of the springs 782.

Arms as 801 are unitary with the arms as 797 and include noses 802 which, when the gear segments 730 and the type segments 774 are in their normal at rest position, seat in notches 803 in the sectors 804 unitary with the gear segments 730. However, as soon as a gear segment 730 moves with its connected sensing bar 682, which means that the sensing bar 682 is moving beyond the position on the card C at which a perforation representative of zero would be provided, then the sector 804 would move with this gear segment and in so moving the nose 802 is forced out of the notch 803 into engagement with the face of the cooperating sector 804, such pivotal movement being effected against the effect of the springs as 799, and the resulting pivotal movement imparted to the arms as 797 are pivoted as just described that the shoulders 800 be capable of clearing the aligned edges 784 and to this end, when the parts are in their normal at rest position shown, for example, in Fig. 3, sufficient clearance is afforded between the shoulders as 800 and the aligned radial edges 784 that in the event the particular arm 797 is pivoted then the shoulder 800 will clear the edge 784.

It will be apparent from the foregoing that only these sensing bars 682 which advance to positions representative of significant digits will so move sectors 804 that the noses 802 will be disengaged from the notches 803. This of course is desirable in so far as the arms 797 that are aligned with those hammers 778 that operate type segments 774 pertaining to orders above that in which the first significant digit is to be printed. There may be however, instances where a zero is to be printed in an order below that in which the first significant digit appears but in such an instance, as has been explained, the sector 804 associated with the gear segment 730 pertaining to that particular order will not be moved for it will be remembered that the sensing nose 736 on a sensing bar 682 promptly passes into a perforation in the card C representative of zero to prevent movement being imparted to a gear segment 730 and its associated mechanism when a zero is to be printed. To enable printing of zeros where desired, the following arrangement is provided.

Each arm 797 carries a lug as 805, Fig. 4A, which extends from the arm and overlies the arm pertaining to the hammer 778 operative on the type segment which will print in the order next lower to that in which the given hammer 778 with which the given arm 797 cooperates. For example, the arm 797 pertaining to the third order in the present instance does not have a lug 805 provided thereon extending over the arm pertaining to the second order because arms as 797 are not provided in association with the edges 784 on those hammers pertaining to the two lowest orders since it is always desirable to print zero in these orders which, in the present instance, pertain to the cents order in a sum of money. Now as a number as 1023.04 is to be printed, the sector 804 pertaining to the sixth order will move in the course of sensing of perforations in a card C representative of this number. The sector 804 however pertaining to the fifth order will not be moved in as much as a perforation representative of zero will cooperate with the nose 736 on the sensing bar 682 pertaining to this order and therefore the nose 802 will remain seated in the notch 803 in this particular sector 804. However, as the sensing bar 682 pertaining to the sixth order causes the sector 804 pertaining to this order to move, the nose 802 on the arm 801 for this order is pivoted out of the notch 803 and thereupon the arm 797 pertaining to this order is pivoted downwardly as viewed in Fig. 3 and in the course of this movement the lug 805 engages the arm 797 downwardly so as to move the shoulder 800 thereon out of cooperating relation with the edge 784 that pertains to the fifth order so that when the hammers are freed to the action of the springs as 782 the hammers pertaining to both the fifth and sixth orders, in the manner above described, has the effect, through the lug on the arm 797 pertaining to the fourth order, of tending to move the arm 797 pertaining to the fourth order downwardly but this arm is moved downwardly by reason of the fact that the sector 804 pertaining to this order will move and unseat the nose 802 from its notch 803 because "2" is sensed in this order. This also applies in so far as the third order is concerned but it will be remembered that the arm 797 for this third order does not have a lug 805 provided thereon because, as explained above, arms as 797 are not associated with the second and first orders in view of the fact that zeros are always to be printed in the orders pertaining to cents in the sum of money. Thus, even though, in the example of 1023.04 the sector 804 pertaining to the second order does not move, a zero will be printed in this order by reason of the fact that this order does not include an arm 797 wherefore the hammer 778 pertaining to this order will be freed to the action of the spring 782 that pertains to this order.

From the foregoing it will be seen that in those orders above the order in which the first significant digit is to be printed, the printing of zeros will be suppressed but that, in those orders below this particular order, the printing of zeros where this seems to be done, will be affected.

*Accumulator—Figs. 3 to 13*

As has been stated heretofore, the auxiliary printing mechanism 36 includes an accumulator in which totals of the amounts printed on the proof sheet 37 from the type characters on the type segments 774 are accumulated, and this accumulator is of such construction that at desired times this accumulator may be operated to set up the type segments 774 whereby totals accumulated in the accumulator may be printed on the proof sheet 37.

This accumulator includes a plurality of accumulator wheels 806, Figs. 4 to 7, there being an accumulator wheel 806 for each sensing bar 682. These accumulator wheels 806, in the present instance, are in the form of gears and are totally mounted on shouldered collars, these collars each including a shoulder of sufficient thickness to accommodate an accumulator wheel. The collars are mounted on a shaft 807 about which therefore the accumulator wheels 806 are supported for rotation, the shaft 807 being fast to the outer ends of the arms 808 and 809 which are pivotally mounted on spacing collars carried by a shaft 810 which in turn is carried by the side plates 811 and 812 of the accumulator unit. The side plate 812 is directly fastened to the inner face of the side plate 687 and lugs as 813, provided on the side plate 811, are detachably connected to the side plate 686, this mounting of the side plates 811 and 812 providing a detachable mounting for an accumulator unit, the various parts of which are carried by the side plates 811 and 812.

The arms 808 and 809 are connected together to move as a unit and mounted therebetween substantially midway in the extent thereof is a roller 814 that may ride on the periphery of a cam 815 fast on a shaft 816 journaled in the side plates 811 and 812. A gear 817, Figs. 4 and 7, fast on the cam shaft 816 outwardly of the side plate 812 received motion from a gear 818 fast on the shaft 202 through idler pinions as 819 so that each time the shaft 202 is set in rotation in the manner hereinabove described the gear 817 and therefore, the cam shaft 816 are caused to again make a complete revolution, the ratio between the gears being such that the shaft 816 rotates synchronically with the shaft 202.

In the course of rotation of the cam 815 with the cam shaft 816, a rise on this cam engages the roller 814 and pivots the arms 808 and 809 in such a manner that the accumulator gear wheels as 806 are respectively engaged with the racks 820 on the lower edges of the sensing bars 682, each accumulator gear wheel 806 being respectively aligned with a rack 820. The gear wheels 806 are so engaged with the racks 820 immediately after the rocker 696 has reached the end of its clockwise motion, as it is viewed in Fig. 5, at which time all the sensing bars 682 which are free to move under the influence of the springs 734 will have attained the positions in which they are to stop by reason of noses 736 thereon having moved through perforations in the particular columns on the card C with which the noses 736 cooperate or, in other words, the sensing bars 682 will be positioned to represent a digital count by the time the gear wheels 806 mesh therewith. Moreover, as will be explained in detail hereinafter, by the time the gear wheels 806 are meshed with the racks 820 the hammers 778 will have been freed to the action of the springs 782 and an impression operation from the type characters set up will be made.

The parts are so timed that immediately after the impression operation effected by the hammers 778 is completed the rocker 696 starts to move counterclockwise, as viewed in Fig. 5, and in the course of this counterclockwise movement the roller 694 comes into engagement with the ends of the sensing bars 682 that have been arrested in positions representative of significant digits and after the roller has moved into engagement with the ends of these bars the bars thereafter move with the rocker 696 and return to their initial or zero positions. Hence, since the sensing bars have been set up to represent a digital count, as the accumulator gear wheels 806 are by this time meshed with the racks 820, it follows that in the return of the sensing bars 682 rotation is imparted to the gear wheels 806 in an amount proportionate to the digital count to which the respective sensing count represented by the sensing bars 682 will be transferred to the accumulator wheels 806.

It will be manifest that as various digital values are entered into the accumulator wheels, more than ten digits will be entered onto a particular wheel and as the tenth digit is entered into a particular wheel it is necessary that a carry-over be made into the order next high than that to which a particular wheel pertains, and hence an arrangement, now to be described, is provided which will effect such carry-over.

Each accumulator gear wheel 806 has twenty teeth thereon and teeth at diametric positions thereon, which is to say, each of the teeth pertaining to 10 is thickened, as best illustrated in Fig. 6A where such thickened teeth are indicated by 821a and 821b. Immediately after the sensing bars 682 attain their forwardmost or zero positions, the roller 814 rides off the rise on the cam 815, and thereupon the arms 808 and 809 are pivoted downwardly under the influence of the spring 822 which so acts on these arms that the roller 814 is urged toward the periphery of the cam 815. In this lowering movement the accumulator gear wheels 806 are demeshed from their cooperating racks 820 and are disposed in a lowered position such as is shown in Fig. 5. A lug as 823, Figs. 9 to 12, depends from each of the arms 808 and 809 adjacent the shaft 807, and a shaft 824 extends between these lugs and dogs as 825 are pivotally mounted on this shaft 824, there being a dog 825 at the side of each accumulator wheel 806 to lie in the line of movement of the thickened portions of the teeth 821a and 821b. The dogs 825 have relatively enlarged openings 826 therein near the upper ends thereof and a rod 827, carried by the arms 808 and 809, extends through all of the openings 826 to limit the pivotal movement thereof about the shaft 824.

Another shaft 828 extends between the side plates 811 and 812 and mounted at spaced intervals therealong are pawls as 829, there being a pawl 829 in alignment with each dog 825. Springs as 830 are effective on the pawls 829 to engage the upper ends of these pawls with the dogs 825 and to urge the shoulders as 831 on the lower ends of the pawls into engagement with the lugs as 832 on the arms 833 of the carry segments generally indicated by 834 which are mounted on a shaft 835 that extends between the side plates 811 and 812, there of course being a carry segment 834 including an upstanding arm 836 having a gear segment 837 at the free end thereof, the gear segments 837 being respectively adapted to mesh with the accumulator gear wheels 805. Each carry segment 834 also includes an arm 838 which projects above a pin 839 carried by the arms as 840 of a rocker pivotally mounted on the shaft 841 that is carried by the side plates 811 and 812. A spring 842 is effective on the arms as 840 to urge these arms and therefore the pin 839 downwardly as the parts are viewed in Fig. 5.

An arm 843 depends from the arm 840 mounted adjacent the side plate 812 and a screw 844, Fig. 5, tapped in this arm extends below this side plate and is passed into an opening on the arm 845 that is pivotally mounted on the shaft 841 outwardly of the side plate 812, this arm being unitary with a cam follower 846, the spring 842 being effective to urge this cam follower toward the periphery of a cam 847 fast on the shaft 816, the periphery of which cam has a notch 848 therein, one end of which notch is defined by a radial edge 849 at the end of a dwell on the periphery of this cam.

A shaft 850 is journaled in the side plates 811 and 812 and a comb spring 851 is fast thereon intermediate these side plates, the free ends of the teeth of this comb spring being respectively engaged in bifurcations 852 provided at the free ends of the arms 833 of the carry segments 834 so that each tooth of the spring 851 is effective on a particular carry segment. It is the spring 851 which supplies power to effect the entry of carries in a manner that will be described presently and in the course of a restoring operation, which will also be described presently, it would be necessary to overcome the effective force of this spring were it not for the fact that I provide an arrangement whereby the spring 851 is strongly tensioned only at the time they are to be effective to cause the entry of carries, and at all times this spring is only lightly tensioned and to this end the following arrangement is provided.

An arm 853, Fig. 3, is fast on the shaft 850 and a link 854 is connected thereto, this link also being connected to one end of a rocker 855 which is pivotally mounted as indicated at 856 on the outer face of the side plate 811, a strong spring 857 being effective on the rocker 855 and urging the roller 858 thereon toward the periphery of a cam 859 fast on the cam shaft 816. At the time a carry is to be entered, the roller 858 rides onto a drop on the cam 859 whereupon through the link 854 and the arm 853 the shaft 850 tends to rotate clockwise, as it is viewed in Figs. 3, 5 and 6, and in this operation the full effect of the strong spring 857 is impressed on the comb spring 851, it being understood that, when the roller 858 rides on the dwell of the cam 859, the spring 857 is only partly effective on the spring 851 which is at such times only lightly tensioned. The increased tension impressed by the strong spring 857 on the spring 851 is maintained until the accumulator wheels 806 are meshed with their aligned racks 820, in the manner above described, but as soon as this is effected the dwell on the cam 859 engages the roller 858 and thereupon the spring 857 is only partly effective on the spring 851 wherefore the tension of this spring is reduced to that a restoring operation may be effected without being required to overcome strong tension on the spring 851 by the spring 857.

Figure 9:
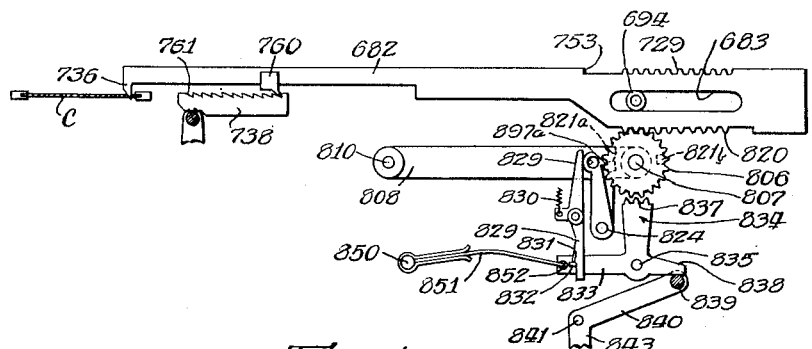

When an accumulator wheel 806 is in one of its two zero positions, either the wide teeth 821a or 821b is located with respect to the dog 825 in the position in which the tooth 821a is shown in Fig. 9 which is positioned immediately beyond that in which the tooth 821a would be effective, upon movement of the accumulator wheel 806 counterclockwise, as viewed in Fig. 9, to pivot the dog 825. In this position the springs 830 act through the pawls 829 to engage the dogs 825 with the rod 827 in the manner shown in Fig. 17 which positions the dogs 825 in the most right-hand position thereof, as they are viewed in this Fig. 5. The nose 736 on the sensing bar 682 shown in Fig. 9 has passed through a perforation in the card C representative of 9 and the accumulator gear wheel 806 has been meshed with the rack 820 by reason of upward movement imparted to the arms 808 and 809 in the manner hereinabove described and, therefore, in Fig. 9 the parts are shown in the positions occupied thereby immediately prior to the time the rocker 696 starts its counterclockwise movement as viewed in Fig. 5.

Figure 10:
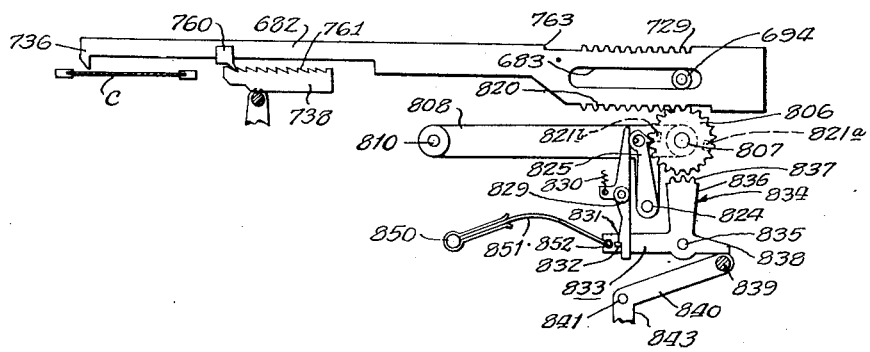

In Fig. 10 the parts are shown in the position attained thereby at the time the sensing bars 682 have attained their forward most position and by this time the roller 737 will have moved into engagement with the bottom face of the block 738 and will have pivoted this block upwardly so as to insure that the nose 736 will be disengaged from a card C whereby a card may be fed from position beneath the noses 736 by means being described hereinafter. As the sensing bar 682 moves from the position shown in Fig. 9 into the position in which it represented the digit 9 to the point wherein it represents zero and in so doing will have rotated the accumulator gear wheel 806 meshed with the rack 820 on this particular sensing bar in an amount representative of nine digits and by referring to Figs. 9 and 10 it may be seen that in Fig. 10 the wide tooth 621b is advanced into a position wherein it will engage the dog 825 as soon as further movement is imparted to the accumulator gear wheel 806, such positioning of the accumulator gear wheel 806 being equivalent to a representation of 9.

Figure 11:
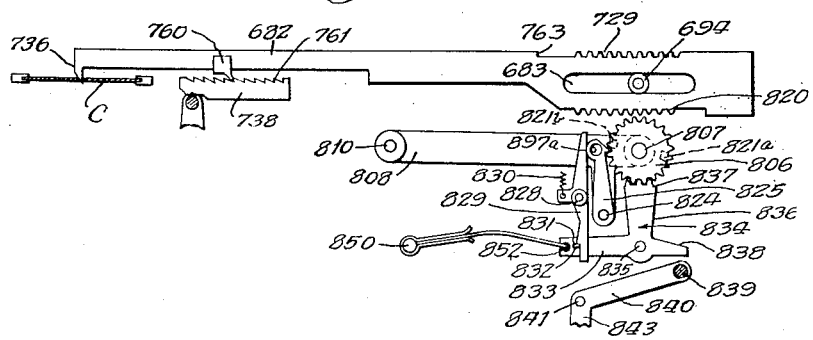

Immediately after the parts attain the post positions thereof shown in Fig. 10, the roller 814 rides off the rise on the cam 815 and thereupon the accumulator gear wheels 806 disengage the aligned racks 820 and move in to a lower position wherein the teeth of these gears engage the teeth of the gear segments 837, such engagement of these teeth being shown in Fig. 11, which shows the movably mounted parts in the lower position attained thereby when the wheel 806 is disengaged from the rack 820.

In Fig. 11 the nose 736 on the illustrated sensing bar 682 is shown as having passed through a perforation in a card C representative of the digit 4, this card being the one succeeding that shown as having passed in Fig. 9, and the sensing bar 682 as illustrated in Fig. 11 is in a position representative of a digital count of four, this position having been attained when the rocker 696 moved clockwise, as it is viewed in Fig. 5. Prior to the time the rocker 696 starts its return or counter-clockwise movement, as it is viewed in Fig. 5, the illustrated accumulator gear wheel 806, as well as all others, will be pivoted back up into engagement with the aligned rack 820 and then as the sensing bar 682 returns from the position in which it is shown in Fig. 12 the digital count of four, which the sensing bar 682 represented when it was in the position shown in Fig. 23 will be entered on the accumulator gear wheel 806 wherefore this wheel will have advanced in an amount equivalent to the representation of four digits, in which position it is shown in Fig. 12.

In the course of the advancing of the wheel 806 from the position in which it shows in Fig. 11 into the position in which it is shown in Fig. 12, the wide tooth 821b engaged the tapered nose at the upper end of the illustrated dog 825 and pivoted this dog counterclockwise as it is viewed in Fig. 12. Such pivotal movement of the illustrated dog 825 is effective on the upper end of the illustrated pawl 829 to pivot the shoulder 831 thereon from engagement with the lug 823 on the arm 833 of the illustrated carry segment 834. This frees the carry segment 834 of its latch connection with the pawl 829 for a very slight movement to the unlatched relation of Fig. 12, but this movement is slight in practice that the teeth of the gear segment 837 are maintained in substantially the same relation with the teeth of the accumulator wheel 806 with which they cooperate as these teeth would have occupied had not the shoulder 831 been disengaged from the lug 832.

The dog 825 and cooperating pawl 829 shown in Figs. 9 to 12, inclusive, cooperate with the accumulator wheel 806 which pertains to the lowermost or units order. The carry segment 834 however shown in these views, while it is under control of the aforesaid dog and pawl, is aligned with the next high accumulator wheel 806 or, in this instance, the accumulator wheel 806 which pertains to the tens order.

When the accumulator wheel 806 with which the dog 825 cooperates advanced from the position in which it is shown in Figs. 10 and 11 into the position in which it is shown in Fig. 12, four digits were added to the nine already standing therein so that when the accumulator wheel 806 attains the position in which it is shown in Fig. 12 it is representing "13." However, this accumulator wheel is only capable of representing the digits appearing in a single order so that when the accumulator wheel 806 advanced from the "9" position thereof shown in Fig. 11 into the "3" position thereof shown in Fig. 24 it was necessary to carry the "1" in the tens order of "13" into the next high or tens order. It was for this purpose that the shoulder 831 was disengaged from the lug 832, and when this shoulder disengaged this lug the arm 838 of the carry segment pertaining to the tens order moved from a position substantially like that shown in Fig. 10 into engagement with the pin 839 to close the gap or clearance between the arm 838 and the pin 839, and it is the engagement of the arm 838 with the pin 839 that maintains the teeth of the gear segment 837 in the proper relation with the teeth of the accumulator wheel 806 that pertains to the tens order or, in other words, insures that upon lowering of the arms 808 and 809 a particular tooth on the accumulator wheel 806 pertaining to the tens order which would have engaged a particular tooth notwithstanding the delatching of the shoulder 831 from the lug 832.

Subsequent to the time the parts attain the position shown in Fig. 12 the arms 808 and 809 pivot downwardly in the manner above described and in the course of this downward pivotal movement the teeth on the accumulator wheel 806 move into meshing relation with the teeth of the gear segment 837 aligned therewith. By the time this intermeshing is established the roller 858 will have ridden off the rise on the cam 859 and the arm 855 will have been freed to the action of the spring 857 which, as explained hereinabove, will be effective through the link 854 and the arm 853 to impress strong tension on the spring 851. Subsequent to the time the just described intermeshing of the accumulator wheel 806 pertaining to the tens order with the gear segment 837 aligned therewith has been established the radial edge 849 of the cam 847 moves from the position of Fig. 6 to the position of Fig. 5 so that the cam follower 846 drops past the radial edge 849 onto the inner dwell surface of the cam. Thus the arm 840 is moved by its spring 842 downwardly from the position shown in Fig. 6 into the position shown in Fig. 5, wherein it will be seen that such movement of the arm 840, which movement the spring 851 is effective through the arm 833 of the carry segment 834 to rock it from the position in which it is shown in Fig. 12 into the position in which it is shown in Fig. 13. Such movement of the carry segment is sufficient to advance the accumulator wheel 806 pertaining to the tens order in an amount equivalent to the representation of one digit thereon whereby the "1" of the above described entry of "13" is entered in tens order.

The above described operation of entering a carry into a next higher order occurs after the accumulation of any digital values that are to be accumulated in the order into which the carry is made and it also occurs prior to the end of a cycle of operation brought about by rotation of the shaft 202. Hence, by the time the shaft 202 comes to rest at the end of a cycle of operation the accumulator wheels stand in positions representative of whatever values were entered into in the course of such cycle of operation plus any values which were previously entered therein.

In the course of a cycle of operation succeeding that in which any carry or carries have been entered into the next higher order in the manner above described (it being understood that a carryover arrangement similar to that hereinabove described is associated with each lower order from which a carry may be made and with each higher order into which a carry may be entered), the carry segments which were rocked into the position which is shown in Fig. 13, to effect entry of such a carry, and the dog 825 which unlatched the pawl 829 to bring about such a carry operation are restored to the position thereof shown for example in Fig. 9, this being brought about as follows.

Shortly after the start of the cycle of operation succeeding that above described and subsequent to the time in such succeeding cycle at which the accumulator gear wheels 806 have been moved from the position such as that shown in Fig. 5 (wherein they are disengaged from the racks 820) into a position such as that shown in Fig. 6 (wherein they are engaged with the racks 820), the rise on the cam 859 engages the roller 858 and pivots the rocker 855 upwardly whereby the spring 851 is relieved of the full effect of the spring 857 and therefore the tension of the spring 851 is lessened so that the strong tension applied thereon as above described need not be overcome by the restoring operation. The spring 851, however, remains effective on the carry segments 834 until the accumulator wheels 806 are effectively meshed with the racks 820 and in this way the accumulator wheels 806 are retained in whatever position into which they are advanced by reason of carry-over actions, it being apparent that such an arrangement insures accuracy of operation which is of course essential.

Immediately after the accumulator wheels 806 have been engaged with their aligned racks 820 and the spring 851 has been freed of strong tension in the manner described, the restoring operation of the carry-segments, and other parts that moved in the carry-over operation, is quickly effected and this is brought about by the engagement of the rise 847' on the cam 847 with the cam follower 846 which pivots the arm 840 clockwise, as viewed for example in Fig. 9, to dispose the pin 839 in the position in which it is shown in Fig. 9 which is slightly above the position in which this pin is shown in Fig. 10. When in this position the pin 839 acts through the arms 838 to so dispose the arms 833 that the lugs 832 are below all of the shoulders 831. Therefore, the pawls 829 are all freed to the action of their springs 830 and this insures that the shoulders 831 will be disposed in latching position above the lugs 832. It will be noted that the rise 847' on the cam 847 extends slightly beyond the outer dwell surface of the cam as at 847', and that is brief so that the nose 846 is quickly freed therefrom and when the nose 846 moves into engagement with the dwell of the cam 847 the pin 839 assumes the position in which it is shown in Fig. 10. This position of the pin is such that if a shoulder 831 is disengaged from a lug 832 the relationship between the teeth of the gear segment 837 of the freed carry segment will be maintained with the aligned gear 806, as has been described hereinabove. The just described restoring operation occurs intermediate the time the accumulator gear wheels 806 are engaged with their aligned racks 820 and the time the rocker 696 is effective on the sensing bars 682 disposed in positions representative of significant digits in the course of its counterclockwise movement as it is viewed in Fig. 5.

In the course of operation of the machine various amounts printed from the type segments 774 are accumulated on the accumulator gear wheels 806 and usually at the end of a predetermined set of operations, which is commonly referred to as the end of a run, it is desired to print the total of the amount that has been accumulated on the wheels 806, and to this end manually operable means are provided for causing the accumulator gear wheels 806 to be engaged with the racks 820 in such a way that the setting of the wheels 806 can be utilized to set the type segments 774 so that the total accumulated on the wheels may be printed therefrom.

It will be remembered that the hammers 778 are released to perform a printing operation just prior to the time the rocker 696 attains the end of its movement in a clockwise direction, as viewed in Fig. 5. It will also be recalled, when a total is being accumulated in the accumulator gear wheels 806, that these wheels are engaged with the racks 820 to pick up the digital setting of the sensing bars 682 in the course of movement of rocker 696 counterclockwise, as viewed in Fig. 5. Now in a total taking operation, since the hammers 778 are to be utilized to effect a printing operation from the type segments 774, it follows that these type segments must be set up right prior to the time the hammers 778 are tripped, the means for tripping the hammers 778 being identical in a total taking operation as in a normal operation, and hence the hammers 778 are tripped at the same time in both a total taking operation and in normal operation. This therefore means that instead of the accumulator gear wheels 806 being engaged with the racks 820 during the forward movement of the sensing bars 682 it must be done during the rearward movement of the sensing bars 682.

It will also be recalled that the accumulator gear wheels 806 were meshed with the racks 820 by the action of a cam 815 which acted to elevate the rocker comprising the arms 808 and 809 in the course of a cycle of operation at the time the rocker 696 attained the end of its clockwise movement, as viewed in Fig. 5. Now in order that the rocker comprising the arms 808 and 809 may be moved upwardly to engage the accumulator gear wheels 806 with the racks 820 right prior to the time the sensing bars 682 leave their zero positions in a total taking operation, it is essential that some means be provided for so elevating the rocker comprising said arms. Furthermore, in the course of a total taking operation it is essential that the accumulator gear wheels be disengaged from the racks 820 in the course of forward movement of the sensing bars 682 for otherwise whatever total was taken from the accumulator gear wheels would be reentered therein as the sensing bars return to their initial position, it being understood that the setting of the various accumulator wheels 806 is utilized to arrest rearward movement of the sensing bars 682 in the course of a total taking operation to set up the type segments 774, this being explained presently.

Now since the cam 815 is formed to maintain the accumulator gear wheels 806 meshed with the racks 820 during forward movement of the sensing bars 682, it is necessary that the cam be rendered ineffective in a total taking operation. Therefore in order to provide means for elevating the rocker of which the arms 808 and 809 are a part at the start of a total taking operation so as to engage the accumulator gear wheels 806 with the racks 820 and in order to prevent the cam 815 from improperly holding the accumulator gear wheels meshed with the racks 820 during forward movement of the sensing bars 682 in the course of a total taking operation, another cam 860 is mounted on the cam shaft 816 adjacent the cam 815, this cam being positioned on the cam shaft 816 toward the side of the device appearing at the top of Fig. 7. Then in order that the cam 815 may be rendered ineffective and the cam 860 rendered effective, the cam shaft 816 is mounted for axial movement in the side plates 811 and 812.

The cam shaft 816 is normally held in position to dispose the cam 815 in position to cooperate with the roller 814 by a leaf spring 861, Fig. 3, which is mounted on the outer face of the side plate 811 and which bears on the adjacent end of the cam shaft 816. When, however, the cam 815 is to be moved from alignment with the roller 814, which is to be done in a total taking operation, the cam shaft 816 is slid axialy in its bearings against the action of the spring 861 and this is brought about in the manner now to be described.

A total taking operation is initiated by pressing down on the key lever 862, Figs. 3, 5 and 6 which is pivotally mounted on the shaft 745 and, as has been explained, is carried by the side plates as 746. The key lever 862 includes the depending arm 863, Figs. 5 and 7, on which a roller 864 is mounted. The roller 864 is engageable with an inclined cam surface 865 provided at one end of a lever 866 that is pivotally mounted at 867 on a lug 868 that extends outwardly from the side plate 812. Another lever 869 is also pivotally mounted on the bracket 868, as indicated at 867 in Fig. 7, and the levers 866 and 869 are secured together by passing a screw 870 through a slot in the lever 866 and threading it into the lever 869, this arrangement affording an adjustable interconnection between the levers 866 and 869. The lever 869 has a boss 871 thereon that is aligned with the adjacent end of the cam shaft 816. When the key lever 862 is pivoted from the position in which it is shown in Fig. 5 into the position in which it is shown in Fig. 6, the roller 864 rides along the cam surface 865 whereupon the levers 866 and 869 are pivoted in such a direction that the boss 871 engages the adjacent end of the cam shaft 816 and moves this cam shaft axially in an amount sufficient to move the cam 815 from cooperating relation with the roller 814 and to dispose the cam 860 in cooperating relation with this roller.

As is best shown in Fig. 5, openings as 876 are provided in the arms 808 and 809 and a pin 877 passes through these openings and is fast in the side plates 811 and 812 and when the accumulator gear wheels 806 are seated in engagement with the gear segments 837, the pin 877 is engaged with the top of the openings as 876 and this supports the arms 808 and 809 in such a position that the roller 814 is free of the cams 815 and 860 wherefore the movement of one of these cams out of cooperative relation with this roller and the movement of the other of the cams into cooperative relation is not impeded by the interengagement of the cams with the roller 814.

It is essential that the cam 860 be maintained in cooperating relation with the roller 814 throughout a total taking operation, that is, until near the end of such an operation, and to this end means are provided for latching the levers 866 and 869 in the position in which they are moved by the action of the roller 864 on the cam surface 865, this also enabling the key lever 862 to be released once it has been moved into its lower position shown in Fig. 6 and a total taking operation has been initiated. The latching means to which reference has just been made includes a boss 878, Fig. 7, on the lever 869 and a notch 879 in the arm 880 that is pivotally mounted as indicated at 881 on the side plate 812, a spring 882 urging the face of the arm 880 toward the boss 878 so that when the lever 869 is moved into the position in which it disposed the cam 860 in alignment with the roller 814, the notch 879 embraces the boss and retains the lever 869 in this position, suitable means described hereinafter being provided to release the notch 879 from the boss 878 near the end of a total taking operation.

Operative movement is imparted to the various mechanisms included in the auxiliary printing mechanism 36 in a total taking operation by energizing the solenoid 717, which is the same solenoid that is energized in normal operation to bring about engagement of the clutch teeth 105 with the clutch teeth 703 which, as has been explained hereinabove, sets the shafts 202 in rotation. Thus when the key lever 862 is pivoted from the position shown in Fig. 5 into the position shown in Fig. 6 an adjusting screw 872 thereon moves into engagement with a strip of insulating material overlying the top of the blade 873 of a switch, generally indicated by 874, and this engagement occurs prior to the time the key lever 862 has attained its lowermost position so that in the course of downward movement of the key lever a contact on the blade 873 is engaged with a contact on the other blade 875 of the switch 874, and it is the engagement of these contacts that closes circuit to the solenoid 717. The arrangement is such, however, that circuit is not closed to the solenoid 717 until after the roller 864 has been effective on the cam surface 865 to move the cam shaft 816 axially in the manner above described so that by the time the solenoid 717 is energized and the shaft 202 is set in operation the cam 816 will be aligned with the roller 814.

When the key lever 862 is rotated into the position shown in Fig. 6, it pivots about the shaft 745. This lever includes an arm 883 which projects beyond the shaft 745 and a latch dog 884 is pivotally mounted on this arm, a spring 885 acting on this latch dog to urge the nose 886 thereon into engagement with a shoulder 887 defined at the outer end and lower edge of the arm 747. In the course of the downward pivoting of the key lever 862, an arm 888 on the latch dog 884 is engaged with a stop 889 to thereby move the nose 886 out of its engagement with the shoulder 887 so that at the proper time in the cycle of operation when the parts carried by the shaft 745 are to be returned to their normal position this may be done even though the key lever 862 is still held in its downward position shown in Fig. 6. Upon return of the key lever 862, however, to its normal position and upon restoration of the parts carried by the shaft 745, the nose 886 reengages the shoulder 887 to enable the latch dog 884 to again operate the parts on the shaft 745 if the key lever 862 is again depressed.

Prior to the time the nose 886 disengages the shoulder 887 during downward movement of the key lever 862, the latch dog 884 causes the bell crank, of which the arm 744 is a part, to pivot in a counterclockwise direction, as viewed in Fig. 6, into such a position that the roller 737 passes beyond the inset edge 759 into engagement with the upwardly inclined edge 890. When this roller engages this edge the block 738 assumes such a position that each tooth 760 on the various sensing bars 682 is prevented from seating in any of the teeth 761. When the block 728 assumes this position the shaft 745 is rotated in such amount that through the arms 735' and 737' the pawl 739' is moved into such a position that the notch 791' therein, located beyond the position of the notch 736' moves into stopping relation with the stop edge 744' and this retains the block 738 in its lower position with the teeth 761 out of position in which a tooth 760 might seat therein in the course of rearward movement of the sensing bars 682 in a pending total taking operation. It is to be understood that it is necessary to lower the block 738 into this lower position during a total taking operation, because when a total taking operation is performed no card is engaged with the stop finger 174 and therefore the noses as 736 seat in the bottom of the grooves 762 in the course of rearward movement of the sensing bars. When however the rocker 696, in the course of a total taking operation, attains a position such that it can engage the pin 747', this pin is pivoted in such a manner that the notch 791' is disengaged from the stop edge 744' and thereupon the roller 737 may be restored to its position beneath the bottom of the block 738 by the spring 756 in the manner above described, it being understood that in the course of a total taking operation the dwell on the cam 755 tensions the spring 756 but that the roller 737 remains in engagement with the inclined edge 890 until the notch 791' is disengaged from the stop edge 744'.

It is essential during the total taking operation that all of the sensing bars 682 be free to move, therefore it is necessary to disengage the depending portion 764 on the plate 765 from the notches 763. This is effected in the course of downward movement of the key lever 862, and to this end a pin 892 is fast in the key lever 862 and this pin is projected through a slot 893 in a link 894 which is pivotally connected, as indicated at 895, to an arm 896 carried by a bracket 897 secured to the pivot block 768 to which the plate 765 is secured. When, in the course of downward movement of the key lever 862, the pin 892 engages the lower end of the slot 893, movement is imparted through the link 894 to the arm 896 whereupon the pivot block 768 is rocked into position in which it is shown in Fig. 18, thereupon the depending edge 764 on the plate 765 is disengaged from the notches 763, thereby freeing all of the sensing fingers 682 from movement under the influence of springs 734.

The configuration of the cam 860 corresponds to the configuration of the cam 815 but the cams 860 and 815 are fast on the cam shaft 816 in diametrically opposite relation, which is to say, the operative portions on the cams are positioned in 180° relationship with each other. Thus when the solenoid 717 is energized by closure of the switch 874 in the manner above described and the clutch teeth 705 engage the clutch teeth 703 and the shaft 702 is set in operation to set the cam shaft 816 in rotation, a rise on the cam 860 engages the roller 814 and elevates the rocker of which the arms 808 and 809 are a part in such a direction that the accumulator gear wheels 806 are meshed in such a direction with the racks 820. In a total taking operation this occurs prior to the time the cam 701 permits the springs 734 to move the rocker 696 clockwise, as viewed in Fig. 6, so that by the time the cam follower 700 rides off the rise on the cam 701 the accumulator gear wheels 608 are meshed with the racks 820. Then as the springs 734 act on the sensing bars 682 to move these bars rearwardly and those bars whose racks 820 are meshed with accumulator gear wheels 608 that are off zero position start to move rearwardly and such rearward movement of these sensing bars continues until either a wide tooth 821b engages the stop edge 897a on the various dogs 825, the stop edge 897a on the various dogs 825 being disposed in such a position that when a wide tooth rides into engagement therewith the accumulator gear wheels 806 will have attained zero position.

It will be understood that each accumulator gear wheel 806 has two zero positions and this is due to the fact that it is desirable to make the accumulator gear wheels of a size such that proper sizing of the various parts can be maintained and proper interrelation between the size of the various parts may be established. Thus each accumulator gear wheel instead of being provided with only ten teeth, to cause the digits to be accumulated thereon in each revolution thereof, is provided with twenty teeth so that the digits are accumulated thereon in each half revolution thereof, such size of the gear teeth neatly fitting to the various other dimensions selected in the machine, even to the spacing of the perforations in the respective rows thereof on the card C, and it is because of this sizing of the wheels 806 that two wide teeth 821a and 821b are provided on each wheel.

At the time the gear wheels 806 are arrested in zero position and the rearward movement of the sensing bars 682 with the rocker 696 is arrested, the proper type characters representative of the digits of the total accumulated on the wheels are positioned in printing position above the hammers 778 and prior to the time the rocker 696 attains the end of its clockwise movement, as viewed in Fig. 6 and in the manner above described, these hammers are tripped to drive the type characters in printing position thereabove upwardly so that an impression will be made through the ink ribbon IRb.

It will be remembered that the impression face 685 of the platen P serves as a backing member when impressions are made from the type characters on the type segments 774. In the normal operation of the machine the platen P is brought into position to so serve as a backing member by energization of the solenoid, which controls the platen actuating pump 89, and this solenoid is energized to move the platen P into such backing position, which is also the impression making position of the platen in so far as the printing and control devices D are concerned, each time an impression is to be made from type characters on the type segments 774, and to this end a pin 898, Fig. 4 is mounted in a cam 899 fast on the shaft 702, which shaft it will be remembered is set in rotation each time the auxiliary printing mechanism 36 is to operate whether it be in the normal operation of the machine or in a total taking operation.

Shortly after the shaft 702 is set in operation the pin 898 moves into engagement with a block 899' of insulating material on the blade 898' of a switch, generally indicated by 897' and engages a contact on this blade with a contact on the blade 896' of the switch 897'. The switch 897', in the manner described hereinafter, is in circuit with the pump control solenoid so that each time the contacts on the blades 898' and 896' are engaged with each other circuit is closed to the pump control solenoid to effect an operation of the platen P in the manner described hereinabove.

Mention has been made that the boss 878, Fig. 7, is latched in the notch 879 in the arm 880 each time the cam shaft 816 is moved against the action of the spring 861 and that the resulting latching is to be maintained until near the end of a total taking operation. This releasing is effected under control of the cam 899 which co-operates with a cam follower 895' Fig. 4, on the end of an arm 894' of a bell crank lever, generally indicated by 893' that is pivotally mounted, as indicated at 892' on the side frame member 687, the cam follower 895', being urged toward the periphery of the cam 899 by a spring 891' which acts on the arm 890' of said bell crank lever 893'. The arm 890' of this bell crank lever is aligned with a pin 889' that depends from the arm 880, and when near the end of a revolution of the shaft 702 a notch 888' in the cam 899 moved into alignment with the cam follower 895', the arm 890' of the bell crank 893' engages the pin 889', and if this occurs in a total taking operation the arm 880 is moved in such a direction that the notch 879 is disengaged from the boss 878 and thereupon the spring 861 effective on the cam shaft 816 moves the levers 866 and 869 back into their normal inoperative position shown in Fig. 7, the cam 815 moving back into cooperative relation with the roller 814 at such time and the cam 860 moving out of cooperative relation with this roller.

The embodiment of the invention disclosed in Figs. 17 to 28 of the drawings was originally disclosed in my aforesaid Patent No. 2,414,643, and in accordance with this embodiment of the invention the carry-over mechanism and the engagement and disengagement of the accumulator wheels with the operating racks are accomplished in a different manner than in the previously described embodiment. The accumulator of Figs. 17 to 28 is illustrated in the aforesaid application Serial No. 348,283 as a part of a billing machine wherein public utility bills are prepared, the variable data that forms a part of such bills being set upon on printing type wheels or type bars under control of perforated control cards.

In such billing machine, provision has been made for keeping a total of certain of the items of variable data printed by the type wheels and type bars and specifically, the net bill amounts and total kilowatt-hours of consumption that are printed in the bottom line of data V upon each sheet or bill, are accumulated in the present instance. In the same cycle in which these items are printed, namely, the first printing cycle of the billing machine shown in the aforesaid application Serial No. 348,283, an entry of the net bill amount and total kilowatt-hours consumption is effected into an accumulating mechanism, now to be described, this being done in the manner which will be presently described.

Each type wheel 1364 has gear teeth 1570 formed thereon and connecting the same to horizontal slides 1571 are positioned in the slots in the comb bars 1572 in vertical alignment with the type wheels from which the amounts of the net bill and total kilowatt-hours consumption are printed.

The slides 1571 are supported for longitudinal movement by individual rollers 1573 disposed in longitudinal slots 1574 in the slides, Figs. 19 and 20, these rollers being rotatably mounted on shafts 1575 fixedly mounted in brackets 1576 secured to the comb bars 1572. A rack 1577 is formed in the upper edge of each slide 1571, and the gear teeth 570 of each of the type wheels 1364 in the net bill, total kilowatt-hour, and district and ledger numbers groups respectively mesh with the rack teeth 577 of the aligned slide 571. As each type wheel that is geared to a slide 571 is rotated to display the selected type character in printing position and is thereafter restored, the connected slide 571 is reciprocated longitudinally to and from its normal position shown in Fig. 17, the displacement of each slide 571 being proportionate to the numerical value of the digit set up in printing position on the type wheel.

In the present construction, provision is made for printing a net bill extending into not more than four orders of significant digits ($99.99 or less), and kilowatt hour consumption quantities of not more than three orders (999 or less), making a total of seven type wheels which are instrumental in printing these quantities upon the sheets or bills.

A rock shaft 1581, Figs. 17 to 21, inclusive, is journaled in the side frames 1155 and 1156 a considerable distance below the type wheels and is passed through bearings 1582 formed in the lower portions of vertical side plates 1583 and 1583a which support the accumulator assembly. A tie rod 1584 carried by the side frames 1155 and 1156 passes through other openings in the side plates 1583 and 1583a near the tops thereof so that the plates 1583 and 1583a are thus firmly supported against rotative movement. Elongated openings or slots 1585 are formed in the plates 1583 and 1583a near their top edges and a shaft assembly generally designated 586, Figs. 19 and 20, is journaled in these openings so as to be vertically movable therein. The assembly 1586 includes a central rod 1587 that is threaded at each end. A number of spacing collars 1588, Fig. 20, are mounted on the rod 1587 between end spacers 1589. The two end spacing collars 1588 have bosses abutting the end spacers 1589, and plates 1590, Figs. 20 and 21, are hung from these bosses. Suitable bosses are formed in the other spacing collars 1588 to afford bearings for a series of accumulator pinions 1591, Figs. 17 to 20, inclusive, that are respectively aligned vertically with only the slides 1571 in the bill amount and kilowatt-hour consumption groups. Outer spacing sleeves 1592 are disposed on the rod 1587 adjacent the spacers 1589, and washers 1593 having diameters larger than the widths of the slots 1585 are positioned next to the spacing sleeves 1592 and adjacent the outer faces of the plates 1583 and 1583a. Nuts 1594 are screwed onto the ends of the rod 1587 into tight engagement with the washers 1583, thereby holding the parts of the shaft assembly 1586 in place, there being sufficient clearance between the washers 1593 and the side plates 1583 and 1583a to enable the shaft assembly 1586 to slide freely up or down within the openings 1585 in these plates. There is enough friction afforded in the bearings of the pinions 1591, when the nuts 1594 have been tightened, to prevent these pinions from being displaced rotatively except when they are positively driven in the manner described hereinafter.

A second shaft assembly generally designated 595, Figs. 19 and 20, is mounted between the side plates 1583 and 1583a directly beneath the shaft assembly 1586. This second shaft assembly 1595 includes a series of spacing collars 1596 that are of substantially the same shapes as are the spacing collars 1588 in the shaft assembly 1586, and which are mounted upon a rod 1597 that extends between and is removably secured to the side plates 1583 and 1583a. End spacers 1598 mounted on the rod 1597 adjacent the inner faces of the side plates 1583 and 1583a maintain the outermost of the spacing collars 1596 in spaced relation to the side plates, the bosses of these spacing collars abutting the end spacers 1598 to afford bearings for rockers 1599, Figs. 17 to 21, inclusive, that are thus positioned beneath the sleeves 1592 in the shaft assembly 1586. The upper portions of the rockers 1599 are provided with cam surfaces 1600, Figs. 17 and 21, which are adapted to cooperate with the sleeves 1592. Springs 1605 are extended between the rods 1587 and 1597 and are normally effective to urge the shaft assembly 1586, Figs. 19 and 20, into its lowermost position in which the sleeves 1592 are seated in the bottoms of the slots 1585, Fig. 21, in the side plates 1583 and 1583a, the cam surfaces 1600 of the rockers 1599 being then positioned to one side of the sleeves 1592. The portions of the rockers 1599 extending below the rod 1597 carry rollers 1602 that are received in bifurcations 1603 formed in the upper edges of rock arms 1604 which are secured to the rock shaft 1581 adjacent the inwardly facing ends of the bearings 1582 in the side plates 1583 and 1583a.

The rock shaft 1581 extends beyond the outer face of the side frame 1156, and a bell crank 1606, Fig. 17, is rotatably mounted thereon. One arm 1607 of the bell crank 1606 is connected by a link 1608 to one end of a lever 1609 which is pivoted at its other end to the frame 1156. A roller 1610 is rotatably mounted on one face of the lever 1609 at the middle thereof, and a spring 1611, Fig. 17, acting upon the lever 1609, urges the roller 1610 against the periphery of a cam 1612 mounted in fixed relation on a sleeve that is slidably but non-rotatably mounted on the cam shaft 1160, this sleeve being normally positioned to enable the cam 1612 to cooperate with the roller 1610. During approximately the first half of each normal cycle of rotation of the cam shaft 1160, the roller 1610 rides on a relieved circular part of the cam 1612, but during the latter half of the cycle, the roller 1610 is on the high portion of the cam 1612 and the lever 1609 is moved to advance the bell crank 1606, Fig. 17, counterclockwise. A rock arm 1615, Figs. 28 and 38, is secured to the shaft 1581 adjacent the inner face of the side frame 1156 and carries a pin 1616 which serves as a pivot for a short lever 1617 having a notch 1618 formed in one edge thereof. A spring 1619 extended between one end of the lever 1617 and the arm 1607 of the bell crank 1606 tends to swing the lever 1617 about its pivot 1616 to cause a lug 1614 carried by the arm 1613 of the bell crank 1606 (which lug extends inwardly of the side frame 1156 through a suitable opening therein) to be seated in the notch 1618, in which position the lug 1614 is firmly held between one end of the notch 1618 and the free end of the rock arm 1615.

During approximately the first half of the first printing cycle, the type wheels are selectively positioned under control of the sensing means as described in the aforesaid copending application Serial No. 343,283, and concurrently therewith the slides 1571 are positioned in accordance with the settings of their connected type wheels. It has been noted that the roller 1610 of the lever 1609, Fig. 17, rides on the lower portion of the cam 1614 during this first half cycle. Hence, the bell crank 1606 occupies its extreme clockwise position as viewed in Fig. 28 and the lug 1614 on this bell crank bears against the rock arm 1615 to maintain the rock shaft 1581, and its connected arms 1604, Figs. 19, 20 and 21, in their extreme clockwise positions, as viewed in these figures. The rockers 1599 are held in their counterclockwise positions, in which the cam surfaces 1600 thereof are ineffective, and therefore the shaft assembly 1586 remains in its lowermost position, the sleeves 1592 resting in the bottoms of the vertical slots 1585. Under these circumstances the accumulator pinions 1591 are out of engagement with the racks 1601 of the slides 1571, as shown in Fig. 17.

Shortly prior to initiation of restoring movement of the type wheels and slides 1571, the roller 1610 rides up onto the high portion of the cam 1612 and the bell crank 1606 is thereby swung counterclockwise, as viewed in Fig. 28, pulling the lever 1617 and its connected arm 1615 to the left, rocking the shaft 1581 and arms 1604 counterclockwise and the rockers 1599 clockwise, as viewed in Fig. 21. The cam surfaces 1600 thereupon bear against the sleeves 1592 and urge the shaft assembly 1566 upwardly in the slots 1585, causing the pinions 1591 to be raised and meshed with the racks 1601. The type wheels 1364 are subsequently restored to their zero positions and in so doing, move the slides 1571 to the right as viewed in Fig. 17 so that the accumulator pinions 1591 are rotated clockwise in amounts proportionate to the numerical settings of the type wheels with which they are vertically aligned. At the conclusion of the first printing cycle, the roller 1610 on the lever 1609 again drops into the relief in the cam 1612 and the intermediate mechanism thereon is operated to restore the accumulator pinions 1591 to their lowermost positions out of engagement with the slides 1571. It will be noted in Fig. 21 that the depending plates 1590 included in the shaft assembly 1585 have bifurcations 1620 at their lower ends which receive the bosses of the spacing collars 1596 of the shaft assembly 1595 positioned therebelow, and hence, the plates 1590 are free to move up or down with the shaft assembly 1586 and are guided in such vertical movement by the aforesaid bosses.

During the first half of the second printing cycle, the roller 1610, Fig. 17, rides on the low portion of the cam 1612, and the bell crank 1606 remains in its extreme clockwise position, as shown in Fig. 28, to maintain the accumulator pinions 591 out of mesh with the racks 1601 in the slides 1571. A pin 1621 projects upwardly from the lever 1617 to one side of the pivot 1616 in lateral alignment with a roller 1622 carried by an arm 1623 rotatably mounted on the outer end of the tie rod 1584, Fig. 28. A link 1624 connects the arm 1623 with the rock arm 1439 included in the line shifting mechanism described in said copending application. During substantially all of the first printing cycle, the arm 1623 is maintained out of engagement with the pin 1621. However, in the second printing cycle, when the rock arm 1439 has been shifted to bring the second variable data line on the sheet or bill beneath the platens, the rock arm 1439 shifts the link 1624 and arm 1623 to the left, Fig. 28, and causes the roller 1622 to bear against the pin 1621, swinging the lever 1617 counterclockwise and withdrawing it from engagement with the lug 1614, thereby uncoupling the bell crank 1606 from the rock arm 1615. Then, in the latter half of the second cycle when the roller 1610 rides onto the high part of the cam 1612, the bell crank 1606 swings idly counterclockwise, Fig. 28, and the rock shaft 1581 remains stationary to thereby maintain the accumulator pinions 1591 out of engagement with the racks

41

1601 during the restoring movement of the slides 1571. Hence, during the second printing cycle, no items are entered into the accumulator.

After the sheet or bill is advanced away from printing position beneath the platen, the line shifting mechanism is restored to its bottom line position and as an incident to this, the arm 1623 is swung to retract the roller 1622 from engagement with the pin 1621, enabling the spring 1619 to swing the lever 1617 back into engagement with the lugs 1614. Then, as the roller 1610 returns to the relieved portion of the cam 1612, the arm 1613 of the bell crank 1606 moves to the right to bear against the end of the rock arm 1615 on the shaft 1581, whereupon the spring 1619 elevates the lever 1617 slightly to seat the lug 1614 in the notch 1618. When the lug 1614 bears against the end of the rock arm 1615 in its clockwise restoring movement, further lateral relative movement of the arm 1613 and lever 1617 ceases inasmuch as the lever 1617 is connected to the arm 1615 which is moved to the right along with the arm 1613. Because of this arrangement a very close fit may be had between the lug 1614 and the left end of the notch 1618 since the lug 1614 cannot ride past the end of the notch 1618 beyond the point at which such close fit is afforded. If the lug 1614 did not bear against the arm 1615, and the notch 1618 alone were relied upon to couple the lug 1614 to the lever 1617, a much looser fit between the lug and the notch would be necessary to insure proper seating of the lug, and this would give rise to undesirable play between the parts. In the course of effecting an entry into the accumulator pinions in the manner described above, it may be necessary to effect a carry-over from a lower order to a higher order as is well understood in the art, and means for effecting this are provided in the accumulator apparatus.

A number of gear segments 1625, Figs. 18 and 20, are rotatably mounted on the bosses of the spacing collars 1596 of the shaft assembly 1595, each in vertical alignment with a respective one of the accumulator pinions 1591. When the shaft assembly 1586 is in its lowermost position, the pinions 1591 mesh with the teeth of the gear segments 1625, but when the pinions 1591 are raised to be meshed with the racks 1601, they move out of mesh with the gear segments 1625. Each gear segment 1625 has an arm 1626 extending laterally therefrom that is acted upon by a spring 1627 anchored on a rod 1628 extending between and secured to the side plates 1583 and 1583a. The springs 627 tend to urge the gear segments 1625 counterclockwise, as viewed in Fig. 18, to thereby advance the pinions 1591 clockwise, but such movement of the gear segments 1625 is restrained by latches 1629 rotatably mounted on a shaft 1630 carried by the side plates 1583 and 1583a, these latches having shoulders 1631 that cooperate with lugs 1632 on the arms 1626 of the gear segments 1625, springs 1633 anchored in a rod 1634 carried by the plates 1583 and 1583a serving to urge the latches 1629 into positions whereat they are effective to restrain movement of the segments 1625. Each latch 1629 has an upstanding arm that abuts an eye 1635 formed in an aligned pawl 1636 that is pivotally mounted on a rod 1637 carried by the vertically movable plates 1590 of the shaft assembly 1586. A pin 1638 carried by the plates 1590 passes through the eyes 1635 of the pawls 1636 and limits movement of these pawls and the latches 1629 under the influence of the springs 633.

42

Insofar as the carry-over arrangement is concerned, it should be noted that each accumulator pinion 1591 is, in the present instance, provided with twenty teeth. Two of these teeth, 1639 and 1639a, situated diametrically opposite from each other on each pinion 1591, are thickened to afford lugs on the face of the pinion. The pawls 1636 are positioned on the rod 1637 in alignment with the thickened portions of the teeth 1639 and 1639a but out of alignment with the remaining teeth of the respective pinions 1591, there being one pawl 1636 for each such pinion. Each pawl has a nose 1640 that is positioned in the path of the movement of the teeth 1639 and 1639a when the eyes 1635 of these pawls bear against the pin 1638 under the influence of the springs 1633 acting upon the latches 1629. The noses 1640 are so shaped that when a thick tooth 1639 or 1639a of a pinion 1591 engages the nose 1640 in the course of rotative movement of the pinion 1591 during an entry-effecting operation therein, the pawl 1636 is cammed out of the path of the tooth 1639 or 1639a, thereby tripping the latch 1629 and releasing the shoulder 631 thereon from engagement with the lug 1632 in the arm 1626 of the associated gear segment 1625, and thereby conditioning this segment to effect a carry-over entry into the next higher order accumulator pinion 1591 in a manner which will be subsequently explained.

Referring to Figs. 19 and 20, a rocker 1641 is rotatably mounted on the bosses of two of the spacing collars 1596 outside of the plates 1590, this rocker having upwardly extending arms 1642 and 1643, Figs. 17 and 18, positioned intermediate the plates 1590 and the rocker arms 1591. A pin 1644, screw-threaded at one end to the rocker arm 1642, passes through enlarged openings 1645, Fig. 21, in the plates 1590 and 1646, Fig. 18, in the gear segments 1625 and thereafter extends through an opening in the other rocker arm 1643 sized to provide a close fit of the pin 1644 therein. The pin 1644 also extends through an enlarged opening 1647, Figs. 20 and 21, in the side plate 1583a.

A spring 1648, Fig. 18, anchored on a pin 1649, secured to the side plate 1583, is attached to the rocker 1641 and tends to urge the rocker arms 1640 and 1642 counterclockwise, as viewed in Figs. 17 and 21, until the pin 1644 carried thereby is arrested by engagement with an edge of the opening 1647 in the side plate 1583a, Figs. 20 and 21. The rocker arm 1642 has a lug 1650 thereon, Fig. 17, and a latch 1651, pivotally mounted on the shaft 1630, is arranged to cooperate with the lug 1650 to restrain movement of the rocker 1641 under influence of the spring 1648. When the shaft assembly 1586 is in its lower position, however, a pin 1652, Fig. 17, carried by the adjacent depending plate 1590, prevents the latch 1651 from being pivoted by its retaining spring 1653 into engagement with the lug 1650.

A typical carry-over operation is effected in the following manner, reference being particularly made to Figs. 22 to 27, inclusive. It will be understood that the gear segment 1625 shown in these views cooperates with the pinion 1591 in the next order above that in which the pinion 1591 shown in these views is situated. The carry-over operation is described as entailing an initial entry of 9 on the illustrated accumulator pinion 1591 and subsequent entry of 2, the carry-over operation being performed as an incident to the entry of the digit 2. To facilitate explanation of these operations, the accumulator slide 1571 above the pinion 591 has been shown with a reference arrow RA thereon that cooperates with a fixed scale, this arrangement illustrating the displacement of the slide 1571 from its normal zero position in terms of the digital entry to be effected onto the pinion 1591 for the purposes of this description.

At the initiation of the first printing cycle, the parts are in the positions shown in Figs. 17, the shaft assembly 1586 including the pinions 1591 resting on the bottoms of the slots 585 in the side plates 1583 and 1583a so that the pinions 1591 are disengaged from the racks 1601 in the slides 1571 thereabove. The latch 1651 is prevented from engaging the lugs 1650 on the rocker arm 1642 by the pin 1652 in the adjacent depending plate 1590 of the shaft assembly 1586, and hence, the rocker 1641 occupies its extreme counterclockwise position, as viewed in Fig. 17, where the pin 1644 carried thereby rests against the edge of the openings 1647, Figs. 20 and 21, in the side plate 1583a. The parts remain in these positions during the first half of the printing cycle, while the roller 1610 of the lever 1609 is riding on the low portion of the cam 1614. Assuming that the digit set up on the type wheel geared to the slide 1571, Fig. 22, is 9, the slide 1571 is displaced from its initial position, in which position the arrow RA is aligned with "0" on the scale, through nine digital positions until the arrow RA is opposite the numeral "9" on the scale, the pinion 1591 remaining out of engagement with the rack 1601 while this displacement of the slide 1571 is being effected.

Prior to the initiation of the restoring movements of type wheel and slide 1571, a lobe 1612a on the cam 1612, Fig. 17, comes under the roller 1610, swinging the lever 1609 and bell crank 1606 to rock the shaft 1581 and rock arms 1604 counterclockwise, as viewed in Fig. 22. This causes the rock arms 1599 to be swung clockwise to thereby elevate the shaft assembly 1586 and bring the pinions as 1591 into mesh with the racks as 1601. The plates 1590 are raised with the shaft assembly 1586 to thereby retract the pin 1652 from the latch 1651. As shown in Fig. 21, the pin 1644, carried by the rocker arms 1643 and 1642, projects into the path of movement of the rocker 1599 adjacent the side plate 1583a. Engagement of the lobe 1612a on the cam 1612 with the roller 1610, Fig. 17, insures that the rocker 1599 will displace the pin 1644 and rocker 1641, of which the arms 1640 and 1642 are a part, sufficiently to enable the latch 1651 to hook the lug 1650 and maintain the rocker 1641 in its extreme clockwise position, as viewed in Fig. 22.

As the lobe 1612a passes from beneath the roller 1610, this roller drops slightly to cause a slight retraction of the rockers 1599 counterclockwise, as shown in Fig. 23, to afford a small clearance between the rocker 1599 and the pin 1644 and lug 1650. The roller 1610, however, remains on the high circular portion of the cam 1612 for the greater part of the second half of the first printing cycle, thereby maintaining the pinions as 1591 in engagement with their racks as 1601. It will also be noted in Fig. 23 that there is a slight clearance between the pin 1644 and the edge of the opening 1646 in the gear segment 1625. As shown in Fig. 23, the slide 1571 has been restored to the right back to its zero position, and in the course of this restoring movement, the pinion 1591 engaged therewith is advanced clockwise nine digital positions, which is to say, nine teeth. Assuming that the pinion 1591 originally stood in a position indicative of zero, as shown in Fig. 22, the aforesaid rotation of the pinion 1591 through nine digital positions brings the thick tooth 1639 into a position adjacent the nose 1640 of the aligned pawl 1636 where it is in position to cooperate with a cam edge on this nose. However, inasmuch as there is no carry-over entailed in adding nine to zero, the movement of the pinion 1591 in this entry-effecting operation is not sufficient to bring the thick tooth 1639 beyond the nose 1640 of the pawl 1636. The pawl 1636 and latch 1629, therefore, remain stationary so that there is no displacement of the gear segment 1625 controlled thereby.

At the conclusion of the first printing cycle, the roller 1610, Fig. 17, will have ridden on to the low portion of the cam 1612, and the rock shaft 1581 and rock arms 1604 are thus restored clockwise to their normal positions as shown in Fig. 17, swinging the rockers 1599 counterclockwise and enabling the shaft assembly 1586 to drop to the bottoms of the slots 1585 to withdraw the pinions 1591 from the racks 1601. As has been mentioned, the pawls 1636 are pivotally mounted on a rod 1637 carried by the plates 1590 of the shaft assembly 1586 and hence, these pawls are raised and lowered together with the pinions 1591, the eyes of the pawls 1636 sliding along the vertical edges of the latches 1629 cooperating therewith. The pin 1652 on the adjacent plate 1590 is lowered into engagement with the latch 1651, swinging this latch downwardly to release the lug 1650 and enable the spring 1648 to return the rocker 1641 counterclockwise as veiwed in Fig. 24, until the pin 1644 is arrested by the edge of the opening 1627, Figs. 20 and 21, in the side plate 1583a.

During the second printing cycle, the accumulator drive is disabled by the mechanism including the arm 1623, Fig. 28, and link 1624 that is under the control of the line shifting mechanism, as has been explained hereinabove, and the parts of the accumulator mechanism, therefore, remain in their normal at rest positions, as shown in Fig. 17, throughout the second cycle wherein the top line of data is printed upon the sheet or bill. When the next succeeding sheet or bill has been advanced into printing position beneath the platens, the cam shaft 1160, Fig. 28, is sent through a cycle of rotation to bring about printing of the bottom line of data upon such sheet. Assuming that the digit 2 has been set up on the connected type wheel, the slide 1571 is displaced in the amount of two digital positions to the left, as shown in Fig. 24, during the first half of this cycle. The roller 1610, Fig. 17, however, remains on the low part of the cam 1612 to maintain the accumulator pinions 1591 out of engagement with the racks 1601, as shown in Fig. 24.

As the lobe 1612a comes under the roller 1610, the rockers 1599 are swung clockwise, as viewed in Fig. 23, to elevate the pinions 1591 into engagement with their racks 1601, the rocker 1599 adjacent the side plate 1583a, Figs. 19 and 20, engaging the pin 1644 to push the rocker arms 1640 and 1642 clockwise and enable the latch 1651 to hook the lug 1650. The lobe 1612a on the cam 1612 then moves away from the roller 1610 and this roller drops slightly onto the high circular portion of the cam 1612 to retract the rocker 1599 slightly from the pin 1644 and lug 1650, as shown in Fig. 26. The slide 1571 is thereupon restored to its zero position, rotating the pinion 1591 through two digital positions, that is, in the amount of two teeth thereof, to a position representative of the digit 1, inasmuch as this is the units component of the sum 9 plus 2 or 11.

It has been mentioned that a slight clearance is normally afforded between the pin 1644 and the openings as 646 in the gear segments as 1625 when the arms 1626 of these gear segments are held against movement by the latches 1629. However, as the tooth 1639 of the pinion 1591, Fig. 26, is carried past the nose 1640 of the pawl 1636, in passing from the position representative of the digit 9 to that representative of zero, it cams the pawl 1636 outwardly to thereby swing the latch 1629 clockwise, and move the shoulder 1631 thereof out of latching engagement with the lug 1632. Spring 1627 thereupon pulls the arm 1626 upwardly a limited distance until the clearance between the opening 1646 in the gear segment 1625 and the pin 1644 is taken up. The lug 1632 is thus moved slightly upwardly out of alignment with the edge of the shoulder 1631 to thereby prevent the spring 1633 from restoring the latch 1629 when the tooth 1639 has been advanced past the nose 1640 of the pawl 1636. The latch 1629 is, therefore, rendered ineffective and movement of the gear segment 1625 under the action of the spring 1627 is restrained only by the pin 1644 carried by the rocker 1641, as shown in Fig. 26. This small displacement of the gear segment 1625 is not sufficient to move its teeth out of substantial alignment with the teeth of the pinion 1591 in the next higher order aligned therewith. Hence, when the roller 1610 rides onto the lower portion of the cam 1612, toward the end of the cycle, and the pinions 1591 are lowered, the aforesaid pinion in the next high order meshes with the gear segment 1625, as do the other pinions 1591 with their gear segments 1625.

The cam surface 1600, Figs. 17 and 21, on the upper end of each of the rockers 1599 is of such a configuration that it enables the pinions 1591 to be lowered and mesh with their gear segments 1625 prior to the time the pin 1652 on the plate 1590 engages the latch 1651 and thereafter releases the rocker 1641 to the action of its spring 1648. Those gear segments 1625, such as shown in Fig. 26, which are restrained against movement under the tension of their springs 1627 solely by the pin 1644, by reason of the corresponding latch 1629 having been tripped to condition the mechanism for effecting a carry entry, are swung counterclockwise by their springs 1625, as shown in Fig. 27, when the rockers 1599 are restored to their normal or extreme counterclockwise positions. Such rocking movement of these gear segments 1625 that were released to effect carry entries continues until the pin 1644 is arrested by engagement thereof with the edge of the opening 1627 in the side plate 1583a (see Fig. 21), and this limited movement of the gear segment 1625, Fig. 27, is sufficient to advance the pinion 1591 that is meshed with such gear segment 1625 in the amount of one tooth clockwise to thus effect the carry entry of 1.

In the next entry-effecting operation, when the shaft assembly 1586 is to be again elevated, the rockers 1599 are swung clockwise, as viewed in Figs. 20 and 25, engaging the pin 1644 and swinging the rocker 1641 and those gear segments 1625 which were released in the above described carry-entering operation clockwise. The lobe 1612a on the cam 1612, in engaging the roller 1610, imparts sufficient clockwise movement to the rocker 1641 to bring the lugs 1632 on the arms 1626 of the gear segments 1625 below the shoulders 1631 on the latches 1629 so that the springs 1633 acting upon the latches 1629 bring these shoulders 1631 over the lugs 1632, thereby latching the gear segments 1625 in their normal inoperative positions, as shown, for example, in Fig. 22.

There may be instances in which long carries are to be effected. To illustrate, an accumulator pinion 1591 may be standing in a position representative of the digit 9 prior to the time a carry-over onto such a pinion occurs. Upon entry of such carry digit, the aforesaid accumulator pinion thereupon moves into a position representative of zero, and a carry must then be effected into the accumulator pinion 1591 in the next higher order. In this event, the carry segment 1625, which was tripped when the lower order accumulator pinion 1591 passed from a position representative of the digit 9 to a position representative of zero, is immediately rocked by its spring 1627 from the position shown in Fig. 25 into the position shown in Fig. 27, without pausing at the intermediate position shown in Fig. 26. This occurs for the reason that the pin 1652 on the plate 1590 will have already descended into the position shown in Fig. 27 prior to the time the carry segment 1625 is released by disengagement of the shoulder 1631 on the pawl 1629 from the lug 1632 on the segment 1625, the plate 1590 and pin 1652 having been lowered at the initiation of the carry entering operation as explained hereinabove. Hence, when a long carry is to be entered into a higher order accumulator pinion, such a carry will take place immediately upon passage of the lower order accumulator pinion 591 from a position representative of the digit 9 into a position representative of the digit 0, the higher order pinion 1591 having been lowered into engagement with the gear segment 1625 before this segment is tripped by the lower order pinion 1591.

As has been described previously, the slides 1571, that are meshed with the special wheels in the two highest orders in the kilowatt-hour consumption and bill amount groups are restrained against movement by pawls as shown in Fig. 22 of the aforesaid copending application, during ordinary printing operations. Hence, those accumulator pinions 1591 that are disposed in alinement with these slides 1571 in the aforesaid two highest orders in each group, do not receive any entries as a direct consequence of the setting up and restoration of the type wheels, as do the other pinions 1591. These pinions are adapted to receive carry-over entries which may accrue in the course of addition of the successive numeral quantities entered in the accumulator. It will be understood that if the anticipated totals obtained in any one run of the machine exceed the two additional orders thus provided for in the accumulator mechanisms and associated accumulator slides 1571 and pinions 1591, together with the attendant mechanisms required, will be provided to accommodate the spill-over, as it is termed in the art, into the higher orders.

Total taking

As will be noted from the foregoing description of the accumulating operations entailed in the printing of certain of the items of variable data upon the sheets or bills, the cam 1612, Fig. 17 is instrumental in governing the operation of the accumulator during the usual variable data printing operations. When it is desired to furnish a record of the total of such items as have been entered into the accumulator in the course of the several printing operations, the accumulator must be conditioned for enabling a total standing therein to be recorded, as by being printed, upon a proof web. In the present instance, this is accomplished by disabling the cam 1612 and rendering effective another cam 1655, Fig. 17, having a shape substantially identical with that of the cam 1612. This cam, however, is mounted in such angular relation to the cam 1612, upon the same sleeve on the cam shaft 1160, that the corresponding parts of the two cams are approximately 180° displaced from each other, the effect of such configuration of the cam 1655 upon the operation of the accumulator mechanism being described presently.

It will be noted in Fig. 17 that when the cam shaft 1160 is at rest, the portion of the periphery of the cam 1612 adjacent the roller 1610 is the same radial distance away from the shaft 1160 as is the point on the periphery of the cam 1655 horizontally aligned therewith. Moreover, a stop pin 1609a anchored in the side frame 1156 limits movement of the lever 1609 under influence of the spring 1611, thereby maintaining a slight clearance between the roller 1610 and aligned cam 1612, in the positions of the parts shown in Fig. 17.

Hence, the sleeve carrying the cams 1612 and 1655 may be shifted along the cam shaft 1160, while this shaft is stationary, to move the cam 1612 out of alignment with the roller 1610 and to move the cam 1655 into alignment with this roller, or vice versa. For the purpose of shifting the sleeve 1217 along the cam shaft 160, a yoke 1656 is secured to the rock shaft 1419, Fig. 17, and depends therefrom in such a manner that rollers carried at the lower ends of the arms thereof are received in a channel defined between the gear 1216 and a raised bearing portion on the sleeve that carries the cams 1612 and 1655. When the cams are thus positioned in total taking position, the slides 1571 that are associated with the spellover orders of the accumulator are unlatched as described in said copending application Serial No. 348,283. When a total taking operation is instituted as described in such copending application, the yoke 1656 is swung outwardly and thereby shifts the cams 1612 and 1655 along the cam shaft 1160, away from the frame 1156, so that cam 1612 is moved out of alignment with the roller 1610, while the cam 1655 is brought beneath this roller.

Shortly after initiation of such rotation of the cam shaft 1160, the lobe 1655a, Fig. 17, on the cam 1655 engages the roller 1610 and swings the lever 1609 upwardly to cause the accumulator pinions 1591 to mesh with the rack 1601 on the aligned slides 1571, as shown in Fig. 22. Subsequently, the low portion of the cam 1292, Fig. 28, comes beneath the roller 1291 on the drive lever 1288, thus enabling the lever 1288 to be springurged in a clockwise direction, and as specifically described in said copending application, this causes shifting the accumulator slides 1571 to the left as viewed in Fig. 28. The noses 1640, Figs. 18 and 23, on the pawls 1636 that cooperate with the thick teeth 1639 and 1639a on the accumulator pinions 1591 are so shaped that they operate to arrest one or the other of such teeth when the pinion 1591 is rotated counterclockwise, as viewed in these figures, sufficiently to engage the tooth with the nose 1640. Hence, as each pinion 1591 is rotated counterclockwise due to the shifting of the connected slide 1571 to the left, it rotates through an angular distance representative of the value of the digit registered thereon and is then arrested by engagement of a tooth 1639 or 1639a thereof with the nose 1640 of the cooperating pawl 1636. Thus, the accumulator pinions 1591 are returned to their zero positions and the slides 1571 are enabled to shift through distances respectively determined by the numerical values of the digits in the accumulated total that was previously accumulated on the pinions 1591, the slides 1571 being halted when the pinions 1591 have been arrested in their zero positions. The type wheels of the associated printing mechanism are moved in the just described operation through distances proportionate to the accumulated totals of the net bill amounts and total kilowatt hours consumption quantities entered in the accumulator subsequent to a preceding total-taking operation.

As the final step in the total-taking operation, a lobe 1700 on a cam 1701, Fig. 28, mounted on the cam shaft 1160 comes into engagement with the roller 1702 on the lower end of the arm 1668 of the lever 1664 and swings this lever to raise the arm 1666 and thereby release the slide bar 1663 and this occurs at about the same time as the cam shaft 1160 completes its cycle of rotation so that the cams 1612 and 1655, Fig. 17 are stationary. This acts as described in the aforesaid copending application Serial No. 348,283, to operate the yoke 1656 so as to bring the cam 1612 beneath the roller 1610 and to move the cam 1655 out of alignment with this roller, and otherwise condition the mechanism for a new series of accumulating operations.

In Figs. 29 to 33 of the drawings I have illustrated an alternative embodiment of accumulator that is shown in my aforesaid copending application Serial No. 416,745, as an element or part of a machine for producing business instruments such as checks, bills and the like from and under control of printing and control devices that are passed in series through the machine. The machine shown in such application not only produces a series of individual checks, bills or the like, but also produces a series of proof sheets that are initially printed on a web W which is thereafter severed to afford the series of proof sheets.

In the machine of my aforesaid copending application Serial No. 416,745, printing and control devices, each bearing printing means or embossed type setting forth the name, address and other identifying data relating to the person or company to which the printing and control device pertains, are passed through the machine in series, and each printing and control device has control means afforded thereon by means such as perforations to indicate certain numerical data such as the number of shares of a particular stock owned by the person or company to which such device pertains. As each printing and control device passes through the machine it comes to rest at a sensing station where the numerical data are sensed, and such numerical data are transmitted to calculating means in the form of a multiplying mechanism M2, Fig. 29 where such numerical data are multiplied by another factor such as a dividend rate so as to ascertain a product which represents the amount of the dividend to be paid to the person or company to which the related printing and control device pertains. This product is manifested in the multiplying means as disclosed in my aforesaid copending application and is read out of the product manifesting means and into a first variable printer VP by means including sensing members 2483 and read-in mechanism 2264, Fig. 29. Such read in is operable to set reciprocable slides 2555r which in turn set up type segments disposed beneath a platen mechanism 2284. When the product is thus set up on the type segments of the first variable printer VP, in cooperation with the platen and the other elements of the variable printer VP, prints the product on a sheet such as a check that moves along a guideway GG into position beneath the platen. While the sheet or check is thus located beneath the platen 2284, the related printing and control device also comes into position beneath the platen, and the name and other related data are printed therefrom onto the check or the like. The printing and control device is then advanced to the right in Fig. 29 and into position beneath a proof platen PP so that an impression may be made from the printing means thereof onto the web W which passes beneath the platen PP. The product that has been set up in the first variable printer VP is transferred to a proof printing unit 2600 as will hereinafter be explained, so that each product may be printed on the proof web W in predetermined relation to the name to which such product relates.

In an instance such as the present one where it is desired to print totals on the web W to appear at the bottom of each proof sheet into which the web W is divided by the pager and proofer mechanism of the machine and where it is also desired to print ledger totals on the proof sheets and also a grand total, I provide three accumulators AC—PT, AC—LT and AC—GT, Fig. 30, in the proof printing unit 2600, these accumulators in the present instance being of the kind shown and described in my aforesaid copending application Serial No. 221,841, filed July 28, 1938, and being respectively operable to enable page totals, ledger totals and grand totals to be printed on the web W when the need so to do arises in the course of operation of the machine.

The accumulators AC—PT, AC—LT and AC—GT are mounted in a frame comprising side plates as 2700 and 2701, Figs. 30, 31 and 32, which are respectively disposed in juxtaposition to, and which are respectively secured to, the side frame members 2504 and 2505, as best shown in Fig. 32. Each accumulator as AC—GT also comprises a frame including frame members 2707 and 2708, Figs. 31 and 32, in which a shaft as 2704 is journaled. A plurality of accumulator wheels as 2705 are rotatably mounted on the shaft as 2704, and these accumulator wheels are respectively aligned with the slide sections 2555f and these accumulator wheels, which are in the form of gears, are adapted to mesh with a rack at 2706, Fig. 30, on the particular slide section 2555f that is aligned therewith. In this respect it is to be noted that structurally each of the accumulators AC—PT, AC—LT and AC—GT correspond structurally and that the accumulator wheels respectively included therein are aligned one with the other so that the accumulator wheel as 2705 in each accumulator, which relates to the units order therein, is aligned with the accumulator wheels in the other two accumulators that also pertain to the units order. These aligned wheels are also adapted for cooperation with the slide section 2555f which pertains to the units order, and this is true with respect to each slide section as 2555f and the aligned accumulator wheels in the respective accumulators. Therefore, the rack as 2706 on the lower edge of each slide as 2555f is sufficiently prolonged as to extend over each of the accumulator wheels in the respective accumulators that are adapted for cooperation therewith wherefore when any of the accumulator wheels is moved upwardly, in a manner to be described presently, the accumulator wheels therein as 2705 will mesh with the racks 2706 on the associated slide sections 2555f.

The manner in which the accumulator as AC—GT is constructed and is operated to be moved upwardly to bring the teeth on the accumulator wheels 2705 thereof into mesh with the racks as 2706 respectively associated with such wheels is described in detail herein and it is to be understood that this is typical of the construction and operation of the other two accumulators. Thus, the frame members 2707 and 2708 of the accumulator AC—GT and the parts mounted between these frame members are moved upwardly upon operation of cam plates as 2702 and 2703 mounted outwardly of and adjacent to these frame members 2707 and 2708. These cam plates have cam slots as 2709, Fig. 30, therein that are of a configuration much like that of the cam slot 2535, and upon rocking of the cam plates about the pivotal supports therefor, described presently, these cam slots are effective to move the shaft 2704 upwardly in the guide slots as 2712 and 2713, Fig. 32, provided therefor in the side plates 2701 and 2702 and to this end the cam plates 2702 and 2703 are pivoted about the shaft 2710 on which they are pivotally mounted. The shaft 2710 is carried by a pair of arms 2714 and 2715, Fig. 31, which, in turn, are pivoted on the shaft 2716 journaled in the side plates 2701 and 2702. The shaft 2710 is supported in position between a pair of adjusting screws 2717 and 2718, Fig. 31A, respectively disposed in ears 2719 and 2720 on a plate 2721 on a rocker 2722 that is pivotally mounted on the shaft 2716.

The rocker 2722 includes a hub 2723, Figs. 31A and 32 that is disposed about one end of the shaft 2716 that is journaled in bearing the side plates 2700 and 2701, as best shown in Fig. 33. A spring 2724, Fig. 32, confined in this hub is normally effective to dispose the arm 2725 of the rocker 2722 in the intermediate position in which it is illustrated in Fig. 32, which is to say, to dispose the gear segment 2726 at the upper end of this arm in a position intermediate the two racks as 2727 and 2728 that are mounted on comb brackets 2729 and 2730, Fig. 29, fast to the outwardly disposed face of the side frame member 2505, which racks are adapted to be reciprocated in the comb brackets 2729 and 2730, in a manner described presently.

When, however, the accumulator wheels 2705 are to be meshed with their associated racks 2706, the rocker 2722 is moved either against or under the influence of the spring 2724 to bring the gear segment 2726 thereon into mesh with either the rack 2727 or 2728 in a manner explained hereinafter. In this respect the gear segment 2726 is meshed with the rack 2727 when an amount is to be entered into the accumulator AC—GT and is meshed with the rack 2728 when a reading is to be taken from the accumulator for the purpose of setting up the type segments TS2 to enable the accumulator total to be printed, in a manner described presently. Therefore, the spring 2724 forces the end of the hub 2723 into engagement with an adjustment screw 2731 mounted in the arm 2732 of a bell crank lever 2733 which includes a hub 2734 that is mounted on a shaft 2735 carried by suitable brackets as 2737, Figs. 31 and 32, fast to the side frame member 2705.

In a manner to be explained presently, the bell crank 2733 pivoted clockwise, as viewed in Fig. 32, when the gear segment 2726 is meshed with the rack 2727 and thereupon under the influence of the spring 2724 the rocker 2722 shifts to the left, as viewed in Fig. 32, to mesh the gear segment 2726 with the teeth of the rack 2727. Thereafter, upon actuation of the rack 2727, in a manner to be explained presently, the rocker 2722 and therefore the plate 2721 and the ears 2719 and 2720 thereon are pivoted upwardly, as viewed in Fig. 31A, to be effective through the adjustment screws 2717 and 2718 to move the shaft 2710 upwardly. This is effective through the cam slots as 2709 to move the shaft 2704 upwardly in the guide slots 2712 and 2713, Fig. 32, whereupon the accumulator wheels 2705 are engaged with their associated racks 2706. Manifestly upon movement of the bell crank 2733 counterclockwise in a manner to be described presently, the spring 2724 is compressed and thereupon the rocker 2722 is disengaged from the rack 2727, and this is effected after the rack 2727 has been actuated to restore the accumulator wheels 2705 to the position in which they are shown in Fig. 32 out of engagement with the racks 2706. This restoration is effected either after an entry has been made into or a readout has been made from the accumulator wheels 2705, as will be described presently.

When the accumulator wheels 2705 are disposed in their lower position shown in Fig. 32, they are engaged with carry segments as 2738, Figs. 30 and 32, which are of the character and which are operated in the manner described in my aforesaid copending application Serial No. 221,841 to effect a carry from any one accumulator wheel to the accumulator wheel for the next higher order when the need so to do arises in the course of entries into the accumulator wheels.

In order to insure proper vertical movement of the frame including the frame members 2707 and 2708, these frame members are interconnected by a tie bar as 2711, Fig. 32, and the frame member 2708 includes a depending portion 2739 which has a bifurcation 2740 therein that embraces the shaft 2710 to thereby guide the frame, of which the frame members 2707 and 2708, are a part in the course of vertical reciprocation thereof.

In the present machine, accumulator wheels as 2705 included in the accumulator AC—PT are to receive entries from the slide sections 2555f each time these slide sections are operated to set up the type segments TS2 to enable variable data to be printed on a proof sheet or web W. Moreover, a sufficient number of accumulator wheels as 2705 are included in this accumulator AC—PT, as well as each other accumulator, to care for carry-overs from lower orders so that there is a greater number of accumulator wheels as 2705 in each accumulator than there are slide sections 2555f which are effective to set up the type segments as TS2 from devices operated under control of the multiplying mechanism M of the machine. However, slide sections as 2555f are associated with these additional accumulator wheels in each accumulator in order that totals accumulated in the accumulators may be read out therefrom and utilized for the purpose of setting up type segments TS2 in those operations where totals are to be printed on the web W.

Each time the type segments TS2 are set up under control of the multiplying mechanism M, in the manner described in said application, entries are made only into the accumulator AC—PT, from which totals are printed at what is to be the last item on each proof sheet into which the web W is divided. This is effected during the restoration of the slide sections 2555f in each operation during which the type segments are set up as stated, under control of the multiplying mechanism M.

Therefore, the rocker as 2722, Fig. 31A, included in the accumulator AC—PT is normally disposed in such position that the segment 2726 thereon is meshed with teeth on the rack slide 2727. During the time slide sections 2555f are being moved to set up the type segments TS2, the rack 2727 is in such position that the shaft as 2710 in the accumulator AC—PT is disposed in its lower position so that the accumulator wheels 2705 in this accumulator are disengaged from the racks 2706 on the associated slides 2555f. However, intermediate the end of the rearward movement of the slide sections 2555f to set up the type segments TS2 and the time at which these slide sections are moved forwardly to be restored to their normal at rest positions, the rack 2727 is actuated in a manner to be described presently to cause the shaft as 2710 in the accumulator AC—PT to be moved upwardly to thereby engage the teeth on the accumulator wheels 2705 with the racks 2706 so that, in the course of restoration of the slides 2555f, whatever digital amounts these slides have been set to represent are entered into the associated accumulator wheels 2705 of the accumulator AC—PT. As stated, any carries that may be required from lower orders to high orders are effected as an incident to such entries from the slide sections 2555f by carry-over devices of the kind described in my aforesaid copending application Serial No. 221,841, but in this repsect it is to be understood that any suitable carry devices might be utilized for this purpose.

It will, therefore, be seen that the rack 2727 must be reciprocated in the comb plate support therefor in the course of each operation of the printing unit 2600 to regulate the position of the shaft 2710 and the accumulator wheels 2705 in the accumulator AC—PT. To this end a pair of spaced-apart lugs 2745, Fig. 29, are mounted on the rack 2727 and a roller 2744, Figs. 29 and 32, is disposed therebetween. The roller 2744 is mounted at one end of a lever 2743 that is pivotally mounted on a stud shaft 2745a, Fig. 32, supported by the adjacent side frame member 2505. The lever 2743 also has a roller 2742 thereon which is urged toward the periphery of a cam 2741 on the cam shaft 2560 of the printing unit 2600, a spring 2743a, Fig. 29, being effective to maintain the roller 2742 in engagement with the periphery of this cam.

In the course of a rotation of the cam shaft 2560 the cam 2741 is effective through the lever 2743 to slide the rack 2727 toward the left, as viewed in Fig. 29, and this occurs at a time in the course of operation when the accumulator wheels as 2705 in the accumulator AC—PT are to be engaged with the rack 2706 as aforesaid. As soon as the rack slides 2555f have been restored to their at rest positions so that the digital amounts they have been set to represent will have been entered into the accumulator AC—PT, the cam 2741 is effective through the lever 2743 to restore the rack 2727 to its at rest position to thereby be effective through the rocker 2722, in the accumulator AC—PT to lower the shaft 2710, included in this accumulator, to thereby retract the accumulator wheels 2705 from engagement with the racks 2706.

In the present machine a total is read out from the accumulator AC—PT after twenty impressions of variable data have been printed on the web W for each proof sheet, into which the web W is to be divided, is normally to have twenty items thereon. Therefore, in the normal operation of the machine, in a manner described hereinafter, all operative functions in the machine, except those which are required to bring about printing of a total after twenty items have been printed on the web W are suspended, and means are rendered effective to enable a total to be printed on the web W immediately after the twentieth of the aforesaid twenty items. Moreover, whatever total is read out of the accumulator AC—PT is entered into the accumulators AC—LT and AC—CT.

In this respect, it will of course be understood that when the machine is initially set in operation, all of the accumulators are zeroized and in order that a page total will be printed after every twenty items, a counting arrangement such as that referred to hereinafter, which is of the character shown and described in my copending application Serial No. 320,778, filed February 26, 1940, is included in the pager and proofer mechanism, this being one convenient manner of bringing about closing of a circuit to devices that are operative to cause a total to be read out from the accumulator AC—PT. It will be understood, however, that resort could be had to any convenient counting mechanism, located as desired, to bring about the printing of a page total as PTT after a predetermined number of items have been printed on the web as W.

The particular manner in which a circuit such as the foregoing is closed in the present instance after twenty impressions have been made on the web W as aforesaid is described in the aforesaid copending application Serial No. 416,745, but it may be observed that in the present machine, circuit is closed to the solenoid 2746, Fig. 32, normally from a switch in the pager and proofer mechanism. Upon energization of the solenoid 2746, the armature 2747 thereof is attracted downwardly and this is effective through the link 2748 to pivot the plate 2749, Figs. 31B and 32, about the shaft 2750, the link 2748 being pivotally connected to the plate 2749, as indicated at 2751. The shaft 2750 is journaled in bearings provided on the brackets as 2737 to be supported from the main side frame member 2505. Upon such pivoting of the plate 2749, the pawl 2752 thereon moves into engagement with the tooth 2753 on the disc 2754 fast on the shaft 2750, this being done for a purpose to be explained presently, the shroud 2755 carried by the shaft 2750 being effective to prevent the pawl 2752 from engaging the tooth 2756 on the disc 2754 at this time. Such engagement of the pawl 2752 with either the tooth 2753 or the tooth 2756 is effective to rotate the shaft 2750 and it is this that causes the accumulator to be conditioned to enable the required operations to be performed.

Thus each accumulator includes a rocker as 2722 which, as referred to hereinabove, may be moved either under the influence or of against the influence of a spring as 2724, Fig. 32. It is such movement of the rocker as 2722 that causes the segments as 2726 on the rocker 2722 to be selectively engaged with teeth on the racks 2727 and 2728. The effect of each spring 2724 is resisted by an adjusting screw 2731 which is utilized to enable the rocker 2722 in the accumulators AC—LT and AC—GT to be adjusted to a proper normal position intermediate the racks, as shown in Fig. 32, and such adjusting screw 2731 is also utilized to enable the rocker 2722 in the accumulator AC—PT to be disposed in such a proper position that the gear segment 2726 thereon is normally engaged with the teeth of the rack 2727. The adjustment screws as 2731 are carried by the arms 2731a of bell crank levers as 2733, there being one such bell crank lever for each accumulator. These bell crank levers are carried by a shaft 2753, journaled in bearings in the aforesaid brackets as 2737, to enable the adjustment screws 2731 carried thereby to be aligned with the hubs 2723 of the rockers 2722 with which such screws respectively cooperate. Each such bell crank 2733 also has a roller as 2758 rotatably mounted on the arm as 2760 thereof and these rollers cooperate with cam plates as 2757 fast on the shaft 2750. It is these cam plates that determine the positions to be assumed by the rockers as 2722 relative to the racks 2727 and 2728 through the intermediary, as explained above, of the adjustment screws 2731.

Normally the rockers 2722 in the accumulators AC—LT and AC—GT are to be disposed intermediate the racks 2727 and 2728 and therefore the cam plates 2757 that control the positions of these two rockers each has a dwell thereon which, when engaged by the cooperating roller 2758, disposes the rocker 2722 in the aforesaid intermediary position. Likewise, the cam plate 2757 associated by the associated roller 2758, is effective to dispose the rocker thereon meshed with the teeth of the rack 2727. The cam plate 2757 associated with the accumulator AC—GT has an arm 2726a thereon and a spring 2762 extends between this arm and a spring anchor carried by the adjacent of the brackets 2737. This spring is effective to dispose the aforesaid dwells on the cam plates 2757 in their normal at rest position, wherefore the shaft 2750 and cam plates are disposed in a normal at rest position, the effect of this spring and therefore the aforesaid normal at rest positions being determined by the engagement of the adjusting screw 2761 with the shaft 2753, this adjusting screw being mounted in an ear 2761a on the cam plate 2757 for the accumulator AC—GT.

Therefore, when the solenoid 2746 is energized, as above described, and the link 2748 connected to the armature thereof is moved to cause the pawl 2752 to engage the tooth 2753, the shaft 2750 and the cam plates as 2757 thereon are rotated counterclockwise, as viewed in Fig. 32. Thereupon the aforesaid dwells on the cam plates move from engagement with the respective rollers 2758, and the configuration of these cam plates is such as to dispose the rockers 2722 in the desired positions.

Thus, when a page total as PTT is to be printed, the cam plates 2757, when moved as just described, are effective to disengage the gear segments 2726 on the rocker 2722 in the accumulator AC—PT from the teeth of the rack 2727 and to dispose this gear segment in engagement with the teeth of the rack 2728. At this same time the rockers 2722 in the accumulators AC—LT and AC—GT have the gear segments as 2726 thereon meshed with the teeth of the rack 2727. When the rockers 2722 are disposed in these positions the operation of printing a total under control of the accumulator AC—PT may proceed.

The cam shaft 2560 of the printing unit 2600 is caused to make a complete revolution when a total is to be printed. To this end a bracket 2763 is fast to the link 2748 and carries an adjustment screw 2764 which, when the link 2748 moves downwardly upon energization of the solenoid 2746, is effective to close switches in a switch pile 2765, and it is this that sets the cam shaft 2560 in operation in those instances where page totals or ledger totals are to be printed.

In the course of an operation in which a page total is to be printed, the cam 2766 on the cam shaft 2560 first acts on the roller 2767a to thereupon actuate the lever 2767, pivotally mounted on the stud 2745a. When the lever 2767 is so pivoted, the roller 2768 thereon, disposed between lugs on the rack 2728 is effective to so move the rack 2728 that the accumulator wheels 2705 in the accumulator AC—PT are meshed with the rack 2706 on the aligned slide sections 2555f. Thereafter the cam 2590 on the cam shaft 2560 causes the bail 2585 to move to the left, as viewed in Fig. 30, whereupon the front slide sections 2555f, which at this time are disconnected from the rear slide section 2555r, are freed to the effect of the springs 2592. Thereupon, under control of the accumulator wheels 2705 in the accumulator AC—PT the slides 2555f are set to represent digits represented by the positions of the wheels 2705. This is effective to dispose the type characters TCF on the type segments TS2 in such position that upon operation of the platen PP at this time a page total as PPT will be printed on the web.

In the course of so setting up the type segments TS2, those accumulator wheels 2705 in the accumulator AC—PT, which were set to represent significant digits, return to zero position. To this end and as best shown in Fig. 31, each rocker 2722 has a pin as 2975 fast therein. When a rocker as 2722 is pivoted in the manner above described, to have the gear segment 2726 thereon meshed with the teeth of the rack 2728, the pin 2975 thereon moves into engagement with a lug 2976, Figs. 30 and 31, that depends from a comb plate 2977. Thereupon the teeth carried by this comb are moved into position to cooperate with thickened teeth of the accumulator wheels 2705 that are disposed at the zero positions thereon. Thus, when the rocker 2722 in the accumulator AC—PT is disposed to engage the gear segment 2726 thereon with the teeth of the rack 2728, when a page total is to be printed as aforesaid, the teeth on the associated comb plate 2977 are disposed in position to insure that the accumulator wheels of this accumulator will come to rest in, or will be retained in, zero position as aforesaid.

After the accumulator wheels 2705 in the accumulator AC—PT have been returned to zero to thereby set up the type characters TCF on the page segments TS2 to enable a total to be printed therefrom, the cam 2766 so actuates the lever 2767 that, thereupon, the rack 2728 acts through the gear segment 2726 on the rocker 2722 of the accumulator AC—PT to lower the shaft 2710 and therefore the accumulator wheels 2705 in this accumulator are withdrawn from engagement with the racks 2706 on the slides 2555f. The slides at this time, however, remain in the digit representing positions into which they were moved in the course of setting up the type segments TS1 to print a total as PTT. Therefore, substantially simultaneously with this, the cam 2741 actuates the lever 2743 to so move the rack 2727 that the gear segments on the rockers 2722 in the accumulators AC—LT and AC—GT are effective to elevate the shafts 2710 and then the accumulator wheels 2705 in these two accumulators move into engagement with the racks 2706 on the slides 2555f which are in the digit representing positions thereof, as aforesaid. Thereafter the cam 2590, Fig. 30, causes the bail 2585 to restore the slides 2555 to their zero positions and in so doing the racks 2706 on the slides 2555f enter into the accumulator wheels of the accumulators AC—LT and AC—GT whatever digital amounts these slides have been set to represent. Therefore whatever total has been printed under control of the accumulator AC—PT is entered into the accumulators AC—LT and AC—GT.

In this respect it is to be noted that totals so read out of the accumulator AC—PT are read into both the accumulators AC—LT and AC—GT, but if it were desired to enter such totals merely into either one or the other of the accumulators AC—LT or AC—GT, then the cam plate 2757 associated with whichever accumulator was to receive the entries would be formed, in the manner above described, to bring only the gear segment 2726 on the rocker 2722 of this accumulator into mesh with teeth on the rack 2727. The cam plate 2757 for the other accumulator, in such circumstances, would merely have a prolonged dwell which would maintain the rocker 2722 thereof in the intermediate position in which the rocker 2722 is shown in Fig. 31. However, in the present instance I find it convenient to enter the totals read out from the accumulator AC—PT into both the accumulators AC—LT and AC—GT in the manner explained above.

In order to insure that the shaft 2750 will remain in such position as to maintain the cam plates 2757 in their proper positions in the course of a total taking operation, the disc 2745 carrying the teeth 2753 and 2756, that are engageable by the pawl 2752, has teeth 2978, 2979 and 2980 thereon. When the pawl 2752 engages the tooth 2753, which occurs when a total is to be printed under control of the accumulator AC—PT, the tooth 2978 is moved into a position to be engaged by the shoulder 2981 formed in a link 2982 that is pivotally mounted, as indicated at 2983 on a bracket as 2984 that extends outwardly from the adjacent side frame member 2505. The link 2982 has a lug 2985 at the lower end thereof that is engageable by a pin 2986 on the cam shaft 2560 near the end of a rotation thereof in each instance where the shoulder 2981 has engaged a tooth as 2978. It is this that is effective to disengage the shoulder 2981 from whichever tooth it has engaged to thereby free the shaft 2750 and the parts fast thereon to the effect of the spring 2762 to thereby permit these parts to be returned to their normal at rest position determined by the adjustment screw 2761 as aforesaid.

It is to be noted that in total taking operations certain control circuits for effecting this are regulated by switches included in a switch unit 2987, Figs. 34, 35 and 36, this arrangement being described in further detail hereinafter. However, when a ledger total is to be printed on a proof sheet or web W, circuits are closed through the switching unit 2987 and other devices are also operated under the control of this unit to enable this to be effected. In this regard the taking of a ledger total is under control of a tab that is provided on the last printing and control device in a series thereof related to the ledger or the like relative to which a total is desired to be taken. It will be understood that a tab is provided on a printing and control device as D at a predetermined tab position thereon. Therefore, when a printing and control device bearing a tab attains station IV, Fig. 29, hereinabove described, this tab is effective to actuate a control switch, (not shown). The circuit closed by such control switch is effective to set the cam shaft 2991, Fig. 34, in the switch unit 2987 in operation, and this cam causes the Bowden cable 2992, Figs. 31B, 32, 35 and 36 to be pushed in such a way that the shroud 2755, Fig. 31B is moved from position above the tooth 2756 to thereby disclose this tooth to the pawl 2752.

Hence, when the solenoid 2746 is thereafter energized to cause the pawl 2742 to move toward the teeth 2753 and 2756, the pawl, in this instance, engages the tooth 2756. This so rotates the shaft 2750 that the cam plates 2757 associated with the accumulators AC—PT and AC—GT move into positions to be effective to dispose the rockers as 2722 therein in the intermediate positions thereof shown in Fig. 32. This is also effective to move the rockers 2722 in the accumulator AC—LT into such position that the gear segment 2726 thereon meshes with the rack 2728. Consequently when, in the manner hereinabove described, the rack 2758 is actuated by the cam 2766, the accumulator wheels of the accumulator AC—LT are engaged with the racks 2706 on the slide sections 2555f. Thereafter, in the manner described hereinabove with reference to the taking of a total from the accumulator AC—PT, the accumulator wheels 2705 of the accumulator AC—LT are effective to set up type characters TCF on the type segments TS2 in printing position so that a ledger total may be printed on a proof sheet or web W. It will be understood that in the course of this operation the pin 2975, Fig. 31, on the rocker 2722 of the accumulator AC—PT disposes the teeth on the associated plate 2977 in position to engage thick teeth on the accumulator wheels 2705 of the accumulator AC—PT, and therefore these accumulator wheels are restored to zero when a total is read out therefrom and printed on the proof sheet.

In this respect it is to be understood that the circuits in the timing or switching unit 2987, Fig. 34, are such that the taking of a ledger total is suspended until after a page total has been printed on the proof sheet or web, and in such an instance energization of the solenoid 2746 to bring about printing of a page total is effected under control of a switch included in the switch unit 2987 for the reason that a page total is to be printed on the proof sheet when a ledger total is to be printed irrespective of whether or not twenty impressions have been made on the web since the last page total was printed. It will also be understood that the page total is printed prior to the time the ledger total is printed for whatever amount is printed as a page total in this instance must be entered into the accumulator AC—LT in the manner hereinabove described prior to the time the ledger total is read out therefrom.

When a grand total as GT is to be printed on a proof sheet or web, this is effected under control of the accumulator AC—GT and the present machine is arranged to enable the printing of such a total to be effected manually. Therefore, a crank 2993, Fig. 29, is provided at the forward end of the shaft 2750 which will be disposed in a position convenient to the front of the machine. When this crank is grasped and the shaft 2750 is rotated it is moved into such a position that the shoulder 2981, Fig. 32, seats in the tooth 2980, it being understood that this shoulder seats on the tooth 2979, when a ledger total is to be taken. Engagement of the shoulder 2981 with the tooth 2980 causes the cam shaft 2750 to assume such a position that the cam plates as 2757 are located in such position that they are effective to dispose the rockers as 2722 in the accumulators AC—PT and AC—LT in the intermediate position in which the rocker 2722 is shown in Fig. 32. This, however, is also effective to dispose the rocker 2722 in the accumulator AC—GT in such position as to have the gear segment 2726 thereon meshed with the rack 2728. This also causes the teeth of the comb 2977 in this accumulator to be disposed in position to effect zeroizing of the accumulator wheels 2705 in the accumulator AC—GT when the total accumulated therein is read out therefrom to enable setting up of the type characters TCF on the type segments TS2 to thereby enable the platen PP to print a grand total as GT on a proof sheet as PS. When a grand total is to be printed under control of the accumulator AC—GT, not only is the shaft 2750 manually rotated, as above described, but further, the cam shaft 2560 is set in operation manually by the manual closing of a suitable switch.

*Operation in which a page total is printed*

As has been explained, in the present machine, a page total is printed on the web W at what is to be the bottom of each proof sheet, and, as has been explained, such a total is printed after twenty items, that is to say, after twenty impressions of related changeable data and variable data have been printed on the web W. This operation of printing such a page total on the web W, under control of the accumulator AC—PT in the manner hereinabove described, is effected automatically in the course of operation of the machine, in the manner to be described, unless a ledger total is to be printed, in which event operation of the means normally effective to bring about printing of a page total is suspended in which event, the operation of printing a page total is effected under control of other means, as will be explained hereinafter.

The operation of printing a page total on the web W is initiated under control of the counting device that forms a part of the pager and proofer machine as described in and which my aforesaid copending application Serial No. 416,745, and this counting device serves to close a page total switch means, and as explained in such copending application, the closure of the page total switch means is effective to suspend normal operation of the printing machine. This serves to suspend operation of the main timing switch shaft of the machine in this operation in which a total is to be printed, and when the main timing shaft is thus stopped, a circuit is completed to terminal strip 1613 which is effective to bring about energization of the solenoid 3615, Figs. 35 and 36, included in the switching or timing unit 2987.

By referring to Fig. 36 it will be seen that a pawl 3619 carried by the armature 3620 of the solenoid 3615 is normally effective to restrain the disc 3621 of a slip clutch against rotation and in this respect it is to be noted that the other disc 3622 of this clutch is constantly driven so long as the main drive shaft 90 of the machine is in operation. Thus the disc 3622 is in the form of a gear and the teeth thereof are meshed with a pinion 3623 which, in turn, meshes with a pinion 3624 fast on the shaft 3625 journaled in the housing of the unit 2987. A pulley 3626 is fast on the shaft 3625 and an endless belt 3627, Fig. 36, is passed about this pulley and a pulley 3628 fast on the main drive shaft 90.

When the pawl 3619 is moved from restraining position with respect to the disc 3621, upon energization of the solenoid 3615 in the manner just explained, the shaft 3629 on which this disc is fast is set in rotation to thereby rotate the switch discs as 3174, Fig. 36, fast thereto and it is these switch discs that are effective to close circuits that bring about the printing of a page total on the web W.

Thus a contact strip on the switch disc 3174a moves into circuit closing relation with the blades 3631 and 3632 associated therewith shortly after the shaft 3629 is set in operation. Thereupon circuit is completed through the winding of the solenoid 2746, Fig. 32.

The solenoid 2746 is effective in the manner explained hereinabove to position the cam plates as 2757 in the position required for the taking of a page total since at this time the shroud 2755, Fig. 31B, is disposed to prevent the pawl 2752 from engaging the tooth 2756.

Upon energization of the solenoid 2746, Fig. 32, the link 2748 is moved downwardly, as described hereinabove, whereupon the adjustment screw 2764 effects closure of the switch 2765, Fig. 32. Closure of the switch 2765 in the manner described in my aforesaid copending application Serial No. 416,745 to the solenoid 2577 that sets the cam shaft 2560 of the printing unit 2600 in operation.

In the ensuing operation of cam shaft 2560, the accumulator wheels 2705 of the accumulator AC—PT are effective, in the manner described hereinabove, to set up the type segments TS2 to dispose type characters TCF from which the total represented by the set position of these accumulator wheels may be printed and then the platen PP is set in operation to print this total on the web W. Thereafter, as explained hereinabove, the total so printed is entered into the accumulator AC—LT and AC—PT. In this operation, a switch disc on the cam shaft 2560 is effective to close the circuit which brings about operation of the platen PP as described in my aforesaid copending application Serial No. 416,745.

Inasmuch as the main timing shaft of the machine is not operated in the cycle of operation in which a total is printed on the web W, those operations which proceed under control of such timing shaft are suspended in this cycle of operation and therefore only those operations just described which effect the printing of a total are brought about in such a cycle of operation.

*Operation in which a page total and a ledger total is printed*

There are, of course, instances where both a page total and a ledger total are printed on a proof sheet or web. It has been explained hereinabove that the operation for printing a ledger total is initiated under control of a special tab on a printing and control device D. It is also to be noted that the printing of a page total at the time when a ledger total is to be printed is not effected under control of the counting device of the pager and proofer, but is effected under control of mechanism rendered operative to bring about the printing of a ledger total.

In a cycle of operation in which a special tab closes the related control switch, circuit is extended to a blade 3676 associated with the switch disc 3677a on the shaft 2991 of the switching unit 2987, Fig. 35. At the time the switch 2988 is closed a contact strip on the switch disc 2577a will be closing circuit between the blade 3676 and the blade 3678, associated therewith, and this is effective to close a stick circuit for a control relay as described in my copending application Serial No. 416,745, and such control relay is operable to condition a circuit to the solenoid 3688, Fig. 36, in the switching unit 2987, and at this same time and in the manner explained in such copending application, means are effective to energize the solenoid 3615 of the switching unit 2987, whereupon, in the manner explained hereinabove, the shaft 3629 of the switching unit 2987 is set in operation. Thereupon under control of the switch disc 3174a a page total is printed on the web W in the manner explained hereinabove.

It will be understood that at this time the switch discs 3174 on the shaft 3629 of the switching unit 2987 are in operation and in the course of rotation of these switch discs a contact strip on the switch disc 3174c is effective to close a circuit to complete circuit to and thereby energize the solenoid 3688 of the switching unit 2987.

Energization of the solenoid 3688 effects engagement of a slip clutch included in the switching unit 2987 and embodying a disc 3704, Fig. 36. Upon energization of the solenoid 3688 the disc 3704 engages the disc 3705 which is in the form of a gear that has the teeth thereof meshed with the pinion 3624 and thereupon the shaft 2991 of the switching unit 2987 is set in operation to thereby set the switch discs 3677 thereon in operation.

When the shaft 2981 is thus set in operation the cam 3706 thereon acts on the cam follower 3707 associated therewith to pivot the lever 3708 downwardly. The Bowden cable 2992 described hereinabove is connected to this lever and upon such downward movement of this lever, this cable is effective to so move the shroud 2755, Fig. 31B, that the tooth 2756 is disclosed to the pawl 2752.

Consequently when the solenoid 2746, Fig. 32 is energized in a manner now to be explained the cam plates 2757 are disposed in such positions that the rockers 2722 in the various accumulators are disposed in the positions into which they are to be moved when a ledger total is to be taken, this having been described hereinabove.

In this instance the energization of the solenoid 2746 is effected through a circuit that is extended by means including a switch disc on the shaft 2991 of the switching unit 2987. Such energization of the solenoid 2746 is effective to close the switch 2765, Fig. 32 to thereupon set the cam shaft 2560 in operation in the manner described hereinabove in the operation in which a page total is printed on the web W in a normal manner.

*Operation in which a grand total is taken*

When a grand total GT is to be printed on a proof sheet, this will usually follow the printing of page and ledger totals, where page total and a ledger total are printed, in the manner above described, to appear before the grand total that is printed on the proof sheet. Since the printing of a grand total in this manner will follow the printing of page and ledger, in an operation such as that just described, the accumulators AC—PT and AC—LT will be zeroized.

In an operation where a grand total is to be printed, the crank 2993, Fig. 29, is grasped and the shaft 2750 is rotated, as described hereinabove, into such position that the shoulder 2981, Fig. 2, seats on the tooth 2980 to thereby retain the shaft 2750, and the cam plates as 2757 thereon, in the hereinabove described positions into which these parts are moved when a grand total is to be read out of the accumulator AC—GT. The rocker 2722 of the accumulator AC—GT is disposed, in such an instance, in position to have the gear segment 2726 thereon mesh with teeth on the rack 2728 for the purpose explained above.

After the parts have been so positioned, the manually operable switch key pressed to energize the solenoid 2746 is energized with the effect hereinabove described, and in this instance when the cam shaft 2560 of the printing unit 2600 is set in operation by closure of the switch 2765, incidental to the energization of the solenoid 2746 as explained hereinabove, a grand total is printed on the web W.

In Figs. 37 to 90 of the drawings I have disclose an accumulator mechanism embodying many of the structural features and principles of the previously described mechanisms, and in the form thus shown in Figs. 37 to 90, the accumulator is embodied in an adding machine 100 that is adapted for use in different commercial installations wherein numerical amounts are to be introduced automatically into the machine and wherein page totals and group totals are to be taken and printed automatically in the course of operation of the machine. As will be evident in Figs. 37 to 40, the adding machine 100 embodies a frame having spaced side plates 101 and 102 that are rigidly associated in the desired spaced relation by a plurality of spacer bars 103. The frame that is thus afforded is adapted to be mounted as for example on a mounting plate 104 so that the side plates 101 and 102 are disposed in a vertical or upstanding relationship. The frame that is thus afforded also has another upstanding side plate 105 disposed to the left and in spaced relation with respect to the side plate 101 so that a main cam shaft 108 of the machine may be extended through and supported by the several plates 101, 102 and 105 near the lower edges thereof as will be evident in Fig. 40.

The adding machine 100 embodies a variable printing mechanism 109, Fig. 39, and accumulator mechanism 110, and the variable printing mechanism 109 and the accumulator mechanism 110 are adapted to be operated by a plurality of horizontally movable slides 111 that are mounted for reciprocating movement in a horizontal direction between the side plates of the frame. In the entry of numerical amounts into the variable printing mechanism 109 and the variable accumulator mechanism 110 the slides 111 are settable in accordance with the desired numerical amounts by set up mechanism 112 that is mounted forwardly of the frame by means of side plates 113 that are secured at 114 to the side plates 101 and 102. The setup mechanism 112 is under the present invention so constructed and arranged so as to be settable by means operating in accordance with the five-element code that is illustrated in Fig. 39A of the drawings.

As will hereafter become evident, the setting movements of the slides 111, as such setting movements are governed by the setup mechanism 112, are utilized to set the variable printing mechanism 109 for printing the setup numerical amounts upon a strip of paper P that is withdrawn from a roll R carried in a paper feed mechanism 115, such web of paper P being advanced beneath a platen roller 116 so as to be disposed at the printing position over a plurality of settable type segments 117 that form part of the variable printing mechanism 109. It will be recognized of course that an inked ribbon 12R is passed between spools 118 so as to be disposed between the web of paper P and the type segments 117 so that impressions may be made from the type segments on to the paper P in accordance with the set-up of the variable printing mechanism 109.

The movements of the slides 111 are also utilized to introduce numerical amounts into the accumulator mechanism 110, which as illustrated in Fig. 39, embodies three accumulators identified as AC1, AC2 and AC3. The three accumulators that are thus afforded are mounted as will hereinafter be described between a pair of relatively small side plates 120 and 121 thereby to afford a separate mounting for the accumulator unit 110, and the side plates 101 and 102 have relatively wide openings or slots 122 formed therein to extend forwardly from the rear edges of these side plates so that accumulator unit 110 may be moved forwardly into the slots 122 and into position beneath the slides 111. The unit 110 is then secured in position with respect to the main frame of the machine by means including a plurality of cap screws 123 as will be evident in Fig. 45 of the drawings.

The slides 111 have longitudinal slots 124 formed therein, and these slides are mounted for horizontal sliding movement on supporting bars 125 that are extended between the side frames 101 and 102, and one such slide 111 is afforded for each order of the accumulator. The several slides 111 are maintained in the desired spaced relationship on the supporting bars 125 by comb bars 127 that are also disposed so as to extend through the slots 124 and are connected to the side plates 101 and 102. At their rear ends slides 111 have upstanding ears 128 and springs 129 are extended from the ears 128 in a forward direction so as to be connected at their forward ends on anchoring bars 130 that are in turn supported by the side plates 101 and 102. The slides 111 are individually urged by the springs 129 in a forward direction from the normal or restored positions thereof shown in Fig. 39 of the drawings, and the forward or setting movements of the individual slide bars 111 are controlled by the set up mechanism 112. The slide bars 111 are returned to their normal or rest positions of Fig. 39 by a restoring bail 131, the cross bar of which is disposed within a slot 132 that is formed in the upper edges of all of the slide bars 111, and the slot 132 affords a rear end edge 132A that may be engaged by the cross bar of the bail 131 to move all of the slides 111 rearwardly to their restored positions. The restoring bail 131 is mounted on a rock shaft 133 and is adjustably connected thereto by means of a screw thread device 134. The rock shaft 133 has an arm 135 extended downwardly therefrom as shown in Figs. 39 and 75, and a cam roller 136 on the lower end of the arm 135 engages a restoring cam 137 fixed on the main cam shaft 108 of the machine. The cam 137, as shown in Fig. 75, is of such a configuration that when the rotation of the cam shaft 108 is started from the initial or rest position shown in Fig. 75, the bail 131 will be moved forwardly or in a counterclockwise direction as illustrated in Figs. 39 and 75, and this permits forward or setting movement of the slides 111 under control of the setup mechanism 112. After the slides 111 have thus been set up, and in the last half of the cycle of operation of the machine, the cam 137 rocks the restoring bail in a clockwise direction so as to thereby move the slides 111 into the normal or restored position of Fig. 39.

The forward or setting movements of the slides 111 are governed by the setup mechanism 112 so as to set the slides 111 in accordance with any desired numerical amount that is to be printed by the variable printing mechanism 109 and which is to be entered into the accumulating mechanism 110, and for cooperation with the setup mechanism 112, each slide 111 has a pawl 140 pivoted thereto at 141 as will be evident in Figs. 39 and 75, and the pawls 140 are in each instance arranged to extend forwardly beyond the forward end edge 111S of the slide 111. Each pawl 140 terminates in a forward edge 140S and when the pawls 140 are disposed in their lower or horizontal positions shown in Fig. 39 of the drawings, the forward edge 140S is disposed opposite the rear edge of a stop plate 142. The stop plate 142 is mounted for rocking movement on a rock shaft 144 and a spring 145 normally urges the stop plate 142 into its upper or effective position as determined by an adjustable or settable stop 146. When the stop plate 142 is in its effective position of Fig. 39, the end edges 140S of the pawls 140 will normally engage the stop plate 142 when the restoring bail 131 is moved forwardly or to the left in Fig. 39, and the movement of a related slide bar 111 will in such an instance be relatively slight and the slide bar 111 will remain in its zero position. When a slide bar is to be set to a position representative of a significant digit, the pawl 140 thereof is pivoted in an upward direction so as to move their end edge 140S thereof out of alignment with the stop plate 142, and this is accomplished by the setup mechanism 112 in the course of the operation of such setup mechanism.

Thus the setup mechanism 112 embodies a plurality of slide plates 150, one of which is provided for each of the slide bars 111, and the slide plates 150 are supported for limited horizontal sliding movement in a pair of supporting combs 151 and 152 that are in turn supported between the two plates 113. Each slide plate 150 has five vertically movable stop pins 152 mounted therein for vertical sliding movement, and these stop pins 152 are so disposed that the upper ends thereof are located beneath the lower edge of the forwardly projecting portion of the pawl 140 to which such slide plate 150 is allocated, and by upward setting movement of any one of the pins 152, the related pawl 140 may be shifted to its raised or released position wherein the stop plate 142 will be ineffective to engage or stop forward setting movement of such pawl 140. The several stop pins 152 are so spaced that the right hand edges thereof are spaced apart in an amount equal to two units of setting movement of the related slide 111. Moreover, the left-hand edge of the left-hand stop pin 152—9, as viewed in Fig. 73, is so located that when the slide plate 150 is in its normal or raised position of Fig. 39, such left-hand edge of the pin 152—9 will be disposed in alignment with the end edge 140S of the related pawl 140. Thus, as the stop pin 152—9 is moved to its upper or set position, it will not only move the pawl 140 to its released position, but will also be disposed so that the stop pin 152—9 will be in a position to engage the adjacent edge of the stop plate 142. Hence when a stop pin 152—9 is actuated or set, it will maintain the slide plate 150 thereof in the normal or rearward position of Fig. 39. In the event, however, that a stop pin 152—9 of a plate 150 is not so actuated, the actuation of any other of the pins 152 of such plate will not only release the pawl 140, but will also permit movement of the related slide 150 in a forward or left-hand direction, Fig. 39, in an amount equal to one unit of setting movement of the slide 111. Such movement of the slide 150 is limited by the comb bar 151.

With the arrangement that is thus afforded the slides 111 may be set in accordance with numerical or digital values that are represented by a five-element code as shown in Fig. 39A of the drawings. Under and in accordance with this code, a zero value is represented by the absence of an indication in any of the five positions of the code, such five positions being indicated by the five vertical columns shown in Fig. 39A. Under such code, an indication is afforded in the fifth or left-hand code position for each of the odd numbers or digits, and as to such odd digits an additional indication is afforded in one of the other of the columns. Thus for the digit "1," an additional indication is afforded in the first or right-hand column, as to the digit "3," an additional indication is afforded in the second column from the right, as to the digit "5," an additional indication is afforded in the third column from the right, while as to the digit "7" an additional indication is afforded in the fourth column from the right. With respect to the even digits, it will be observed that but one indication is employed, the digit "2" being represented by an indication in the first or right-hand column, the digit "4" being represented by an indication in the second column from the right, the digit "6" being represented by an indication in the third column from the right, while the digit "8" is represented by an indication in the fourth column from the right.

Thus in the operation of the setup mechanism 112, the pins 152 may be selectively actuated, either singly or in pairs with respect to each slide plate 150 so as to control setup movement of the slides 111 in the several orders of the mechanism. In the present instance the stop pins 152 are actuated by individual Bowden cables 154, one such cable being provided for each stop pin 152 in each order of the machine into which numerical or digital amounts are to be introduced. The Bowden cables 154 have the sheaths thereof anchored in an anchoring plate 155 that is extended between the plates 113, and the wire of each cable 154 is connected to the lower end of a plunger 156. The plunger 156 that is associated with a particular Bowden cable is so arranged as to be disposed beneath the lower end of the stop pin 152 to which the Bowden cable is allocated so that by actuation of a particular Bowden cable the related stop pin 152 may be moved to its raised or active position. It will be observed that the plungers 156 are relatively narrow so that when a plunger is actuated to a projecting upper position, this plunger will not stand in the way of the one-space movement that may be required with respect to the related slide plate 150. In other words, the lower end of the stop pin that is disposed to the right, Fig. 39, of such an actuated plunger 156 will not engage such an actuated plunger in the course of a one-space movement to the left. The sensing impulses for operating such Bowden cables may be derived from any suitable sensing means operating to sense coded perforations or the like in cards, printing and control devices or the like.

With the mechanism that is thus described, the set up movements of the slides 111 may readily be controlled in accordance with the digital value that is to be introduced into the several orders of the machine. Thus when a zero is to be introduced into a particular order of a machine, all of the stop pins 152 will remain in their lower or ineffective positions so that the pawl 140 of the related slide 111 will remain in its lower or effective position. Thus when the restoring bail 131 moves to the left, Fig. 39, the end 140S of such pawl 140 will engage the stop plate 142 so as to hold the related slide 111 in its zero position. If the digit 1 is to be introduced into a particular order of the machine, the stop pin 152—9 and the stop pin 152—1 will be actuated, thereby to raise the pawl 140 to its ineffective or released position. The setting of the pin 152—9 will place such pin in a position to engage the stop plate 142, thus to hold the related slide 150 in its normal or right-hand position. Hence when the restoring bail 131 moves to the left, the related slide 111 will move through but one unit of setting movement, such movement being determined by the engagement of the edge 111S with the adjacent edge of the stop pin 152—1.

As to all the odd digits, the action of the stop pin 152—9 in holding the slide plate 150 against forward or left-hand movement will be the same, and the other of the stop pins 152 that is actuated in each instance will serve to limit the movement of the slide 111 in a left-hand or setting direction, Fig. 39. Thus as to the digit 3, the stop pin 152—3 serves to stop the setting movement of the slide 111, while with respect to the digits 5 and 7, the stop pins 152—5 and 152—7 respectively serve to accomplish this limiting function.

With respect to the even digits, it will be recalled that the stop pin 152—9 is not actuated, and hence with respect to each such even digit, the related slide plate 150 will be allowed to move one space forwardly or to the left in Fig. 39. Hence in setting up the digit 2, the stop pin 152—1 will be engaged by the edge 111S of the related slide 111 after the slide is moved through one unit of setting movement, and the slide 111 will then act upon the pin 152—1 to move the slide plate 150 an additional unit to the left, thereby bringing the slide 111 to rest after the slide is moved through two units of setting movement. A similar action takes place with respect to the other even digits.

After the slides 111 have been thus set and after the various operations have been performed and the slides 111 have been restored to their normal or rearward positions of Fig. 39, as will hereinafter be described, the slide plates 150 are restored in a rearward direction, that is to the right in Fig. 39. Thus as shown in Figs. 37, 39, 73 and 74, a restoring plate 160 is mounted on a rod 161 that is carried between the forward ends of a pair of levers 162, such levers being pivoted at 163 intermediate the ends thereof. The restoring plate 160 extends upwardly from the rod 161 so that the upper end of the plate 160 is disposed just forwardly of the forward ends of the slide plates 150. When the slide plates 150 are to be restored the levers 162 are rocked in a clockwise direction in the Figure 73, and this is accomplished by a cam 165 mounted on the main cam shaft 108. The cam 165 acts on a roller 166 fixed on the rear end of a lever 167, and this lever 167 is pivoted at 168 intermediate its ends and has a pin and slot connection 169 with the rear end of the lever 162. A spring 170 acts on the lever 167 to maintain the roller 166 thereof in engagement with the cam 165. At the end of a cycle of operation of the machine, the roller 166 rides upon a raised portion 165R of the cam 165 so that the slide plates 150 are at this time held in their restored positions. Soon after a cycle of operation is instituted, the roller 166 rides off of the high portion 165R and the restoring plate 160 is moved forwardly to an ineffective position thereby to permit such forward or left-hand movement, Fig. 39, as may be required with respect to any one of the slide plates 150.

The forward ends of the pawls 140 are guided and maintained in proper position over the related sets of stop pins 152 by a comb plate 207 that is extended between the two plates 113, and near the end of a cycle of operation of the machine, all of the pawls 140 are restored in a downward direction so as to thereby restore the pins 152 that have been set in the course of such cycle of operation. As shown in Figs. 64 and 65, such restoring operation is effected by means of a vertically slidable restoring plate 210 that is disposed over the pawls 140 just rearwardly of the comb 207, and the restoring plate 210 is guided for vertical sliding movement on pins 211 that extend rearwardly from the comb 207 and engage vertical slots 212 formed in the restoring plate 210. An operating lever 213 is disposed just above the comb 207 and is pivoted at 214 on a bracket associated with the left-hand side plate 113 as shown in Fig. 64. The operating lever 213 has a pin and slot connection 216 with the restoring plate 210, and a spring 217 acting on the left-hand end of the lever 213 as viewed in Fig. 64 tends to raise the restoring plate 210 to the raised or retracted position of Fig. 64.

When the pawls 140 and the pins 152 are to be restored, it will be recognized that the slides 111 and the pawls 140 will have been fully restored to their rearward or normal positions, and at this time the right-hand end of the lever 213 is actuated in a downward direction by means including a downwardly extended operating link 219 that is pivoted at its upper end to the right hand end of the lever 213 as viewed in Fig. 64. The lower end of the link 219 is pivoted at one end of a bell crank lever 220 that is pivoted intermediate its ends on a pivot stud 168, and the other end of the bell crank 220 has cam roller 221 thereon that engages a cam 222. Near the end of the machine cycle, and after the slide plates 150 and the associated pins have been restored to their rearward positions by the action of the restoring plate 160, the roller 221 is engaged by a lobe 222A on the cam 222, as shown in Fig. 65, to thereby move the operating lever 213 downwardly to restore the pawls 140 and the pins 152. The roller 221 rides off of the lobe 222A just prior to the end of the machine cycle, thereby to release the pawls 140 and the pins 152 have setting movement or operation in the next cycle of the machine.

The restoring means that are thus afforded for the pawls 140 and the pins 152 are such that they are operated in each cycle of operation of the main cam shaft 108 of the machine, and while this restoring operation is in most instances adequate to take care of the requirements encountered in practice, it has been found that over some circumstances that where the adding machine of the present invention is being utilized in timed relation with other machines such as a printing machine, there may be circumstances where it is desirable to restore the pins 152 and the pawls 140 independently of the operation of the main cam shaft 108 and for this purpose, means are associated with the restoring rod or link 219 for imparting restoring movement thereto independently of the cam shaft 108. In the present instance such means include a control solenoid 224 mounted beneath the base plate 104 and having an operating link 225 extended upwardly from the armature of the solenoid. The upper end of the operating rod 225 is extended through and guided by a guide plate 226 that is afforded at the lower edge of a mounting bracket 227 that is extended laterally from the right-hand plate 113, as viewed in Fig. 64. A spring 228 surrounds the rod 225 above the guide plate 226, and this spring acts against a collar 229 that is mounted on the upper end of the rod 225. The spring 228 is effective to urge the rod 225 upwardly to a position determined by a stop collar 230 that is fixed on the rod so as to engage the guide plate. The collar 229 is thus arranged to be moved downwardly when the solenoid 224 is energized, and in such movement the collar 229 is arranged to engage one arm 231A of a bell crank 231, this bell crank being pivoted at 232 on the arm 220 adjacent to the point where the rod 219 is connected thereto. A spring 233 acting between an upwardly extending arm of the bell crank 231 and an anchoring pin 234 on the bell crank 220 serves to urge the bell crank 231 to the position shown in Fig. 65. The bell crank 231 also has a downwardly extended hooked arm 231B that normally acts as a latch to hold an arm or pawl 235 in the position shown in Fig. 65. The pawl 235 is pivoted at 236 on the arm 220 coaxially with the roller 221, and a lateral pin 237 at the other or left end of the pawl 235 is engaged by the hooked arm 231B. When the solenoid 224 is energized, the pawl 235 is released, and a spring 238 draws the pawl 235 downwardly so as to move into abutment with a stop 235S to thereby move a shoulder or tooth 239, formed on the pawl 235, into the path of an arm 240A of a constantly operated rocker 240. The arm 240A is therefore effective in its right-hand movement, Fig. 65, to push the pawl 235 to the right, thereby to rock the bell crank 220 and impart downward restoring movement to the rod 219. In the course of such rocking movement of the bell crank 220, the pawl 235 is of course held against downward movement by the stop 235S, while the latch 231 is moved downwardly, and thus the latch 231 is again re-engaged with the pin 237.

The rocker 240 is mounted on a shaft 241, and has a roller 242 mounted on the arm 240A so as to engage an eccentric 243 that is mounted on a constantly rotated drive shaft 244. A spring 243A acting on the arm 240A serves to hold the roller 242 against the eccentric 243, and thus the rocker 240 is rocked through a complete rocking cycle in each rotation of the shaft 244. The shaft 244 is in the present case utilized as a drive shaft which is constantly rotated from a suitable power source, and the shaft 244 is geared to a gear 245, Fig. 38, that is loosely mounted on the cam shaft 108. The gear 245 constitutes the driving member of a one-revolution clutch 246 whereby the cam shaft 108 may be rotated through a single revolution for each cycle of operation of the machine. This clutch 246 may be of the general character disclosed in my Patent No. 2,265,133, patented December 9, 1941, and the manner of control thereof will be described in detail hereinafter.

The geared relation between the shaft 244 and the gear 245 is such that the shaft 244 rotates considerably faster than the gear 245, and I have found that accomplishment of the desired control operations by the rocker 240 may be satisfactorily attained where the shaft 244 makes approximately three and one-half revolutions for each revolution of the gear 245.

When the slides 111 are moved to set positions under control of the setup mechanism 112, as hereinbefore described, the type segments 117 are set up to corresponding positions so that, order by order, the type segments have corresponding type characters TC3 disposed in printing position beneath the platen 116. In accomplishing this set up operation of the type segments 117, each type segment is pivotally supported on an arm 247, the pivotal connection being effected at 248, but there being a spring 249 acting between the type segments and a bracket 250 formed on the arm 247 so as to pivot the type segment in a counterclockwise direction toward the retracted or lower position of Fig. 39. Such lower position is governed by a cross bar 250A upon which the type segments 117 ride in a slidable relation. Each arm 249 is adjustably carried upon a segment 251 that is mounted for rocking movement on a transverse shaft 252 extended between the side plates 101 and 102, and the segment has gear teeth 253 formed thereon and meshed with rack teeth 254 formed on the upper edge of the related slide 111 so that longitudinal setting movement of the slide 111 imparts corresponding setting movement of a rocking character to the segment 251 and the type segment 117 that is carried thereby.

When the type segments 117 have been individually set to the desired numerical or digital position, such type segments are accurately aligned by aligning pawls 255 that engage aligning teeth 256, such aligning teeth 256 being formed on the segments 251 as will be evident in Figs. 39 and 66 of the drawings. The aligning pawls 255 are individually pivoted in individual slots formed in a bar 257 and are adapted for rocking movement, with the bar 257, in a counterclockwise direction, Figs. 39 and 66, into their effective positions, and the bar 257 is extended between a pair of arms 258 that are in turn supported on the shaft 252 on opposite sides of the group of segments 251 that are to be aligned thereby. A pair of operating cams 260 are pivoted at 261 on the outer faces of the side plates 101 and 102, and these operating plates 260 have cam slots 263 formed therein that engage rollers 264 that are carried on operating arms 265. When the cams 260 are rocked so as to thereby raise the operating arms 265, the bar 257 is also moved upwardly, and in such movement the bar 257 is rocked in a counterclockwise direction. For this purpose, stationary cams 266A have cam slots 266 formed therein that are engaged by cam follower pins 267 provided on arms 268 fixed on opposite ends of the bar 257. When this occurs, a comb spring 269 acts on the pawls 255 to cause these pawls to follow the rocking movement of the bar 257 and thereby to move the pawls to their aligning positions. Thus when the plates 260 are rocked in a clockwise direction from the position shown in Fig. 66, the pawls 255 are moved to their effective positions. Such engagement of the pawls 255 with the teeth 256 is resilient in character so that while the segments 257 are held accurately in position, these segments may be moved in a returned or restoring direction.

The cam plates 260 are operated in proper timed relation to the setting movements of the slides 111 by a cam 270 fixed on the cam shaft 108. During the first part of the cycle of operation of the machine during which the slides 111 are being moved to the left in Fig. 39 through their setting movements, a cam roller 271 rides on a relieved dwell surface 270A of the cam 270, but just after the setting movements of the slides 111 have been completed, the roller 271 rides on to a raised surface 270B of the cam 270. The roller 271 is carried on an arm 272 that is pivoted at 273, and the arm 272 is connected by link 274 to a pivot 275 on one of the plates 260. Thus when the cam roller 271 rides on to the raised surface 270B the plates 260 will be rocked in a clockwise direction, Fig. 66, thereby to move the pawls 255 to their operative or aligning positions. The aligning pawls 255 remain in position until shortly before the end of the cycle, thereby to hold the slides 111 in their set position until such time as the restoring bail 131 engages the shoulder 132A and starts the return movement of such slides.

After the type segments 117 have thus been set up and aligned, the type segments are actuated upwardly so as to produce impressions from the type characters TC3 that are disposed in printing position, and as will be hereinafter be described in detail, this actuation is effected by a plurality of hammers 280 that are pivotally mounted on a transverse shaft 281 that is extended between the side frames 101 and 102. The hammers 280 are each provided with forwardly extending arms 282 and springs 283 are extended downwardly as shown in Figs. 39 and 77 and are connected to anchoring bars 284. The anchoring bars are in turn mounted on the ends of the arms 285 of a bail 286, the arms 285 being pivoted on pins 287 that are mounted on the side frames 101 and 102. The cross member of the bail 286 is engaged by a hook member 288 as shown in Fig. 39 so that by actuation of the hook 288, the position of the bail 286 may be adjusted so as to thereby adjust the spring tension on the hammers 280. The hook 288 is extended through a cross rod 289 and has an adjusting member 290 threaded on the upper end thereof for attaining such adjustment of the spring tension.

The hammers 280 are held in their retracted or downward positions of Figs. 39 and 77 by a latch bar 292 that engages corresponding teeth 293 formed on the respective hammers 280, and the latch bar 292 is mounted as the cross member of a bail that includes a pair of arms 294 fixed on opposite ends of a rock shaft 295. The rock shaft 295 is mounted for rocking movement between the side plates 101 and 102, and the arm 294 that is disposed just outside of the side plate 101 has a bell crank extension 294A formed thereon so as to extend in a forward direction. The arm 294A has a link 296, Fig. 77, extended downwardly therefrom and connected at its lower end to a lever 297. The lever 297 is pivoted intermediate its ends at 298, and a roller 299 at the opposite end of the lever 297 is arranged to ride upon the lower edge surface of a hammer trip cam 300 that is fixed on the main cam shaft 108. After the slides 111 have been moved through their setting movement, the latch bar 292 is actuated or released by the action of a cam lobe 300A formed on the cam 300 as will be evident in Fig. 77 of the drawings, and in the present instance such release of the hammer trip or latch bar 292 takes place just prior to the completion of the first half of the operating cycle of the machine.

While all of the hammers 280 are released in each machine cycle by release of the trip bar 292, means are afforded for attaining additional control of the hammers 280 so that zeros will not be printed in those orders above the highest order in which a figure digit is to appear, and such means are also effective to insure that zeros will be printed in those orders below the aforesaid highest order and in which a figure digit has not been set up in printing position. Such means constitute what are known as zero suppressing means, and are governed by the setup movement of the type segments 117 and serve to additionally control the hammers 280. As thus shown in Figs. 39, 88, 89 and 90, a subassembly 305 of zero suppressing pawls 306 is mounted just forwardly of the segments 251, Fig. 39, for cooperation with such segments and with the hammers 280. The assembly 305, Figs. 86 to 90, includes a mounting shaft 307 along which a plurality of pawls 306 are mounted for rocking movement relative to such shaft, and a spacing plate 308 is secured by screws 309 to the shaft 307. This spacing plate has comb sections 310 and 311 formed along opposite edges thereof and the comb section 310 is arranged to engage the portions of the pawls 306 that are adjacent to the mounting shaft 307 thereby to space such pawls in proper relation along the shaft 307. The comb section 311 is formed as a flange along the other edge of the plate 308 so that the comb elements thereof extend between the forwardly projecting arms of the pawls 306. Each of the pawls 306 has an ear or lug 312 that is extended laterally therefrom in a right-hand direction as viewed in Fig. 90, and these lugs 312 are so related that each lug overlies the adjacent pawl 306 that pertains to the next lower order of the mechanism.

The assembly 305 of zero suppressing pawls is arranged to be readily removable from the machine, for in practice it is often desirable to substitute different zero suppressing assemblies, or to modify the zero suppressing assembly so as to enable split-field operation of the machine to be readily attained, and for this purpose, the mounting shaft 307 has mounting bars 314 fixed on the opposite ends thereof. At least one of the mounting bars 314 is flanged inwardly as at 314A at one end, and a slot 314B in the flange embraces the plate 308, thereby to hold the assembly in a position determined by the bar 314. The zero suppressing assembly 305 is adapted for insertion into the position shown in Fig. 39 through an opening 315 formed in the side plate 101 of the machine, as shown in Fig. 37, and when the assembly 305 is in position, it is secured in place by screws 316 that are passed through the bearing members 314 and into one of the adjacent side frames 101 and 102. When the assembly 305 is thus in position, the respective pawls 306 are disposed in alignment with the segments 251 to which they are allocated. Each of the pawls 306 has a tooth 306A that is disposed opposite a cut away corner 318 of a segmental extension 319 of the segment 251, and the extension 209 affords an arcuate surface 320 that is concentric with the shaft 252. When a type segment 117 is in its zero position, the tooth 306A is opposite the cut away corner 318, and the pawl 306 may therefore be rocked in a clockwise direction, Fig. 39 to a position wherein the end of the pawl 306 is opposite a tooth 321 formed on the related hammer 280. When a pawl 306 is thus positioned, it will act as a latch that will prevent an operative stroke of the related hammer 280, even though the main latch bar 239 is released. The assembly 305 also has a guide comb 322 engaging the teeth 306A, this comb being mounted on radial studs 322A fixed on the shaft 307.

When a type segment 117 is moved from its zero position, the arcuate surface 320 moves into position opposite the tooth 320A of the related pawl 306. Thus the pawl 306 is held in its inactive position of Fig. 39, thereby to enable the related hammer 280 to operate through a printing stroke when the latch bar 292 is released.

The several pawls 306 normally rest in the ineffective positions shown in Fig. 39 and after the type segments 117 have been set, and prior to the time when the latch bar 292 is released, the several pawls 306 are urged in a counterclockwise direction by a spring means so that such pawls may be moved to their effective positions in those instances where operation of the related hammers 280 is to be prevented. The spring means for thus operating the pawls 306 are afforded by a comb spring 325 having individual arms disposed beneath their respective pawls 306, and the comb spring 325 is mounted on a rock shaft 326 as shown in Figs. 37 and 39. The rock shaft 326 is extended outwardly through the side plate 101, Fig. 37, and has an operating plate 327 fixed thereto. A spring 329 acting on the plate 327 urges the rock shaft 326 in a clockwise direction, thereby to disengage the comb spring 325 from the pawls 306. When the spring 325 is to be rendered effective, the operating plate 327 is rocked in a counterclockwise direction by a link 330 that is pivoted to the plate 327 and extends downwardly therefrom as viewed in Figs. 37 and 37A and is operatively associated with a cam 331 mounted on the shaft 108. Such association is effected by means including a bell crank 332, Fig. 37A pivoted at 333 and having a roller 334 at one end thereof riding on the cam 331. The rod 330 is pivoted to the other end of the bell crank 332, as shown in Fig. 37A.

When the hammers 280 have thus been operated, a restoring movement is applied thereto almost immediately, as shown in Fig. 91 so as to complete the hammer restoring movement prior to the time when the restoring of the slides 111 is initiated. Thus, as shown in Figs. 39 and 40, the hammer restoring bail 335 is mounted on arms 336 that are connected together and are pivoted on a shaft 337. The arms 336 are adjustably related to the shaft 337 by a screw device 338, and an arm 339 extends downwardly and to the right in Fig. 39 so that a roller 340 on the end of the arm 339 may engage a restoring cam 341 that is fixed on the main cam shaft 108. Thus at the time shown in the timing chart of Fig. 91, the cam 341 is effective to rock the bail 335 in a counterclockwise direction so as to engage the bail with the arms 321 of the hammers 280, and this restores the hammers to their retracted position, as shown in Fig. 39 and the latch bar 292 becomes effective to retain the hammers in this position when the bail 335 is returned in a clockwise direction to its normal or rest position of Fig. 39.

The various cycles of operation of the present machine are in each instance initiated by the tripping of the one-revolution clutch 246, and this may be accomplished in different ways. For example, a solenoid 343, Fig. 38 may be operated or energized so as to act through a link 344 to shift a stop lever 345, Fig. 78A, of the clutch 246 to an upper or released position, and this initiates a single revolution operation of the main cam shaft 108. The solenoid 343 may be thus energized each time the set up mechanism has been set up by a related machine, thereby to add the set up amount into the accumulator. The stop bar or lever 345 of the clutch 246 is pivoted at 346, and the clutch 246 may also be tripped by pulling downwardly on the left hand end 345A of the stop lever 345. Thus, as will be evident in Figs. 38 and 78A, a transverse shaft 347 is extended through the side frames 101 and 102, and at its right hand end as viewed in Fig. 38, the shaft 347 has an arm 348 that projects in a generally upward direction. The arm 348 has a roller 349 thereon so that when the shaft 347 is rocked in a counterclockwise direction in Fig. 78A, the stop lever 345 of the clutch will be tripped. The left hand end of the shaft 347 has an arm 350 thereon that extends in a generally horizontal direction, and in certain instances when it is desired to trip the clutch 246, this may be accomplished by downward movement of the lever 350, as will hereinafter be explained in detail.

As hereinbefore pointed out, the accumulator structure of the present machine is constructed and arranged as a separate and individual unit that may be positioned on the machine frame within the slots 122 and beneath the slides 111. It has also been pointed out that the accumulator unit 110 has two relatively small side plates 120 and 121, and the details of construction of the accumulator unit are illustrated in Figs. 38, 39 and 44 to 49. Thus the side plates 120 and 121 of the accumulator unit are held in spaced relation by a plurality of cross shafts and bars that also serve as mounting means for some of the elements of the mechanism as will hereinafter become apparent. Each of the three separate accumulators AC that are included in the unit 110 embodies a pair of end plates 355 that are supported in spaced relation by a mounting shaft 356, such mounting shaft being secured to each related end plate 355 by a stud 357 that in each instance carries a cam roller 358 just beyond the outer face of the related end plate 355. The cam rollers 358 are arranged to ride in vertical slots 359 formed in the side plates 120 and 121 of the accumulator unit and thus the shaft 356 may be moved and guided in a vertical direction. Such shaft 356 in each instance constitutes the mounting means for the accumulator wheels 360, one of which is provided for each of the orders of the machine, and these accumulator wheels are mounted on hubs 361 as will be evident in Fig. 45 of the drawings. The accumulator wheels or gears 360 are in the present case arranged to have twenty gear teeth, and two wide teeth 360W are provided at diametrically opposite position for use in accomplishing the carry-over function in the accumulator, as will hereinafter be explained.

The shaft 356 is in each instance arranged for vertical movement in the slots 359 by cams 363 that are mounted for rocking movement on a shaft 364 that is disposed in a downwardly spaced relation with respect to the related shaft 356, such shaft 364 in each instance being extended through the side plates 120 and 121 and being held in position by studs 365. At its left hand end, each shaft 364 has an enlarged extension 366, Fig. 45, which serves as a mounting means for a related control element, as will hereinafter be described. The end plates 355 of each accumulator have vertical slots 367 formed therein at their lower ends and these slots embrace the shaft 364 so as to cooperate with the guide slots 359 in guiding the accumulator assemblies for vertical movement by the cams 363. The cams 363 that are associated with a particular one of the accumulators have openings 363A therein that embrace the shaft 364, and arms 363B formed on the cams 363 are connected by a relatively heavy cross bar 368 so that by operation of the cross bar 368, the cams 363 may be rocked in unison. A spring 369 acting on a projecting stud 368A, Fig. 47, serves to normally urge the cams 363 in a counterclockwise direction, Figs. 44 and 46 so as to normally tend to move the related accumulator in a downward direction, that is to a lower position wherein the accumulator pinions 360 are out of engagement with respect to the slides 111. Such operation of the related accumulator is effected by a cam slot 363S formed in each of the cams 363 and arranged to engage the roller 358 at the adjacent end of the accumulator supporting shaft 356. The cam slot 363S is so formed that when the cam 363 is in its most counterclockwise position, the accumulator will be in its lower position, while movement of the cams to their most clockwise position, against the action of the spring 369, serves to move the accumulator in an upward direction so as to engage the teeth 360T of the pinions 360 with complemental gear teeth 370 formed in the lower edge of the slides 111.

In the course of a downward or disengaging movement of the accumulator pinions 360, the teeth at the lower edge of such pinions are engaged with related carry-over segments 372 that are mounted on the mounting shaft 364, one such carry-over segment 372 being provided for each of the pinions 360, and such carry-over segments 372 being arranged and controlled in such a manner as to effect the necessary tens-transfer operation in the cycle of operation of the accumulator. Each carry-over segment 372 has teeth formed at the upper end of such segment and it is these teeth that are engaged by the teeth of the related pinion 360. The carry-over segments 372 are in each instance provided with an integral arm 372A that extends to the right as viewed in Fig. 44 so as to thereby pass below the bar 368 that connects the cams 363, and hence, when the cams 363 are rocked in a clockwise direction so as to raise the related accumulator, the bar 368 engages the arms 372A of the several carry-over segments so as to move the carry-over segments to their normal or restored positions as shown in Fig. 44 and in Fig. 57. The carry-over segments 372 are individually latched in such restored positions by latch pawls 380 that are mounted for rocking movement on a transverse shaft 381 that is extended between the two side plates 120 and 121. Each latch pawl 380 is urged toward an effective position shown in Fig. 44 by a comb spring 382 that is mounted on a cross bar 383. The comb spring acts on the upper end of each latch pawl 380 so as to dispose the lower end of the latch pawl in an overlying relationship with respect to an upstanding tooth 372T formed on the arm 372A of the related carry-over segment 372.

The normal latching position of each latch pawl 380 is determined by an operating pawl 385 that is pivoted at its lower end on a transverse shaft 386 extended between the side plates 355 of the accumulator, and such pawls 385 are held in spaced relation by a comb 387 that is extended between the plates 355 so as to dispose the teeth of the comb between the respective pawls 385. Each pawl 385 has a notch 388 in its upper end that is arranged to engage the lower edge of a spacer bar 389 thereby to limit rocking movements of the pawl 385. The rear or right hand face of the pawl 385 is arranged to ride along a vertical surface formed on the upper end of the pawl 380, thereby to act on the pawl 380 at all times to tend to maintain the pawl limit the left hand movement of the upper end of the pawl 380. Each pawl 385 has a nose formed thereon at its upper end so as to project to the left in Fig. 44 and into the path of the thick tooth 360W of the pinion 360 that is allocated to the next lower order of the mechanism. Thus for example if the units order pinion 360 of the accumulator is so actuated that its wide tooth 360W engages the nose on the pawl 385, this pawl 385 will rock the latch 380 of the tens order in a clockwise direction from the position shown in Fig. 57 to the position shown in Fig. 58, and when this is done, the carry-over segment 372 of the tens order will rock slightly in a counterclockwise direction to an extent that is limited by a shoulder 390 formed on a latch bar 391. One such latch bar 391 is provided for each accumulator and each such latch bar 391 is extended between the side plates 120 and 121 and is mounted for rocking movement on pivot 392 disposed adjacent to the upper edge of the latch bar 391. The carry-over segments 372 have an end projection or ear 372E formed at the ends of the arms 372A, and it is such ear that is disposed beneath the shoulder 390 of the latch bar 391. The carry-over segments 372 are normally urged in a counterclockwise direction by comb springs 394 mounted on rocking bars 395 and the tension applied to the springs 394 is such as to urge the ear 372E into engagement with the shoulder 390 when the related latch 380 is released.

It will be recognized that the release of the latch pawls 380 will in most instances take place while the related accumulator is in its upper position and in engagement with the slides 111, and this of course conditions the carry-over segments 372 for operation in introducing a carry-over into related accumulator pinion 360. The actual introduction of the carry-over amounts into the related pinions 360 of the accumulator takes place when the accumulator has been returned to its lower position wherein its several pinions 360 are engaged with the teeth of carry-over segments 372. Thus when the accumulator pinions 360 have been lowered, the latch bar 391 may be released, or in other words this latch bar may be rocked in a counterclockwise direction so as to disengage the shoulder 390 from the ears 372E of those carry-over segments 372 that have been enlarged or conditioned for operation. When this is to be done, the latch bar 391 is rocked from the position shown in Fig. 58 to the positions shown in Fig. 59, and when this is done, the carry-over segment 372 rocks in a counterclockwise direction until the ear 372E engages a shoulder 391B on the bar 391. This introduces the desired carry-over into the related pinion 360. It will be recognized of course that such introduction of a carry-over into a related pawl may cause such pawl to move through its zero position, thereby to actuate the pawls 385 and 380 of the next higher order, and when this occurs, a similar carry-over action will be attained as to such next higher order. Such an action may be progressive through the several orders of the accumulator under some conditions or settings of the accumulator.

The rocking movement of the latch bars 391 is accomplished in unison with respect to all such latch bars and this is done by a link 398, Fig. 49A. The link 398 has slots 399 formed therein that engage pins 400 extended from the adjacent ends of the latch bars 391. The operating bar 398 has an arm 401 extended downwardly therefrom as viewed in Fig. 44, and a roller 402 on the arm 401 is disposed in a slot 403 formed on an upward projecting arm 404, Figs. 44 and 39. An arm 407 fixed to the arm 405 has a cam roller thereon that engages a cam 409 fixed on the cam shaft 108, Figs. 39 and 40, and the cam 409 is thus effective to release the latch bars 391 after the accumulators have been returned to their downward positions wherein they are engaged with the carry-over segments 372.

The carry-over springs 394 may of course be so arranged so as to have a fixed tension, this being accomplished by fixing the mounting bars 395 in a selected rotative position, but where the mechanism is embodied in a relatively large accumulator, that is, an accumulator having a large number of orders, the tension on the springs 394 is varied so that the restoring operation of the carry-over segments may be accomplished against a relatively light spring pressure while a heavy spring pressure is afforded during the time when the carry-over operations are to take place. For this purpose, each mounting bar 395 has a downwardly extending arm 406 fixed thereon, and each of these arms has a slot 407 formed therein which embraces a horizontal operating rod 408. Abutment collars 409 are provided on the rod 408 in a left hand direction, Fig. 44, added tension may be applied to all of the carry-over springs 394. Such operation of the rod 408 is accomplished by a bell crank 410 that is connected to the rod 408 at 411, and a cam roller 412 on the other arm of the bell crank 410 is arranged to bear upon the cam 413 fixed on the cam shaft 108.

As will be evident in the timing chart of Fig. 91, the slides 111 are in an adding operation moved to the left to their set positions while all of the accumulators are in their lower positions, and after the slides 111 have been set, the accumulator into which an amount is to be entered is moved to its raised position so as to engage the rack teeth 370 on the slides 111. The slides 111 are then restored so that the amounts that have been set up on such slides are entered into the accumulator that is engaged with such slides in a clockwise adding direction. When an accumulator is to be restored to its zero position, as in an instance where a total standing in the accumulator is to be read from such accumulator, the timing of the engaging and disengaging movements of the accumulator with respect to the slides 111 is modified as will hereinafter be described in greater detail, and the accumulator is engaged with the slides during what may be termed the readout or total setting operation. In such a readout operation, a zero stop plate 420, Fig. 44, is moved into an operative position so as to be engaged by the wide teeth 360W of the pinions 360 as such pinions are rotated in a counterclockwise direction. The zero stop plate 420 has teeth 420T that may extend into the space between the pinions 360 and into the path of the wide teeth 360W. The zero stop plate 420 has ears 421 at its opposite ends and these ears are pivoted at 422 on the end plates 355, and a torsion spring 423 serves normally to rock such stop plate in a counterclockwise direction to the inactive position of Fig. 44. Each zero stop plate has an arm 425 at its right hand end, or in other words at the end which is adjacent the side plate 121, and as will hereinafter be described in detail, this depending arm 425 is engaged and moved to the left in Fig. 44 when the zero stop plate 420 is to be rendered effective.

The cams 363 must of course be rocked in proper timed relation to the movements of the slides 111 in order that the desired numerical amounts may be entered into the accumulators, or to enable totals to be read out of an accumulator, and in accomplishing such timed operation of the cams 363, means are mounted on the projecting stud 366 for rocking movement about the axis of said stud 366, and such rocking movements are transmitted to the cams 363 so as to thereby raise and lower the accumulator pinions and restore the carry segments 372. The means that are thus utilized for operating the cams 363 are shown in detail in Figs. 40 to 43. Thus such means constitute a rocking assembly 430 that includes a sleeve 431 that is slidably fitted over the stud 366, and the sleeve 431 has a closed end 431A so that an expansive coil spring 432 may be confined within the sleeve and within a bore 433 formed in the stud 366. This spring 432 tends to move the rocking assembly 430 in an outward or left hand direction as viewed in Figs. 40 and 42, and such movement is controlled as will hereinafter be described. On the sleeve 431, a gear segment 435 is fixed for rotation or rocking movement with the sleeve 431, and an inner plate 436 is mounted on the sleeve 431 in an inwardly spaced relation so as to be capable of adjusting movement relative to the segment 435 in a rotative relation with respect to the axis of the sleeve 431. Thus an internally threaded sleeve or stud 437 is mounted on the inner plate 436, and a headed screw 438 is passed through an enlarged opening 439 in the segment 435 so that the stud 437 may be clamped to the segment 435 for rocking movement therewith. An ear 439 is provided on the segment 435, and a set screw 440 is extended through the ear 439 to engage one side of the stud 437, and this arrangement enables accurate adjustment of the inner plate 436 with respect to the segment 435. Preferably a lock nut 441 is associated with the set screw 440.

As will be evident in Figs. 37 and 41 of the drawings, the plate 436 has a notch 443 formed in the right hand edge thereof and this notch 443 is arranged to embrace a projecting end 368B formed on the bar 368, Fig. 47. Thus by rocking movement imparted to the segment 435 in a clockwise direction from the position shown in Figs. 37 and 41, the cams 363 may be correspondingly rocked so as to thereby raise the associated accumulator into engagement with the slides 111 while at the same time imparting restoring movement to the carry-over segments 372.

As hereinbefore pointed out, the rocking assembly 430 may be moved endwise with respect to the mounting stud 366, and such endwise movement is utilized to determine whether or not a particular rocking assembly shall be operated, what the timing of such operation shall be, and also to operate the zero stop plate 420 in total taking operations. Thus as will be evident in Figs. 43 and 44, each inner plate 436 has a pin 445 extended inwardly therefrom on the side of the rocking axis opposite from the slot or notch 443. This pin 445 has a pointed end 445A that is arranged to engage the right hand side of the depending arm 425 of the zero stop plate 420 of the related accumulator. Thus when the rocking assembly 430 is shifted inwardly or to the right in Fig. 42 to what may be termed an inner or total taking position, the conical surface 445A engages the arm 425 and rocks the zero stop plate clockwise as viewed in Fig. 44 and into an effective position.

For the purpose of imparting proper timed movements to the rocking assemblies 430, means are afforded which operate in every cycle of machine operation, but with different timing arrangement, and the character or timing of the rocking movements to be imparted to a particular rocking assembly 430 is determined by selectively positioning the rocking assembly longitudinally of the stud 366 and in a total position, an adding position, or in a neutral or idle position. Thus as will be evident in Figs. 37 and 38, an adding control rack 450 and a total control rack 451 are mounted on the outer side of the side plate 101 for longitudinal reciprocating movements, this mounting being acomplished by a pair of guide brackets 452 and 453 disposed near the ends of such racks 450 and 451, and also a supporting bracket 454 that is mounted on the side plate 101 near the central portion of the racks 450 and 451. The racks 450 and 451 are disposed in laterally spaced relationship as will be evident in Figs. 60 and 62, and each rack has three sets of teeth formed in the lower edge thereof so that these teeth may be meshed with the teeth of the gear segments 435 of the three rocking assemblies 430.

As will be evident in Fig. 37, one such rocking assembly is afforded for each of the three accumulators, and the rocking assemblies have been distinguished in Fig. 37 and in Figs. 50 to 55 by the use of different suffixes added to the reference character 430. Thus the accumulator AC—1 has a rocking assembly 430—1 associated therewith; the accumulator AC—2 has a rocking assembly 430—2 associated therewith; while the accumulator AC—3 has a rocking assembly 430—3 associated therewith, and these three rocking assemblies are disposed so that they may be engaged with the related set of teeth 456 of either of the racks 450 or 451. When one of the rocking assemblies is in its adding position, the segment 435 thereof is engaged with the adding rack 450, while in the total position of a particular rocking assembly 430, the segment 435 is engaged with the total rack 451, and intermediate these two positions an idle position is afforded wherein the segment 435 is out of engagement with respect to both of the racks 450 and 451.

The adding rack 450 is reciprocated in the proper timed relation, as is indicated in the timing chart of Fig. 91, by means including a rocking lever 455 that is pivoted on the stud 168 so that a roller 456 on the lower end of the lever 455 is engaged with the periphery of a cam 457. A spring 458, Fig. 37, acts to maintain the roller 456 in engagement with the cam 457, and the upper end of the lever 455 has a roller 459 thereon through which the lever 455 is operatively engaged with the adding control rack 450. As shown in Figs. 60 and 63A, such engagement is effected by means of a plate 460 pivoted near its rear edge at 461 on the rack 450, and the plate 460 has upward projecting arms 462 and 463 that are arranged to embrace the roller 459. The plate 460 has a slot 464 therein that is arcuate in character and is fitted upon the pivot 461, and a spring plunger 465 mounted on a stud 466 is seated in a socket 467 so as to tend to hold the plate in the position shown in Fig. 63. In the event that an undue resistance force is applied to the rack 450 in its rearward movement, that is right hand movement in Fig. 63, then the force applied to the arm 462 will be sufficient to force the plunger 465 out of the socket 467, and the plate 460 may in such an instance pivot in a clockwise direction from the position shown in Fig. 63. This mechanism constitutes an overload release in the drive of the adding control rack 450.

When the cam shaft 108 is in its rest position the adding control rack 450 is located in its forward position of Fig. 61, and such location may be accurately adjusted by means of a set screw 469 that is extended forwardly through a laterally projecting ear formed on the rear end of the rack 450. Such set screw is adapted to engage the supporting bracket 452. The specific timing of the reciprocating movements of the adding rack 450 is shown in Fig. 91 and will be described hereinafter.

The total control rack 451 has a pair of arms 471 and 472 extended upwardly therefrom near the forward end thereof and these arms 471 and 472 are arranged to embrace a roller 473 that is provided on the upper end of a lever 475. The lever 475 is mounted on the stud 160B and has a roller 476 at its lower end that engages a control cam 477 mounted on the main cam shaft as will be evident in Figs. 40, 61 and 62. A spring at 478 acts on the lever 475 to maintain the roller 476 in engagement with the cam 477. The timing of the total control rack 451 is illustrated in Fig. 91, and will be described in detail hereinafter.

In controlling the positioning of the rocking assemblies 430 so as to locate these assemblies either in the neutral position, or in engagement with the adding control rack 450 or the total control rack 451, each such rocking control lever is provided with an operating lever 480, and the suffix 1, 2 or 3 has been utilized in the connection with the reference character 480 to indicate the particular one of the rocking assemblies with which the operating lever is associated. The operating levers 480 are suspended from the mounting shaft 481 that extends from front to rear of the machine adjacent to the side plate 101, such mounting shaft 481 being carried in a rotative relationship in the bracket 454, and in a rear bearing 482 and a front bearing 483. Each operating lever 480 has a laterally projecting ear 484 formed near its lower end, and an adjustable set screw 485 is extended through this gear so that the inner end of this set screw may engage the outer end of the sleeve of the rocking assembly 430. It will be recalled that the rocking assembly 430 is urged in an outward direction by the spring 432, so that by applying downward pressure to a laterally extended pin 487 that is provided on each lever 480, the position of the rocking assembly longitudinally of its mounting stud 366 may be determined.

Such operation of the levers 480 is in the present case attained by cam means that are mounted upon and in some instances actuated by a total control shaft 490. The total control shaft 490 is rotatably mounted in the bracket 454 and extends from front to rear of the machine somewhat above the mounting shaft 481, and the shaft 490 is supported at its rear end by bearing 491 and at its forward end by a bearing 492. The forward end of the shafts 481 and 490 extend through a forward wall of a casing 494, and a total control lever 495 is fixed on the forward end of the total control shaft 490. Similarly, a sub-total control lever 496 is mounted on the forward end of the shaft 481, and by actuation of the control handles 495 and 496, the shafts may be selectively rocked to different control positions so as to cause different total and sub-total operations of the mechanism as will hereinafter be described in detail.

Figure 50:
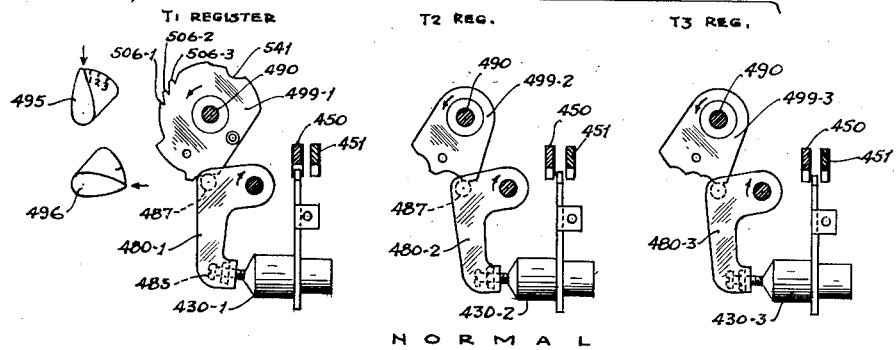

The total control shaft 490 has three main total control cams 499—1, 499—2 and 499—3 fixed thereon for rocking movement with such total control shaft 490, and the specific form of such cams 499 is shown in detail in Fig. 50 of the drawings wherein the cams are shown in their normal or rest positions. It will be observed in Fig. 50 and in the several related views up to and including Fig. 55, that the control handles 495 and 496 are also illustrated in proper relation to the positions of the cams that are illustrated in these views. When the main total control shaft 490 is in the rest position of Fig. 50, the mechanism is in its normal or adding relationship and amounts that are set up on slides 111 will be introduced into the accumulator AC—1, for as will be evident in Fig. 50 of the drawings, the rocking assembly 430—1 is, under such a setting of the machine, engaged with the adding control rack 450 while the other two rocking assemblies are disposed in their neutral or inactive positions wherein each rocking assembly will be free of the racks 450 and 451. Thus with respect to the cam 499—1, the form of the cam is such that when the cam is in its normal position, a relieved surface of the cam will be engaged with the pin 487 of the operating lever 480—1. At this same time, an intermediate surface on the cam 499—2 and an intermediate surface on the cam 499—3 will be engaged respectively with the pins 487 of the arms 480—2 and 480—3 so that the related rocking assemblies 430—2 and 430—3 will be in their neutral positions.

Figure 51:
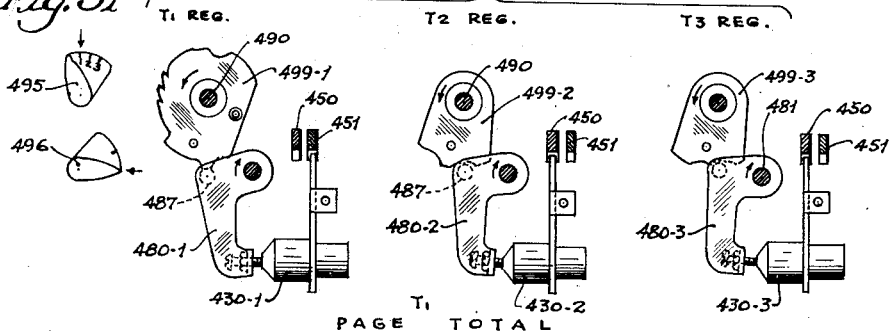

The total control shaft 490 is adapted to be rocked from the normal position of Fig. 50 to three other positions, the first one of which is indicated in Fig. 51, and in this first or T1 position, a high portion of the cam 499—1 will be engaged with the pin 487 of the lever 480—1, and this results in so rocking the lever 480—1 as to shift the rocking assembly 430—1 to the total position shown in Fig. 51. The setting of the total control shaft 490 in the T1 position of Fig. 51 causes relieved portions on the cams 499—2 and 499—3 to be engaged with the pins 487 of the respective levers 480—2 and 480—3, and hence the assemblies 430—2 and 430—3 are allowed to move outwardly under the influence of the springs 432 and into the adding positions wherein the segments 435 thereof are engaged with the adding control rack 450.

Figure 52:
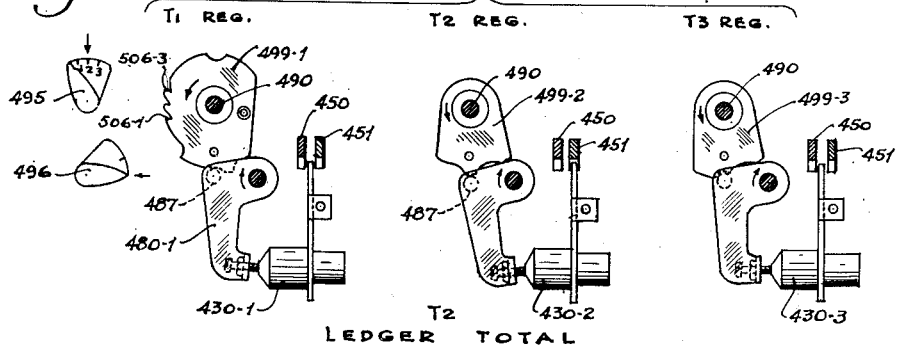

When the total control shaft 490 is shifted to the T2 position of Fig. 52, the pins 487 of the assemblies 430—1 and 430—3 are engaged with intermediate portions of the cams 499—1 and 499—3 respectively so that the rocking assemblies 430—1 and 430—3 will be disposed in their intermediate or neutral positions. In such T2 position of the total control shaft 490, the pin 487 of the lever 480—1 is engaged by a high point on the cam 499—2, and this locates the rocking assembly 430—2 in the position shown in Fig. 52 wherein the segment 435 of the rocking assembly is engaged with the total control rack 451. Thus in the T2 setting of the total control shaft the accumulators AC—1 and AC—3 will remain idle, while the total standing in the accumulator AC—2 will be read out or cleared.

When a grand total is to be taken, the total control shaft 490 is moved to its T3 position shown in Fig. 53 of the drawings, and the cams 499—1 and 499—2 will have intermediate cam surfaces thereon into engagement with the pins 487 of the related levers 480—1 and 480—2. Thus the rocking assemblies 430—1 and 430—2 will be disposed in their intermediate or neutral positions as shown in Fig. 53, and in the total cycle of the machine, the related accumulators AC—1 and AC—2 will remain in their lower or inactive positions. With respect to the cam 499—3 however a high point on such cam will be engaged with the pin 487 of the lever 480—3 so that the rocking assembly 430—3 will be engaged with the total control rack 451. In this setting of the parts, the accumulator AC—3 will be so operated in the total cycle of the machine that the total standing in the accumulator AC—3 will be read out or cleared.

It will be evident that the total control shaft 490 may be manually set from its normal position of Fig. 50 to any one of the three total positions just described, and throughout the cycle of operation of the machine, and until substantially the end thereof, the total control shaft is held in any position to which it has been set by means of a latch lever 500 that is pivoted at 501 on a bracket 502 that is extended inwardly from the side plate 105, as shown in Fig. 61 of the drawings. The latch lever 500 has a spring 503 acting on its lower end so as to urge the upper end in an inward direction, thereby to hold a latch pin 505 against the outer side edge of the cam 499—1. When the total shaft 490 is rocked to a desired one of its total positions, the latch pin 505 is engaged with one of three teeth 506—1, 506—2 or 506—3 that corresponds respectively with the T1, T2 and T3 positions of the total control shaft 490. Thus the latch lever 500 holds the total control shaft in its set position, and at substantially the end of the cycle of operation of the machine, the latch lever 500 is actuated to a released position by a cam pin 508 that is mounted so as to extend radially from the shaft 108. In the present instance this pin 508 is mounted on the hub of the cam 301, as will be evident in Figs. 37A and 38A. At substantially the end of the cycle of operation of the cam shaft 108, the pin 508 engages a pin 509 mounted on the lower end of the lever 500, as shown in Fig. 38A, such engagement being on the left hand side of the pin 509 so as to thereby rock the latch lever 500 to a released position. At the end of the cycle, the latch lever 500 is again allowed to return into engagement with the edge of the cam 499—1 so that the shaft 490 may again be set for other total operation as this is desired. When a total operation is to be accomplished by manual setting of the total control shaft 490, the cycle of operation of the main cam shaft 108 may be initiated by manual closure of a control switch 510, Fig. 37, that serves to energize the trip solenoid 343 of the clutch 246.

In the event that the total control shaft 490 has been set incorrectly, the latch lever 500 may be readily released by means of a handle 511 that extends through the side wall of the casing 494, and such releasing movement of the latch lever 500 is limited by a control pawl 513 that is urged to effective position by a spring 514, Fig. 62, so as to hold the latch lever 513 in engagement with a pin 515 on the cam 499—1.

In the operation of the machine shown in Figs. 37 to 90, it is usually desirable to have the T1 and T2 total cycles initiated automatically, and this may be accomplished under the control of counting devices as described in my aforesaid copending application, Serial No. 416,745, or under the control of tabs placed on appropriate ones of the printing devices from which numerical amounts are sensed for entry into the accumulator. Under the present invention, the total control shaft 490 is automatically set at the desired time to either its T1 or T2 position, and this is accomplished through the use of power taken from the rocker 240. Thus as shown in Figs. 37, 38 and 65, the rocker 240 has a rearwardly projecting arm 240B provided thereon that is disposed substantially beneath the total control cam shaft 490, and means are associated with the total control shaft 490 that are adapted for engagement with the constantly operating rocker arm 240B whenever an automatic setting movement is to be imparted to the automatic control shaft 490. Thus an arm 518 is fixed on the total control shaft 490 near the rear end thereof and above the rear end portion of the arm 240B, and a pair of operating links 519 and 520 are suspended from the arm 518 so as to extend downwardly through appropriate slots in a guide bracket 521 beneath which the arm 240B is located. The lower ends of the links 519 and 520 have shoulders 519S and 520S formed respectively thereon in positions such that these shoulders may be moved into position beneath arm 240B. As will be evident in Fig. 37 of the drawings, the shoulder 519S is disposed at a level higher than the shoulder 520S, and these shoulders are so related to the range of rocking movement of the arm 240B that when the shoulder 519S is disposed beneath the rocker arm 240B, the link 519 will be pulled downwardly in an amount sufficient to set the total control shaft 490 in its T2 position, while a similar engagement of the shoulder 520S with the rocker arm 240B will rock the total control shaft 490 in an amount sufficient to set the total control shaft in its T1 position. The links 519 and 520 are normally urged away from the rocker arm 240B by springs 522, and may be selectively engaged with the rocker arm 240B by operating cam plates 524, one of which is provided for each of the links 519 and 520. The cam plates 524 are pivoted at 525 above the base plate 104, and these cam plates are triangular in shape and are extended upwardly through guide slots in the bracket 521 so that the left hand edge of each cam plate 524, Fig. 38, will be aligned with and engaged by the link 519 or 520 to which such cam plate 524 is allocated. The cam plates 524 are adapted to be selectively rocked in a counterclockwise direction, Fig. 38, by Bowden cables 526T1 and 526T2 that are provided for the respective cam plate 524, and the manner in which such Bowden cables 526 are selectively actuated will be described in detail hereinafter.

When one or the other of the links 519 or 520 is thus actuated through a downward or setting movement, means are effective to trip the main clutch 246 of the machine, and for this purpose, the requisite clutch tripping action is applied to the lever arm 350, Figs. 37, 38 and 78A. Thus the arm 350 is disposed adjacent to the links 519 and 520 and means are mounted on each of these links for engagement with the lever 350 in the course of a downward or setting movement of the link. Thus, as will be evident in Figs. 37 and 38, the link 519 has a bracket 519B mounted in vertically adjustable position thereon by means of screws 520A, and the bracket 519B has a downwardly projecting arm 519C formed thereon in such a position that the lower end of this arm is disposed over the arm 350 when the link 519 is in its engaged relation with respect to the rocker arm 240B. It will be observed that the arm 519C is spaced away from the link 519 so that when the links 519 are moved downwardly in the course of the manual setting of the total shaft 490, the arm 519C will pass freely by the arm 350 and will thus be ineffective to trip the clutch tripping action thereof is attained in the manner just described with respect to the bracket 519B.

Figure 56:
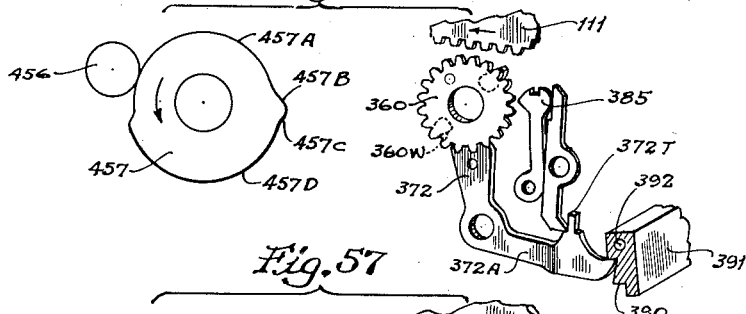
Figure 57:
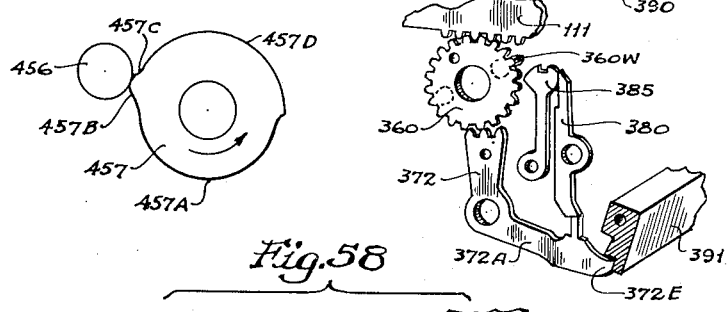
Figure 58:
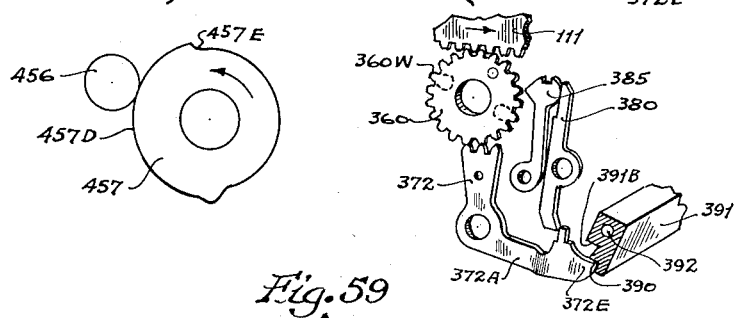

When the setting of the total control shaft 490 has caused a rocking assembly 430 to be engaged with the adding control rack 450, such rack 450 is operative to control the engagement and disengagement of this accumulator with the slides 111 as indicated in the timing chart of Fig. 91. The adding control rack 450 remains stationary in its most forward position throughout substantially 165° of the cycle, during which time, the slides 111 will have been set up as indicated in the first line of the timing chart of Fig. 91. The relationship of the accumulator pinions 360 to the other elements of the structure during this period is represented by the diagrammatic showing in Fig. 56 of the drawings wherein the various parts of the accumulator are shown in diagrammatic association with the adding control cam 457 and the cam roller 456 whereby the adding control rack 450 is operated. Thus the elements of the carry-over mechanism are in Fig. 56 shown in an unlatched or actuated relationship, while the accumulator pinion 360 of the order next lower than the order to which the carry-over segment 372 pertains is shown in its lower position, that is, out of engagement with respect to the slides 111. During the time when the slides 111 are being set up, the cam roller 456 rides on the dwell surface 457A of the cam 457, and the roller 456 is then engaged by an inclined surface 457B which serves to move the adding control rack in a rearward direction, as is indicated in Fig. 57. This serves to rock the assembly 430 in such a manner as to raise the accumulator pinions 360 into engagement with the racks 111, and at the same time, the carry-over segments 372 are engaged by the bar 368 and are restored to the position shown in Fig. 57. The roller 456 then rides off of a relieved portion of the cam 457 and thus causes the adding control rack to move slightly in a forward direction, thereby to lift the restoring bar 368 upward into a spaced relationship with respect to the arms 372A of the carry-over segments. Continued movement of the cam 457 causes a dwell surface 457D to maintain the adding control rack in a stationary position, and during this time, as shown in the timing chart of Fig. 91, the slides 111 are restored to their rearward or rest positions, thereby to enter the set up numerical amounts into the accumulator AC—1.

Figure 59:
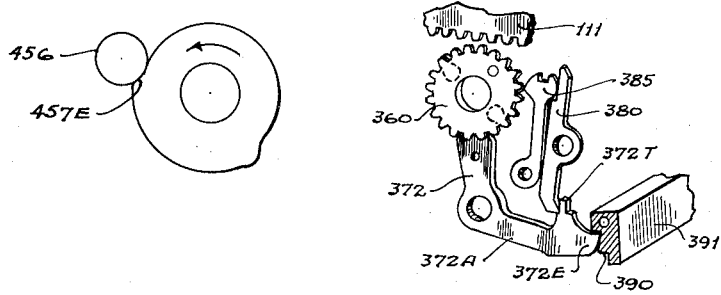

When the entry of such amount into an accumulator pinion 360 causes this pinion to move through a zero position, one of the wide teeth 360W of such pinion acts on the pawl 385 to unlatch the carry-over segment 372 of the next higher order of the accumulator. When this occurs, the carry-over pawl 372 rocks slightly under the action of the carry-over spring 394, and such movement is limited by the shoulder 390 of the latch bar 391. Thus the parts assume the relationship shown in Fig. 58 of the drawings. At the end of the restoring movement of the slides 111, the continued rotation of the cam 457 brings a relieved surface 457E into contact with the roller 456 as indicated in Fig. 59 of the drawings, and this causes the adding control rack to move forwardly to its rest position so as to thereby lower the accumulator pinions 360 into engagement with the carry-over segments 372. It should be observed in this connection that the accumulator wheels 360 are partially meshed with the teeth of the carry-over segments 372 before such pinions are completely de-meshed with respect to the slides 111. After the accumulator pinions 360 have been fully meshed with the carry-over segments 372 and at substantially the end of the cycle as shown in Fig. 91, the latch bars 391 are released, thereby to enable the tooth 372E of any unlatched carry-over segment 372 to move into engagement with the shoulder 391B of the latch bar 391. The latch bar 391 remains in this ineffective position until substantially the time when the carry segments 372 are restored, as will be evident in Fig. 91 of the drawings.

When a particular one of the rocking assemblies 430 is engaged with the total control rack 451, the related accumulator AC is lifted into engagement with the slides 111 within the first 20° of the machine cycle, and at this time the carry segments 372 are restored and the restoring bar 364 is again slightly lifted prior to the time when the forward or setting movements of the slides 111 is initiated, and this time relationship will be evident in Fig. 91 of the drawings. It should be observed that when a rocking assembly 430 is engaged with the adding control rack 451, the pin 445 of such assembly will be engaged with the arm 425 of the related zero stop plate 420, and thus the zero stop plate will be moved into its effective position. Thus when the slides 111 are released, as will hereinafter be explained, for forward or setting movement, such setting movement of each slide may continue until such time as a wide tooth of the related accumulator pinion 360 has engaged the zero stop plate 420. This in effect reads out the amount standing in such accumulator AC and sets up the type segments 117 to print such amount. After the type segments have thus been set up, the aligning pawls 255 are moved into their effective positions, as indicated in Fig. 91, and the hammers 280 are released so as to print the total. In the normal operation of the total control rack 451, the accumulator AC is then lowered into engagement with the carry over pinions, and the carry-over action takes place in the manner and at the time described hereinbefore.

As pointed out hereinbefore, all of the slides 111 are released for forward or setting movement whenever a total operation is to be performed, and this releasing action is accomplished as an incident to the setting of the total control shaft 490 to any one of the total positions thereof.

Thus as will be evident in Figs. 60, 61 and 62, a U-shaped rocker 530 is mounted on a stud 531 that is extended from the side plate 101 just above the forward ends of the racks 451 and 450. The bracket 530 has an arm 530A that extends through a slot 533 formed in the adjacent one of the side plates 113 of the side plates 113 of the set up mechanism 112. The arm 530A is arranged to overlie the rear end of the stop plate 142, as will be evident in Fig. 65, so that by rocking the bracket 530 in a counterclockwise direction, Fig. 61, the stop plate 142 may be moved to an ineffective position and out of alignment with the ends 140S of the pawls 140. When this is done, all of the slides 111 are free for movement to the left or forwardly in a total taking operation.

Such rocking movement of the bracket 530 is accomplished by means including an arm 535 that is pivoted on the stud 531 adjacent the outer edge of the bracket 530 and is secured by means of a screw and nut device 536 to the bracket 530. The arm 535 extends rearwardly and through a guide slot in the stationary bracket 454, as will be evident in Figs. 60 to 62, and adjacent its rear end, the arm 535 is arranged to overlie an operating lever 537 that is pivoted at 538 on the bracket 454. The lever 539 has a laterally projecting pin or roller 540 thereon that is arranged to overlie the upper edge of the cam 499—1, and when the cam 499—1 is in its normal position of Figs. 50 and 62, the roller 540 is disposed in a recess 541 in the cam 499—1. When the cam 499—1 is moved to one of its total positions, the recess 541 is moved out of alignment with respect to the roller 540, and the lever 537 is therefore raised so as to lift the rear end of the arm 535. This serves of course to rock the bracket 530, and the stop plate 142 is thereby depressed to its ineffective position so as to release all of the pawls 140. Hence when the operation of the main cam shaft 108 is initiated, the slides 111 will be free to more in a forward or setting direction under control of the accumulator pinions 360.

The rocking movement that is thus applied to the lever arm 535 and the bracket 530 is also utilized to accomplish other control functions, one of which is the control of a numbering mechanism which is normally operated in each cycle of machine operation. Such numbering machine is indicated generally at 543 in Fig. 37, and is operated by a plunger 544 that is mounted for vertical movement on the outer side of the side plate 101. The plunger 544 is normally moved upwardly in each cycle of machine operation so as to advance the numbering machine and also making numbering impression upon the paper P opposite the impressions made by the hammers 280. The actuating mechanism for the plunger 544 includes a vertically disposed link 545 operated by a lever 546 from the main cam shaft at substantially the same time that the hammers 280 are operated, and the upper end of the link 545 is connected by a slotted tooth connection 547 with the plunger 544. When the numbering machine is to be rendered ineffective, the link 545 is shifted to the right in Fig. 37 at the upper end thereof to disengage the tooth 547. This is accomplished by the lever 535 which has an angular surface 548 at its rear end. The surface 548 underlies a roller 549 on the link 545 so that when the lever 535 is rocked in an upward direction, the connection 547 between the link 545 and the plunger 544 will be disengaged.

The rocking frame 530 that has just been described is also utilized for accomplishing another function, and as illustrated in Figs. 79 to 81, such function is the suppression of printing in certain selected orders of the mechanism. Thus as will be evident in Figs. 79 to 81, a control plate 550 is mounted on a rocking bar 551 that is in turn pivoted on studs 552 extended through the side plates 113 of the set up mechanism 112. The rocking bar 551 is preferably arranged to support the control plate 550 so that such control plate may readily be removed and replaced when it is desired to change the controlling action of the control plate. Thus the rocking bar 551 has a pair of clamping screws 554 mounted in the upper face thereof, and the control plate 550 has slots 555 in its rear edge which embrace the clamping screws 554.

The control plate 550 has its forward edge cut or formed so as to afford a projecting edge portion 550A, Fig. 79, that is adapted to be disposed in the path of the forward end edges of certain of the slides 111, and the longitudinal extent of the extended portion 550A determines which of the slides 111 shall be held in the zero position. Thus any particular field of the accumulator may be rendered ineffective, and this will of course prevent printing of amounts in the orders where the slides 111 are held in zero position. Such suppression of printing in selected orders of the machine may be effective throughout every machine cycle, that is in the normal adding cycles as well as in the total cycles of the machine, but in the use of the machine of the present invention, it may be desirable to use a particular section of the accumulator for the printing of serial numbers, account numbers or the like, and to suppress printing of totals in this account number field of the apparatus when a total is taken from another field of the accumulator. Thus as will be evident in Figs. 79 to 81, the rocking bar 551 has a pin 557 extended through the side plate 113 adjacent to the rocker 530, and a sleeve 558 is mounted on the pin 557 so that an extension 558A of the sleeve may be disposed in position above a lug 559 that is provided on the rocker 530. Thus when the extension 558 is in position over the rocker 530 will normally hold the plate 550 in its elevated or ineffective position that is shown in dotted outline in Fig. 81. However, in a total operation, the rocker 530 moves the lug 559 downwardly, and the control plate 550 becomes effective.

The sleeve 558 may be shifted to the left to an ineffective position shown in Fig. 79, and a clamping screw 560 may be utilized to fold the sleeve 558 in this position or in any other adjusted position. When the sleeve 558 is in its left-hand position, Fig. 79, the plate 550 will be effective in total cycles as well as in normal adding cycles.

When a total is printed, it is desirable that an appropriate symbol be printed opposite such total to indicate whether such total is a T1 total, a T2 total or a T3 total, and for this purpose a special type segment 117S, Figs. 40 and 55A is provided next to the lowest order of the type segments 117. The type segment 117S is mounted on a rocking segment 251S that is associated with a special slide 111SP that is in most respects identical with the slides 111. As will be evident however in Fig. 40 of the drawings, the special slide 111SP is not mounted opposite a pinion 360 of the accumulator, and special means are provided for controlling the movements of the slide 111SP in accordance with the particular total that is to be printed. Thus under the present invention, the setting of the slide 111SP is governed by the setting of the total control shaft 490, and for this purpose a special stop pin carrier or plate 150T, Fig. 55B, is mounted in alignment with the special slide 111SP. The two left hand stop pins 152 of the plate 150T are arranged to be inactive, and may be entirely removed if desired, and as will be evident in Fig. 55B, no mechanism is afforded for actuating such plungers in an upward direction. The most right hand or rearward pin 152—T1 is allocated to the control of the slide 111SP for printing a symbol T1 when a T1 total is printed. Similarly, the second and third pins from the right are designated as 152—T2 and 152—T3 respectively and these two plungers are allocated to the control of printing of the appropriate symbols for the T2 and T3 totals respectively. Since the most forward or left hand pin, Fig. 55B, is not actuated at any time, the slide 150T will in each total cycle move to the left, or forwardly, through one unit of movement. A control pawl 140T that is associated with the slide 111SP will be effective to engage the stop plate 142 in every normal cycle of operation of the machine, but will be released so as to permit movement of the slide 111SP in a total cycle. The operation of the pin 152—T1 will permit forward setting movement of the slide 111SP to a position corresponding with a setting of another type segment 117 to a 2-position, and as shown in Fig. 55A, the type segment 117S has type characters T1 formed thereon in what may be termed the 2-position of such type segment. Similarly, the characters T2 are formed at the 4-position and the characters T3 are formed at the 6-position on the type segment 117S, and with this arrangement, the selective action of the stop pins 152—T1, 152—T2, or 152—T3, may be rendered effective selectively to print the symbol T1, T2 or T3 opposite a total that is printed by the type segments 117.

Actuation of the stop pins of the plate 150T, Fig. 55B, is accomplished by Bowden cables 565—1, 565—2 and 565—3, which as shown in Figs. 37 and 64 are extended to a bracket 566, mounted on the bracket 219, and the Bowden cables are arranged in association with plungers 567, one plunger being provided for each such Bowden cable. On the total control shaft 490, a plurality of angularly displaced actuating pins 568—1, 568—2 and 568—3 are provided, and when the total control shaft 490 is rocked to its T1 position, the pin 568—1 is effective through the related plunger 567 to actuate the Bowden cable 565—1 and this is in turn effective to move the stop pin 152—T1 to its set position. This will cause the related type segment 117S to be set for printing of the symbol T1. When the total control shaft 490 is set in its T2 position, the pin 568—2 will operate through the associated plunger 567 to actuate the Bowden cable 565—2, thereby to actuate the plunger 152—T2, and this will cause the type segment 117S to be set in position to print the symbol T2. Similarly, the pin 568—3 is effective when the total control shaft 490 is set to its T3 position to actuate the Bowden cable 565—3 and the pin 152—T3, thereby to cause printing of the symbol T3.

The pins 152—T1, 152—T2 and 152—T3 are restored to their normal positions by gravity, the plungers 567 being provided with return springs so that they remain in their lower positions only when engaged by an operating cam pin 568.

In the use of the machine of the present invention, it may be desirable in some instances to read out and print a sub-total, and in Figs. 37, 55 and 60 to 62 of the drawings, means are illustrated for enabling this to be done. Thus the total control rack 451 has a latching pawl 570 pivoted thereon as shown in Figs. 60 to 61A, such pivot being provided at 571 at the forward end of such pawl. The pawl 570 has a tooth 572 near its forward end that is adapted to be moved upwardly in position to engage a tooth 573 formed on the bracket 454. The pawl 570 is normally urged upwardly toward an effective position by a spring 574 acting between the pawl 570 and the upwardly projecting arm 471, and when the pawl 570 is thus urged upwardly to its effective position, the pawl will engage the total 573 when the total control rack 451 reaches its most forward position of travel. This relationship is such that the total control rack 451 will move slightly forwardly to a position wherein the bar 368 is retracted from the arms of the carry segments, and the total control rack 451 will then be maintained stationary until such time as the pawl 570 is released. Thus the accumulator AC that is being governed by the total control rack 451 will be maintained into engagement with the slides 111 during such time as the pawl 570 remains in its upper or latched position, and this latched relationship being maintained during the restoring operation of the slides 111 so that a total that has been read out of the slides 111 will be read back into the accumulator during the restoring of such slides. The total printed will therefore be a sub-total.

The control of the pawl 570 to attain such sub-total operation of the machine is afforded by a sub-total cam 575, Figs. 37, 55 and 68 to 70, that is mounted adjacent to the cam 499—1 on the shaft 490, the cam 575 being loosely mounted so that it may be rocked independently of the shaft 490. The cam 575 has an arm 575A formed thereon so that when this cam is in a normal position, as shown in Fig. 62 of the drawings, the arm 575A will ride upon a flat upper surface 570A of the pawl 570 to hold the same downwardly and in an ineffective position such as that shown in Fig. 61 of the drawings. When a sub-total is to be taken, the cam 575 is rocked to the position shown in Fig. 55, and this is accomplished by rocking movement of the mounting shaft 481. Thus the mounting shaft 481 has an arm 577 fixed thereon which has a pin and slot connection 578 with the cam 575, and by rocking the shaft 481 by means of the handle 496, the cam 575 may be moved to the sub-total position of Fig. 55 in which it is latched by engagement of the pin 505, Fig. 37 with a tooth 575T formed on the cam 575, Fig. 55. The cam 575 has a depression 541S and an adjacent raised portion for cooperation with the roller 540 and the arm 537 to operate the rocker 530 in the manner hereinbefore described when the sub-total cam 575 is thus operated. The sub-total cam 575 is urged toward the position of Fig. 52 by a spring 575S, Figs. 37 and 68, and hence the sub-total cam 575 remains in its set position of Fig. 55 until substantially the end of the cycle of operation, at which time the latch 500 is released and the cam 575 returns to the position of Fig. 62 so as to thereby move the pawl 570 from the effective position of Fig. 61A to the ineffective position of Fig. 61. Thus the total that has been printed is read back into the accumulator so that this accumulator stands in the same setting as it did before such sub-total operation.

When a sub-total is printed, it is desirable that a suitable symbol be printed opposite such total and thus, as shown in Fig. 55A, the type character S is provided on the segment 117S in what may be termed the 9-position thereof. Thus it will be evident that the operation of the rocker 530 by the sub-total cam 575 will cause the special slide 111SP to be released for forward or setting movement, and since none of the stop pins mounted on the plate 150—T, Fig. 55, has been actuated, the slide 111SP will move throughout its entire range of movement, and will set the symbol S of the segment 117S in printing position. This will cause the symbol S to be printed opposite the sub-total that has thus been taken. The end of the range of movement of the slide 111SP, as well as the slides 111, is determined by the bail 131 which strikes a stop bar 131A when the slides have reached their 9-positions.

When the sub-total cam 575 is moved to its effective position of Fig. 55, the cam is effective through a high or raised portion to move the pin 487 of the lever 480—1 in a downward direction, and this is effective to shift the rocking assembly 430—1 to the total position shown in Fig. 55 wherein this assembly is operatively associated with the total control rack 451. When the sub-total cam 575 is released at the end of the cycle, the rocking assembly 430—1 is allowed to move in an outward direction until the pin 487 of the lever 480—1 engages the cam 499—1 and thus at the end of a sub-total cycle, the rocking assembly 430—1 returns to the normal position shown in Fig. 50 of the drawings. Hence the sub-total that is taken under control of the cam 575 is taken from the accumulator AC—1.

In the various operations of the machine as thus far described, all of the total operations except the sub-total are governed by the setting of the total control shaft 490, and whenever a total is read out of the accumulator AC—1, such total is read into the accumulators AC—2 and AC—3. In some instances however it may be desirable to read out and print a total from the accumulator AC—1 without entering such total into accumulators AC—2 and AC—3, and in Figs. 37, 54 and 68 to 70, mechanism for accomplishing this action has been disclosed. Thus a third cam 580 is mounted on the hub of the sub-total cam 575 so as to be capable of rocking movement independently of the cam 575. The cam 580 is disposed between the cams 575 and 499—1, and an operating handle 581 is provided on the cam 580 for rocking the same in a counterclockwise direction against the force of a spring 582. The normal position of the cam 580 is shown in Fig. 69 of the drawings and is determined by a stud 583 that extends from the bracket 454 through a slot 584 in the sub-total cam 575. The stud 583 is engaged by a shoulder 585 formed on the cam 580. The cam 580 is formed so as to cooperate with the roller 540 to actuate the arm 537 in the same manner as the other two cams 499—1 and 575, and when the cam 580 has been moved to its effective position, a tooth 580T is engaged by the tooth 505 of the latch 500. The cam 580 is so formed that when the cam is actuated to its set position of Fig. 54, a high portion on the cam will engage the pin 487 of the lever 480—1 so as to move the same downwardly, and this will act to move the rocking assembly 430—1 into engagement with the total control rack 451. Such movement of the total control cam 430—1 is attained, as will be evident in Fig. 54, independently of the rocking assemblies 430—2 and 430—3, and hence a total will be read out of the accumulator AC—1 in the normal manner, but such total will not be read into the accumulators AC—2 and AC—3. At the end of such a total cycle wherein transfer of the total to the other accumulators has been suppressed, the latch lever 500 will be released and the cam 580 will be returned to its normal position. This will enable the rocking assembly 430—1 to be returned to the normal position of Fig. 50 so as to be conditioned for normal adding operation of the machine.

It has been pointed out hereinbefore that the T1 and T2 total operations of the machines may be automatically initiated by actuation of the Bowden cables 526—T1 and 526—T2, and in Figs. 37, 71 and 72, a total control unit 590 has been illustrated whereby the Bowden cables 526—T1 and 526—T2 may be operated to attain such automatic total cycles of the adding machine. The total control unit 590 comprises a frame including a pair of end plates 591 and 592 that are suspended beneath the base plate 104, and the plates 591 and 592 serve to support a constantly driven horizontal shaft 594. The shaft 594 has a pulley 595 on one end thereof that is disposed generally beneath a pulley 596 fixed on the shaft 244 just outside of the side plate 105 of the adding machine, and a belt 597 extends about the pulleys 595 and 596 and past an idler or belt tightening pulley 597 so that a belt tightening shaft of the control unit is constantly driven. The relationship between the pulleys 595 and 596 is such that the shaft 594 will rotate somewhat slower than the gear 245 that drives the shaft 108.

The shaft 594 has a pair of sleeves 600 and 601 mounted thereon in a freely rotative relationship, and an expansive spring 602 disposed about the shaft 594 between the two sleeves 600 and 601 tends to separate the two sleeves and urge them in opposite endwise directions, and this action is utilized to urge a pair of spring clutches 600C and 601C into an engaged or driving relationship. In affording the clutch 600C, a driving disc 603 is fixed on the shaft 594, and friction elements forming a part of the clutch 600C are interposed between the disc 603 and a disc 604 that is fixed on the adjacent end of the sleeve 600. Thus the disc 603 tends to drive the disc 604 and the associated sleeve 600, but the sleeve 600 is normally restrained against rotation by a latch 605 that is pivoted at 606 on the side plate 591. A spring 607 normally urges a tooth 605T on the latch 605 into a notch 608 in the disc 604 so as to thereby hold the disc 604 and the sleeve 600 against rotation. A solenoid 609—1 has its armature connected to the latch 605 so that when the solenoid 609—1 is energized, the disc 604 will be released for rotative movement by the clutch 600C. The clutch 601C serves to control rotation of the sleeve 601, and a solenoid 609—2 controls a latch 605C that acts on a disc 604C fixed on the sleeve 601. Thus when the latch 605C is released, the sleeve 601 will be rotated.

The disc 604 also serves as a mounting means for a cam 610 that is arranged in the rotative movement of the disc 604 to engage a lever 611, and this lever is arranged to act upon the Bowden cable 526T1. Thus, soon after the rotation of the sleeve 600 is initiated, the Bowden cable 526T1, is actuated so as to shift the link 520 into its effective position, thus to initiate a T1 total cycle of the machine. Similarly, the disc 604C has a cam 610C mounted thereon and arranged to engage a lever 611C, and the lever 611C operates in a similar manner upon the Bowden cable 526T2 to shift the link 519 into its effective position, and this causes a T2 total cycle of the machine to be initiated.

The sleeves 600 and 601 also carry a plurality of cams 613, and of such cams, the sleeve 600 carries cams 613—1, 613—2, 613—3 and 613—4, while the sleeve 601 carries cams 613—5 and 613—6. The cams 613 are arranged to control a plurality of related switches 614 that are mounted upon a bar 615 extended between the two side plates 591 and 592. The various switches 614 are closed or opened in timed relation to the rotation of the sleeves 600 and 601, as will be described in detail hereinafter, and among the functions controlled by such switch 614 is a paper feed mechanism whereby the paper P is fed past the platen 160. Thus as will be evident in Figs. 37, 39 and 82 to 85, the paper feed mechanism includes a pair of side plates 115A and 115B supported in spaced relation by spacer bars 617, and the roll R of paper is supported on a cross shaft 618 at the upper edge of the side plates 115A and 115B. The paper on the roll R is led from the lower face of the roll and over a diablo roller 619 that is guided in slots 619S in the side plates and which is urged upwardly by springs 620. The paper is then passed downwardly along guides 621 and around the platen roller 116. The frame of the paper feed mechanism is pivoted on the upper edge of the frame of the adding machine on a pivotal axis 622, and may therefore be tipped in a clockwise direction from the position shown in Fig. 37. A latch 623 normally holds the frame of the paper feed mechanism 115 in position, and this latch may be released by a handle 623H.

The desired feeding movements are imparted to the platen 116 by means of a ratchet mechanism that is best shown in Figs. 82 to 85 wherein it will be evident that the platen 116 has a central mounting shaft 116S that extends beyond a side plate 115A and has a ratchet 624 fixed thereon. A rocker 625 is mounted on the shaft 116S and has a pawl 626 thereon that is spring urged into engagement with the ratchet 624. The rocker 625 has a pinion 627 fixed thereon and a rack 628 is held in engagement with the pinion 627 by a housing 628H. Thus by moving the rack 628 in a left hand direction in Fig. 85, the rocker 625 may be moved in a reverse direction through a conditioning stroke, and when the rack is returned in a right hand direction, the pawl 626 will cause the platen 116 to be advanced. The rack 628 has one end thereof connected to an arm 629U of a bell crank 629 that is pivoted at 630 on the side plate 115A. The other arm 629L of the bell crank 629 has a spring 631 attached thereto so as to tend to rock the bell crank in a counterclockwise direction, Fig. 85. The desired movements of the platen 116 are attained by controlled actuation of the bell crank 629, and for this purpose, a rocking plate 632 is mounted on the shaft 630 and has a roller 633 adapted to engage the arm 629L to impart clockwise rotation to the bell crank 629. The rocking plate 632 has a link 634 connected thereto and extended downwardly so as to slidably embrace the cam shaft 108, and below the cam shaft 108, a roller 635 is mounted on the link 634 to engage the lower edge of a cam 636 fixed on the shaft 108. The form of the cam 636 is such that the rocking plate 632 is in its normal position of Figs. 37 and 85 at the end of a machine cycle. When a machine cycle is started, the link 634 moves upwardly, and the range of movement of the plate 632 is somewhat greater than the movement that would be required in order to impart a single line spacing movement to the platen 116. However, in normal adding cycles of the machine, the bell crank 629 follows the upward movement of the plate 632 in an amount just sufficient to cause a single line space movement of the platen 116 when the plate 632 is returned to lower or rest position, and such control of the bell crank 629 is attained by a latch 637 that is urged upwardly to its effective position by a spring 638, as shown in Figs. 37 and 85. The latch 637 is thus held in a normally effective position, and when a long feed is to be imparted to the paper after a total printing operation, the latch 637 is shifted downwardly to a released position by means including a link 639. The link 639 is connected to the armature of a solenoid 630 that is mounted on the bracket 521, and when a long feed is to be imparted to the paper, the solenoid 630 is energized. Such energization of the solenoid 630 is attained under control of the total control unit 590, as will now be described.

It has been pointed out hereinbefore that the automatic total operations of the adding machine may be controlled by different means, and as shown in the wiring diagram of Fig. 91A, a switch 640 is arranged to be closed by a switch operating member 641 that may constitute a means for detecting the last impression position on a sheet, or which may be operated by a counter. In Fig. 91A, another normally open switch 642 is shown which may be arranged to be closed by the selector mechanism of a printing machine in response to the presence or absence of a tab on a particular position on a printing and control device.

When the switch 640 is closed, circuit is completed to a T1 total relay 643 which serves to control the energization of the solenoid 609—1 of the total control unit. The circuit for the relay 643 is provided from a first line wire L1 by a wire 644 and a wire 645 in series that extend to one terminal of the relay 643, and a wire 646, extended from the other terminal of the relay 643 to one contact of the switch 640. A wire 647 extends to the other line L2 from the other contact of the switch 640. When the relay 643 is thus energized, a holding circuit is established for such relay through one pair of contacts 643—1 of the relay 643. Thus a wire 649 extends from one of the contacts 643—1 to the terminal of the relay 643 to which the wire 646 is connected. A wire 650 extends from the other contact of the contacts 643—1 to one contact of the switch 614—1, while wires 651 and 652 are extended from the other contact of this switch back to the wire L2, thus to afford a holding circuit through the contacts 643—1 and around the switch 640.

The operation of the relay 643 also serves to condition a circuit to the relay 609—1 of the control unit, and such circuit is finally completed in timed relation to the completion of the cycle of operation in which the machine is then engaged. Thus a wire 653 extends from the line wire L2 to one of the contacts 643—2, and a wire 654 extends from the other of these two contacts to one contact of a switch 655. The wire 656 extends from the other contact of the switch 655 to one terminal of the solenoid 609—1, and a wire 657 connects the other terminal of this solenoid to the line wire L1. Thus after the relay 643 has been energized, the energizing circuit to the solenoid 609—1 may be completed by closure of the switch 655, and this is accomplished at the end of a cycle of operation of a machine by cam 658 mounted on the end of the cam shaft 108, as viewed in Fig. 38 of the drawings.

Upon closure of the timing switch 655, the solenoid 609—1 is energized, then the disc 604 and the associated sleeve 600 are released for rotation by the friction clutch 600C. As will be evident in Figs. 71, 72 and 91A, such rotation of the sleeve 600 is effective first to energize the solenoid 630 so that the paper feed mechanism will be conditioned for a long feed after the total has been printed. This circuit for the solenoid 630 is afforded by a wire 659 extended from the line wire L1 to one terminal of the solenoid 630, and a wire 660 from the other terminal of the solenoid is connected to one blade of the switch 614—4, the other blade of which is connected by a wire 662 to one of the contacts 643—3. The other of the contacts 643—3 is connected by a wire 663 to the line wire L2. Thus this circuit is conditioned by the relay 643 and is finally closed by the cam 613—4 after the rotation of the sleeve 600 has started. The cam 610 then actuates the cable 526T1 so as to start operation of the machine through a T1 total cycle as hereinbefore explained. At the end of a full rotation of the sleeve 600, the latch 605 becomes effective to stop such rotation, and during the latter portion of the cycle of operation of the sleeve 600, the switch 614—3 is closed and then opened so that this switch may again be utilized to start operation of the related machine from which the numerical data is being transferred to the set up mechanism 112 of the adding machine.

When a T2 total is to be taken, the closure of the switch 642 is effective to energize a T2 control relay 664, this circuit being provided by a wire 665 extended from the wire 645 to one terminal of the relay 664, and wires 666 and 666A extended in series from the other terminal of this relay to one contact of the switch 642 while the other contact of this switch being connected by a wire 666B to the line wire L2. Upon closure of operation of the relay 664, a holding circuit for this relay is provided. This circuit is afforded by a wire 667 from the wire 666 to one of the contacts 664—1 of the relay 664, the other of these two contacts being connected by a wire 668 to one of the blades of the switch 614—6, the other blade of which is connected by a wire 669 to the line wire L2. When the relay 664 is thus energized, a circuit is conditioned to the solenoid 609—1 through the contact 664—2 of the relay. Thus a wire 670 and a branch lead 671 connect the line wire L2 with one of the contacts 664—2, while a wire 672 is extended from the other of these two contacts to the wire 654 and hence a circuit is conditioned to the timing switch 655, and upon closure of the timing switch at the end of the last adding cycle of the machine, the solenoid 609—1 will be energized so as to start the rotative movement of the sleeve 600. When this occurs, the list feed solenoid 630 will be energized, due to the closure of the switch 614—4, and by reason of the actuation of the Bowden cable 526T1, a T1 total cycle will be initiated.

The operation of the sleeve 600, when it is initiated by the action of the T2 relay 664, is also effective to initiate operation of the sleeve 601 after the rotation of the sleeve 600 has been completed. This is accomplished by means that are conditioned by the operation of the T2 relay 664. Thus a pair of contacts 664—3 of this relay are connected on one side by wire 901 to the wire 670, while a wire 902 extends from the other one of these contacts to the switch 614—2, and a wire 903 is extended to one terminal of the solenoid 609—2, the other terminal of this solenoid being connected to the wire 644. Thus an energizing circuit for the solenoid 609—2 is conditioned by the relay 664, and near the end of the cycle of rotation of the sleeve 600, the switch 614—2 is closed, so that the solenoid 609—2 is operated and the disc 604C is released. This initiates rotation of the sleeve 601, and causes the Bowden cable 526T2 so as to initiate a T2 cycle of operation of the adding machine. Soon after the rotation of the sleeve 601 has been initiated, the list feed solenoid 630 is energized, and this is accomplished through a circuit that is conditioned by a pair of contacts 664—4 of the T2 relay 664. Thus a wire 907 being extended from the wire 670 to one of these contacts, and thus a wire 908 being extended from the other of these contacts to the contact 614—5. A wire 909 being extended from the other of the contacts 614—5 to the wire 660. This affords an energizing circuit for the list feed solenoid 630, and this circuit is closed soon after the rotation of the sleeve 601 has been initiated. It will be evident of course that after the various functions of the relays 643 and 664 have been accomplished the holding circuits therefor will be broken by the action of the cams 613—1 and 613—6 respectively.

It will also be observed that when the operation of the sleeve 600 of the total unit has been initiated due to the controlling action of the relay 664, the switch 614—3 is in effect disabled, and this is accomplished, by extending the circuit from the switch 614—3 by a wire 610 through a pair of normally closed contacts 664—5 of the T2 relay 664 so that these normally closed contacts will be opened by the relay 664 at the time when the switch 614—3 is closed.

The set up means for controlling the setting of the slides 111 may take other forms such as that illustrated in my aforesaid copending application Serial No. 587,579, and such mechanism has been illustrated in Figs. 92 to 96 of the drawings. As there shown, the set up means 404M whereby the setting of the slides 400M is controlled is substantially the same for each order of the accumulator, or in other words, for each of the slides 400M. Thus, a plurality of set up bars 425M are mounted parallel to and just to the left of the respective slides 400M, and these set up bars are supported in guiding combs 426M and 427M for limited longitudinal movement parallel to the path of movement of the slides 400M. Each of the set up bars 425M has five set up pins 430M mounted therein by means of slots formed in the horizontal edge flanges of the bars 425M for limited vertical movement. The spacing of the pins 430 M is such that the right-hand edges thereof are spaced apart in an amount equal to two units of movement of the related slide 400M, while each of the set up bars is adapted to move in an endwise direction through a distance equal to one unit of movement of the related slide 400M. At the beginning of each cycle of operation of the machine, all of the set up bars 425 are in their right-hand positions, Fig. 95, but in the course of set up operation of the mechanism, those set up bars that are disposed in order wherein an even number is to be represented move to the left through one unit of movement and into abutment with stop means 431M, as will hereinafter be described in detail. The pins 430M are so arranged that when they are in their lower positions, as shown in Fig. 95, they are disposed below the lower edge of the related slide 400M, but when a pin 430M is moved to its upper position, the pin is disposed in the path of movement of the left hand end of the related slide 400M so as to stop the yieldingly induced left hand or set up movement of the slide The pins 430M are connected to the related Bowden wires 75AM, as shown in Fig. 95, the sheaths 75BM of the Bowden wires being anchored on an anchoring plate 432M that is disposed in a fixed position beneath the supporting combs of the set up means 404M. As to any particular order of the sensing means and the related order of the set up means, the cables 75AM are connected to the pins 430M, in the related order of the set up means in the manner hereinbefore described. With this arrangement, the left-hand pin 430M, Fig. 95, will be actuated each time an odd number is to be represented, and when such a left-hand pin is actuated to its upper positions, it is disposed in such a relation that it will engage a depressible stop plate 433M when forces are applied to the bar 425M in a left-hand direction Thus under such circumstances the set up bar will move but slightly to the left. as an example, the sensing of perforations in a printing device that are representative of the digit "1" will cause the two end ones of the pins 430M to be moved upwardly, and the left-hand pin will hold the set up bar 425M against appreciable left-hand movement, while the most right-hand pin 430M will stop the movement of the related slide 400M after this slide has moved through one unit of movement. Such action may well be compared with the action in the event that the digit "2" has been represented on the printing and control device. In such an instance only the most right-hand one of the pins 430M will be actuated to its upper position, and hence the related slide 400M will move one unit before it engages the pin 430 M that has been set, and will then move through an additional unit until such time as the left-hand end of the set up bar engages the stop plate 433M. A similar action is attained with respect to all of the other digits that may be represented by the code of Fig. 39A. After the restoring movement of the slides 400M has been completed all of the pins 430M are restored to their lowermost positions, and the restoring movement of the pins 430M is accomplished by a plurality of lever arms 435 M, one of which is pivotally connected at 436M to each of the slides 400M. These lever arms overlie the row of pins 430M that are related to the respective slides upon which such lever arms are mounted, and after the slides have been restored to their zero positions, all of the lever arms 435 are moved downwardly by bail or by means, similar to the bar 210 that overlies the several levers 435M. When the lever arms 435M are in their lower or restored positions the left-hand ends thereof are positioned in engagement with a stop plate 439M, and thus each slide 400M will be retained in its zero position unless the actuation of one or more pins 430M has raised the associated lever arm 435M so as to disengage the same from the stop plate 439M.

Since the set up bars 425M may in many instances move to the left from the normal positions shown in Fig. 95, means are also afforded for restoring these set up bars to their normal positions. In the present case such means comprise a rocking plate 440M that is operated by a bell crank 441M and cam means, Fig. 95, provided on the cam shaft 375M.

From the foregoing description it will be evident that the present invention affords accumulator mechanism having a wide field of usefulness and which is readily adaptable to the problems of adaptation involved in correlating the mechanism with different kinds and types of automatic business machines. Under the present invention the set up of the accumulator slides may be readily controlled by automatic means, and the total cycles of different kinds may be automatically instituted and controlled. Moreover, the machine is particularly adapted for split field operation, and for use of one or more of such split fields either for accumulating purposes or for numbering purposes. The provision of zero suppressing means in the form of an independently removable unit serves of course to facilitate modification of the unit for split field operation as by bending or removal of one or more of the transfer ears from the pawls of such unit; and since the related actuating springs for operation of such unit are normally in retracted positions, the insertion and removal of the unit may be readily and easily accomplished.

The total control means of the present invention are such as to simplify the use of the accumulator mechanism where automatic total controls are desirable, and yet the total control mechanism is such that different totals may be taken under manual control when this is necessary. The total taking operations under the present invention are governed by timing and control means that operate more or less independently of the normal machine cycle and thus the timing of the total operations and the correlation of successive automatic total taking operations may be readily attained.

It will also be evident that the accumulator mechanism of the present invention is advantageous in operation, particularly insofar as the restoring of the carry over mechanism is concerned, for the spring means of the carry over mechanism is lightly tensioned during the restoring period while heavy tension is afforded during carry over periods so as to thereby assure accuracy of operation.

Thus, while I have illustrated and described the preferred embodiments of my invention, it is to be understood that these are capable of variation and modification and I therefore do not wish to be limited to the precise details set forth, but desire to avail myself of such changes and alterations as fall within the purview of the following claims.

I claim:

1. In apparatus of the type described, a plurality of slides movable in opposite directions through setting and return strokes, a supporting shaft, a plurality of accumulator wheels rotatably mounted on said supporting shaft and engageable with said slides, means for moving said accumulator wheels into and out of engagement with said slides, said means comprising a pair of spaced control racks, a gear segment normally disposed between said control racks but shiftable into engagement with either of said control racks, means for selectively shifting said gear means normally urging said gear segment in one direction to engage said gear segment with one of said control racks, means for moving said gear segment, against the action of said urging means, into engagement with the other of said control racks, and means coacting with said gear segment and with one of said control racks, when said gear segment is engaged with said one control rack, for moving said supporting shaft into position to engage said accumulator wheels carried thereby with said slides while said slides move through their returns strokes and coacting with said gear segment and the other of said racks, when said gear segment is engaged with said other control rack, for moving said supporting shaft into position to move said accumulator wheels into engagement with said slides while said slides move through their setting strokes.

2. In apparatus of the type described, a plurality of slides movable in opposite directions through setting and returns strokes, a supporting shaft, a plurality of accumulator wheels rotatably mounted on said supporting shaft and engageable with said slides, means for moving said accumulator wheels into and out of engagement with said slides, said means comprising a pair of spaced control racks, a gear segment normally disposed between said control racks but shiftable into engagement with either of said control racks, means for selectively shifting said gear segment into and out of engagement with said control racks, a spring normally urging said gear segment in one direction to engage said gear segment with one of said control racks, means for moving said gear segment, against the action of said spring, into engagement with the other of said control racks, and means coacting with said gear segment and with one of said control racks, when said gear segment is engaged with said one control rack, for moving said supporting shaft into position to engage said accumulator wheels carried thereby with said slides while said slides move through their return strokes and coacting with said gear segment and the other of said racks, when said gear segment is engaged with said other control rack, for moving said supporting shaft into position to move said accumulator wheels into engagement with said slides while said slides move through their setting strokes.

3. In apparatus of the character described, a plurality of slides movable in opposite directions through setting and return strokes, a supporting frame, an accumulator wheel carriage mounted in said supporting frame and movable relative thereto, a shaft rotatably journaled in said accumulator wheel carriage, a plurality of accumulator wheels rotatably mounted upon said shaft and movable, with said shaft, into and out of engagement with said slides, a pair of spaced control members, a member rockably mounted in said supporting frame and normally disposed between said control members, means normally urging said rockably mounted member in a direction to engage one of said control members, means for moving said rockably mounted member, against the action of said urging means, into engagement with the other of said control members, and means coacting with said rockably mounted member when said rockably mounted member is in engagement with one of said control members, and said one control member is operated, for moving said accumulator wheel carriage and said shaft and said accumulator wheels carried thereby to dispose said accumulator wheels in engagement with said slides during the return strokes of said slides but coacting with said rockably mounted member, when said rockably mounted member is in engagement with the other of said control members, for moving said accumulator wheel carriage and said shaft and said accumulator wheels carried thereby to move said accumulator wheels into engagement with said slides during the setting strokes of said slides.

4. In an adding machine a plurality of set up slides and differential set-up means therefor, a plurality of adding units each including shiftable accumulator wheels and associated carry-over mechanism and zero stop means, each accumulator unit including a pair of cams for shifting said accumulator wheels into and out of engagement with said slides, an adding control rack and a total control rack mounted for parallel reciprocating movements, a plurality of rocking control assemblies allocated one to each of said units and each including a gear segment and associated with the cams of the related unit for rocking movement about a predetermined axis and for sliding movement along said axis between an adding position wherein said gear segment is engaged with said adding control rack, a total position wherein said segment is engaged with said total control rack, and an idle position wherein said segment is disengaged from both of said racks, means operable in each machine cycle to reciprocate said control racks through cycles so timed that engagement of one of said segments with said adding control rack engages the related wheels with said slides during the restoring movements of the slides, while engagement of one of said segments with said total control rack engages the related wheels with said slides during the setting movements thereof, and means associated with each rocking assembly to render the related zero stop means effective when such segment is engaged with said total control rack.

5. In an adding machine a plurality of set up slides and differential set-up means therefor, a plurality of adding units each including shiftable accumulator wheels and associated carry-over mechanism and zero stop means, each accumulator unit including a pair of cams for shifting said accumulator wheels into and out of engagement with said slides, an adding control rack and a total control rack mounted for parallel reciprocating movements, a plurality of rocking control assemblies allocated one to each of said units and each including a gear segment and associated with the cams of the related unit for rocking movement about a predetermined axis and for sliding movement along said axis between an adding position wherein said gear segment is engaged with said adding control rack, a total position wherein said segment is engaged with said total control rack, and an idle position wherein said segment is disengaged from both of said racks, means operable in each machine cycle to reciprocate said control racks through cycles so timed that engagement of one of said segments with said adding control rack engages the related wheels with said slides during the restoring movements of the slides, while engagement of one of said segments with said total control rack engages the related wheels with said slides during the setting movements thereof, means associated with each rocking assembly to render the related zero stop means effective when such segment is engaged with said total control rack, a total control shaft settable to different total positions, and cams on said total control shaft associated with the respective assemblies and operable to set the several assemblies in different combinations of positions in the different set positions of said total control shaft.

6. In an adding machine, a plurality of differentially settable slides allocated to the respective orders of numerical amounts to be introduced into the machine, restoring means for moving said slides to normal zero positions and for releasing said slides for setting movement, differentially settable means for governing said setting movement of the respective slides, a shiftable accumulator unit including a plurality of accumulator wheels allocated to and engageable with the respective slides when said unit is in an operating position, spring operated carry-over segments allocated to the respective accumulator wheels into which the introduction of carry-over amounts may be required and with which said wheels are engaged when said unit is in a rest position, a pair of cams for shifting said unit between said positions and normally operable to maintain said unit in said rest position, a restoring bar rigidly connecting said cams and operable to restore said carry-over segments to normal positions, individual conditioning latch means for the respective carry-over segments and respectively arranged for release by the wheel of the next lower order, a main latch for releasing said carry-over segments after release thereof by said conditioning latch means, normally ineffective zero stop means associated with said unit, an adding control rack and a total control rack mounted for parallel reciprocating movements, a rocking control assembly including a gear segment and associated with said cams for rocking movement about a predetermined axis and for sliding movement along said axis between an adding position wherein said gear segment is engaged with said adding control rack, a total position wherein said segment is engaged with said total control rack and an idle position wherein said segment is disengaged from both of said racks, means operable in each machine cycle to reciprocate said control racks through cycles so timed that engagement of said segment with said adding control rack engages said wheels with said slides during the restoring movements of the slides, while engagement of said segment with said total control rack engages said wheels with said slides during the setting movements thereof, means associated with said rocking assembly to render said zero stop means effective when said segment is engaged with said total control rack, and means for controlling the setting of said rocking assembly.

7. In an adding machine, a plurality of differentially settable slides, restoring means for moving said slides to normal zero positions and for releasing said slides for setting movement, differentially settable means for governing said setting movement of the respective slides, a shiftable accumulator unit including a plurality of accumulator wheels allocated to and engageable with the respective slides when said unit is in an operating position, pivoted carry-over segments allocated to the respective accumulator wheels into which the introduction of carry-over amounts may be required and with which said wheels are engaged when said unit is in a rest position, a pair of cams mounted on the same axis as said segments and operable to shift said unit between said positions and normally operable to maintain said unit in said rest position, a restoring bar rigidly connecting said cams and operable to restore said carry-over segments to normal positions, individual conditioning latch means for the respective carry-over segments and respectively arranged for release by the wheel of the next lower order, a main latch for releasing said carry-over segments after release thereof by said conditioning latch means, normally ineffective zero stop means associated with said unit, an adding control rack and a total control rack mounted for parallel reciprocating movements, a rocking control assembly including a gear segment mounted for rocking movement on the same axis as said cams and associated with said cams for rocking movement about a predetermined axis and for sliding movement along said axis between an adding position wherein said gear segment is engaged with said adding control rack, a total position wherein said segment is disengaged from both of said racks, means operable in each machine cycle to reciprocate said control racks through cycles so timed that engagement of said gear segment with said adding control rack engages said wheels with said slides during the restoring movements of the slides, while engagement of said gear segment with said total control rack engages said wheels with said slides during the setting movements thereof, means associated with said rocking assembly to render said zero stop means effective when said segment is engaged with said total control rack, and means for controlling the setting of said rocking assembly.

8. In an adding machine, a plurality of set up slides and differential set-up means therefor, an adding unit including shiftable accumulator wheels and associated carry-over mechanism and zero stop means, a pair of cams for shifting said accumulator wheels into and out of engagement with said slides, an adding control rack and a total control rack mounted for parallel reciprocating movements, a rocking control assembly including a gear segment and associated with said cams for rocking movement about a predetermined axis and for sliding movement along said axis between an adding position wherein said gear segment is engaged with said adding control rack, a total position wherein said segment is engaged with said total control rack, and an idle position wherein said segment is disengaged from both of said racks, means operable in each machine cycle to reciprocate said control racks through cycles so timed that engagement of said segment with said adding control rack engages said wheels with said slides during the restoring movements of the slides, while engagement of said segment with said total control rack engages said wheels with said slides during the setting movements thereof, means associated with said rocking assembly to render said zero stop means effective when said segment is engaged with said total control rack, means for controlling the setting of said rocking assembly, a latch for latching said total control rack in a predetermined position wherein said accumulator wheels are engaged with said slides, and means for governing the effectiveness of said latch.

9. In an adding machine, a plurality of set up slides and differential set-up means therefor, an adding unit including shiftable accumulator wheels and associated carry-over mechanism and zero stop means, a pair of cams for shifting said accumulator wheels into and out of engagement with said slides, an adding control rack and a total control rack mounted for parallel reciprocating movements, a rocking control assembly including a gear segment and associated with said cams for rocking movement about a predetermined axis and for sliding movement along said axis between an adding position wherein said gear segment is engaged with said adding control rack, a total position wherein said segment is engaged with said total control rack, and an idle position wherein said segment is disengaged from both of said racks, means operable in each machine cycle to reciprocate said control racks through cycles so timed that engagement of said segment with said adding control rack engages said wheels with said slides during the restoring movements of the slides, while engagement of said segment with said total control rack engages said wheels with said slides during the setting movements thereof, means associated with said rocking assembly to render said zero stop means effective when said segment is engaged with said total control rack, a lever for controlling the setting of said rocking assembly, a settable control cam acting on said lever and urged to a normal position wherein said rocking assembly is engaged with said adding control rack, means for moving said control cam to a set position wherein said rocking assembly is engaged with said total control rack, latch means for holding said control cam in said set position, and means for releasing said latch at the end of a total cycle of the machine.

10. In an adding machine a plurality of set up slides and differential set-up means therefor, a plurality of adding units each including shiftable accumulator wheels and associated carry-over mechanism and zero stop means, each accumulator unit including a pair of cams for shifting said accumulator wheels into and out of engagement with said slides, an adding control rack and a total control rack mounted for parallel reciprocating movements, a plurality of rocking control assemblies allocated one to each of said units and each including a gear segment and associated with the cams of the related unit for rocking movement about a predetermined axis and for sliding movement along said axis between an adding position wherein said gear segment is engaged with said adding control rack, a total position wherein said segment is engaged with said total control rack, and an idle position wherein said segment is disengaged from both of said racks, means operable in each machine cycle to reciprocate said control racks through cycles so timed that engagement of one of said segments with said adding control rack engages the related wheels with said slides during the restoring movements of the slides, while engagement of one of said segments with said total control rack engages the related wheels with said slides during the setting movements thereof, means associated with each rocking assembly to render the related zero stop means effective when such segment is engaged with said total control rack, a total control shaft settable to different total positions and having individual control cams thereon operatively related to the respective rocking assemblies for controlling the positions thereof, a latch for holding said control shaft in any set position, and means for releasing said latch at the end of a total taking cycle.

11. In an adding machine, a plurality of set up slides and differential set-up means therefor, an adding unit including shiftable accumulator wheels and associated carry-over mechanism and zero stop means, a pair of cams for shifting said accumulator wheels into and out of engagement with said slides, an adding control rack and a total control rack mounted for parallel reciprocating movements, a rocking control assembly including a gear segment and associated with said cams for rocking movement about a predetermined axis and for sliding movement along said axis between an adding position wherein said gear segment is engaged with said adding control rack, a total position wherein said segment is engaged with said total control rack, and an idle position wherein said segment is disengaged from both of said racks, means operable in each machine cycle to reciprocate said control racks through cycles so timed that engagement of said segment with said adding control rack engages said wheels with said slides during the restoring movements of the slides, while engagement of said segment with said total control rack engages said wheels with said slides during the setting movements thereof, means associated with said rocking assembly to render said zero stop means effective when said segment is engaged with said total control rack, and means for controlling the setting of said rocking assembly.

12. In an adding machine a plurality of set up slides and differential set-up means therefor, a plurality of adding units each including shiftable accumulator wheels and associated zero stop means, carry-over segments for said accumulator wheels mounted for rocking movement on a common axis, each accumulator unit including a pair of cams pivoted on said axis for shifting said accumulator wheels into and out of engagement with said slides, an adding control rack and a total control rack mounted for parallel reciprocating movements, a plurality of rocking control assemblies allocated one to each of said units and each including a gear segment and associated with the cams of the related unit for rocking movement about said axis and for sliding movement along said axis between an adding position wherein said gear segment is engaged with said adding control rack, a total position wherein said segment is engaged with said total control rack, and an idle position wherein said segment is disengaged from both of said racks, means operable in each machine cycle to reciprocate said control racks through cycles so timed that engagement of one of said segments with said adding control rack engages the related wheels with said slides during the restoring movements of the slides, while engagement of one of said segments with said total control rack engages the related wheels with said slides during the setting movements thereof, means associated with each rocking assembly to render the related zero stop means effective when such segment is moved into engagement with said total control rack, and means for controlling the setting of said rocking assemblies.

13. In an adding machine, a plurality of set up slides and differential set-up means therefor, an adding unit including shiftable accumulator wheels and associated carry-over mechanism and zero stop means, a pair of cams for shifting said accumulator wheels into and out of engagement with said slides, an adding control rack and a total control rack mounted for parallel reciprocating movements, a rocking control assembly including a gear segment and associated with said cams for rocking movement about a predetermined axis and for sliding movement along said axis between an adding position wherein said gear segment is engaged with said adding control rack, a total position wherein said segment is engaged with said total control rack, and an idle position wherein said segment is disengaged from both of said racks, means operable in each machine cycle to reciprocate said control racks through cycles so timed that engagement of said segment with said adding control rack engages said wheels with said slides during the restoring movements of the slides, while engage- ment of said segment with said total control rack engages said wheels with said slides during the setting movements thereof, means associated with said rocking assembly to render said zero stop means effective when said segment is engaged with said total control rack, a lever for controlling the setting of said rocking assembly, a settable control cam acting on said lever and urged to a normal position wherein said rocking assembly is engaged with said adding control rack, means for moving said control cam to a set position wherein said rocking assembly is engaged with said total control rack, latch means for holding said control cam in said set position, means for releasing said latch at the end of a total cycle of the machine, and means actuated by said control cam for releasing all of said slides when a total is to be taken.

14. In an adding machine a plurality of set up slides and differential set-up means therefor, a plurality of adding units each including shiftable accumulator wheels and associated carry-over mechanism and zero stop means, each accumulator unit including a pair of cams for shifting said accumulator wheels into and out of engagement with said slides, an adding control rack and a total control rack mounted for parallel reciprocating movements, a plurality of rocking control assemblies allocated one to each of said units and each including a gear segment and associated with the cams of the related unit for rocking movement about a predetermined axis and for sliding movement along said axis between an adding position wherein said gear segment is engaged with said adding control rack, a total position wherein said segment is engaged with said total control rack, and an idle position wherein said segment is disengaged from both of said racks, means operable in each machine cycle to reciprocate said control racks through cycles so timed that engagement of one of said segments with said adding control rack engages the related wheels with said slides during the restoring movements of the slides, while engagement of one of said segments with said total control rack engages the related wheels with said slides during the setting movements thereof, means associated with each rocking assembly to render the related zero stop means effective when such segment is engaged with said total control rack, a total control shaft settable to different total positions and having individual control cams fixed thereon and operated thereby and operatively related to the respective rocking assemblies for controlling the positions thereof, a latch for holding said control shaft in any set position, an individual control cam operatively related to a selected one of said rocking assemblies and arranged for cooperation with said latch, and means for releasing said latch at the end of a total taking cycle.

15. In an adding machine a plurality of set up slides and differential set-up means therefor, a plurality of adding units each including shiftable accumulator wheels and associated zero stop means, carry-over segments for said accumulator wheels mounted for rocking movement on a common axis, each accumulator unit including a pair of cams pivoted on said axis for shifting said accumulator wheels into and out of engagement with said slides, an adding control rack and a total control rack mounted for parallel reciprocating movements, a plurality of rocking control assemblies allocated one to each of said units and each including a gear segment and associated with the cams of the related unit for rocking movement about said axis and for sliding movement along said axis between an adding position wherein said gear segment is engaged with said adding control rack, a total position wherein said segment is engaged with said total control rack, and an idle position wherein said segment is disengaged from both of said racks, means operable in each machine cycle to reciprocate said control racks through cycles so timed that engagement of one of said segments with said adding control rack engages the related wheels with said slides during the restoring movements of the slides, while engagement of one of said segments with said total control rack engages the related wheels with said slides during the setting movements thereof, means associated with each rocking assembly to render the related zero stop means effective when such segment is moved into engagement with said total control rack, power means for effecting setting of said rocking assemblies, and means for controlling the operation of said last mentioned means.

16. In an adding machine, a plurality of set up slides and differential set-up means therefor, an adding unit including shiftable accumulator wheels and associated zero stop means, cam means for shifting said accumulator wheels into and out of engagement with said slides, an adding control member and a total control member mounted for parallel control movements, a rocking control assembly including a gear segment and associated with said cam means for rocking movement about a predetermined axis and for sliding movement along said axis between an adding position wherein said gear segment is engaged with said adding control member, a total position wherein said segment is engaged with said total control member, and an idle position wherein said segment is disengaged from both of said control members, means operable in each machine cycle to operate said control members through cycles so timed that engagement of said segment with said adding control member engages said wheels with said slides during the restoring movements of the slides, while engagement of said segment with said total control member engages said wheels with said slides during the setting movements thereof, means associated with said rocking assembly to render said zero stop means effective when said segment is engaged with said total control member, and means for controlling the setting of said rocking assembly.

17. In an adding machine, a plurality of set up slides and differential set-up means therefor, an adding unit including a plurality of sets of shiftable accumulator wheels and carry over means and zero stop means associated with each such set, individual cam means allocated to the respective sets for shifting said accumulator wheels into and out of engagement with said slides, an adding control member and a total control member mounted for parallel control movements, a plurality of rocking control assemblies allocated to the respective sets and associated with the related cam means for rocking movement about a predetermined axis and for sliding movement along said axis between an adding position wherein the assembly is operatively engaged with said adding control member, a total position wherein the assembly is engaged with said total control member, and an idle position wherein the assembly is disengaged from both of said control members, means operable in each machine cycle to operate said control members through cycles so timed that engagement of an assembly with said adding control member engages the wheels of the related set with said slides during the restoring movements of the slides, while engagement of an assembly with said total control member engages the wheels of the related set with said slides during the setting movements thereof, means associated with each of said rocking assemblies to render the related zero stop means effective when an assembly is engaged with said total control member, a main total setting member governing the setting of all of said rocking assemblies, and an individual total setting member for individually controlling the setting of a selected one of said assemblies.

18. In an adding machine, a plurality of differentially settable slides and differentially operable set-up means therefor, an accumulator unit including a plurality of accumulator wheels shiftable into and out of engagement with said slides and including carry-over mechanism and zero stop means, a total control shaft having settable governing means associated therewith for shifting said accumulator wheels into and out of engagement with said racks and normally operable to cause an adding cycle, said shaft being settable through rocking movements in the same direction but of different magnitudes to any one of a plurality of total positions to cause different types of total taking cycles of operation thereof, constantly operated power means for setting said governing means to said total setting, a plurality of connecting devices adapted to be selectively connected to said constantly operated power means to set said governing means to said different total positions selectively, and means for selectively rendering said connecting devices effective.

19. In an adding machine, a plurality of differentially settable slides and differentially operable set-up means therefor, an accumulator unit including a plurality of accumulator wheels shiftable into and out of engagement with said slides and including carry-over mechanism and zero stop means, settable governing means for shifting said accumulator wheels into and out of engagement with said racks and normally operable to cause an adding cycle and settable to different total positions to cause different total taking cycles of operations thereof, a total control unit including a constantly driven power source, a plurality of total timing and controlling elements forming part of such total control unit, clutch means for each of said elements for connecting the same to said power source, individual release solenoids for releasing the respective clutches, and means governed by the respective elements when operated to set said settable means to the related total position and initiate a total taking cycle of operation of the machine.

20. In an adding machine, a plurality of differentially settable slides and differentially operable set-up means therefor, an accumulator unit including a plurality of accumulator wheels shiftable into and out of engagement with said slides and including carry-over mechanism and zero stop means, settable governing means for shifting said accumulator wheels into and out of engagement with said racks and normally operable to cause an adding cycle and settable to different total positions to cause different total taking cycles of operation thereof, a total control unit including a constantly driven power source, a plurality of total timing and controlling elements forming part of such total control unit, clutch means for each of said elements for connecting the same to said power source, individual release solenoids for releasing the respective clutches, means governed by the respective elements when operated to set said settable means to the related total position and initiate a total taking cycle of operation of the machine, and relay means operable to modify the controlling action of one of said timing and controlling elements.

21. In an adding machine, a plurality of differentially settable slides and differentially operable set-up means therefor, an accumulator unit including a plurality of accumulator wheels shiftable into and out of engagement with said slides and including carry-over mechanism and zero stop means, settable governing means for shifting said accumulator wheels into and out of engagement with said racks and normally operable to cause an adding cycle and settable to different total positions to cause different total taking cycles of operation thereof, a total control unit including a constantly driven power source, a plurality of total timing and controlling elements forming part of such total control unit, clutch means for each of said elements for connecting the same to said power source, individual release solenoids for releasing the respective clutches, means governed by the respective elements when operated to set said settable means to the related total position and initiate a total taking cycle of operation of the machine, a first relay operable to control the solenoid of a first one of said elements to initiate operation thereof, a second control relay operable to control the solenoid of said first one of said elements and also operable to render said first control element operable to operate the other of said solenoids to thereby initiate operation of the second of said elements.

22. In an adding machine, a plurality of differentially settable slides, restoring means for such slides, an accumulator including accumulator wheels engageable with said slides and embodying zero stop means and carry over means, control means for governing engagement and disengagement of said accumulator wheels with respect to said slides and settable to a normal adding position or to a total position, set up means for said slides including a plurality of stop pawls pivotally mounted on and extended longitudinally from the respective slides, stop means normally disposed in the path of all of said pawls to hold the related slides in zero positions, a plurality of differentially settable stop pins disposed beneath each pawl and adapted when actuated to lift the related pawl out of alignment with respect to the stop means, each such pin when actuated being disposed as a stop in the path of the related slide to limit setting movement thereof, means for restoring said pawls and said pins, and means operated by said total control means to render said stop means ineffective when a total is to be taken.

23. In an adding machine, a plurality of set up slides and differential set-up means therefor, an adding unit including shiftable accumulator wheels and associated zero stop means, cam means for shifting said accumulator wheels into and out of engagement with said slides, an adding control member and a total control member mounted for parallel control movements, a rocking control assembly including a gear segment and associated with said cam means for rocking movement about a predetermined axis and for sliding movement along said axis between an adding position wherein said gear segment is engaged with said adding control member, a total position wherein said segment is engaged with said total control member, and an idle position wherein said segment is disengaged from both of said control members, means operable in each machine cycle to operate said control members through cycles so timed that engagement of said segment with said adding control member engages said wheels with said slides during the restoring movements of the slides, while engagement of said segment with said total control member engages said wheels with said slides during the setting movements thereof, means associated with said rocking assembly to render said zero stop means effective when said segment is engaged with said total control member, and means for controlling the setting of said rocking assembly.

24. In an adding machine, a plurality of set up slides and differential set-up means therefor, an adding unit including shiftable accumulator wheels and associated zero stop means, cam means for shifting said accumulator wheels into and out of engagement with said slides, an adding control member and a total control member mounted for parallel control movements, a rocking control assembly associated with said cam means for rocking movement about a predetermined axis and for sliding movement along said axis between an adding position wherein said assembly is operatively connected with said adding control member, a total position wherein said assembly is operatively connected with said total control member, and an idle position wherein said assembly is disengaged from both of said control members, means operable in each machine cycle to operate said control members through cycles so timed that connection of said assembly with said adding control member engages said wheels with said slides during the restoring movements of the slides, while connection of said assembly with said total control member engages said wheels with said slides during the setting movements thereof, means associated with said rocking assembly to render said zero stop means effective when said assembly is engaged with said total control member, and means for controlling the setting of said rocking assembly.

25. In an adding machine, a plurality of differentially settable slides, restoring means for such slides, an accumulator including accumulator wheels engageable with said slides and embodying zero stop means and carry over means, control means for governing engagement and disengagement of said accumulator wheels with respect to said slides and settable to a normal adding position or to a total position, set up means for said slides including a plurality of stop pawls pivotally mounted on the respective slides on axes parallel to the axis of said accumulator wheels and said pawls being extended longitudinally from the respective slides, a stop plate pivoted on an axis parallel to said axes and having one edge normally disposed in the path of all of said pawls to hold the related slides in zero positions, a plurality of differentially settable stop pins disposed beneath each pawl and adapted when actuated to lift the related pawl out of alignment with respect to the stop plate, each such pin when actuated being disposed as a stop in the path of the related slide to limit setting movement thereof, means for restoring said pawls and said pins, a rocking member mounted on an axis parallel to the axis of said accumulator wheels and operated by said total control means to shift said stop plate to an ineffective position when a total is to be taken, a normally ineffective abutment plate pivoted on an axis parallel to the axis of said accumulator wheels and having an abutment edge adapted to be moved into the path of selected of said slides to prevent setting movement thereof, and means operable by said rocking member to render said abutment plate effective in a total taking operation of the machine.

WALTER T. GOLLWITZER.

REFERENCES CITED

The following references are of record in the file of this patent:

UNITED STATES PATENTS

| Number | Name | Date |
|---|---|---|
| 1,013,910 | Vincent | Jan. 9, 1912 |
| 1,533,119 | Lasker | Apr. 14, 1925 |
| 1,562,491 | Bernau | Nov. 24, 1925 |
| 1,580,492 | Johantgen | Apr. 13, 1926 |
| 1,641,126 | Dement | Aug. 30, 1927 |
| 1,734,538 | Strother | Nov. 5, 1929 |
| 1,778,506 | Pasinski | Oct. 14, 1930 |
| 1,780,621 | Lasker | Nov. 4, 1930 |
| 1,780,884 | Lebeis | Nov. 4, 1930 |
| 1,812,161 | Mapel | June 30, 1931 |
| 1,874,709 | Perkins | Aug. 30, 1932 |
| 1,876,057 | Johantgen | Sept. 6, 1932 |
| 1,885,960 | Sundstrand | Nov. 1, 1932 |
| 1,946,505 | Sundstrand | Feb. 13, 1934 |
| 2,014,561 | Dysart | Sept. 17, 1935 |
| 2,052,905 | Sturm | Sept. 1, 1936 |
| 2,110,987 | Kammel | Mar. 15, 1938 |
| 2,140,136 | Lasker | Dec. 13, 1938 |
| 2,153,299 | Dahlberg | Apr. 4, 1939 |
| 2,221,861 | Butler | Nov. 19, 1940 |
| 2,313,982 | Williams | Mar. 16, 1943 |